United States Patent [19]
Scott

[11] Patent Number: 6,141,373
[45] Date of Patent: *Oct. 31, 2000

[54] PREAMBLE CODE STRUCTURE AND DETECTION METHOD AND APPARATUS

[75] Inventor: Logan Scott, Breckenridge, Colo.

[73] Assignee: Omnipoint Corporation, Colorado Springs, Colo.

[*] Notice: This patent issued on a continued prosecution application filed under 37 CFR 1.53(d), and is subject to the twenty year patent term provisions of 35 U.S.C. 154(a)(2).

[21] Appl. No.: 08/751,081

[22] Filed: Nov. 15, 1996

[51] Int. Cl.$^7$ .............................. A61F 2/06; H04L 27/30
[52] U.S. Cl. ..................... 375/150; 375/152; 375/142; 375/143
[58] Field of Search ..................... 375/207, 208, 375/343, 350, 367, 209, 210, 149, 150, 152, 142, 143, 145, 130; 370/515; 708/314

[56] References Cited

U.S. PATENT DOCUMENTS

| | | | |
|---|---|---|---|
| 3,569,631 | 3/1971 | Holmdel | 179/15 |
| 3,723,916 | 3/1973 | Speiser et al. | |
| 3,934,203 | 1/1976 | Schiff | 325/65 |

(List continued on next page.)

FOREIGN PATENT DOCUMENTS

| | | | |
|---|---|---|---|
| 60-5638 | 1/1985 | Japan | H04J 12/00 |
| 2211053 | 6/1989 | United Kingdom | H04L 9/00 |
| 9315573 | 8/1993 | WIPO | H04J 13/00 |
| WO 93/15573 | 8/1993 | WIPO. | |
| 9318601 | 9/1993 | WIPO | H04L 27/30 |
| WO 93/18601 | 9/1993 | WIPO. | |
| 9406217 | 3/1994 | WIPO | H04B 7/005 |
| WO 94/06217 | 3/1994 | WIPO. | |
| 9501018 | 1/1995 | WIPO | H04K 1/00 |
| WO 95/01018 | 1/1995 | WIPO. | |
| 9503652 | 2/1995 | WIPO | H04B 7/26 |
| WO 95/03652 | 2/1995 | WIPO. | |
| 9512938 | 5/1995 | WIPO | H04J 13/00 |
| WO 95/12938 | 5/1995 | WIPO. | |

OTHER PUBLICATIONS

Simon, Marvin K. et al., *Spread Spectrum Communications Handbook*, pp. 7–9, 262–266, 269–270, 297–299, 352–353 (1994).

CDSIM—a simulation environment for spreading codes, Karkkainen, Vehicular Technology Conference, Jun. 8, 1994.

W.H. Wow, Best Quadriphasse Codes Up to Length 24, Electronics Letters, vol. 29, No. 10 (Date of Publication: May 13, 1993).

(List continued on next page.)

*Primary Examiner*—Chi H. Pham
*Assistant Examiner*—Jean B Corrielus
*Attorney, Agent, or Firm*—Lyon & Lyon LLP

[57] ABSTRACT

In a first embodiment of the invention, a concatenated preamble code is formed by a kronecker product between two subcodes of the same or different lengths. The subcodes have favorable correlation properties and may be Barker codes, minimum peak sidelobe codes, Gold codes, Kasami codes, Boztas codes, or other codes. At the receiver a two-stage processor is used to detect the concatenated preamble code. The two-stage processor comprises a series of two filters, one of which is preferably a mismatched filter. In another aspect of the invention, a repeated codeword preamble is formed from a series of the same repeated short subcode. The short subcode may be an augmented or truncated odd-length code. At the receiver a single matched filter is preferably used to generate a series of spikes separated by the period of the subcode. An alert/confirm detector non-coherently adds together individual correlation spikes and reject false alarms. The alert function measures total correlation energy and adjusts detection thresholds based thereon, while the confirm function ensures that the proper number of correlation spikes exceed a detection threshold at the correct times. The preamble codes and their means for detection are preferably employed in a TDMA spread spectrum communication system, wherein a plurality of user stations communicate with a base station, one in each time slot (or virtual time slot).

17 Claims, 78 Drawing Sheets

Microfiche Appendix Included
(1 Microfiche, 31 Pages)

U.S. PATENT DOCUMENTS

| | | | |
|---|---|---|---|
| 4,100,498 | 7/1978 | Alsup et al. | 328/14 |
| 4,164,628 | 8/1979 | Ward et al. | 179/15 BA |
| 4,189,677 | 2/1980 | Cooper et al. | 325/321 |
| 4,222,115 | 9/1980 | Cooper et al. | 375/1 |
| 4,231,005 | 10/1980 | Taylor, Jr. | 343/5 NQ |
| 4,324,001 | 4/1982 | Rhodes | 375/90 |
| 4,338,579 | 7/1982 | Rhodes | 332/21 |
| 4,418,393 | 11/1983 | Zachiele, Jr. | 364/724 |
| 4,418,425 | 11/1983 | Fennel, Jr. et al. | 455/27 |
| 4,423,519 | 12/1983 | Bennett, Jr. et al. | 375/80 |
| 4,432,089 | 2/1984 | Wurzburg et al. | 370/110.1 |
| 4,484,028 | 11/1984 | Kelley et al. | 179/2 DP |
| 4,506,372 | 3/1985 | Massey | 375/116 |
| 4,525,835 | 7/1985 | Vance et al. | 370/29 |
| 4,527,275 | 7/1985 | Russell | 375/1 |
| 4,532,639 | 7/1985 | Price et al. | 375/96 |
| 4,538,281 | 8/1985 | Rajan | 375/2.2 |
| 4,550,414 | 10/1985 | Guinon et al. | 375/1 |
| 4,561,089 | 12/1985 | Rouse et al. | 370/18 |
| 4,563,774 | 1/1986 | Gloge et al. | 455/607 |
| 4,567,588 | 1/1986 | Jerrim | 370/18 |
| 4,583,048 | 4/1986 | Gumacos et al. | 329/122 |
| 4,587,662 | 5/1986 | Langewellpott | 375/1 |
| 4,599,732 | 7/1986 | Lefever | 375/13 |
| 4,601,047 | 7/1986 | Horwitz et al. | 375/2.2 |
| 4,606,039 | 8/1986 | Nicolas et al. | 375/1 |
| 4,621,365 | 11/1986 | Chiu | 375/1 |
| 4,630,283 | 12/1986 | Schiff | 375/1 |
| 4,638,494 | 1/1987 | Kartchner et al. | 375/2.2 |
| 4,653,069 | 3/1987 | Roeder | 380/31 |
| 4,660,164 | 4/1987 | Leibowitz | 364/728 |
| 4,688,210 | 8/1987 | Eizenhöfer et al. | 370/18 |
| 4,691,326 | 9/1987 | Yauchiya | 375/1 |
| 4,724,435 | 2/1988 | Moses et al. | 340/870.13 |
| 4,736,371 | 4/1988 | Tejima et al. | 370/95 |
| 4,742,512 | 5/1988 | Akashi et al. | 370/96 |
| 4,745,408 | 5/1988 | Nagata et al. | 340/825.44 |
| 4,745,628 | 5/1988 | McDavid et al. | 375/39 |
| 4,759,034 | 7/1988 | Nagazumi | 375/1 |
| 4,765,753 | 8/1988 | Schmidt | 379/60 |
| 4,774,715 | 9/1988 | Messenger | 375/1 |
| 4,787,093 | 11/1988 | Rorden | 375/23 |
| 4,797,947 | 1/1989 | Labedz | 455/33 |
| 4,817,014 | 3/1989 | Schneider | 364/728.03 |
| 4,837,786 | 6/1989 | Gurantz et al. | 370/20 |
| 4,860,307 | 8/1989 | Nakayama | 375/1 |
| 4,894,842 | 1/1990 | Brockhoven et al. | 375/1 |
| 4,928,274 | 5/1990 | Gilhousen et al. | 370/92 |
| 4,965,759 | 10/1990 | Uchida et al. | 364/604 |
| 4,995,083 | 2/1991 | Baker | 380/23 |
| 5,014,344 | 5/1991 | Golberg | 455/51 |
| 5,016,255 | 5/1991 | Dixon et al. | 375/1 |
| 5,022,046 | 6/1991 | Morrow | 375/1 |
| 5,022,047 | 6/1991 | Dixon et al. | 375/1 |
| 5,023,887 | 6/1991 | Takeuchi et al. | 375/1 |
| 5,029,184 | 7/1991 | Andren et al. | 375/1 |
| 5,097,484 | 3/1992 | Akaiwa | 375/40 |
| 5,103,459 | 4/1992 | Gilhousen et al. | 375/1 |
| 5,109,390 | 4/1992 | Gilhousen et al. | 375/1 |
| 5,132,986 | 7/1992 | Endo et al. | 375/1 |
| 5,146,471 | 9/1992 | Cowart | 375/1 |
| 5,151,698 | 9/1992 | Pophillat | 342/52 |
| 5,153,598 | 10/1992 | Alves, Jr. | 342/352 |
| 5,166,952 | 11/1992 | Omura et al. | 375/1 |
| 5,181,225 | 1/1993 | Neeser et al. | 375/1 |
| 5,206,882 | 4/1993 | Schloemer | 375/1 |
| 5,210,770 | 5/1993 | Rice | 375/1 |
| 5,228,056 | 7/1993 | Schilling | 375/1 |
| 5,239,572 | 8/1993 | Saegusa et al. | 379/61 |
| 5,257,283 | 10/1993 | Gilhousen et al. | 375/1 |
| 5,276,704 | 1/1994 | Dixon | 375/1 |
| 5,276,705 | 1/1994 | Higgins | 375/1 |
| 5,280,472 | 1/1994 | Gilhousen et al. | 370/18 |
| 5,280,537 | 1/1994 | Sugiyama et al. | 375/1 |
| 5,291,515 | 3/1994 | Uchida et al. | 375/1 |
| 5,313,457 | 5/1994 | Hostetter et al. | 370/18 |
| 5,347,284 | 9/1994 | Volpi et al. | 342/356 |
| 5,353,303 | 10/1994 | Walthall | 375/2 |
| 5,353,389 | 10/1994 | O'Clock et al. | 375/1 |
| 5,359,625 | 10/1994 | Vander Mey et al. | 375/1 |
| 5,367,544 | 11/1994 | Bruekheimer . | |
| 5,377,192 | 12/1994 | Goodings et al. | 370/95.3 |
| 5,383,219 | 1/1995 | Wheatley, III et al. | 375/1 |
| 5,392,287 | 2/1995 | Tiedemann, Jr. et al. | 370/95.1 |
| 5,400,359 | 3/1995 | Hikoso et al. | 375/1 |
| 5,410,568 | 4/1995 | Schilling | 375/205 |
| 5,414,428 | 5/1995 | Gallagher et al. | 342/132 |
| 5,414,728 | 5/1995 | Zehavi | 375/200 |
| 5,414,796 | 5/1995 | Jacobs et al. | 395/2.3 |
| 5,416,797 | 5/1995 | Gilhousen et al. | 375/705 |
| 5,436,941 | 7/1995 | Dixon et al. | 375/206 |
| 5,442,662 | 8/1995 | Fukasawa et al. | 375/205 |
| 5,469,469 | 11/1995 | Haines | 375/201 |
| 5,481,533 | 1/1996 | Honig et al. | 370/18 |
| 5,504,781 | 4/1996 | Wolf . | |
| 5,511,067 | 4/1996 | Miller | 370/18 |
| 5,535,402 | 7/1996 | Leibowitz | 395/800 |
| 5,602,832 | 2/1997 | Hudson | 370/342 |
| 5,610,940 | 3/1997 | Durrant et al. | 375/208 |
| 5,619,270 | 4/1997 | Demmer | 348/441 |
| 5,786,788 | 7/1998 | Schober et al. | 342/159 |
| 5,805,584 | 9/1998 | Kingston | 370/342 |

OTHER PUBLICATIONS

Kim et al., Optimal PN codes in a DS/SS wireless LAN system, IEEE, p. 226 (Date of Publication: Aug. 1994).

Grayson, et al., Optimum Synchronization Preamble, Electronics Letters, vol. 27, No. 1, pp. 36–38 (Date of Publication: Jan. 1991).

Blinchikoff, Range Sidelobe Reduction for Quadriphase Codes, IEEE, pp. 668–675 (Date of Publication Apr. 1996).

Ruprecht, Jurg, "Code Time Division Multiple Access: A Method for the Orthogonalization of CDMA Signals in Multipath Environment", Aachener Kolloquium "Signal theorie", *Mobile Kommunikation Systems,* Mar. 1994, pp. 1–8.

Feher, Kamilo, *JTC Modulation Standard Group—FQPSK Consortium—Spectrum utilization with compatible/expandable GMSK, QPSK and FQPSK,* JTC: Joint Technical Committee On Wireless Access, Jan. 1994.

Anderson, John B. et al., *Digital Phase Modulation,* (Plenum Press, 1986), Chap. 7, pp. 237–271.

Bird, John S., "Calculating the Performance of Linear and Square–Law Detectors", *IEEE Trans. On Aerospace & Elec. Sys.,* 31(1):39–51, Jan. 1995.

Boztas, Serdar et al., "4–Phase Sequences with Near–Optimum Correlation Properties", *IEEE Trans. On Info. Theory,* 38(3):1101–1113, May 1992.

Campbell, Colin K., "Applications of Surface Acoustice and Shallow Bulk Acoustic Wave Devices", *Proc. of the IEEE,* Oct. 1989, pp. 1453–1484.

Cohen, Marvin N., "Pulse Compression in Pulsed Doppler Radar Systems," reprinted in Morris, Guy V., *Airbourne Pulsed Doppler Radar,* Chap. 8, pp. 123–155, 1988.

Cohen, Marvin N. et al., "Minimum Peak Sidelobe Pulse Compression Codes", *IEEE Int'l Radar Conf.,* 1990, pp. 633–638.

Collins, J.H. et al., "The Role of Surface Acoustic Wave Technology in Communication Systems", *Ultrasonics*, 10(2):59–71, Mar. 1972.

de Jager, Frank et al., "Tamed Frequency Modulation, A Novel Method to Achieve Spectrum in Digital Transmission", *IEEE Trans. on Comms.*, Com–26(5):534–541, May 1978.

Dixon, Robert C., *Spread Spectrum Systems with Commercial Applications* (J. Wiley & Sons, 3d ed. 1994).

Feher, Kamilo, *Digial Comms. Satellite/Earth Station Eng.*, pp. 196–200 (Prentice–Hall 1983).

Radio Sub–system Synchronization, GSM Recommendation 05.10 (Ver. 3.5.1), Released by ETSI/PT, Oct. 1992.

Gold, Robert, "Characteristic Linear Sequences And Their Coset Functions", J. *Siam Appl. Math.*, 14(5):980–985, Sep. 1966.

Gold, R., "Optimal Binary Sequences for Spread Spectrum Multiplexing", *IEEE Trans. on Info. Theory*, IT–13(4):619–621, Oct. 1967.

Hagon, P.J. et al., "A Programmable Surface Acoustic Wave Matched Filter for Phase–Coded Spread Spectrum Waveforms", *IEEE Trans. on Microwave Theory & Techniques*, 21(4):303–306, Apr. 1973.

Hakizimana, Gaspard et al., "A New M–ary Wideband Communication System with Application to Multipath Channels—Part I: System Performance", *IEEE Trans. on Comms.*, 43(1):127–135, Jan. 1995.

Hammons, A. Roger et al., "The $Z_4$–Linearity of Kerdock, Preparata, Goethals, and Related Codes", *IEEE Trans. On Info. Theory*, 40(2):301–319, Mar. 1994.

Kato, Shuzo et al., "XPSK: A New Cross–Correlated Phase–Shift Keying Modulation Technique", *IEEE Trans. on Comms.*, Com–31(5):701–707, May 1983.

Nanayakkara, S., "High Speed Receiver Designs Based on Surface Acoustic Wave Devices", *Sixth Int'l Conf. On Digital Statellite Comms.*, Sep. 1983, pp. 16–22.

Proakis, John G., *Digital Communications* (McGraw–Hill, 2d ed. 1989), pp. 831–836.

Rohling, Hermann et al., "Mismatched–Filter Design for Periodical Binary Phased Signals", *IEEE Trans. On Aerospace & Elec. Sys.*, 25(6):890–897, Nov. 1989.

Saleh, Adel A.M. et al., "An Experimental TDMA Indoor Radio Communications System Using Slow Frequency Hopping and Coding", *IEEE Trans. on Comms.*, 39(1):152–161, Jan. 1991.

Simon, Marvin K. et al., "Optimum Performance of Suppressed Carrier Receivers with Costas Loop Tracking", *IEEE Trans. on Comms.*, Com–25(2):215–227, Feb. 1977.

Shnidman, David A., "The Calculation of the Probability of Detection and the Generalized Marcum Q–Function", *IEEE Trans. On Info. Theory*, 35(2):389–400, Mar. 1989.

Stark, W.E., "Performance of Concatenated Codes on Channels With Jamming", *IEEE Int'l Conf. on Comms.*, Cat. No. 82CH1766–5, vol. 3 of 3, pp. 7E.4.1–7E.4.5, Jun. 13–17, 1982.

Taylor, John W., Jr. et al., "Quadriphase Code–A Radar Pulse Compression Signal With Unique Characteristics", *IEEE Trans. On Aerospace & Elec. Sys.*, 24(2):156–170, Mar. 1988.

Unkauf, Manfred G., "Surface Wave Devices in Spread Spectrum Systems", reprinted in H. Matthews (ed.), *Surface Wave Filters* (Wiley 1977), pp. 477–509.

Vale, Christopher R., "Saw Quadraphase Code Generator", *IEEE Trans. On Microwave Theory & Techniquest*, MTT–29(5):410–414, May 1981.

Joint Tech. Committee on Wireless Access JTC(Air) *Standards Contribution* (*Air Interface Standards Project*), Date: Mar. 21, 1994.

Joint Tech. Committee on Wireless Access JTC(Air) *Draft PCS2000 Standard* (*PN–3390*), Date: Sep. 23, 1994.

Omnipoint Corp. PCS2000 *A Composite CDMA/TDMA Air Interface Compatibility Standard For Personal Communication in 1.8–2.2 GHz For Licensed Applications*, Feb. 2, 1995.

Omnipoint Corp. PCS2000 *A Composite CDMA/TDMA Air Interface Compatibility Standard For Personal Communication in 1.8–2.2 GHz For Licensed And Unlicensed Applications*, Aug. 1994.

N=3 FREQUENCY REUSE USING CDMA

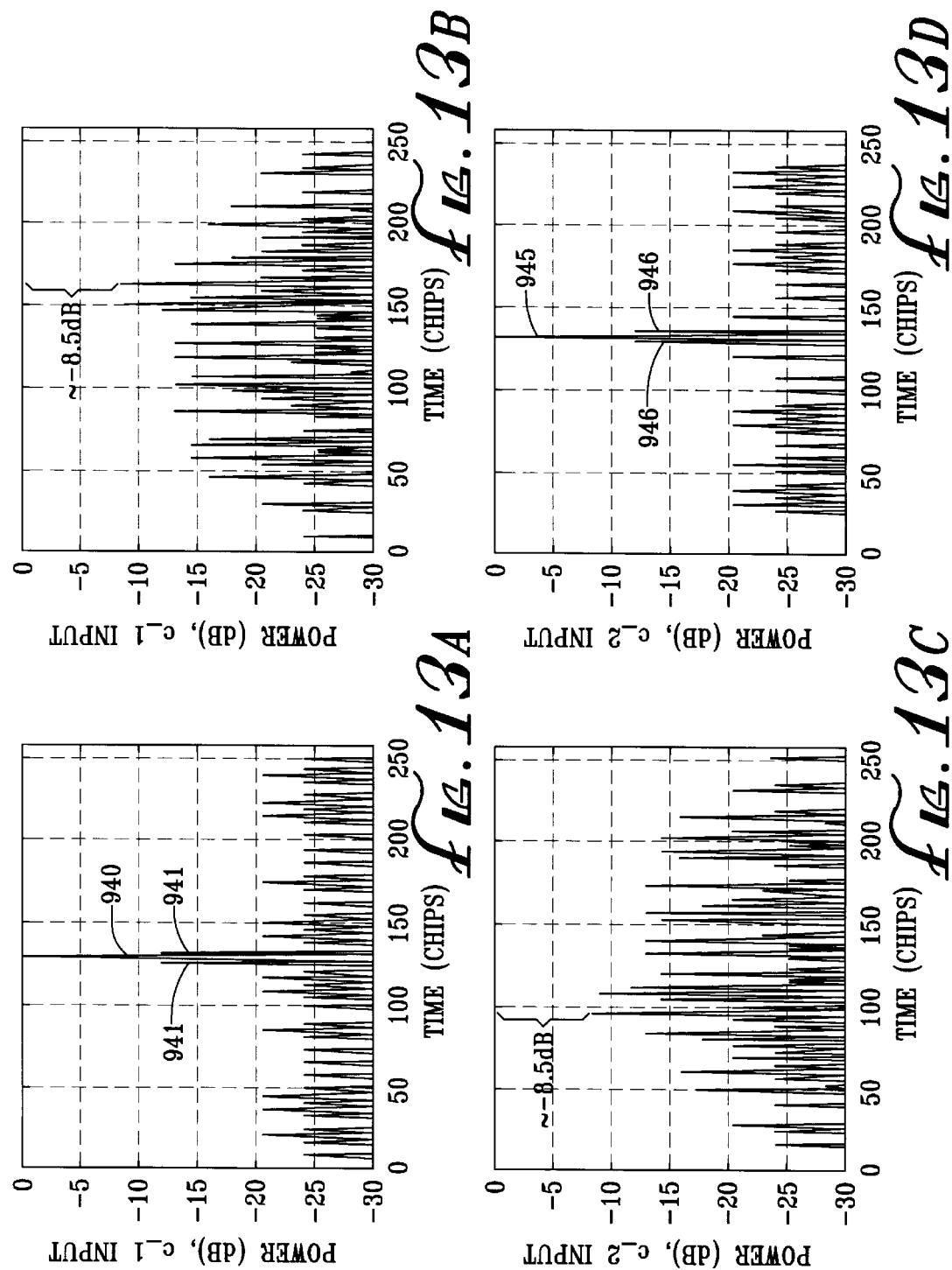

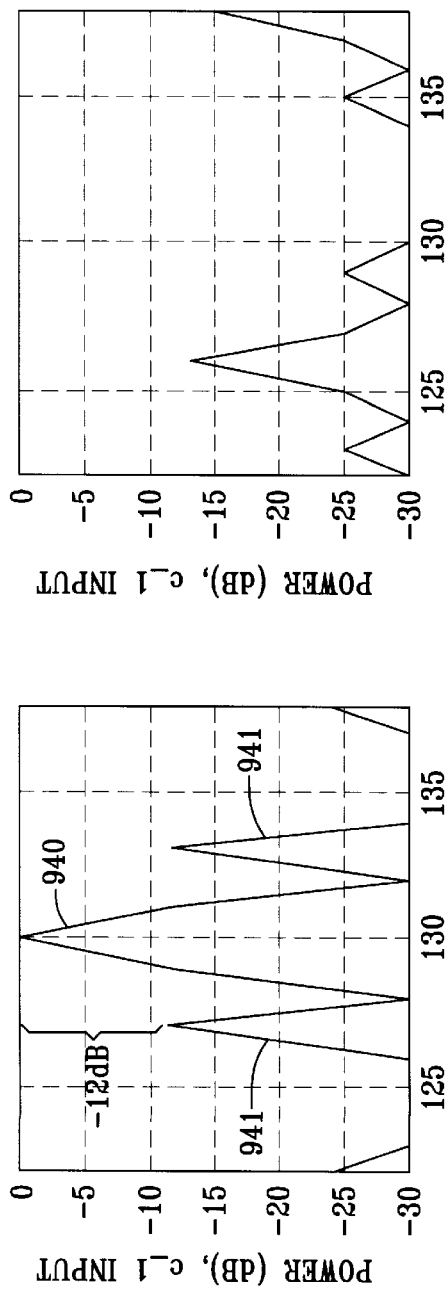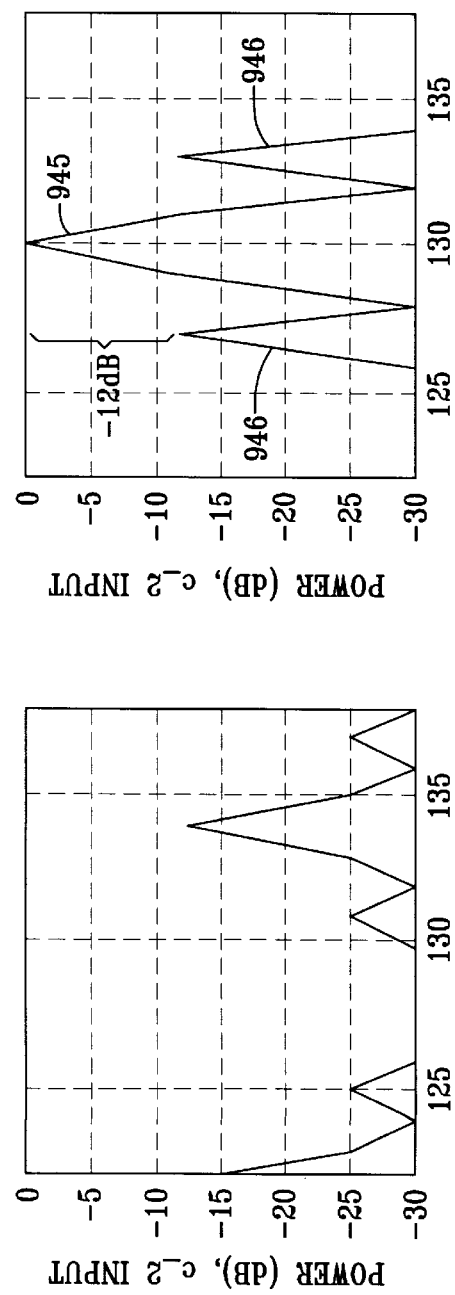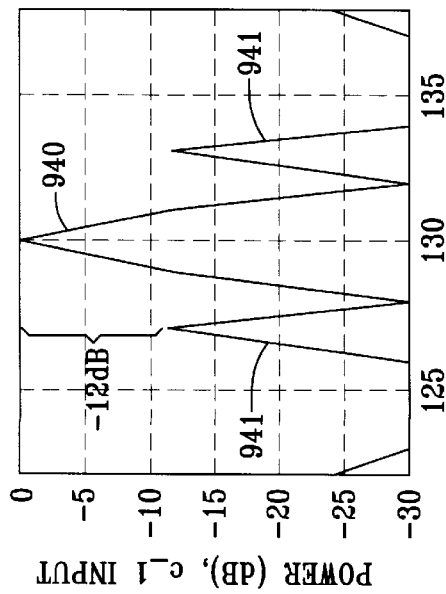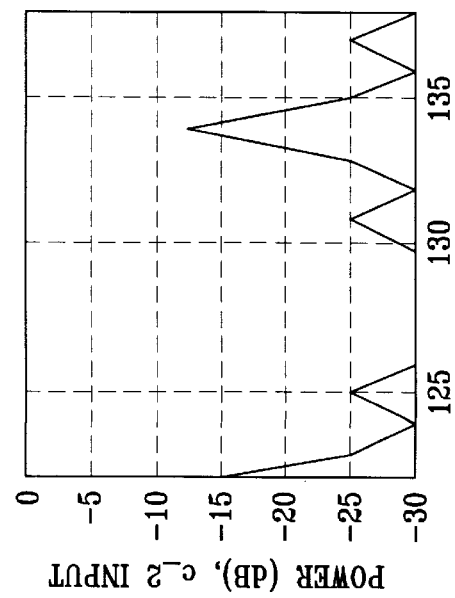

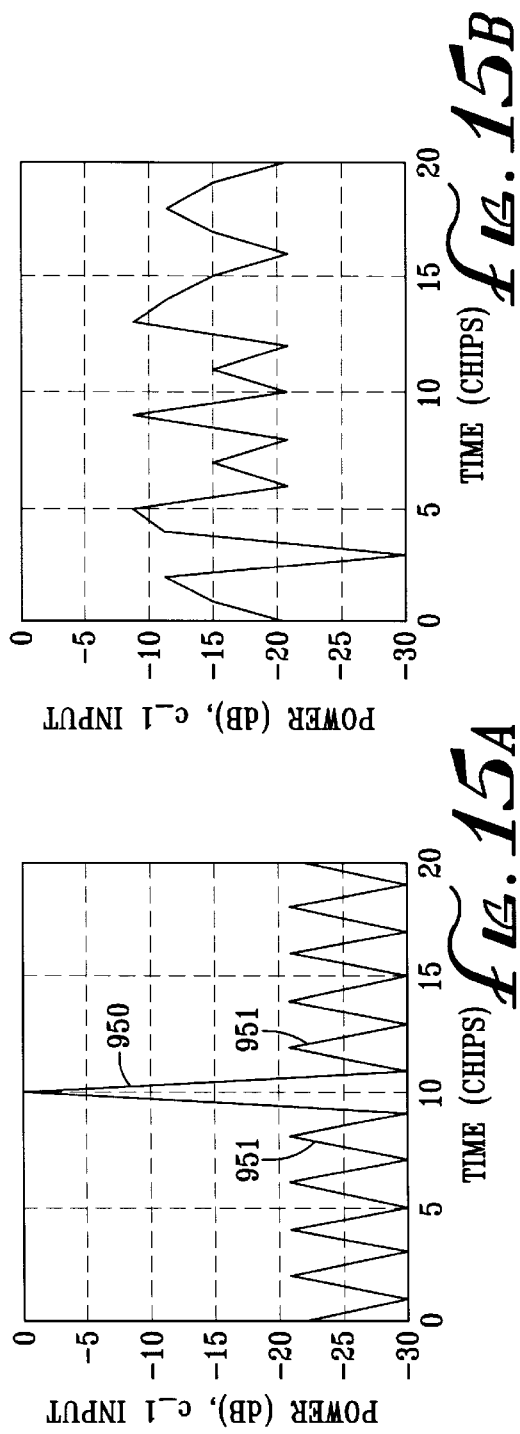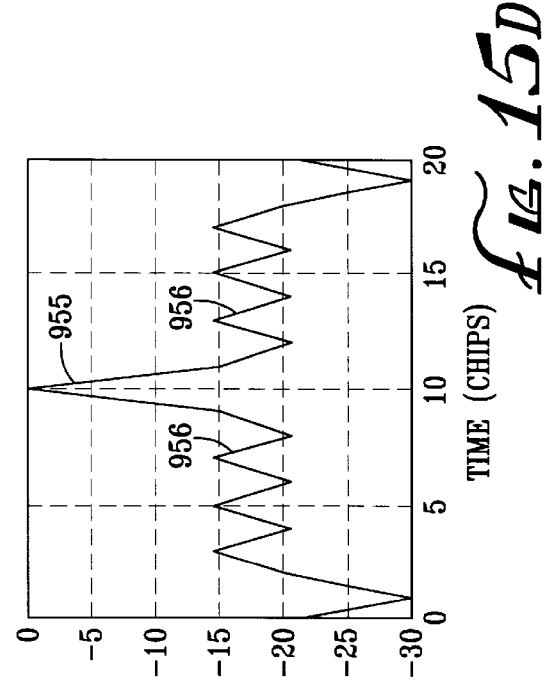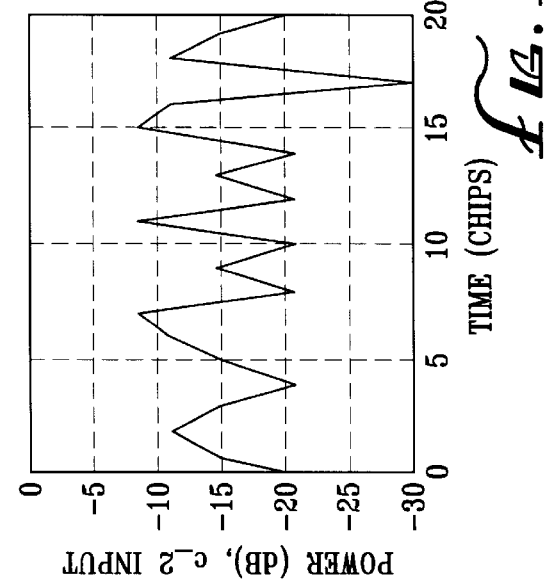

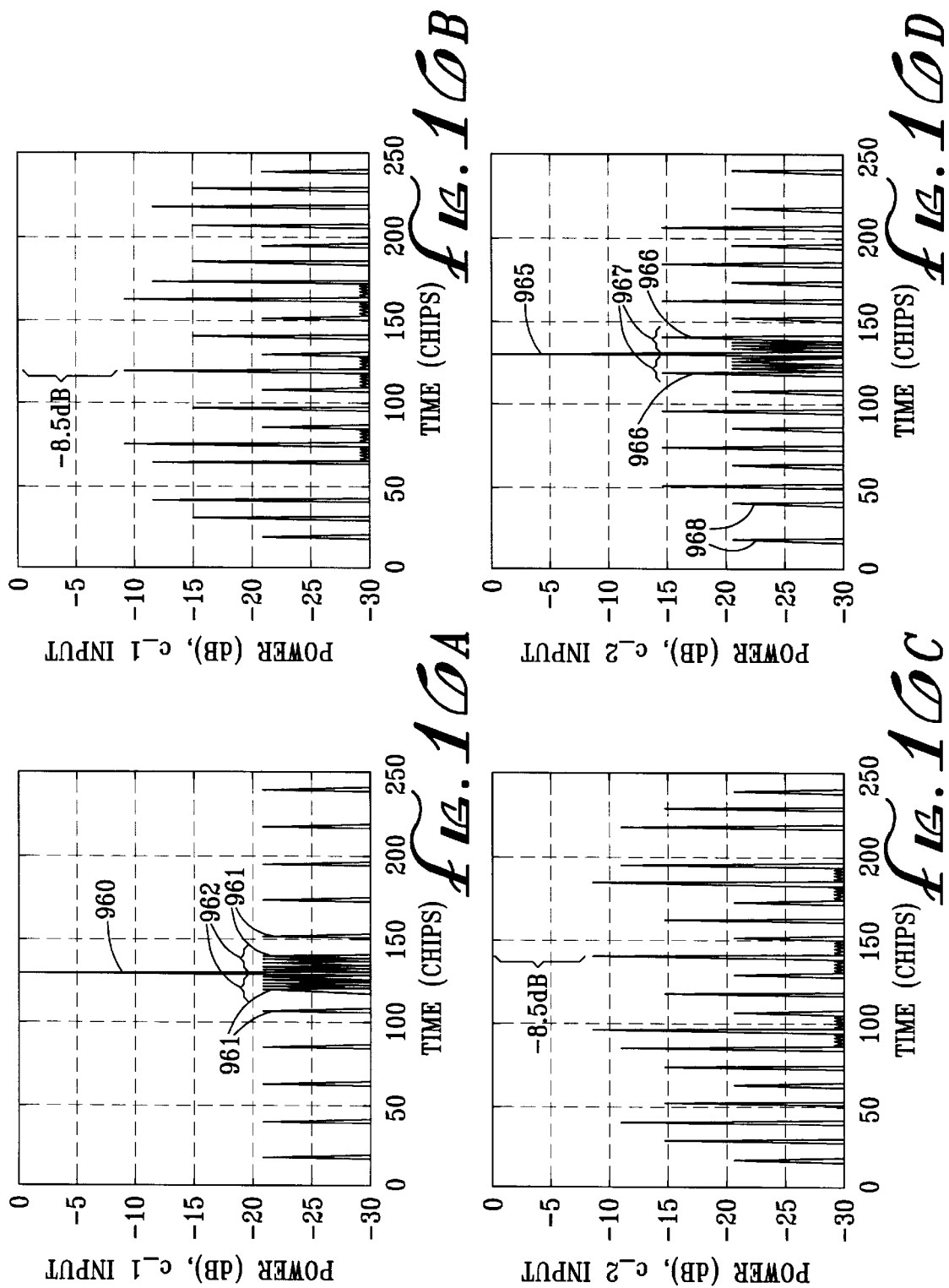

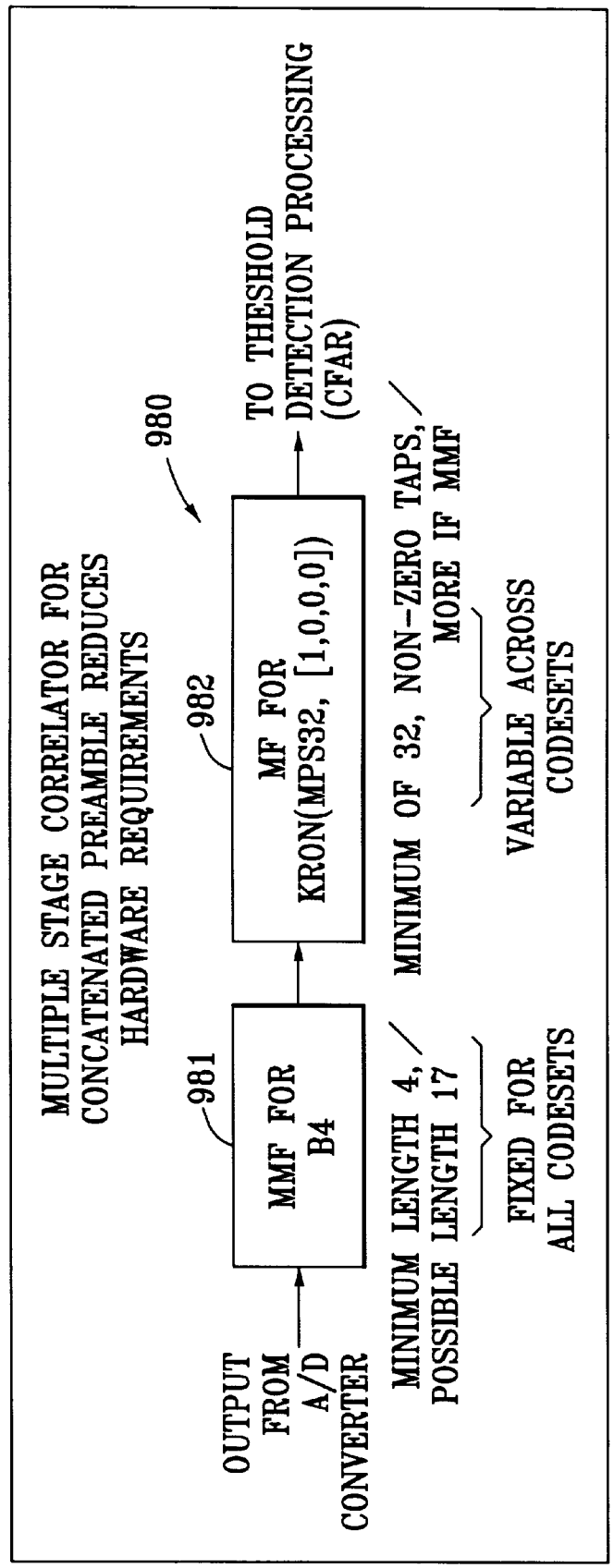

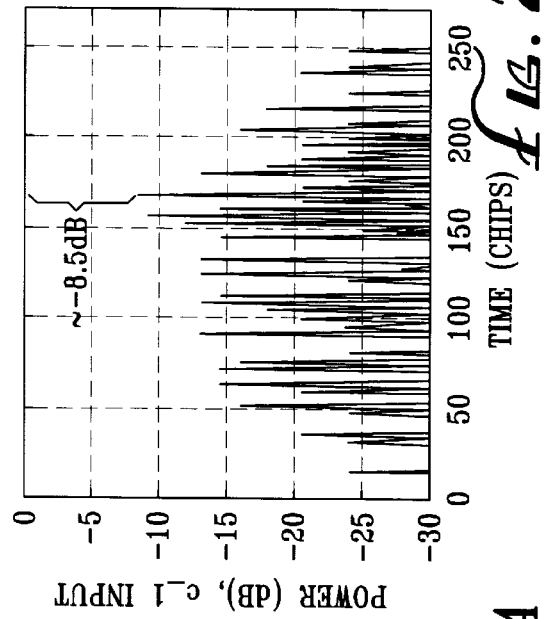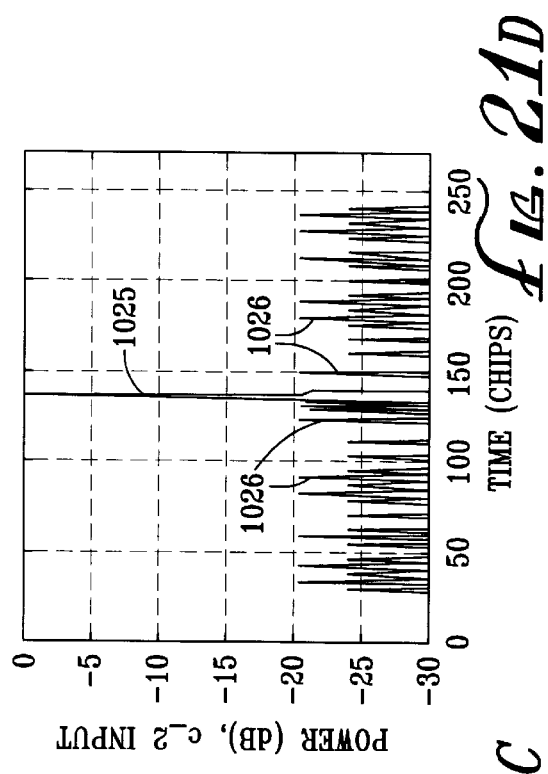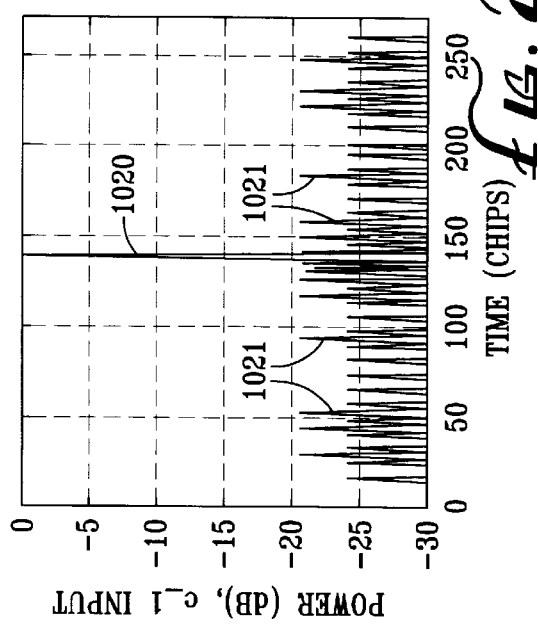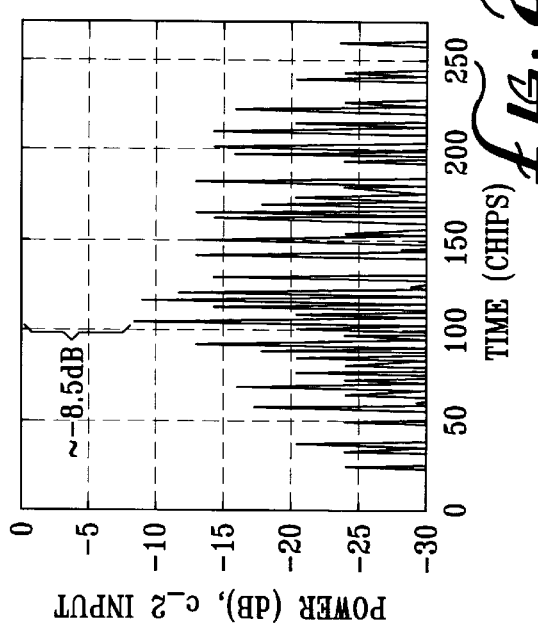

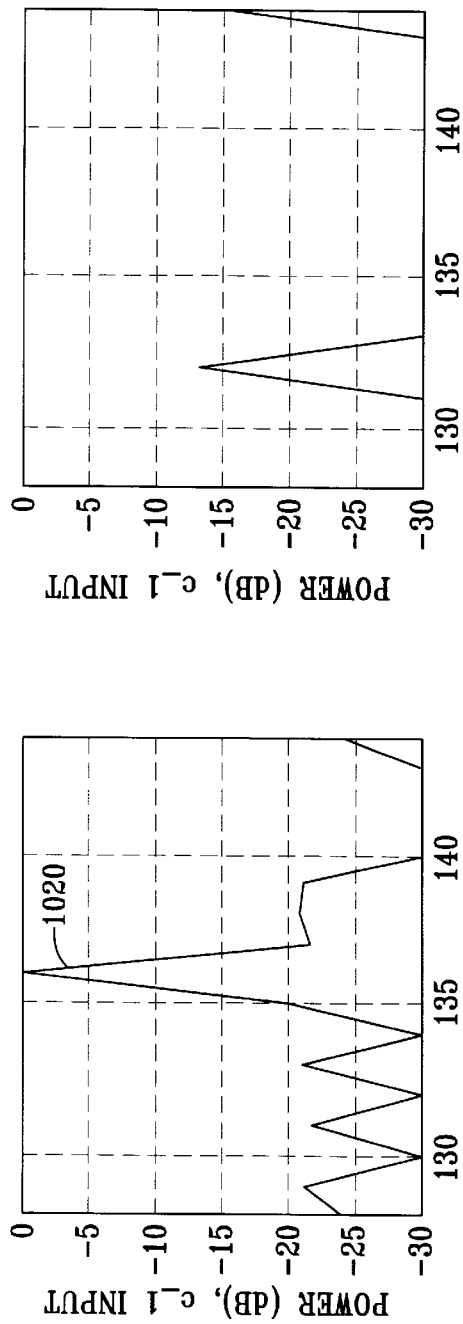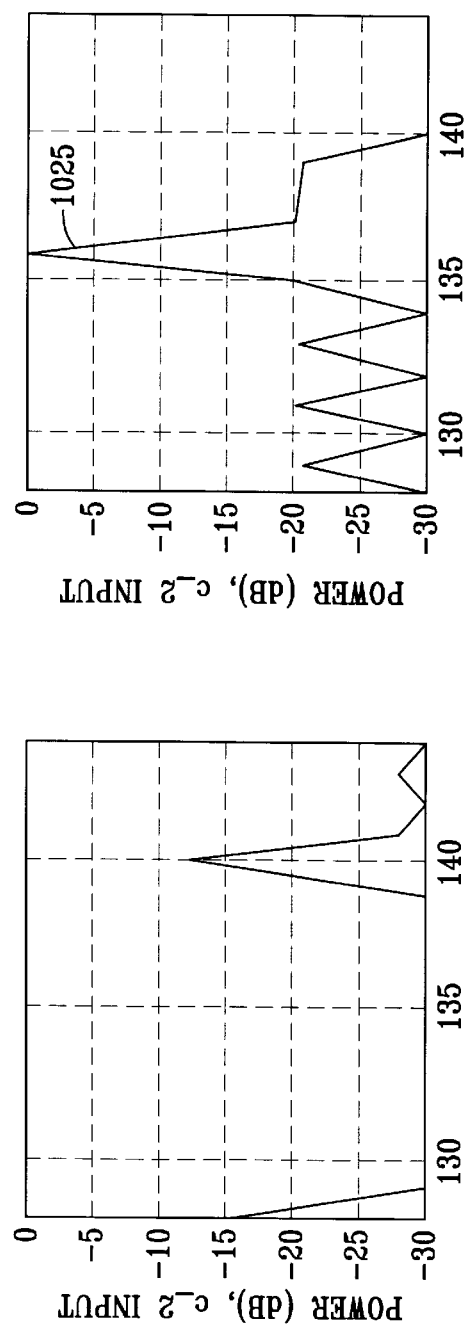

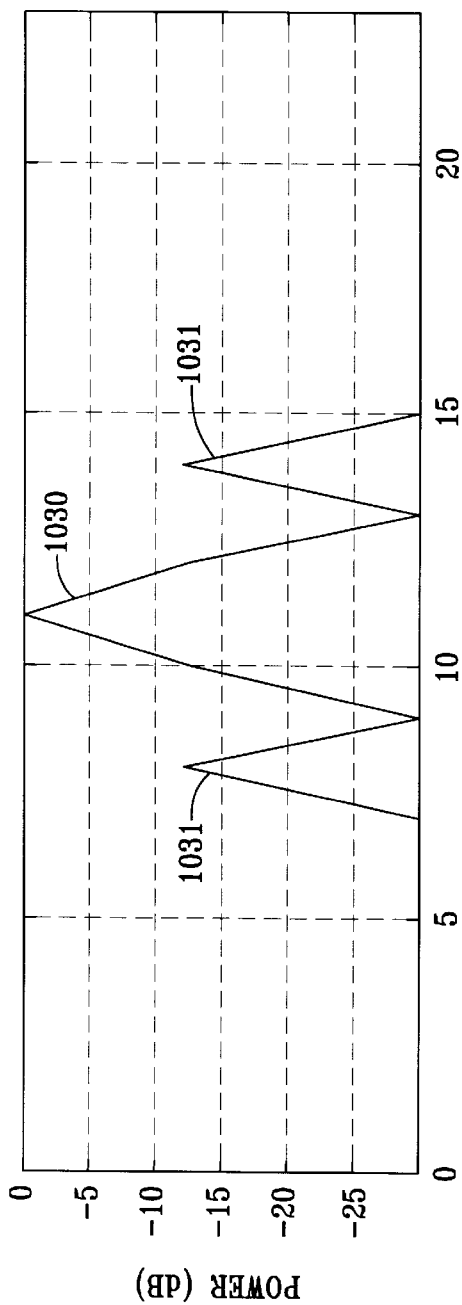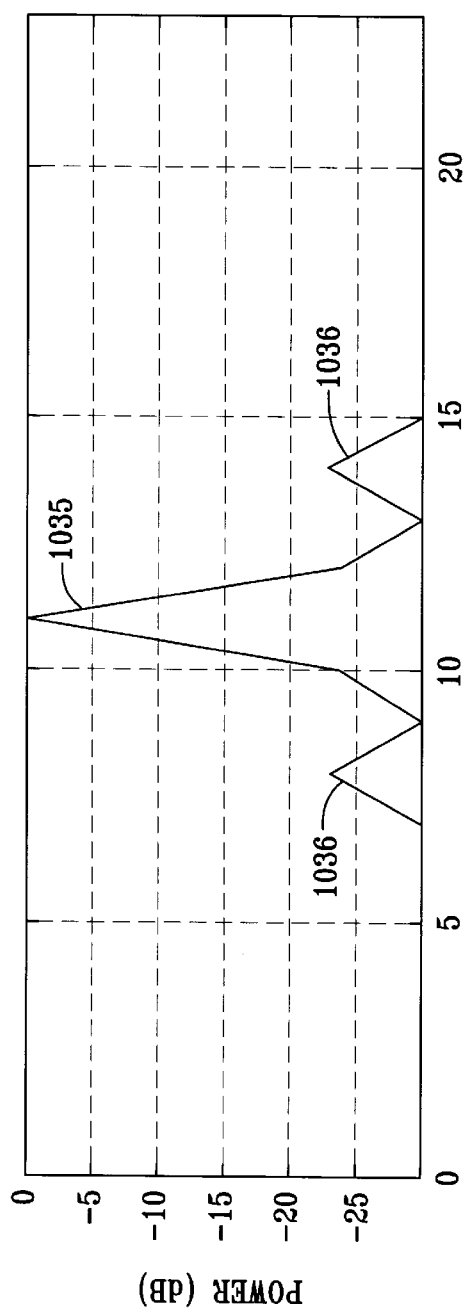

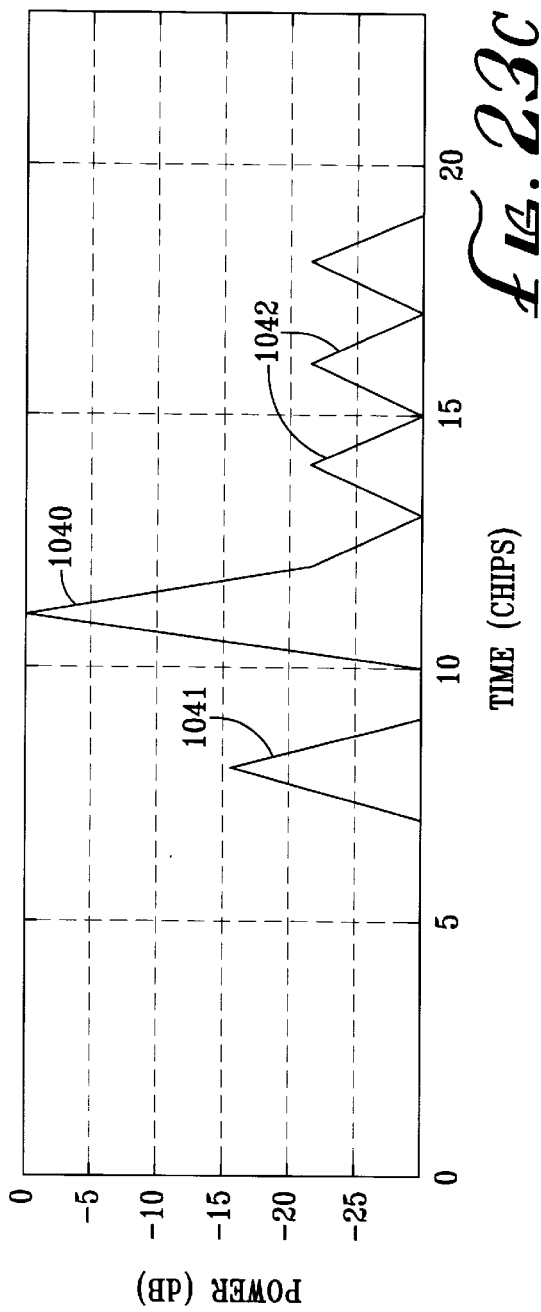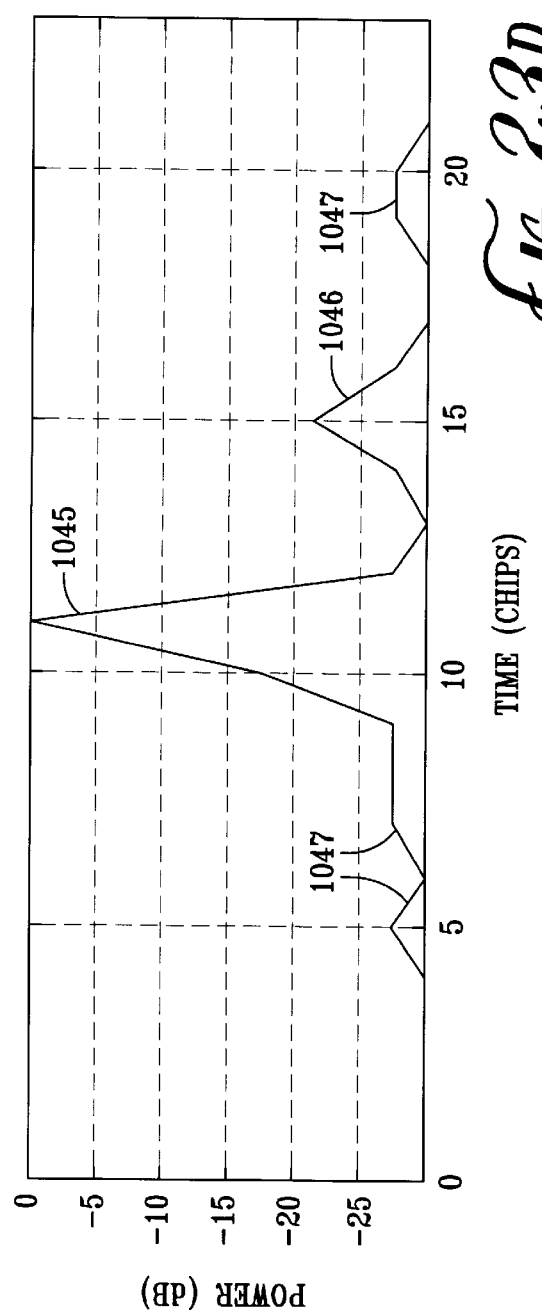

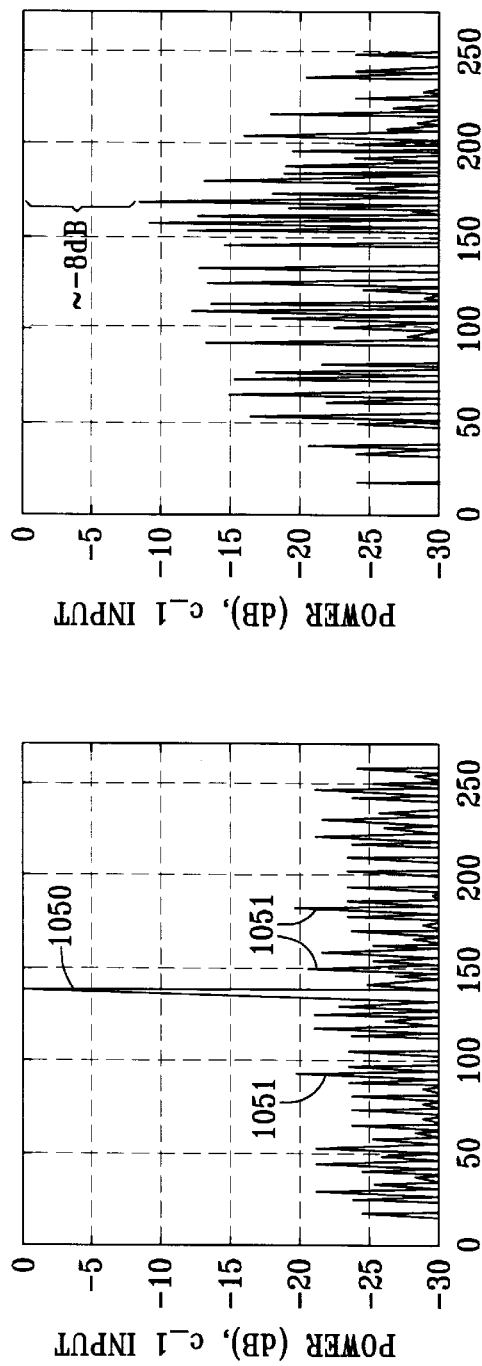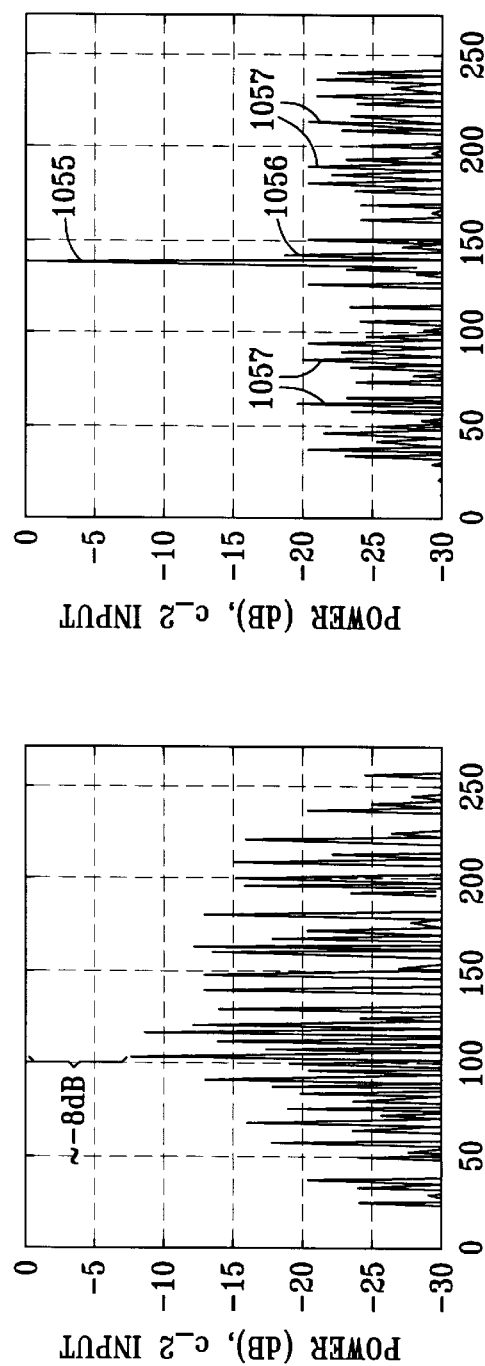

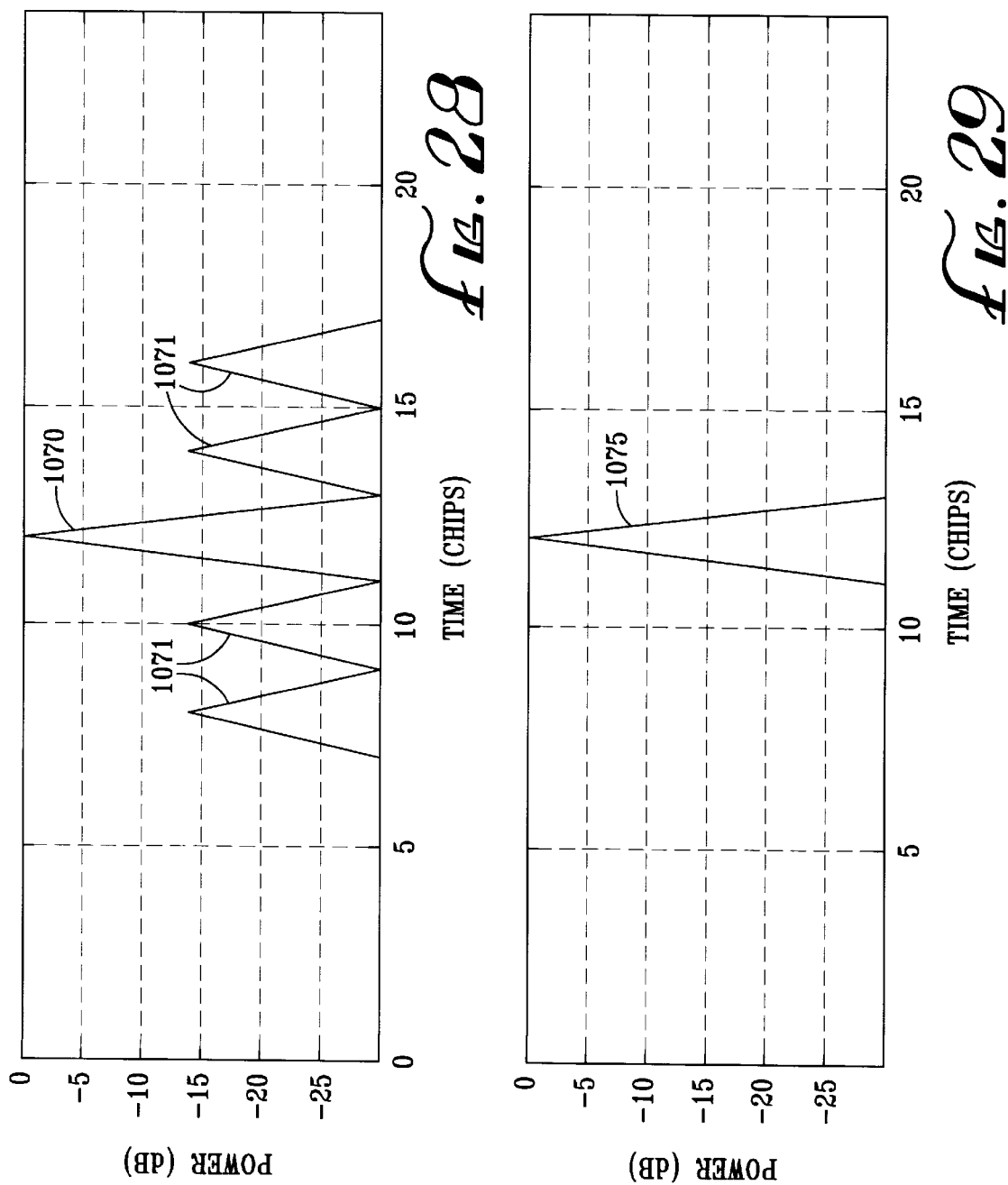

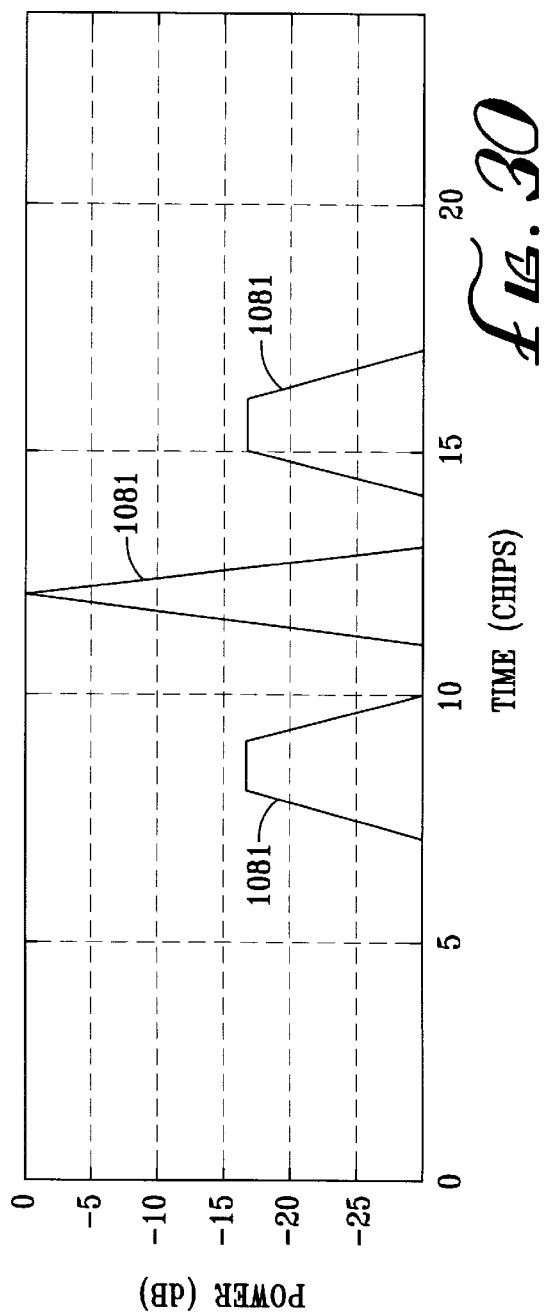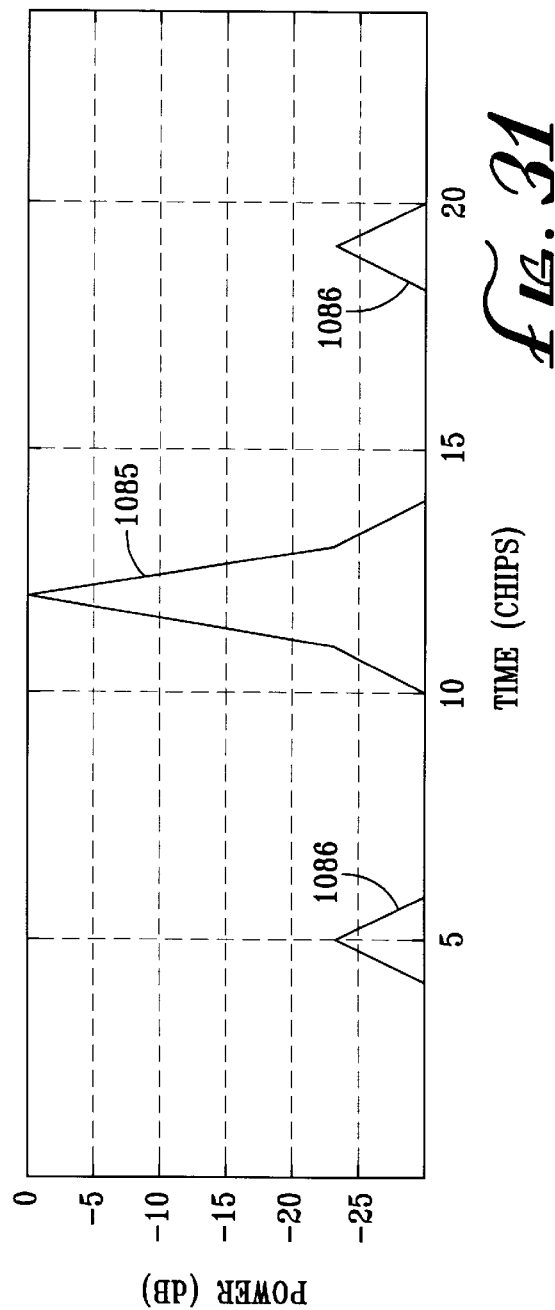

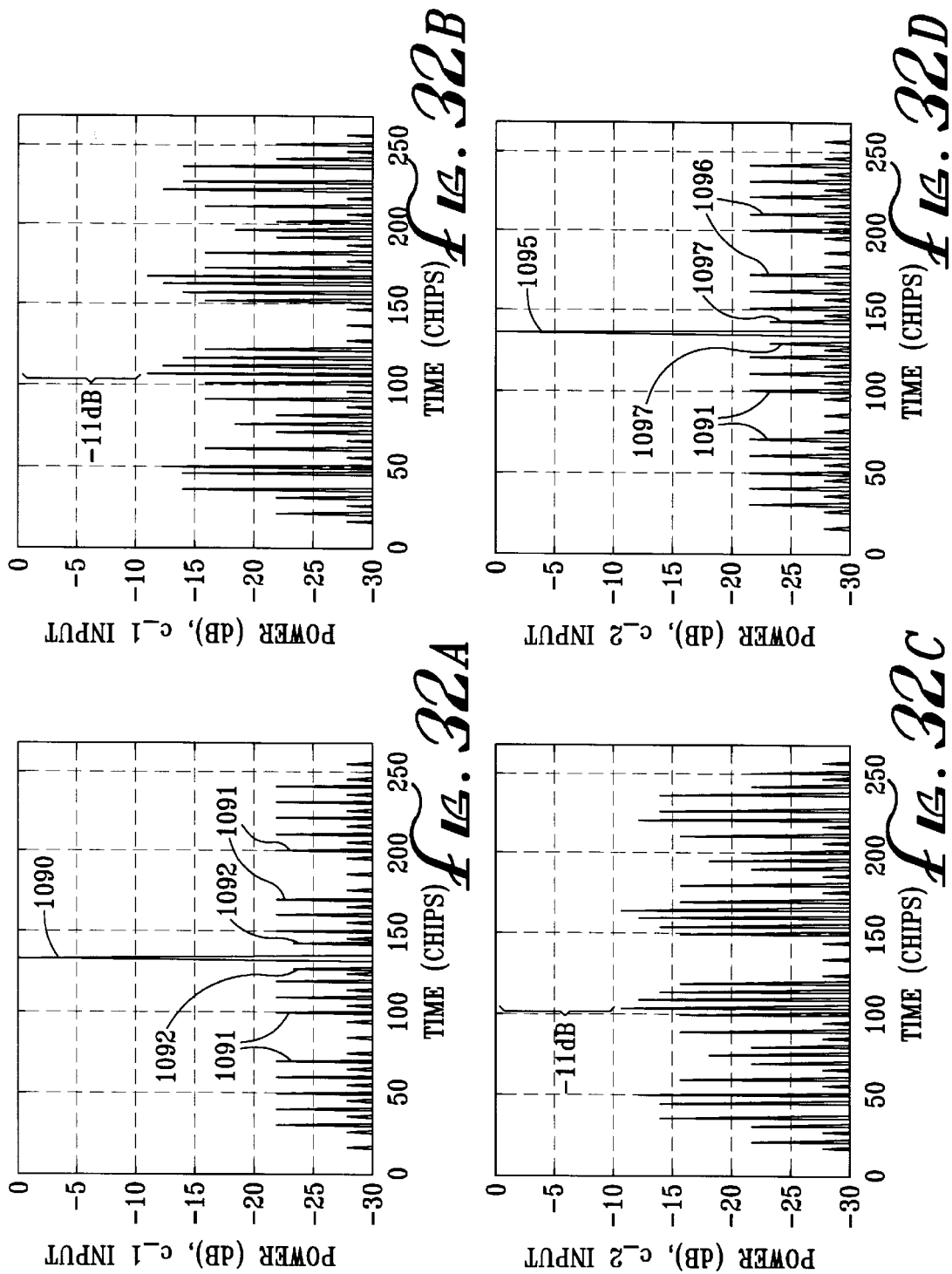

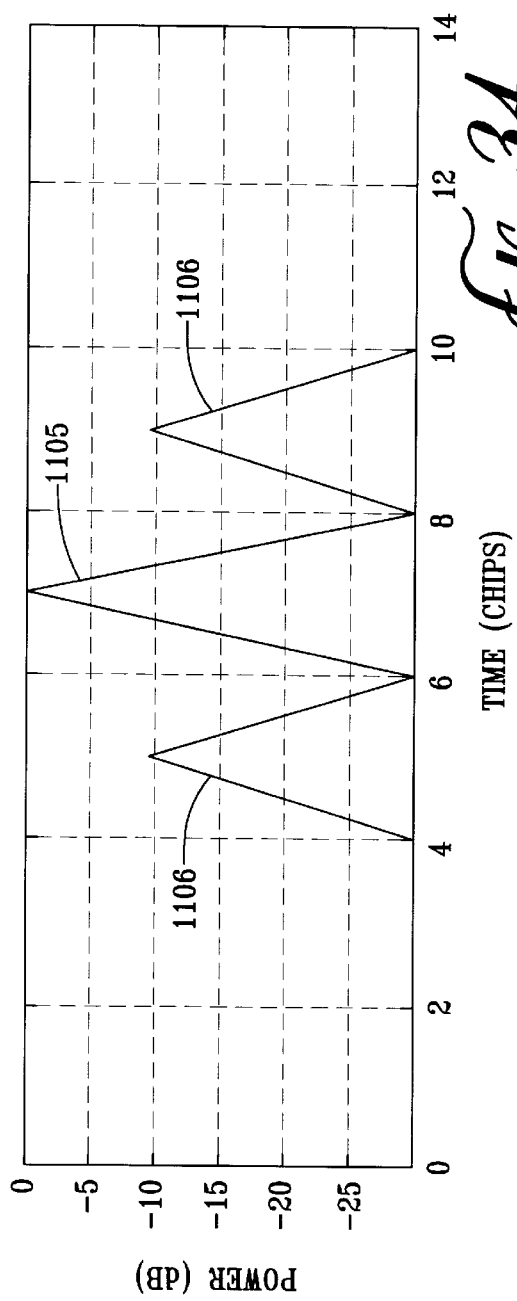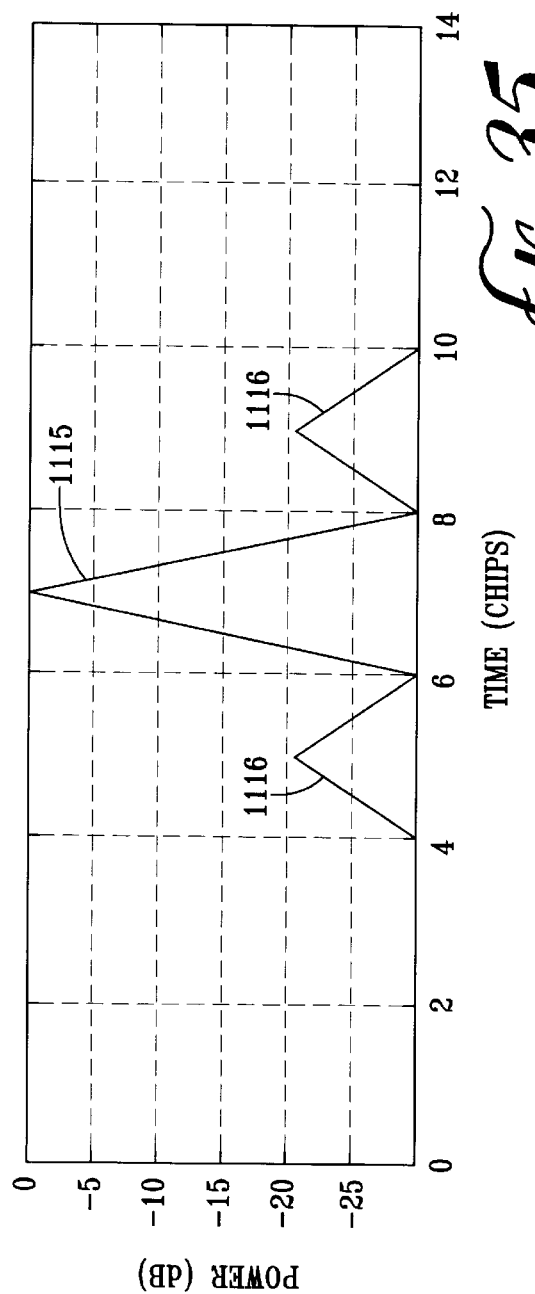

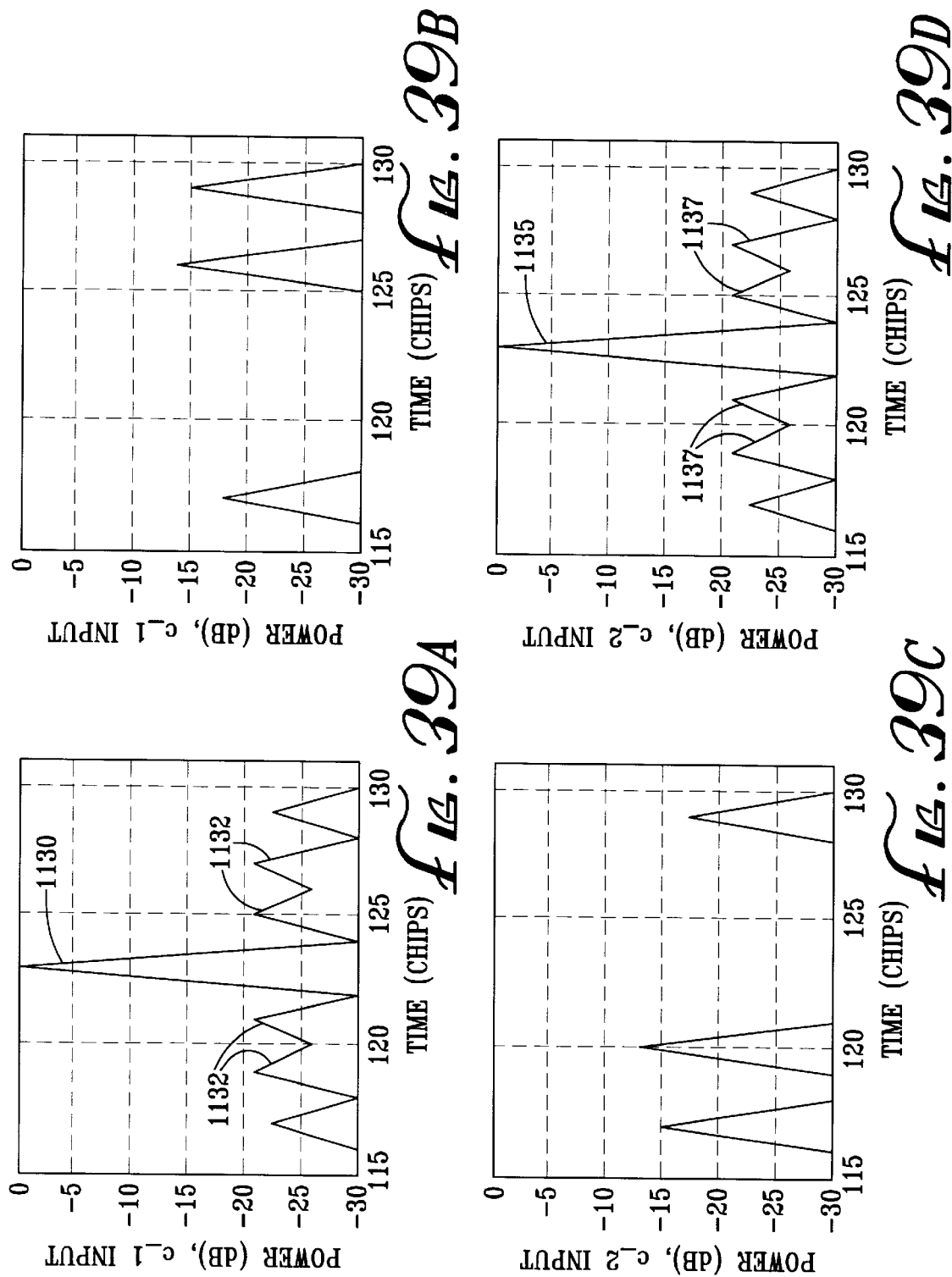

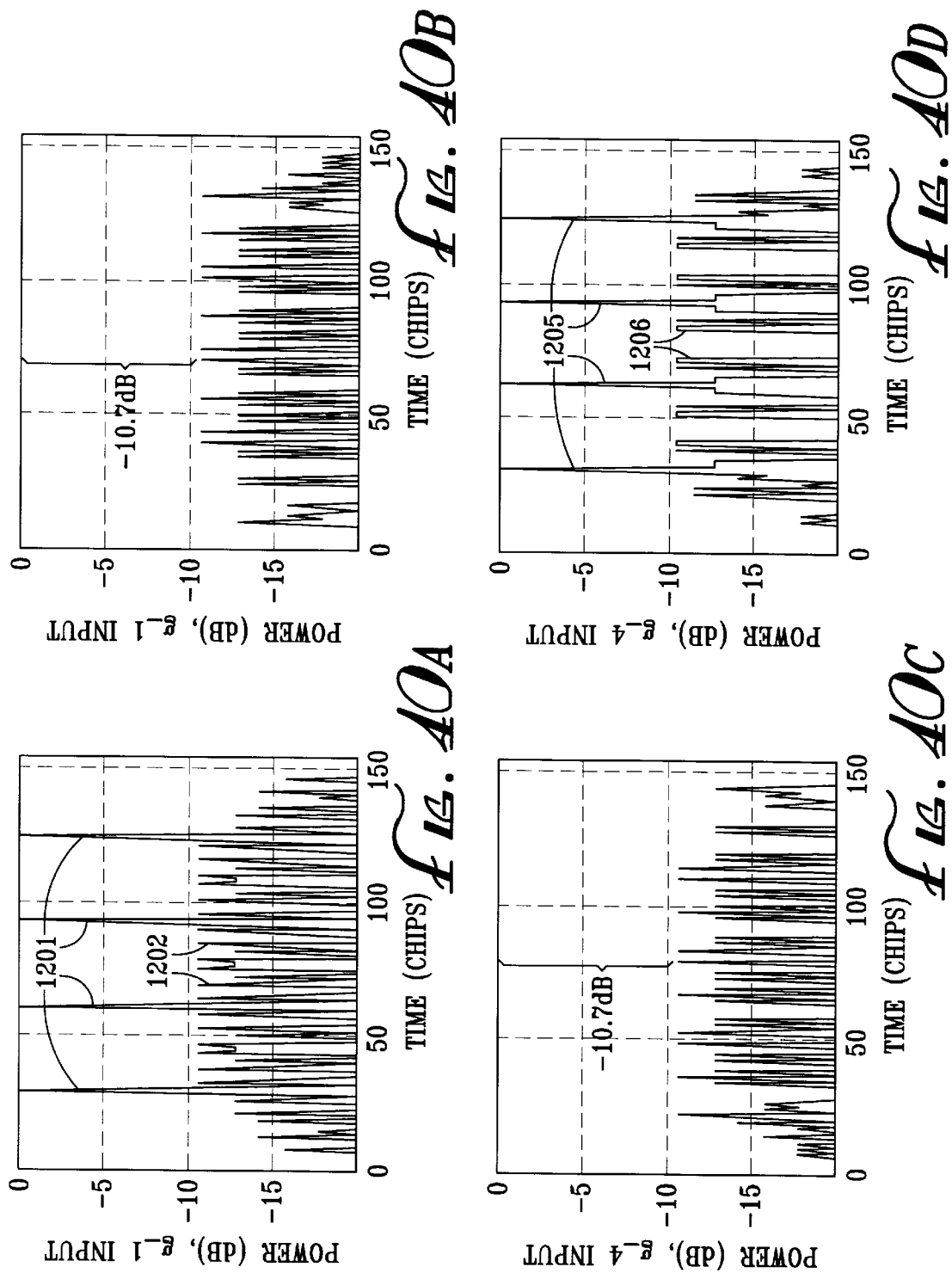

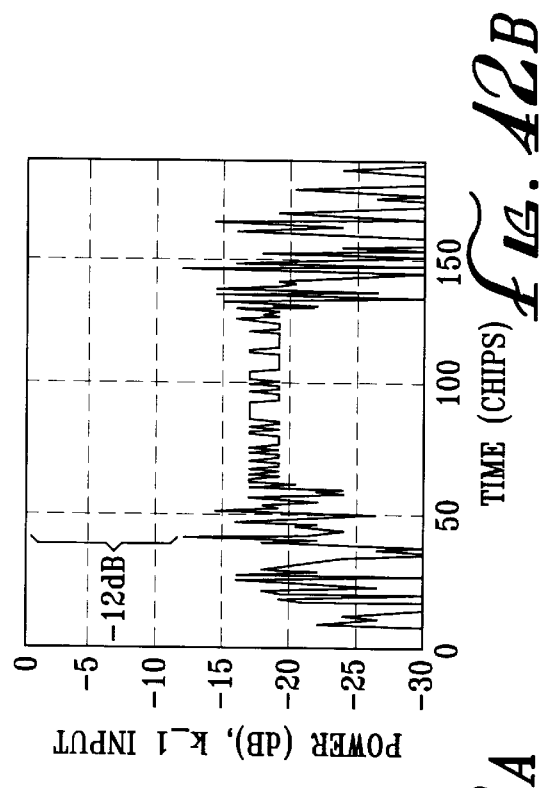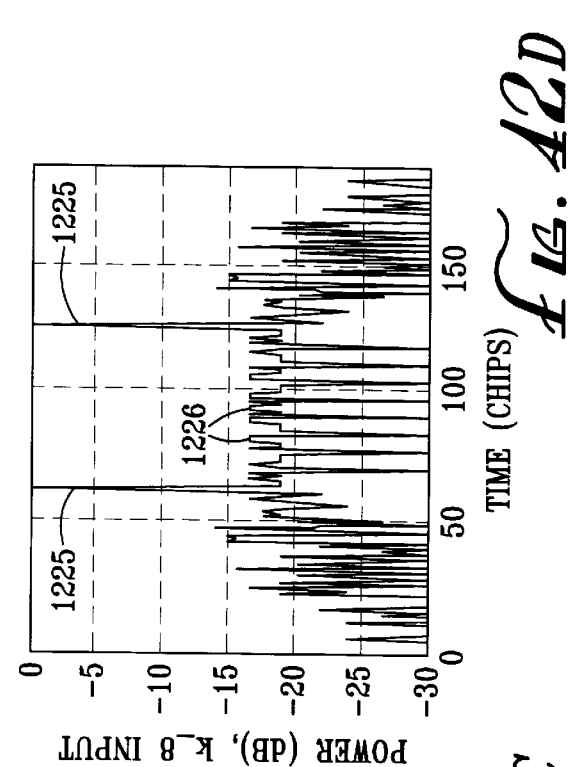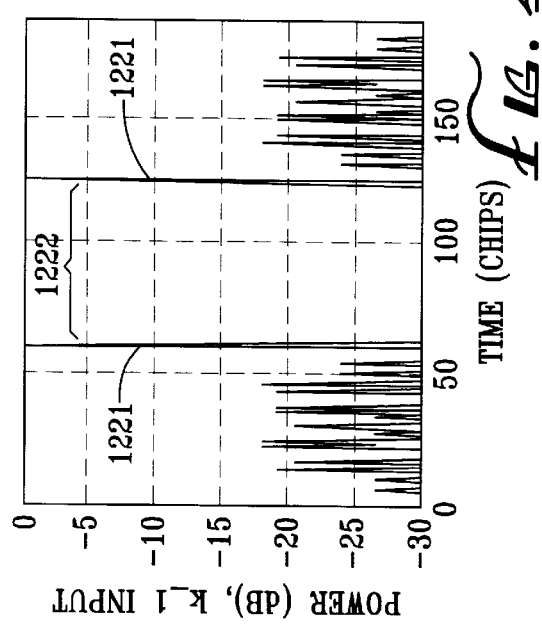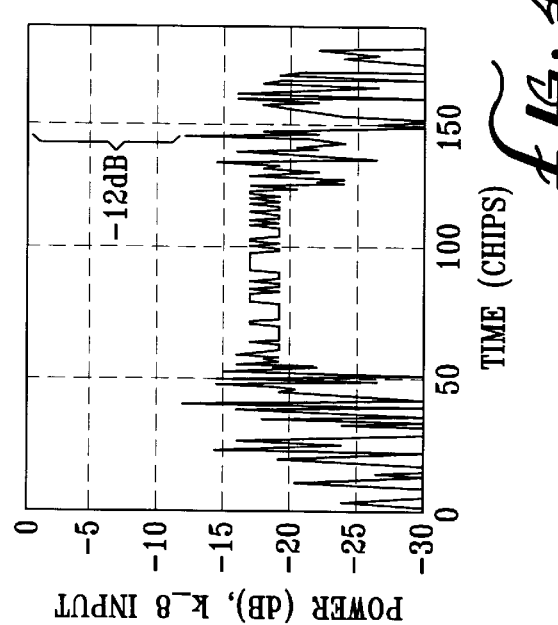

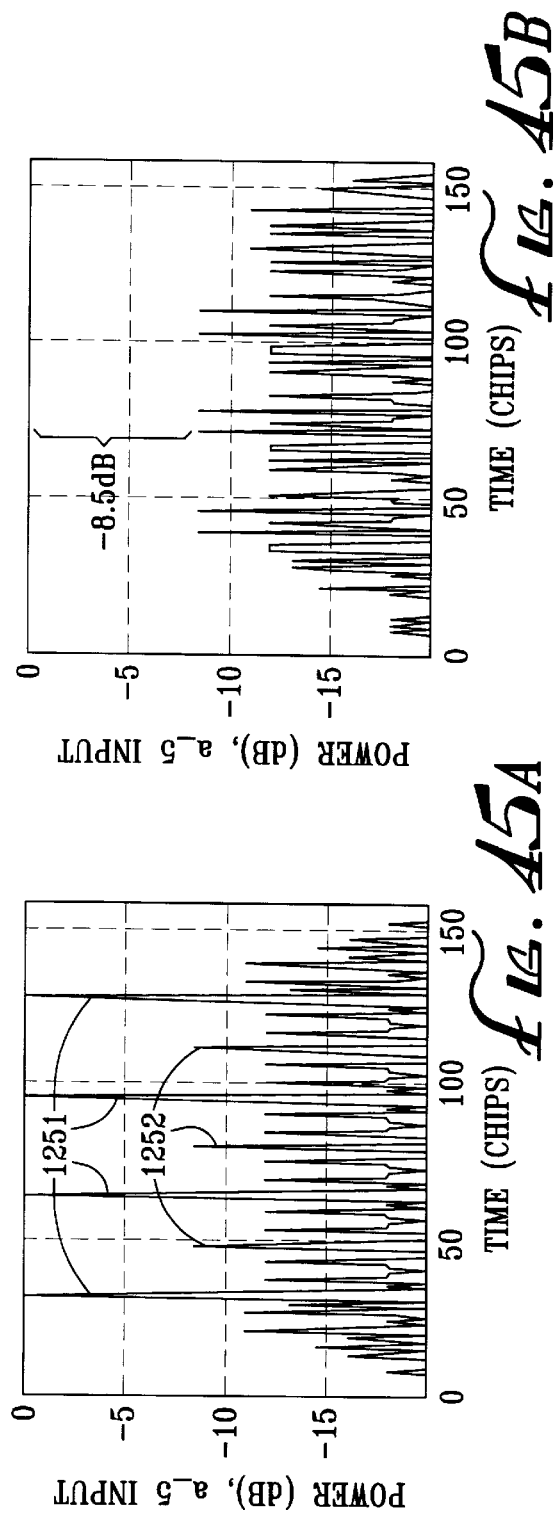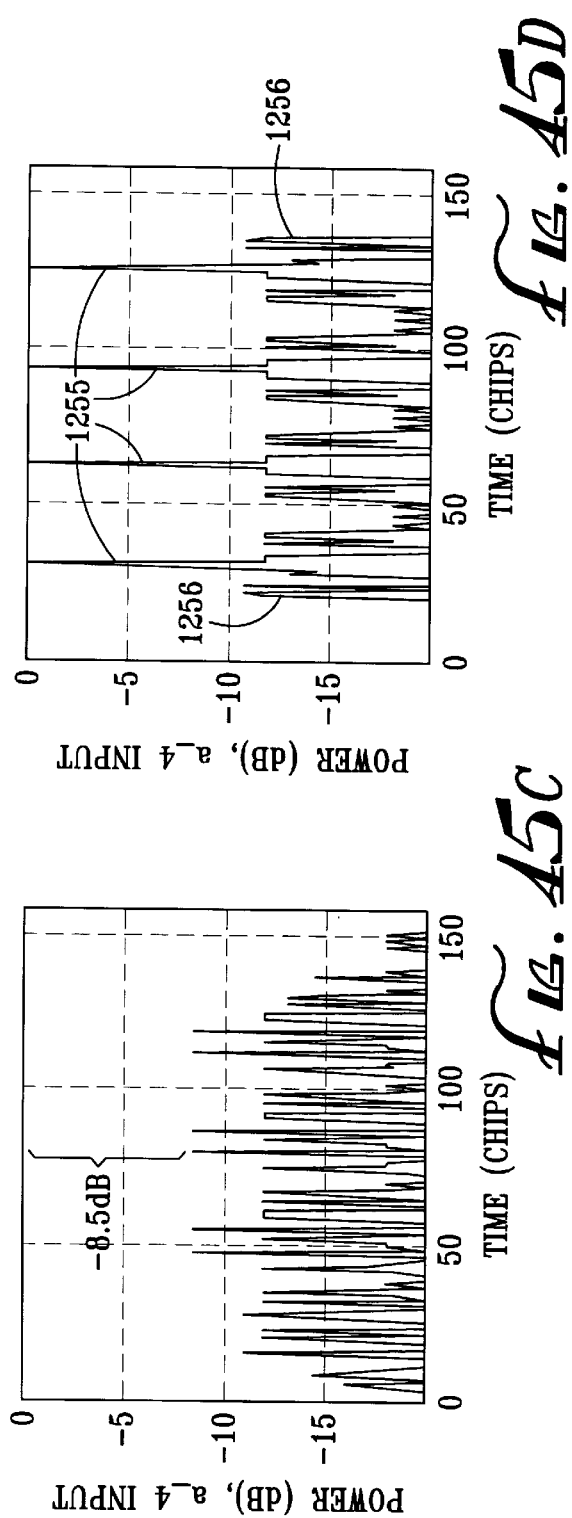

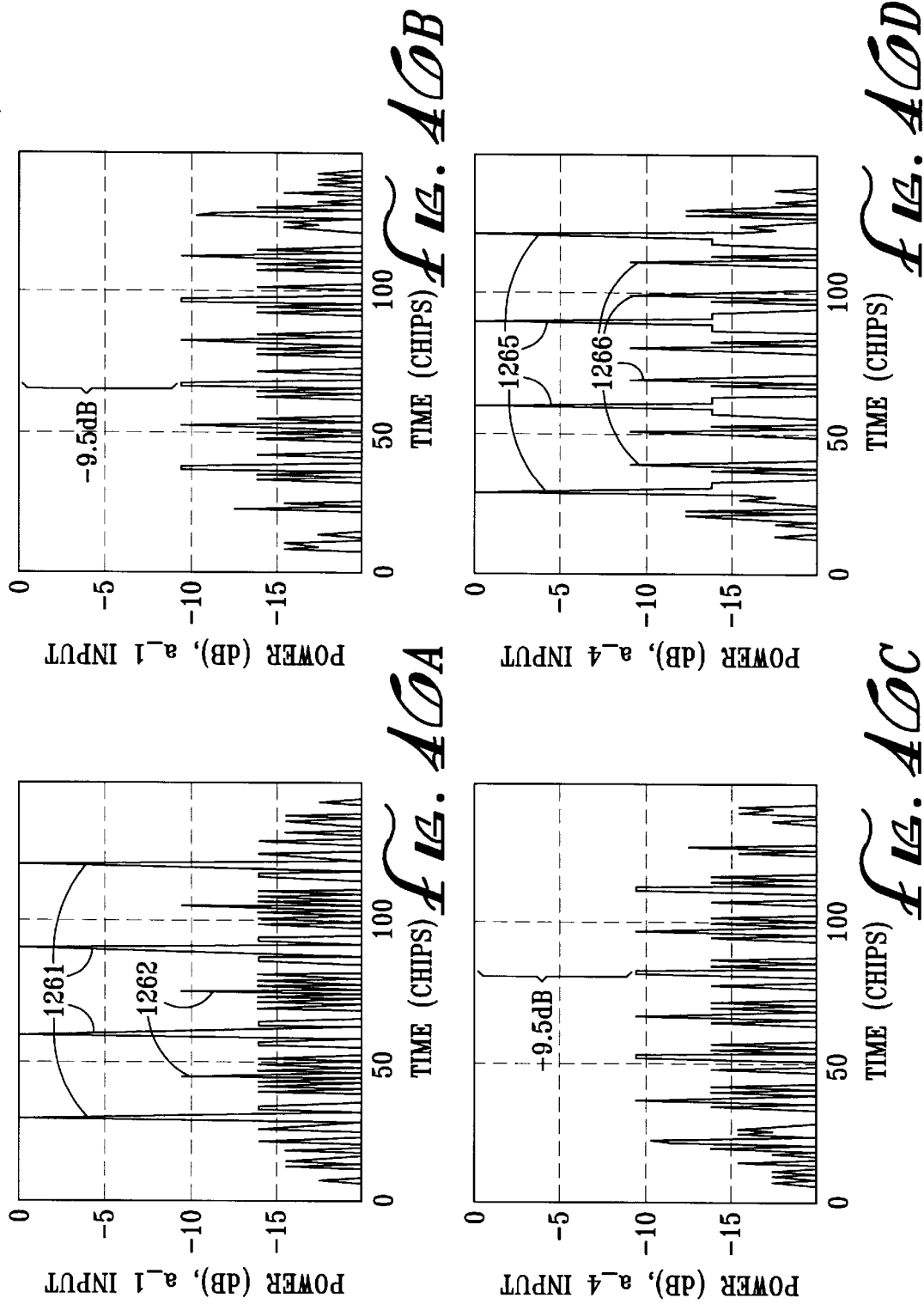

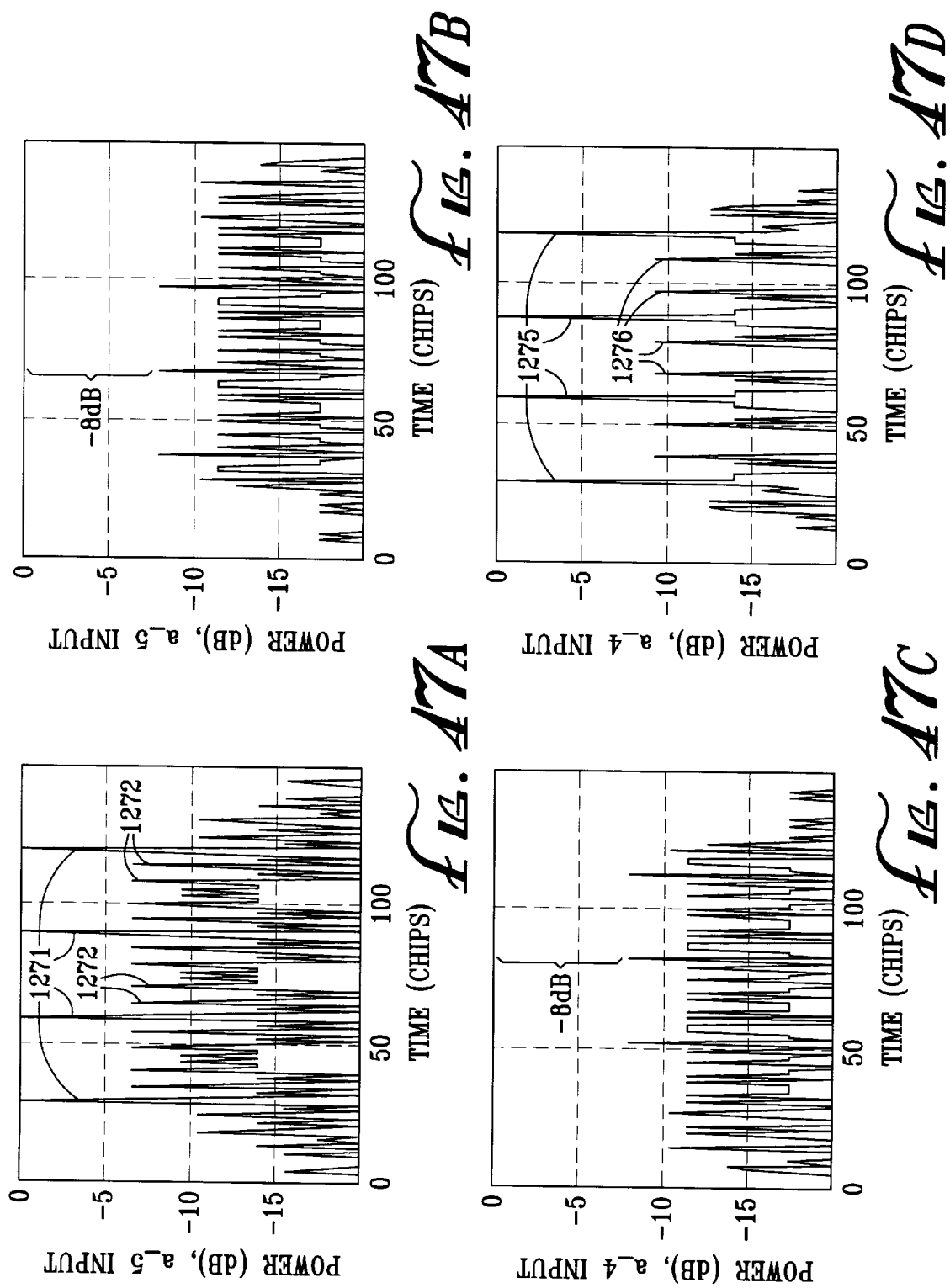

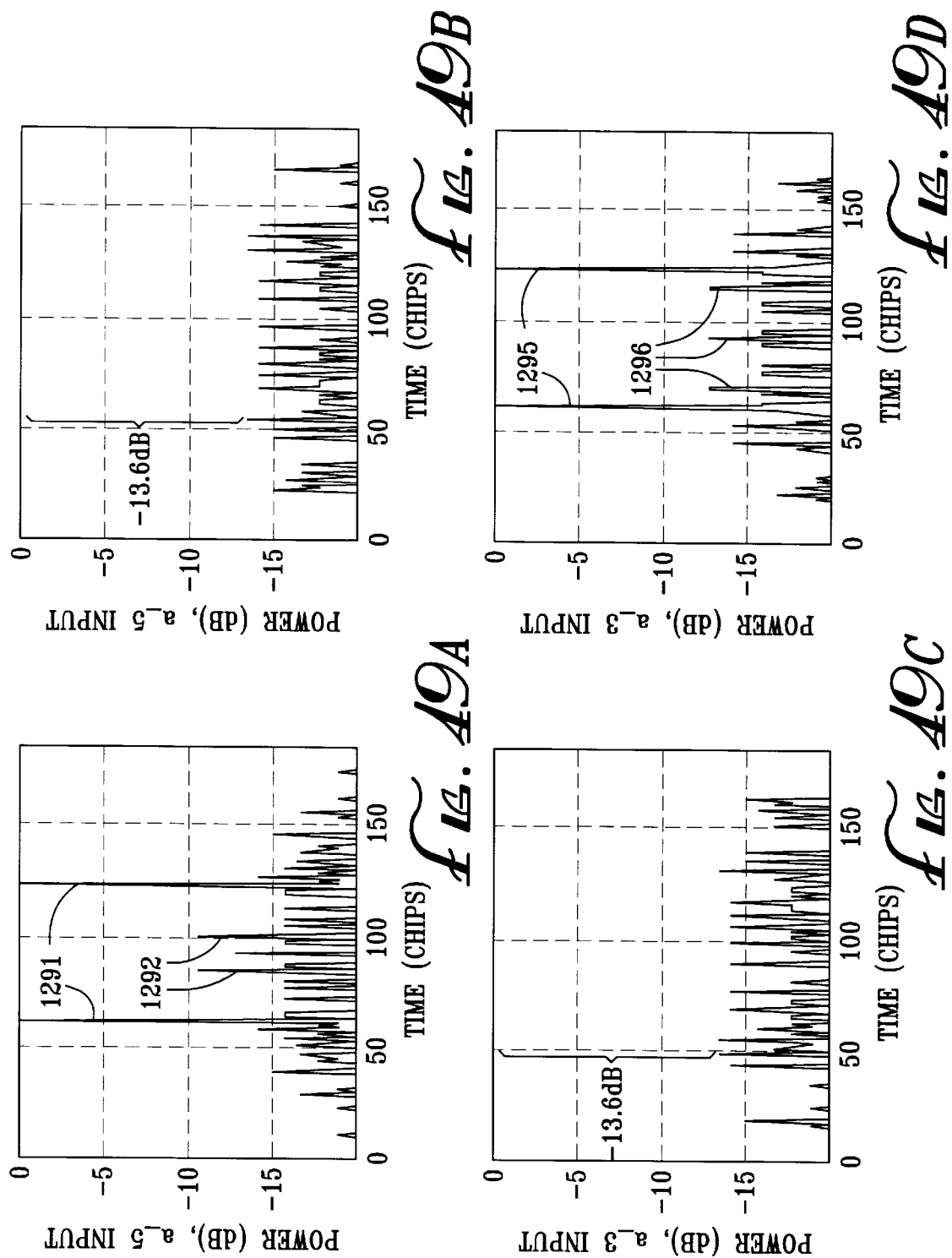

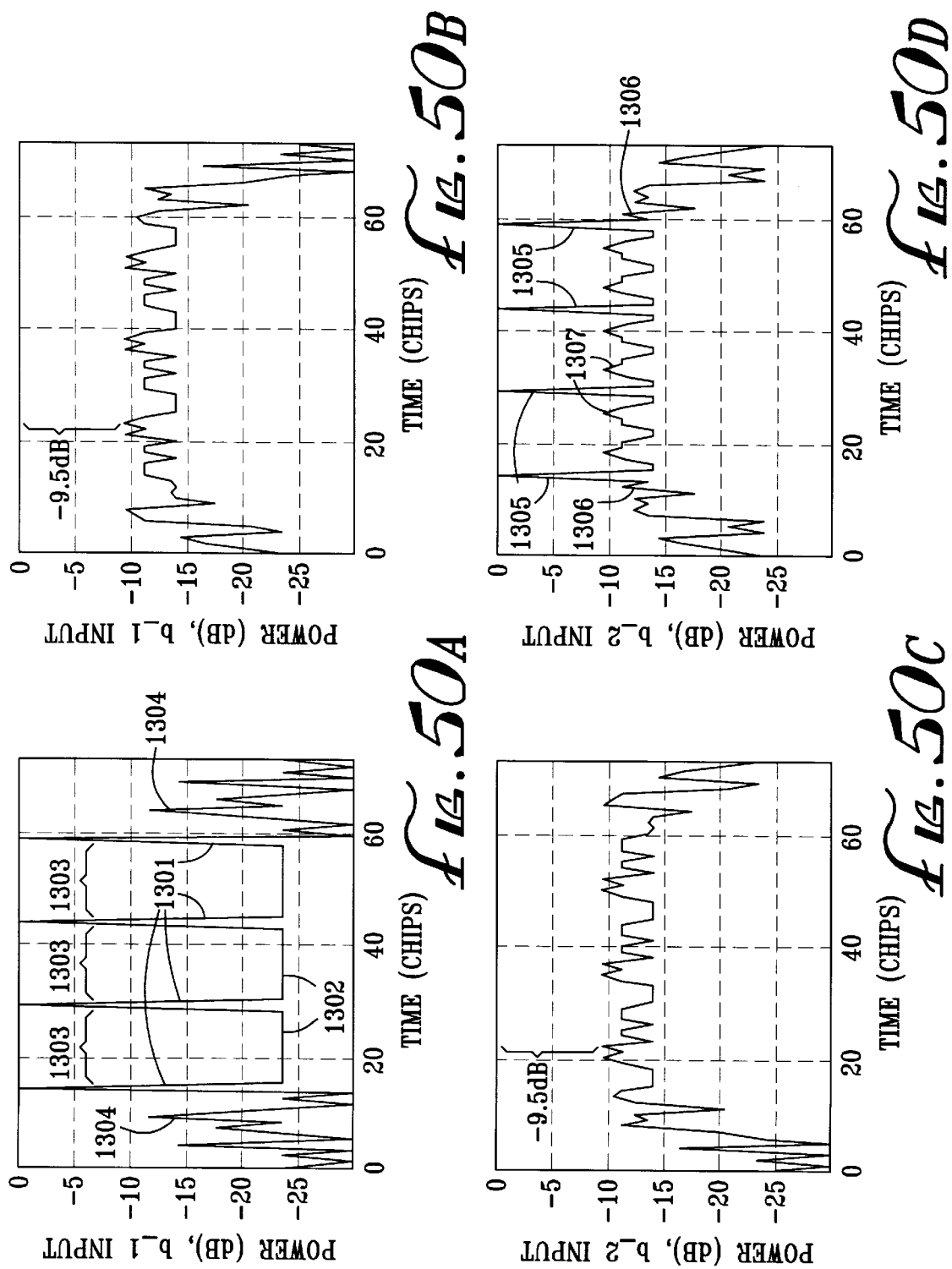

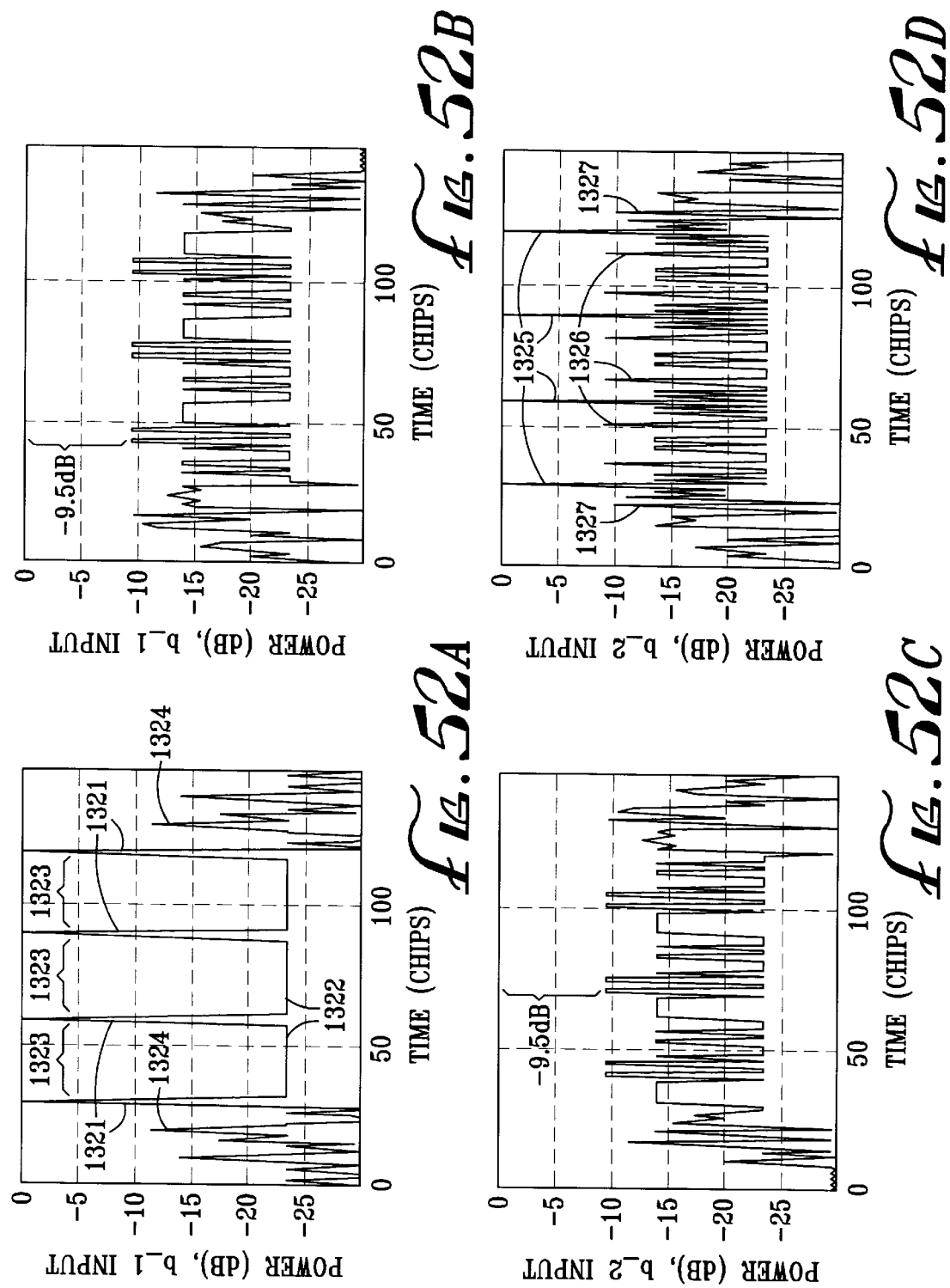

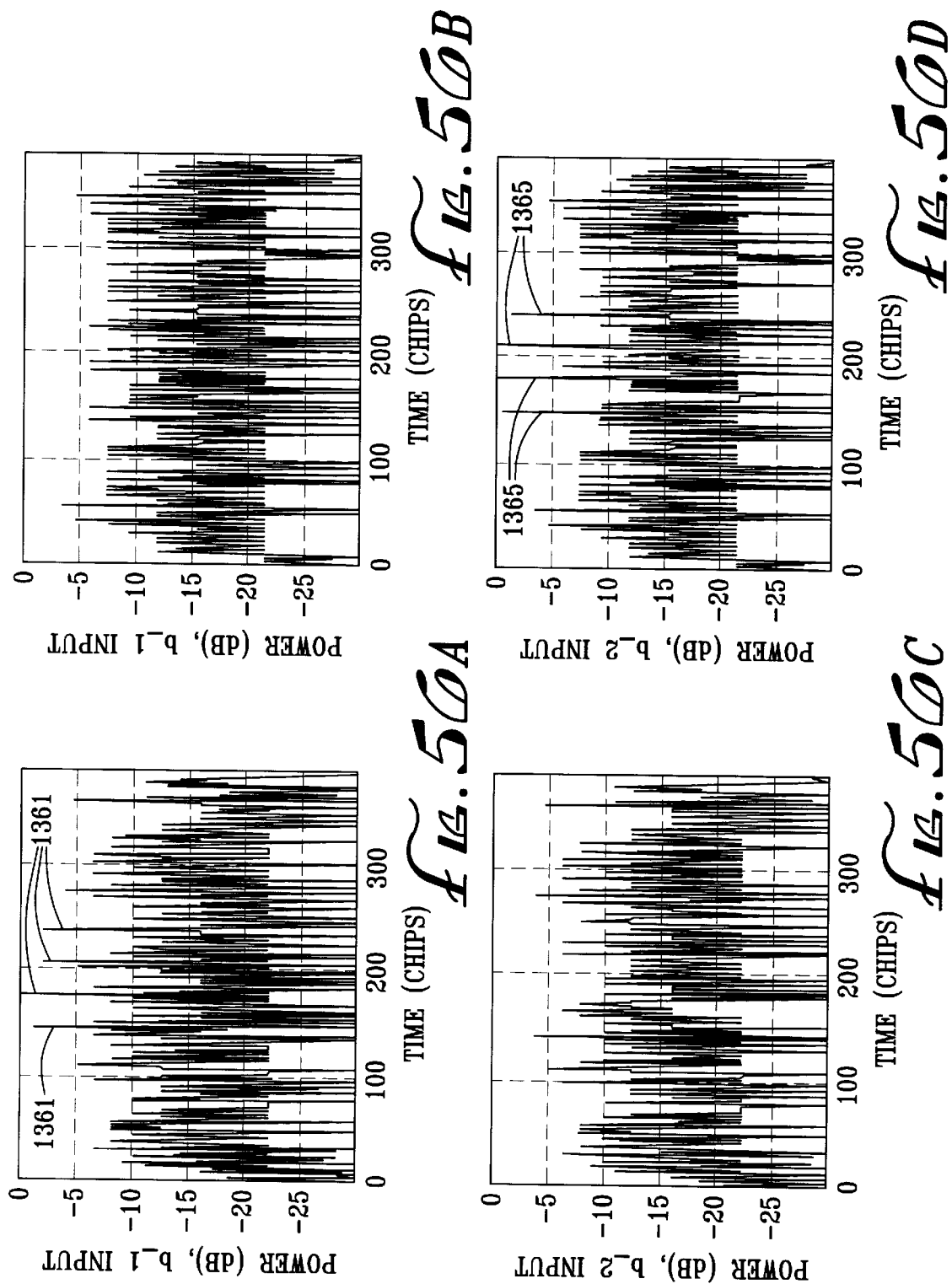

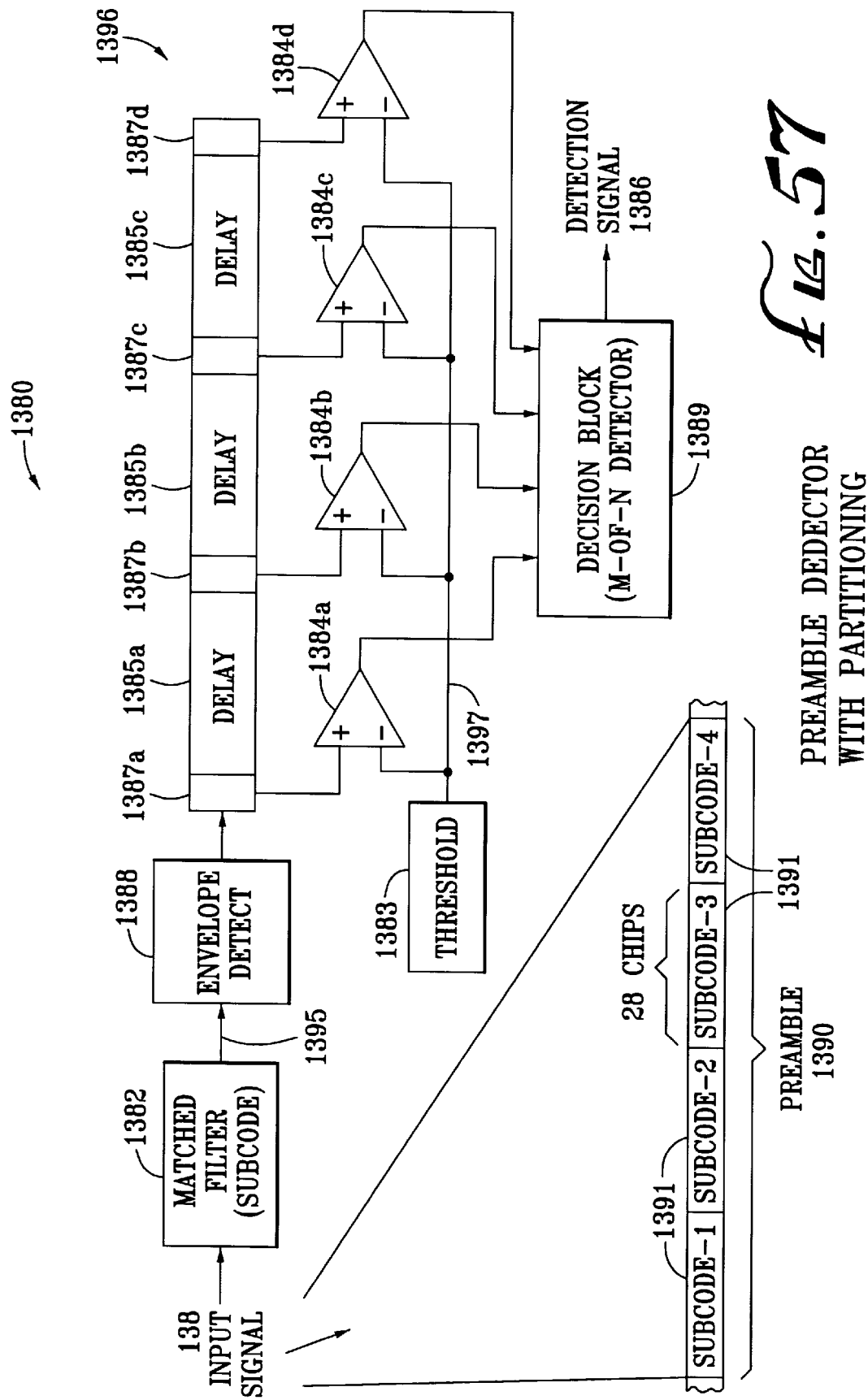
Fig. 57 PREAMBLE DEDECTOR WITH PARTITIONING

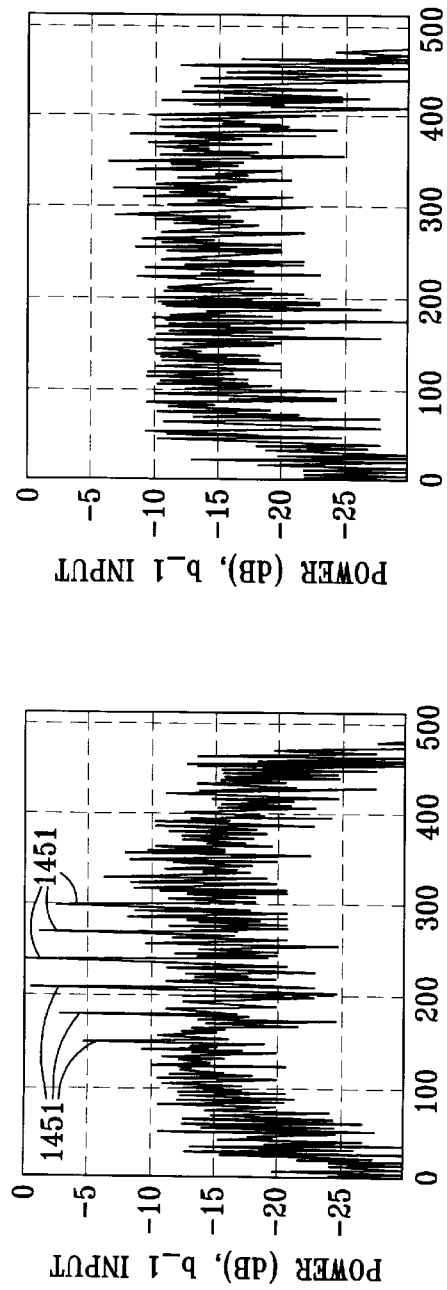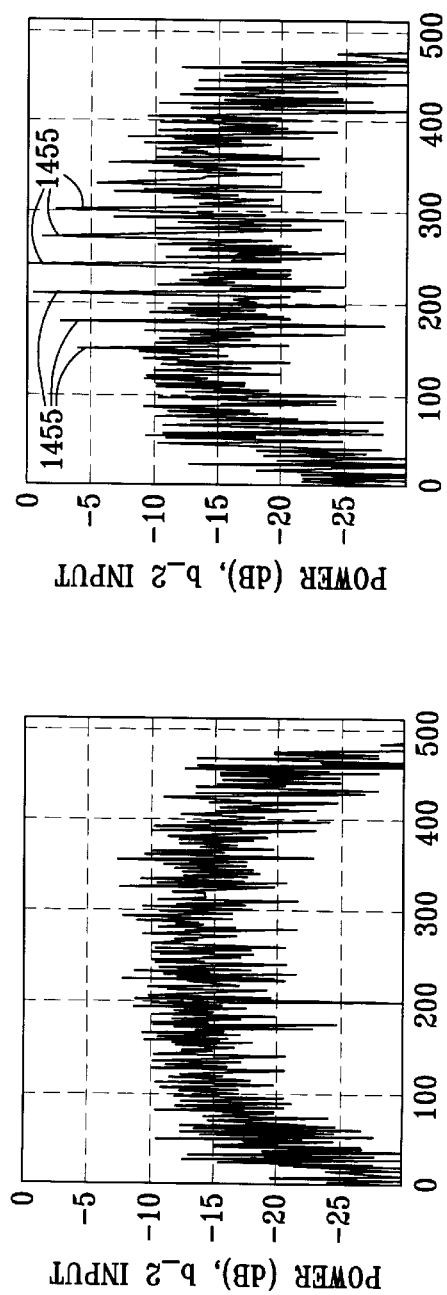

PREAMBLE PERFORMANCE IN RAYLEIGH FADING ($L_{ANT}$ =3, $L_{RAKE}$ =1)[1]

| CASE IDENTIFIER | PREAMBLE LENGTH | 99.9 % DETECTION THRESHOLD (dBm) | | PREAMBLE LENGTH | 90% DETECTION THRESHOLD (dBm) | |
|---|---|---|---|---|---|---|
| | | NO SIDELOBE | -7dB PEAK SIDELOBE | | NO SIDELOBE | -7 dB PEAK SIDELOBE |
| HIGH TIER INTERFACES AND ISM INTERFACES | | | | | | |
| 5.00HT | 56 | -100.4 | -96.1 | 28 | -100.6 | -94.8 |
| 2.80HF | 112 | -105.9 | -101.6 | 56 | -106.1 | -100.4 |
| 1.60HF | 84 | -107.1 | -102.8 | 28 | -105.5 | -99.8 |
| 1.40HF | 112 | -108.9 | -104.6 | 28 | -106.1 | -100.4 |
| LOW TIER INTERFACES AND UNLICENSED ISOCHRONOUS INTERFACES | | | | | | |
| 5.00HT | 56 | -100.4 | -96.1 | 28 | -100.6 | -94.8 |
| 0.64LF | 28 | -106.3 | -102.0 | 13 | -106.2 | -100.4 |
| 0.56LF | 28 | -106.9 | -102.6 | 13 | -106.8 | -101.0 |
| 0.35LF | 25 | -108.4 | -104.2 | 11 | -108.1 | -102.3 |

[1] $PFA_{1SHOT}$ =1%, NF=4 dB, IMPLEMENTATION LOSS=3 dB, CFAR LOSS=2 dB

Fig. 65

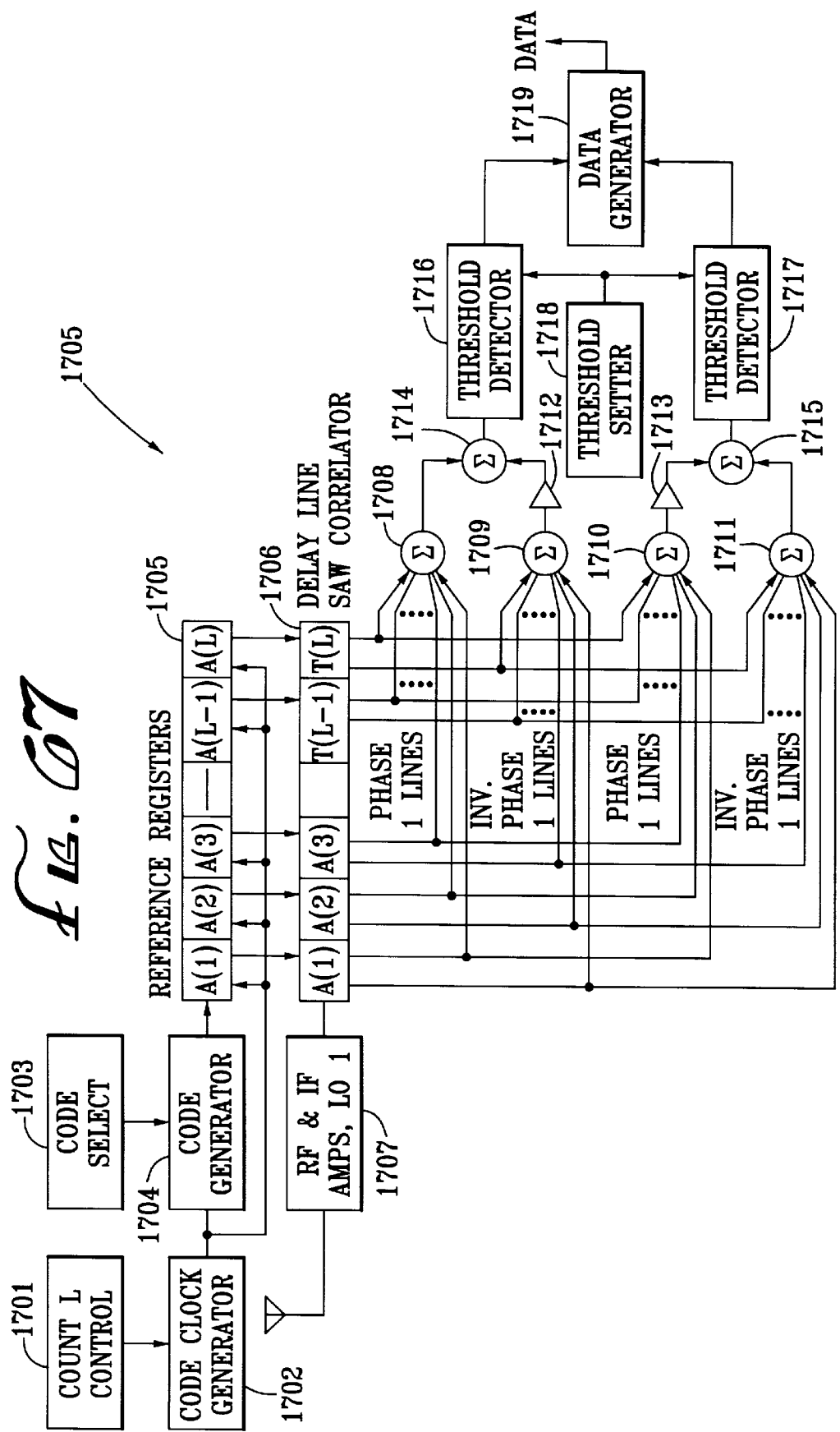

GOLD CODES

| M | COMPLEX CODE LENGTH | REAL CODE LENGTH | NUMBER CODES IN FAMILY | MAXIMUM CROSS CORRELATION (VOLTS) | (dB) | BINARY WELCH BOUND (VOLTS) |
|---|---|---|---|---|---|---|
| 5 | 15.5 | 31 | 33 | 9.00 | −10.74 | 5.49 |
| 6 | 31.5 | 63 | 65 | 17.00 | −11.38 | 7.88 |
| 7 | 63.5 | 129 | 129 | 17.00 | −17.47 | 11.23 |
|   |      |     |     |       |        |       |
| 9 | 255.5 | 511 | 513 | 33.00 | −23.80 | 22.58 |
| 10 | 511.5 | 1023 | 1025 | 65.00 | −23.94 | 31.97 |
| 11 | 1023.5 | 2047 | 2049 | 65.00 | −29.96 | 45.23 |

FIG. 68A

KASAMI CODES

| m | COMPLEX CODE LENGTH | REAL CODE LENGTH | NUMBER CODES IN FAMILY | MAXIMUM CROSS CORRELATION | | BINARY WELCH BOUND (VOLTS) |
|---|---|---|---|---|---|---|
| | | | | (VOLTS) | (dB) | |
| 2 | 1.5 | 3 | 2 | 3.00 | 0.00 | 1.34 |
| 4 | 7.5 | 15 | 4 | 5.00 | −9.54 | 3.38 |
| 6 | 31.5 | 63 | 8 | 9.00 | −16.90 | 7.43 |
| 8 | 127.5 | 255 | 16 | 17.00 | −23.52 | 15.46 |
| 10 | 511.5 | 1023 | 32 | 33.00 | −29.83 | 31.48 |
| 12 | 2047.5 | 4095 | 64 | 65.00 | −35.99 | 63.49 |
| 14 | 8191.5 | 16383 | 128 | 129.00 | −42.08 | 127.50 |
| 16 | 32767.5 | 65535 | 256 | 257.00 | −48.13 | 255.50 |

FIG. 68B

BOZTAS CODES
CODE A:

| r | COMPLEX CODE LENGTH | REAL CODE LENGTH | NUMBER CODES IN FAMILY | MAXIMUM CROSS CORRELATION | | BINARY WELCH BOUND (VOLTS) |
|---|---|---|---|---|---|---|
| | | | | (VOLTS) | (dB) | |
| 2 | 3 | 6 | 4 | 3.00 | 0.00 | 1.57 |
| 3 | 7 | 14 | 8 | 3.83 | −5.24 | 2.50 |
| 4 | 15 | 30 | 16 | 5.00 | −9.54 | 3.76 |
| 5 | 31 | 62 | 32 | 6.66 | −13.36 | 5.48 |
| 6 | 63 | 126 | 64 | 9.00 | −16.90 | 7.88 |
| 7 | 127 | 254 | 128 | 12.31 | −20.27 | 11.23 |
| 8 | 255 | 510 | 256 | 17.00 | −23.52 | 15.94 |
| 9 | 511 | 1022 | 512 | 23.63 | −26.70 | 22.58 |
| 10 | 1023 | 2046 | 1024 | 33.00 | −29.83 | 31.97 |

FIG. 69A

BOZTAS CODES
CODE B:

| r | COMPLEX CODE LENGTH | REAL CODE LENGTH | NUMBER CODES IN FAMILY | MAXIMUM CROSS CORRELATION | | BINARY WELCH BOUND (VOLTS) |
|---|---|---|---|---|---|---|
| | | | | (VOLTS) | (dB) | |
| 2 | 6 | 12 | 2 | 4.83 | −1.89 | 1.81 |
| 3 | 14 | 28 | 4 | 6.00 | −7.36 | 3.27 |
| 4 | 30 | 60 | 8 | 7.66 | −11.86 | 5.13 |
| 5 | 62 | 124 | 16 | 10.00 | −15.85 | 7.63 |
| 6 | 126 | 252 | 32 | 13.31 | −19.52 | 11.05 |
| 7 | 254 | 508 | 64 | 18.00 | −22.99 | 15.81 |
| 8 | 510 | 1020 | 128 | 24.63 | −26.32 | 22.49 |
| 9 | 1022 | 2044 | 256 | 34.00 | −29.56 | 31.91 |
| 10 | 2046 | 4092 | 512 | 47.25 | −32.73 | 45.19 |

FIG. 69B

NOVOSAD CODES

| n | COMPLEX CODE LENGTH | REAL CODE LENGTH | NUMBER CODES IN FAMILY | MAXIMUM CROSS CORRELATION (VOLTS) | (dB) | BINARY WELCH BOUND (VOLTS) |
|---|---|---|---|---|---|---|
| 2 | 3 | 6 | 2 | 3.00 | 0.00 | 1.34 |
| 6 | 63 | 126 | 8 | 9.00 | −16.90 | 7.43 |
| 10 | 1023 | 2046 | 32 | 33.00 | −29.83 | 31.48 |

FIG. 69C

MATSUFUJU CODES

| n | COMPLEX CODE LENGTH | REAL CODE LENGTH | NUMBER CODES IN FAMILY | MAXIMUM CROSS CORRELATION | | BINARY WELCH BOUND (VOLTS) |
|---|---|---|---|---|---|---|
| | | | | (VOLTS) | (dB) | |
| 4 | 15 | 30 | 4 | 5.00 | −9.54 | 3.38 |
| 8 | 255 | 510 | 16 | 17.00 | −23.52 | 15.46 |
| 12 | 4095 | 8190 | 64 | 65.00 | −35.99 | 63.49 |

FIG. 69D

THE FAMILY OF LENGTH 63 KASAMI CODES BASED ON THE
ML SEQUENCE SHOWN AS KASAMI 1

| CHIP NUMBER | KASAMI_1 | KASAMI_2 | KASAMI_3 | KASAMI_4 | KASAMI_5 | KASAMI_6 | KASAMI_7 | KASAMI_8 |
|---|---|---|---|---|---|---|---|---|
| 1 | 1 | 1 | 0 | 1 | 1 | 0 | 0 | 0 |
| 2 | 1 | 0 | 1 | 1 | 0 | 0 | 0 | 1 |
| 3 | 1 | 1 | 1 | 0 | 0 | 0 | 1 | 0 |
| 4 | 1 | 1 | 0 | 0 | 0 | 1 | 0 | 1 |
| 5 | 1 | 0 | 0 | 0 | 1 | 0 | 1 | 1 |
| 6 | 1 | 0 | 0 | 1 | 0 | 1 | 1 | 0 |
| 7 | 0 | 1 | 0 | 1 | 0 | 0 | 1 | 1 |
| 8 | 0 | 0 | 1 | 0 | 0 | 1 | 1 | 1 |
| 9 | 0 | 1 | 0 | 0 | 1 | 1 | 1 | 0 |
| 10 | 0 | 0 | 0 | 1 | 1 | 1 | 0 | 1 |
| 11 | 0 | 0 | 1 | 1 | 1 | 0 | 1 | 0 |
| 12 | 1 | 0 | 0 | 0 | 1 | 0 | 1 | 1 |
| 13 | 0 | 1 | 1 | 0 | 1 | 0 | 0 | 1 |
| 14 | 0 | 1 | 0 | 1 | 0 | 0 | 1 | 1 |
| 15 | 0 | 0 | 1 | 0 | 0 | 1 | 1 | 1 |
| 16 | 0 | 1 | 0 | 0 | 1 | 1 | 1 | 0 |
| 17 | 1 | 1 | 1 | 0 | 0 | 0 | 1 | 0 |
| 18 | 1 | 1 | 0 | 0 | 0 | 1 | 0 | 1 |
| 19 | 0 | 1 | 1 | 1 | 0 | 1 | 0 | 0 |
| 20 | 0 | 1 | 1 | 0 | 1 | 0 | 0 | 1 |
| 21 | 0 | 1 | 0 | 1 | 0 | 0 | 1 | 1 |
| 22 | 1 | 1 | 0 | 1 | 1 | 0 | 0 | 0 |
| 23 | 0 | 1 | 0 | 0 | 1 | 1 | 1 | 0 |
| 24 | 1 | 1 | 1 | 0 | 0 | 0 | 1 | 0 |
| 25 | 0 | 0 | 1 | 1 | 1 | 0 | 1 | 0 |
| 26 | 0 | 1 | 1 | 1 | 0 | 1 | 0 | 0 |
| 27 | 1 | 0 | 0 | 1 | 0 | 1 | 1 | 0 |
| 28 | 1 | 0 | 1 | 0 | 1 | 1 | 0 | 0 |
| 29 | 1 | 1 | 0 | 1 | 1 | 0 | 0 | 0 |
| 30 | 1 | 0 | 1 | 1 | 0 | 0 | 0 | 1 |

| | | | | | | | | |
|---|---|---|---|---|---|---|---|---|
| 31 | 0 | 0 | 0 | 1 | 1 | 1 | 0 | 1 |
| 32 | 1 | 1 | 0 | 0 | 0 | 1 | 0 | 1 |
| 33 | 0 | 1 | 1 | 1 | 0 | 1 | 0 | 0 |
| 34 | 0 | 1 | 1 | 0 | 1 | 0 | 0 | 1 |
| 35 | 0 | 1 | 0 | 1 | 0 | 0 | 1 | 1 |
| 36 | 1 | 1 | 0 | 1 | 1 | 0 | 0 | 0 |
| 37 | 1 | 0 | 1 | 1 | 0 | 0 | 0 | 1 |
| 38 | 1 | 1 | 1 | 0 | 0 | 0 | 1 | 0 |
| 39 | 0 | 0 | 1 | 1 | 1 | 0 | 1 | 0 |
| 40 | 0 | 1 | 1 | 1 | 0 | 1 | 0 | 0 |
| 41 | 1 | 0 | 0 | 1 | 0 | 1 | 1 | 0 |
| 42 | 0 | 1 | 0 | 1 | 0 | 0 | 1 | 1 |
| 43 | 0 | 0 | 1 | 0 | 0 | 1 | 1 | 1 |
| 44 | 1 | 0 | 1 | 1 | 0 | 0 | 0 | 1 |
| 45 | 0 | 0 | 0 | 1 | 1 | 1 | 0 | 1 |
| 46 | 1 | 1 | 0 | 0 | 0 | 1 | 0 | 1 |
| 47 | 1 | 0 | 0 | 0 | 1 | 0 | 1 | 1 |
| 48 | 0 | 1 | 1 | 0 | 1 | 0 | 0 | 1 |
| 49 | 1 | 0 | 1 | 0 | 1 | 1 | 0 | 0 |
| 50 | 1 | 1 | 0 | 1 | 1 | 0 | 0 | 0 |
| 51 | 1 | 0 | 1 | 1 | 0 | 0 | 0 | 1 |
| 52 | 0 | 0 | 0 | 1 | 1 | 1 | 0 | 1 |
| 53 | 1 | 1 | 0 | 0 | 0 | 1 | 0 | 1 |
| 54 | 1 | 0 | 0 | 0 | 1 | 0 | 1 | 1 |
| 55 | 0 | 1 | 1 | 0 | 1 | 0 | 0 | 1 |
| 56 | 0 | 1 | 0 | 1 | 0 | 0 | 1 | 1 |
| 57 | 1 | 1 | 0 | 1 | 1 | 0 | 0 | 0 |
| 58 | 1 | 0 | 1 | 1 | 0 | 0 | 0 | 1 |
| 59 | 0 | 0 | 0 | 1 | 1 | 1 | 0 | 1 |
| 60 | 1 | 1 | 0 | 0 | 0 | 1 | 0 | 1 |
| 61 | 0 | 1 | 1 | 1 | 0 | 1 | 0 | 0 |
| 62 | 1 | 0 | 0 | 1 | 0 | 1 | 1 | 0 |
| 63 | 0 | 1 | 0 | 1 | 0 | 0 | 1 | 1 |

*FIG. 70B*

BOZTAS
GALOIS REPRESENTATION OF FOUR MEMBERS OF A LENGTH 15 BOZTAS CODE
(FAMILY A)

| CHIP NUMBER | GALOIS REPRESENTATION | | | |
|---|---|---|---|---|
| | BOZTAS_1 (SEED=[2 2 2 2]) | BOZTAS_2 (SEED=[3 3 3 3]) | BOZTAS_3 (SEED=[1 2 3 0]) | BOZTAS_4 (SEED=[1 1 3 3]) |
| 1 | 2 | 3 | 0 | 3 |
| 2 | 2 | 3 | 3 | 3 |
| 3 | 2 | 3 | 2 | 1 |
| 4 | 2 | 3 | 1 | 1 |
| 5 | 0 | 2 | 3 | 2 |
| 6 | 0 | 2 | 1 | 0 |
| 7 | 0 | 0 | 1 | 0 |
| 8 | 2 | 3 | 0 | 1 |
| 9 | 0 | 0 | 0 | 2 |
| 10 | 0 | 3 | 3 | 2 |
| 11 | 2 | 1 | 0 | 1 |
| 12 | 0 | 2 | 2 | 1 |
| 13 | 2 | 1 | 3 | 2 |
| 14 | 0 | 2 | 1 | 1 |
| 15 | | | | 0 |

FIG. 71

GREY MAPPED BOZTAS

| CHIP NUMBER | GREY MAPPED BOZTAS CODES | |
|---|---|---|
| | BOZTAS_1 (SEED=[2 2 2 2]) | BOZTAS_2 (SEED=[3 3 3 3]) |
| 1 | 1 | 1 |
| 2 | 1 | 0 |
| 3 | 1 | 1 |
| 4 | 1 | 0 |
| 5 | 1 | 1 |
| 6 | 1 | 0 |
| 7 | 1 | 1 |
| 8 | 1 | 0 |
| 9 | 0 | 1 |
| 10 | 0 | 1 |
| 11 | 0 | 1 |
| 12 | 0 | 1 |
| 13 | 0 | 0 |
| 14 | 0 | 0 |
| 15 | 1 | 1 |
| 16 | 1 | 0 |
| 17 | 0 | 0 |
| 18 | 0 | 0 |
| 19 | 0 | 0 |
| 20 | 0 | 0 |
| 21 | 1 | 1 |
| 22 | 1 | 0 |
| 23 | 1 | 0 |
| 24 | 1 | 1 |
| 25 | 0 | 1 |
| 26 | 0 | 1 |
| 27 | 1 | 0 |
| 28 | 1 | 1 |
| 29 | 0 | 1 |
| 30 | 0 | 1 |

LENGTH 31 BOZTAS
GALOIS FIELD REPRESENTATION OF 3 MEMBERS OF A
LENGTH 31 BOZTAS FAMILY A CODE SET

| CHIP NUMBER | BOZTAS_5 (SEED=[1 2 2 1 1]) | BOZTAS_6 (SEED=[2 2 2 2 2]) | BOZTAS_7 (SEED=[1 2 3 0 0]) |
|---|---|---|---|
| 1 | 1 | 2 | 0 |
| 2 | 1 | 2 | 0 |
| 3 | 2 | 2 | 3 |
| 4 | 2 | 2 | 2 |
| 5 | 1 | 2 | 1 |
| 6 | 1 | 0 | 3 |
| 7 | 3 | 0 | 0 |
| 8 | 3 | 0 | 0 |
| 9 | 1 | 2 | 3 |
| 10 | 2 | 2 | 3 |
| 11 | 2 | 0 | 3 |
| 12 | 2 | 2 | 3 |
| 13 | 3 | 2 | 1 |
| 14 | 3 | 2 | 0 |
| 15 | 0 | 0 | 0 |
| 16 | 1 | 2 | 2 |
| 17 | 3 | 0 | 1 |
| 18 | 1 | 2 | 1 |
| 19 | 0 | 0 | 2 |
| 20 | 1 | 0 | 1 |
| 21 | 0 | 0 | 1 |
| 22 | 1 | 0 | 1 |
| 23 | 2 | 2 | 2 |
| 24 | 2 | 0 | 1 |
| 25 | 2 | 0 | 0 |
| 26 | 0 | 2 | 1 |
| 27 | 3 | 0 | 2 |
| 28 | 0 | 2 | 0 |
| 29 | 2 | 2 | 2 |
| 30 | 1 | 0 | 0 |
| 31 | 2 | 0 | 1 |

PREAMBLE CODE STRUCTURE AND DETECTION METHOD AND APPARATUS

MICROFICHE APPENDIX

A Microfiche Appendix is filed herewith which comprises one microfiche sheet of 31 frames.

FIELD OF THE INVENTION

The field of the present invention relates to communications and, more particularly, to an improved preamble code structure and method for code detection for use in a wireless communication system.

BACKGROUND

Wireless communication systems typically comprise a number of mobile "user stations" or "handsets" and a number of stationary or fixed "base stations" which are capable of communicating with each other. The base stations and user stations may communicate using frequency division multiple access (FDMA), wherein transmissions are distinguished by using different assigned frequencies; time division multiple access (TDMA), wherein transmissions are distinguished according to assigned time slots within a time frame; code division multiple access (CDMA), wherein transmissions are distinguished according to different assigned codes; or various combinations thereof. One type of communication used in wireless applications is spread spectrum communication, wherein the bandwidth of the signal being transmitted generally exceeds the bandwidth required to transmit the data being sent. In spread spectrum communication, a data signal is typically modulated with a pseudo-random chip code to generate a transmitted signal spread over a relatively wide bandwidth. At the receiver the received spread spectrum signal is despread in order to recover the original data. One method of despreading of the spread spectrum signal is by correlating the received signal with a reference code matching the pseudo-noise code used by the transmitter to transmit the data. After initial correlation is achieved, in many systems it is necessary to track the incoming signal so as to maintain synchronization and keep it time-aligned with the local reference code to allow continued despreading of the received signal.

In order to carry out communication between a base station and a user station, a communication link must first be established. In a TDMA system, a communication link may comprise, e.g., a-time slot having a forward link portion and a reverse link portion wherein a base station and a user station exchange communications in time division duplex. Establishment of the communication link can be difficult in a spread-spectrum TDMA communication system, due to the length of time that may be required to synchronize the transmitter and the receiver as well as the relative brevity of the time slot within which synchronization can take place.

In order to assist rapid synchronization of communication in spread spectrum and other communication systems, a preamble code preceding an information message may be used. A preamble code may comprise a relatively easily identifiable code sequence that marks the start of the information message and thereby allows the transmitter and receiver to synchronize. The receiver searches for the preamble code and, after locating it, knows when to expect the remaining information message and what timing adjustments may need to be-made for optimum correlation of the information message.

Use of a preamble code can be particularly advantageous in a TDMA system because of the intermittent nature of the periodic transmissions between a base station and the user stations, which may require re-synchronization each time frame or series of time frames. Because the length of each burst is inherently limited by the duration of a time slot (or time slots), information is transmitted to and from a given user station in a TDMA system periodically over a series of time frames, with the base station and user station typically communicating only once per time frame, during a specified time slot. Due to the periodic nature of TDMA transmissions over a given link, the base station and the user station using the link have to look for the intermittent messages sent to them, which may be separated in time by an entire time frame or even more (e.g., several time frames) in some cases.

The fact that the user stations can be mobile may cause the periodic transmissions to drift within the allocated time slot. In addition, there is the possibility of drift between transmitter and receiver clocks. Thus, the receiver may not know precisely at what point the incoming burst will be received, although in some cases the expected time of arrival may be narrowed down to within a predefined window around the start of the time slot. When the receiver is waiting for its designated message, it may receive extraneous messages from nearby users of the same frequency spectrum or neighboring frequency spectrum, or may otherwise receive interference or noise and mistakenly interpret it as part of the message designated for it. A preamble code helps minimize possible misidentification of noise or interference as a valid message by assisting in the detection of the start of a designated burst. To prevent confusion at the user station, the preamble code for a given user station must be distinguished from the preamble codes as well as any other codes that may be targeted to any other the user station (or to the base station) during a time slot when the given user station is to communicate with the base station.

A preamble code may need to be identified rapidly, such as where a time slot is relatively short. This requirement generally suggests the use of short preamble codes. At the same time, a preamble code is preferably resistant to noise, interference and multipath effects, as well as false alarms due to autocorrelation peaks and cross-correlations, so as to ensure the highest probability of proper detection and identification of the preamble code at the receiver. If a preamble code is not properly identified by the receiver, the entire information message for the burst being sent may be lost.

One option to increase likelihood of preamble code detection is to increase the power of the transmitted preamble code over that of the transmit power for the information message, thereby increasing signal-to-noise ratio of the transmitted preamble code. While increasing the transmit power for the preamble code may decrease sensitivity to noise and interference, higher power transmissions for preamble codes may unduly interfere with users of the same or neighboring frequency spectra. Moreover, in certain low power applications (such as various types of handsets), it may not be feasible to increase the transmission power of preamble codes. Even if feasible, increasing the transmit power could cause early depletion of battery charge for some mobile handsets.

Another option is to increase the length of the preamble code so as to provide better discrimination as against noise and other signals. However, merely elongating the preamble code generally leads to more complex synchronization filters and increases the time needed to detect the preamble code.

Accordingly, it would be advantageous to provide a preamble code well suited to a TDMA communication system or other communication system requiring rapid synchronization at the receiver. It would further be advantageous to provide such a preamble code while maintaining a relatively simple synchronization filter structure. It would further be advantageous to provide a preamble code having resistance to noise and interference, without necessarily requiring increased transmission power.

As a further consideration in preamble code design, a preamble code may be used for selection of an antenna channel in a system where antenna diversity is employed. The received signal quality of the preamble code is evaluated for each antenna branch, and the best antenna or set of antennas is selected to receive the information message. Thus, a preamble code is preferably constructed so as to be well suited for use in a system employing antenna diversity, and to allow relatively easy evaluation of received signal quality so as to facilitate antenna selection.

SUMMARY OF THE INVENTION

The invention in one aspect comprises a concatenated preamble code structure and means for detecting a concatenated code such as a concatenated preamble code.

In a first embodiment of the invention, a concatenated preamble code is formed by a kronecker product between two subcodes of different lengths. At the receiver a two-stage processor is preferably used to detect the concatenated preamble code. The two-stage processor preferably comprises a series of two correlation filters. A family of concatenated preamble codes may be generated from the kronecker product of a first subcode (such as a Barker code) with each of a plurality of other subcodes, each of these other subcodes preferably having low cross-correlation levels with respect to one another.

In a second embodiment of the invention, a concatenated preamble code is formed by a kronecker product between two subcodes of approximately equal length. The two selected subcodes used to form the concatenated preamble code are preferably short and preferably have relatively low aperiodic auto-correlation responses.

In another aspect of the invention, a plurality of correlation filters including at least one mismatched filter are employed in series for detecting a concatenated code, such as a concatenated preamble code. The mismatched filter is preferably the first in the series of filters and is preferably followed by a single matched filter. Odd length Barker codes may be used to reduce processing gain losses attributed to use of a mismatched filter. Alternatively, to support a modulation format using in-phase (I) and quadrature (Q) baseband components, an even code length may be selected by adding a chip to or truncating a chip from an existing odd code (such as a Gold code or a Kasami code).

In another aspect of the invention, a repeated codeword preamble (RCP) code is formed by transmitting a single short codeword (i.e., subcode) several times in a row. At the receiver a relatively simple matched filter is used to generate a series of spikes separated by the period of the subcode. An alert/confirm detector may be used to non-coherently add together individual correlation spikes and reject false alarms. The alert function preferably measures total correlation energy and adjusts detection thresholds based thereon, while the confirm function preferably ensures that the proper number of correlation spikes exceed a detection threshold at the correct times.

The various preamble code structures and means for detection thereof are disclosed with respect to a preferred TDMA communication system, wherein a plurality of user stations communicate with a base station, one in each time slot (or virtual time slot) in time division duplex.

Other further variations and refinements are also disclosed herein.

BRIEF DESCRIPTION OF THE DRAWINGS

FIGS. 13A–D and 14A–D are graphs illustrating correlation responses of a two-stage correlator using matched filters to detect concatenated preamble codes derived from a Barker code and a length-32 minimum peak sidelobe code.

FIGS. 15A–D are graphs illustrating correlation properties of two length-11 Barker codes.

FIGS. 16A–D are graphs illustrating correlation responses of a two-stage correlator using matched filters to detect concatenated preamble codes derived from the length-11 Barker codes used to generate the graphs of FIGS. 15A–D.

FIG. 18 is a block diagram of a multiple-stage correlator using a mismatched filter and matched filters for detecting a concatenated preamble code.

FIGS. 21A–D and 22A–D are graphs illustrating correlation responses of a two-stage mismatched filter correlator to concatenated preamble codes derived from a Barker code and a length-32 minimum peak sidelobe code.

FIGS. 23A–D are graphs showing the responses of various matched and mismatched filters having different filter structures to a particular length-4 code.

FIGS. 24A–D and 25A–D are graphs illustrating correlation responses of a two-stage mismatched filter correlator including the mismatched filter of FIG. 23D to concatenated preamble codes derived from a Barker code and a length-32 minimum peak sidelobe code.

FIGS. 28 through 31 compare the response of a matched filter with the responses of various mismatched filters to a length-5 Barker code.

FIGS. 32A–D and 33A–D are graphs illustrating correlation responses of a two-stage mismatched filter correlator including the mismatched filter of FIG. 31 to concatenated preamble codes derived from a length-5 Barker code and a length-25 minimum peak sidelobe code.

FIGS. 34 through 37 compare the responses of a matched filter and various mismatched filters to a length-3 Barker code.

FIGS. 38A–D and 39A–D are graphs illustrating correlation responses of a two-stage mismatched filter correlator including the mismatched filter of FIG. 37 to concatenated preamble codes derived from a length-3 Barker code and a length-39 code.

FIGS. 40A–D are graphs illustrating correlation responses of matched filters configured for length-124 repeated codeword preamble codes constructed from length-31 Gold codes.

FIGS. 42A–D and 43A–D are graphs illustrating correlation responses of matched filters to length-126 repeated codeword preamble codes constructed from Kasami-63 codes.

FIGS. 44A–D and 45A–D are graphs illustrating correlation responses of matched filters to length-128 preamble codes constructed from augmented Gold codes.

FIGS. 46A–D and 47A–D are graphs illustrating correlation responses of matched filters to length-120 repeated codeword preamble codes constructed from truncated Gold codes.

FIGS. 49A–D are graphs illustrating correlation responses of matched filters to length-124 repeated codeword preamble codes constructed from truncated Kasami codes.

FIGS. 50A–D and 51A–D are graphs illustrating correlation responses of matched filters to length-60 repeated codeword preamble codes constructed from Boztas codes.

FIGS. 52A–D, 53A–D and 54A–D are graphs illustrating correlation responses of matched filters to various length quadriphase preamble codes constructed from Boztas codes.

FIGS. 55A–D and 56A–D are graphs comparing simulated correlation responses of a length-128 non-repeating preamble code with a length-120 repeated codeword preamble code in the presence of noise and interference.

FIG. 57 is a block diagram of one embodiment of a repeated codeword preamble code detector.

FIGS. 60A–D, 61A–D and 62A–D are graphs showing exemplary signal output levels in accordance with the FIG. 59 alert/confirm preamble code detector.

FIG. 65 is a chart comparing preamble threshold detection setting requirements for various preamble code lengths and alternative probability of detection figures.

FIG. 67 is a detailed block diagram of a spread spectrum correlator.

FIGS. 68A and 68B are tables summarizing various properties relating to Gold codes and Kasami codes.

FIGS. 69A through 69D are tables summarizing various properties relating to particular quadriphase codes.

FIG. 71 is a table of four length-15 quadriphase Boztas codes in Galois representation and their seed values.

FIG. 72 is a table of two length-30 Grey-mapped Boztas codes and their seed values.

FIG. 73 is a table of three length-31 quadriphase Boztas codes in Galois representation and their seed values.

DETAILED DESCRIPTION OF THE PREFERRED EMBODIMENTS

Various aspects of the invention, including different preamble code structures and means for detecting preamble codes, are described with reference to a preferred TDMA communication system as set forth below.

Figure 1:
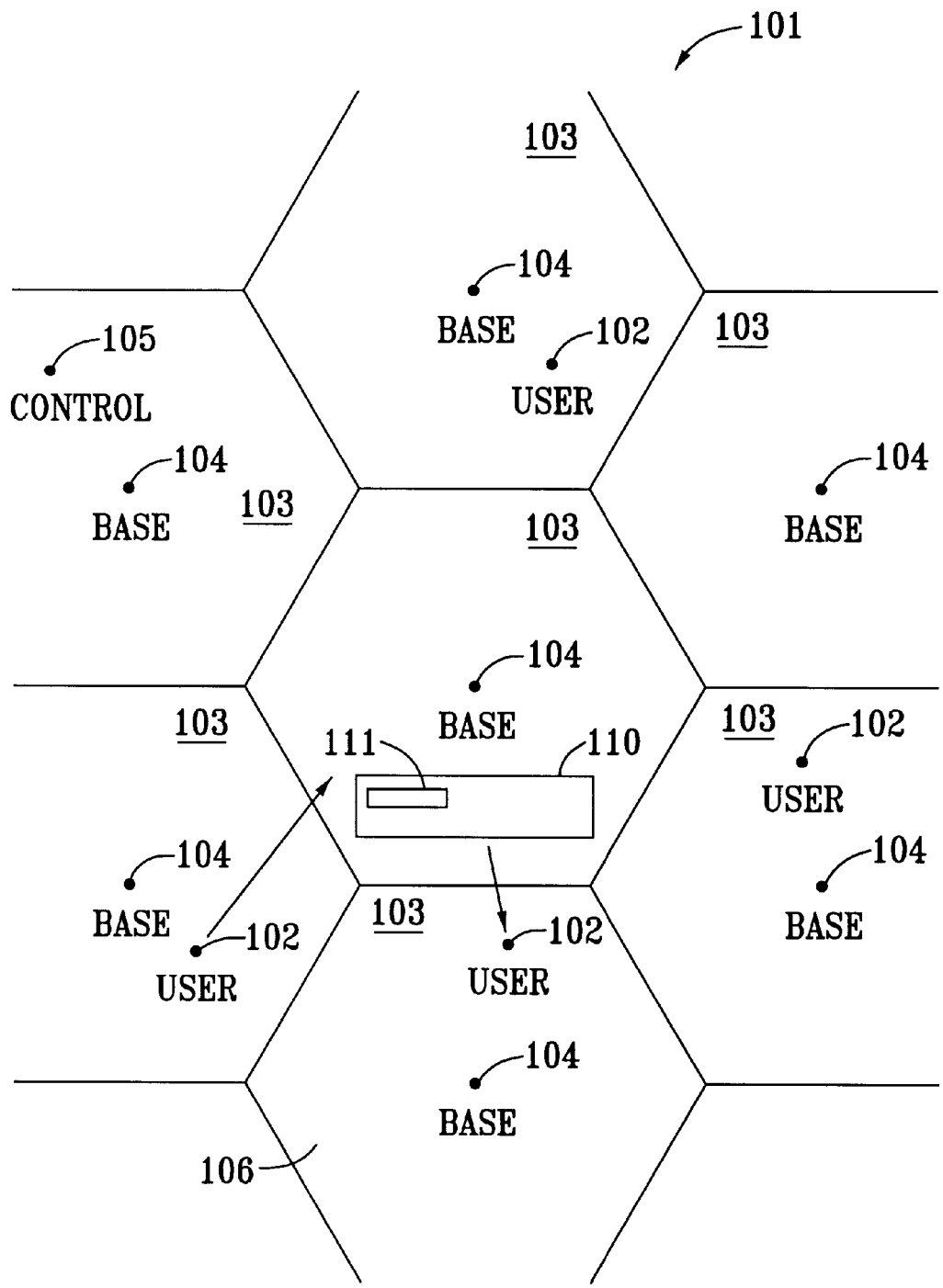
FIG. 1 is a block diagram of a communication system comprising user stations and base stations.

FIG. 1 illustrates the cellular arrangement of a communication system 101 comprising one or more user stations 102 and one or more base stations 104 arranged within a plurality of communication cells 103. Each base station 104 and user station 102 preferably comprises one or more radios each comprising a receiver, a transmitter, and one or more antennas. Each cell 103 preferably includes a single base station 104 located near the center of the cell 103.

Figure 2:
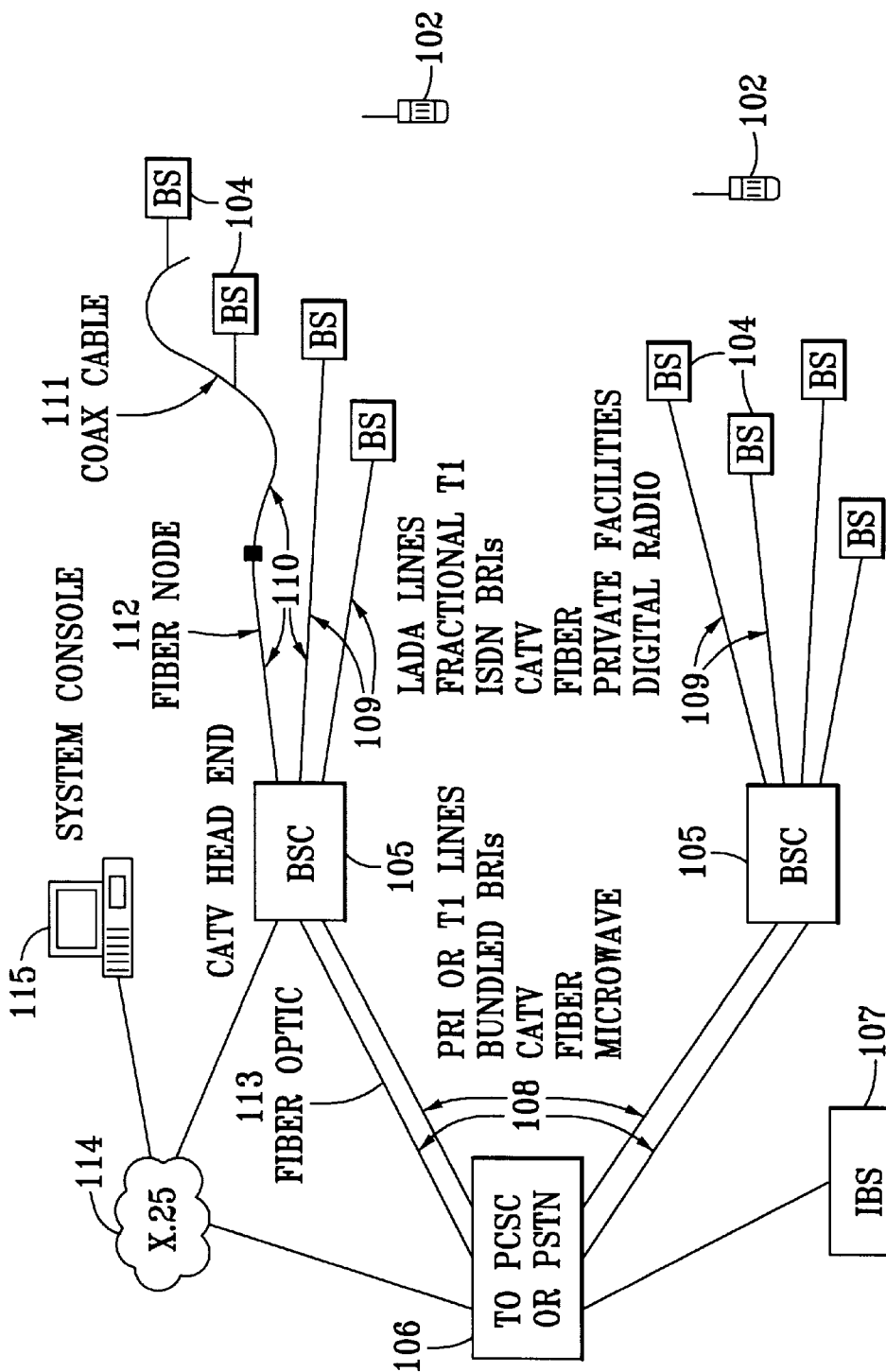
FIG. 2 is a block diagram of a communication network including user stations and base stations.

FIG. 2 is a diagram showing additional details of a communication system architecture. The system architecture includes a plurality of base stations 104 which communicate with a plurality of user stations 102. Each base station 104 is shown coupled to a base station controller 105 by any of a variety of communication paths 109. The communication paths 109 each comprise one or more communication links 110 (e.g., a coaxial cable, a fiber optic cable, a digital radio link, or a telephone line). Each base station controller 105 is preferably connected to one or more communication networks 106 such as a public switched telephone network (PSTN) or personal communication system switching center (PCSC). Each base station controller 105 is shown connected to the communication network(s) 106 by means of one or more communication paths 108, each of which may include one or more communication links 110, examples of which are explained above. The communication system architecture shown in FIG. 2 also may include one or more "intelligent" base stations 107 which connects a user station 102 directly to a communication network 106 without interfacing through a base station controller 105.

Figure 8:
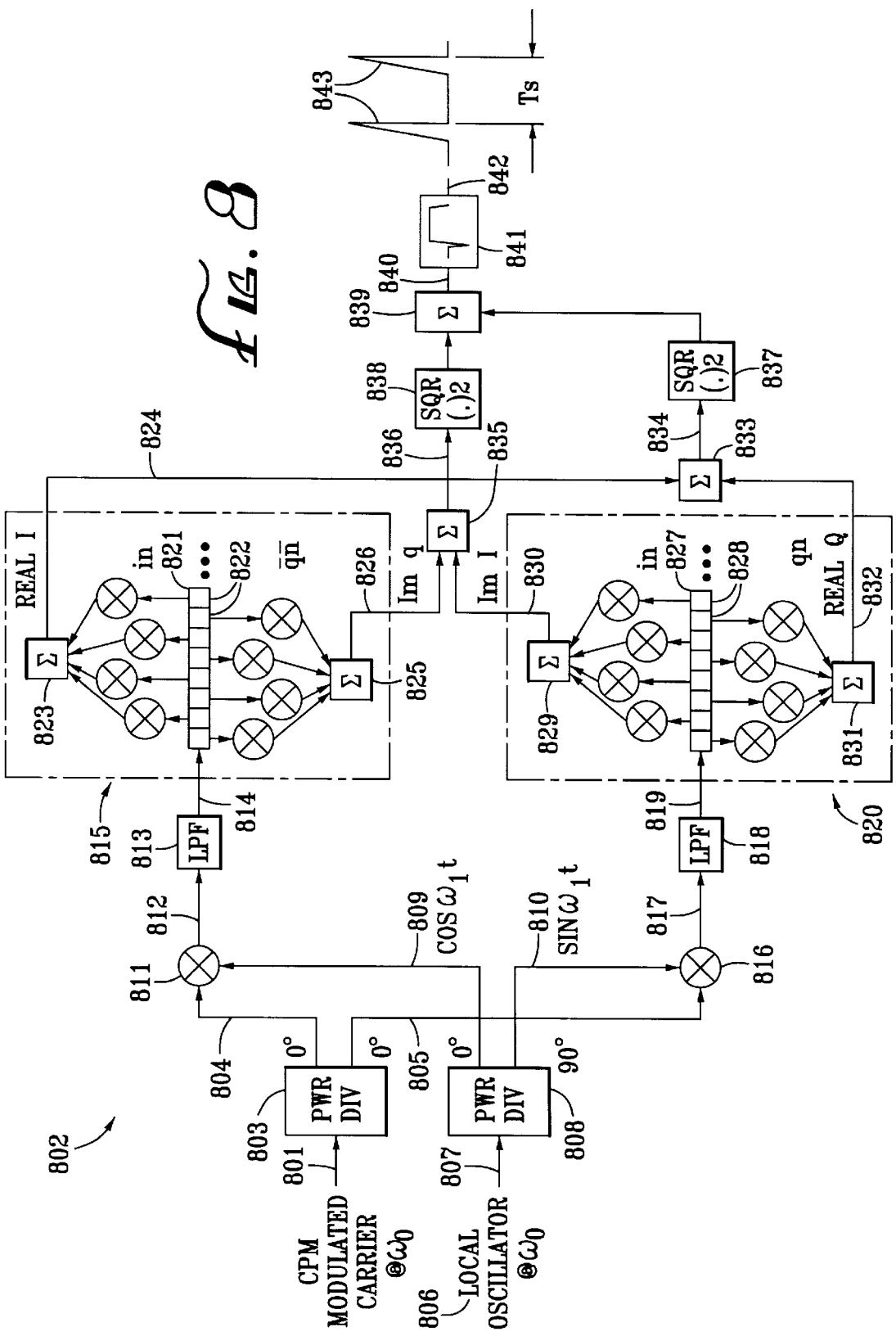
FIG. 8 is a circuit diagram of a preferred non-coherent CPM correlator.

In a preferred embodiment, communication between base stations 104 and user stations 102 is accomplished using spread spectrum technology. A preferred method of demodulating and correlating a continuous phase modulated (CPM) spread spectrum signal is described in U.S. Pat. No. 5,659,574, hereby incorporated by reference as if set forth fully herein. FIG. 8 is a circuit diagram of a preferred non-coherent continuous phase modulated (CPM) correlator that may be used for detecting a preamble code or other spread spectrum code. The operation of the FIG. 8 circuit is more fully described in the U.S. Pat. No. 5,659,574 patent referenced immediately above.

Other exemplary correlators are described in, e.g., U.S. Pat. Nos. 5,022,047 and 5,016,255, each of which are assigned to the assignee of the present invention, and each of which are incorporated herein by reference as if fully set forth herein.

Preferably, the base station 104 and user station 102 of FIG. 1 establish synchronization and communication using an M-ary direct sequence spreading technique in which multiple bits of data are transmitted for each spread spectrum symbol. Suitable M-ary spread spectrum transmission and reception techniques are described in, e.g., U.S. Pat. No. 5,022,047 or in U.S. Pat. No. 5,757,847, both of which are incorporated herein by reference as if set forth fully herein. In a preferred embodiment, the base station 104 and user stations 102 each transmit an M-ary direct sequence spread spectrum signal, with M=32, using spread spectrum codes (called "symbol codes") of the same length (e.g., 32 chips each in length). In a preferred M-ary spread spectrum modulation technique, thirty-two different symbol codes are used to represent up to thirty-two different data symbols, each comprising five bits of data, with differential phase encoding allowing transmission of a 6th bit of data for each symbol code. Techniques of phase encoding for transmission of an additional bit of information per symbol code are described in, e.g., U.S. Pat. No. 5,757,847 referenced above.

Figure 3:
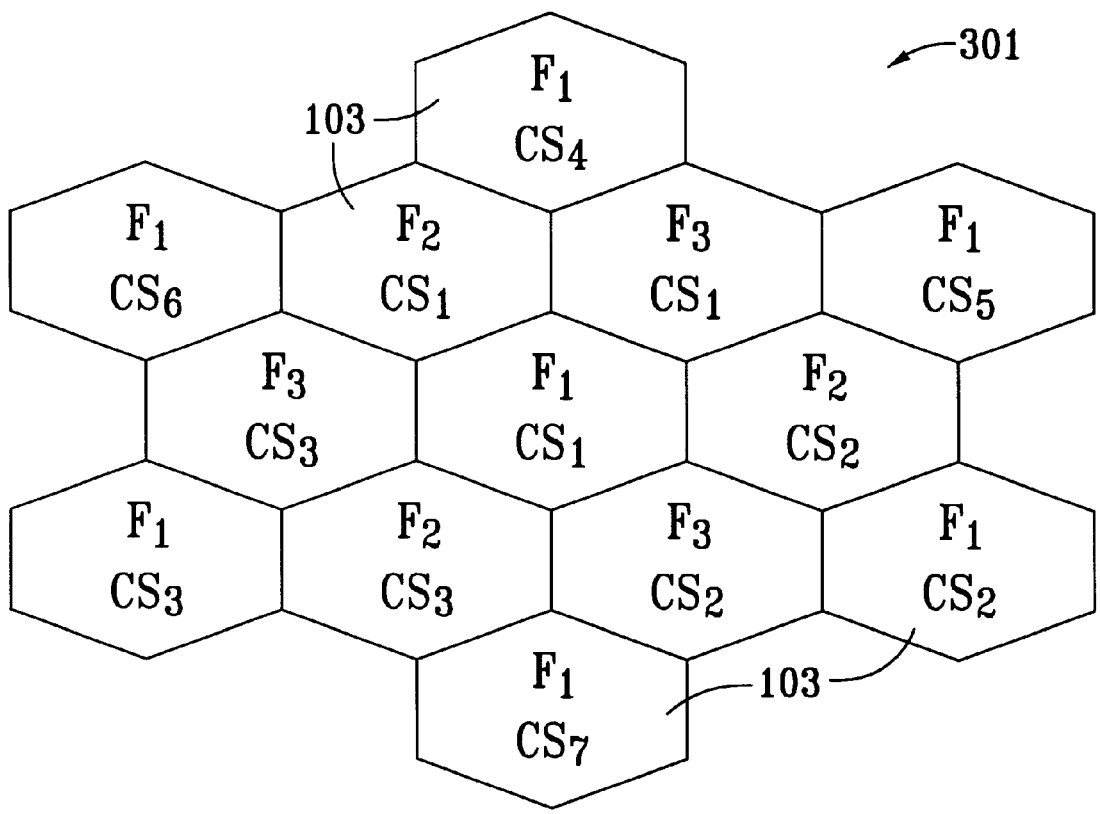
FIG. 3 is a diagram of a preferred cellular environment according to one or more aspects of the present invention.

FIG. 3 is a diagram of a preferred cellular environment in which the invention may operate.

In FIG. 3, a geographical region 301 is divided into a plurality of cells 103. Associated with each cell 103 is an assigned frequency Fx and an assigned spread spectrum code Cy. Preferably, three different frequencies F1, F2 and F3 are assigned in such a manner that no two adjacent cells have the same assigned frequency F1, F2 or F3. The effect of such a frequency reuse pattern is the minimization of interference between adjacent cells with a minimum number of frequencies used. The preferable frequency reuse pattern is F=3.

To further reduce the possibility of intercell interference, different near-orthogonal spread spectrum codes C1 through C7 are assigned as shown in a repeating pattern overlapping the frequency reuse pattern. Although a repeating pattern of seven spread spectrum codes C1 through C7 is preferred, a pattern involving other numbers of spread spectrum codes may be suitable depending upon the particular application.

Further information regarding a suitable cellular environment for operation of the invention may be found in U.S. Pat. No. 5,402,413 which is incorporated herein by reference as if fully set forth herein.

The use of spread spectrum techniques for carrier modulation permits a frequency reuse factor of N=3 for allocating different carrier frequencies F1, F2 and F3 to adjacent cells 103. Interference between cells 103 using the same carrier frequency F1, F2 or F3 is reduced by the propagation loss due to the distance separating the cells 103 (no two cells 103 using the same frequency F1, F2 or F3 are less than two cells 103 in distance away from one another), and also by the spread spectrum processing gain of cells 103 using the same carrier frequencies F1, F2 or F3, obtained by the use of near-orthogonal spreading codes.

The invention may be used, as explained hereinafter, in conjunction with antenna diversity techniques. For example, a preamble code such as described herein may be used to sound a channel and allow selection of one from a plurality of antennas for the message following the preamble code.

Different types and numbers of antennas may be connected to the base station 104, depending on the type of application. For low density suburban or rural applications an omnidirectional antenna is preferable to provide maximum coverage with the fewest base stations 104. For example, a vertically polarized omnidirectional antenna may be employed having a gain of approximately 9 dB. The 9 dB of gain permits a relatively large radius cell even with an omnidirectional azimuthal pattern.

A single steered phased array antenna is presently preferred for applications requiring a high gain, highly directional antenna. For example, to permit a single base station 104 to cover large, sparsely populated area, a steered phased array antenna with up to 20 dB of horizontal directivity is presently preferred. The steered phased array antenna preferably utilizes circular polarization so that high level delayed clutter signals reflected from buildings or other obstructions within the beam path do not interfere with the received signals from the user stations 102. Because reflected signals are typically reversed in polarization, they will be largely rejected by circularly polarized antennas.

In suburban and low density urban areas, directional antennas with 120 degree azimuth beamwidths and 13 dB vertical gain are presently preferred so that a cell 103 can be divided into three sectors, with each sector accommodating a full load of user stations (e.g., 16 or 32 user stations 102). The use of high gain, directional antennas reduces the delay spread in severe multipath environments by rejecting multipath components arriving from outside the main beam of the antenna. Additionally, directional antennas reduce interference to user stations 102 in neighboring cells and fixed microwave facilities which may be operating nearby.

In more dense urban areas and other areas with significant multipath problems, the number of directional antennas used by a base station 104 is preferably increased to provide antenna diversity as a means of combatting signal degradations from multipath propagation. When multiple antennas are employed, circuitry for selecting an antenna for each transmission which best matches the communication channel between the base station 104 and user station 102 is preferred.

In one embodiment, the user station 102 employs a halfwave dipole antenna which is linearly polarized and provides a gain of 2 dB with an omnidirectional pattern perpendicular to the antenna axis. At a nominal frequency of 1900 MHz, a half wavelength is approximately 3 inches, which is fitted within a handset.

Details of a particular protocol suitable for low power pocket phone operation in a PCS microcell environment is found in co-pending U.S. patent application Ser. No. 08/284,053 filed on Aug. 1, 1994, hereby incorporated by reference as if set forth fully herein.

In a preferred embodiment, the user stations 102 and base stations 104 communicate using time division multiple access (TDMA) techniques and preferably time division duplexing (TDD). According to these techniques, a continuous series of polling loops or major time frames for organizing communication between a base station 104 and user stations 102 is provided.

Figure 4:
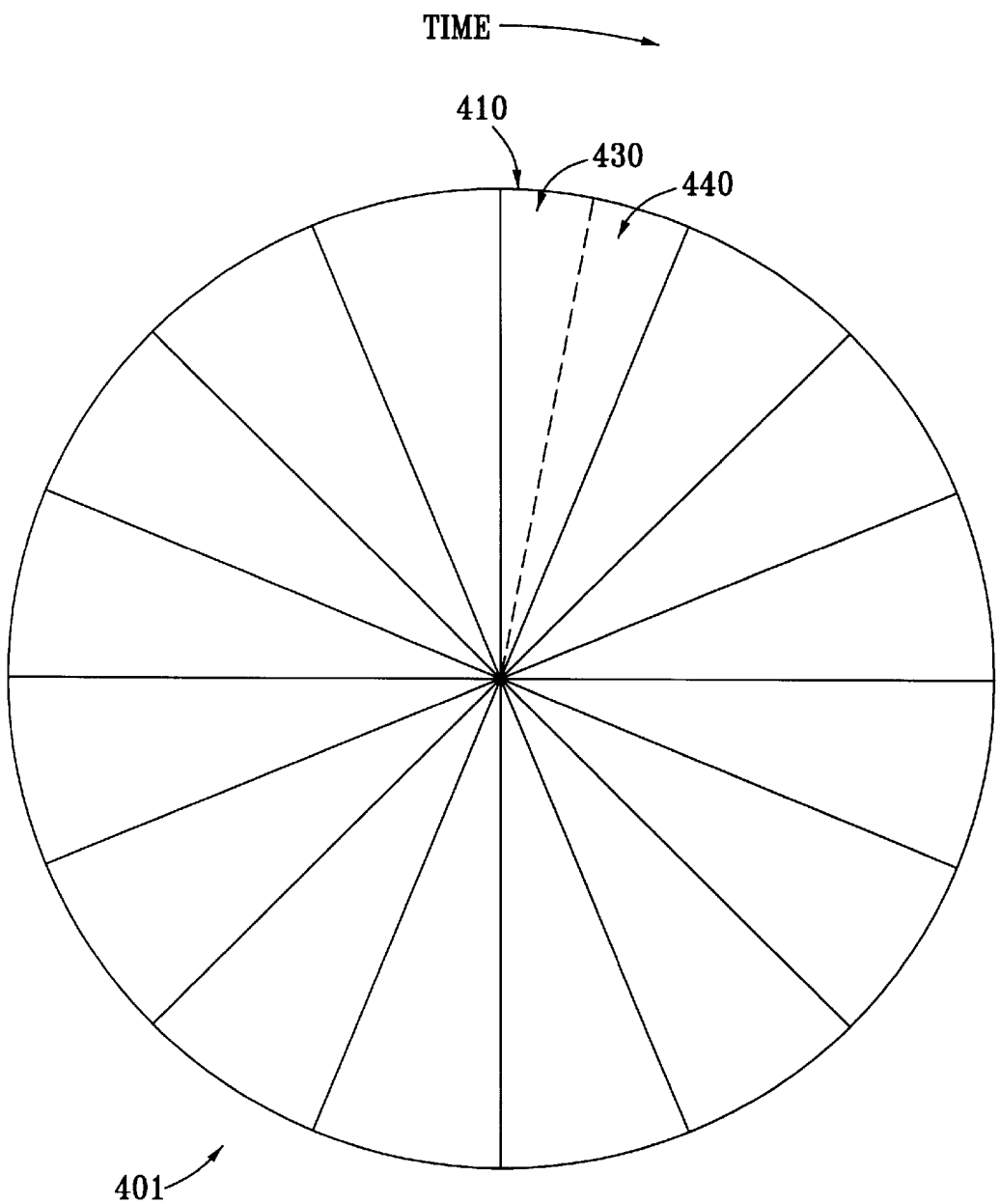
FIG. 4 is a timing diagram of a polling loop illustrating an exemplary over-the-air protocol.

FIG. 4 is a diagram of a polling loop 401 (also referred to as a major time frame). In FIG. 4 each polling loop 401 is further divided into multiple time slots 410 which are assigned for communication between base stations 104 and user stations 102. A base station 104 may communicate with a plurality of user stations 102 on a periodic basis over consecutive polling loops 401. In a preferred embodiment, the polling loop 401 is divided into sixteen time slots 410, and each time slot 410 has a duration of 1.25 milliseconds.

Figure 5:
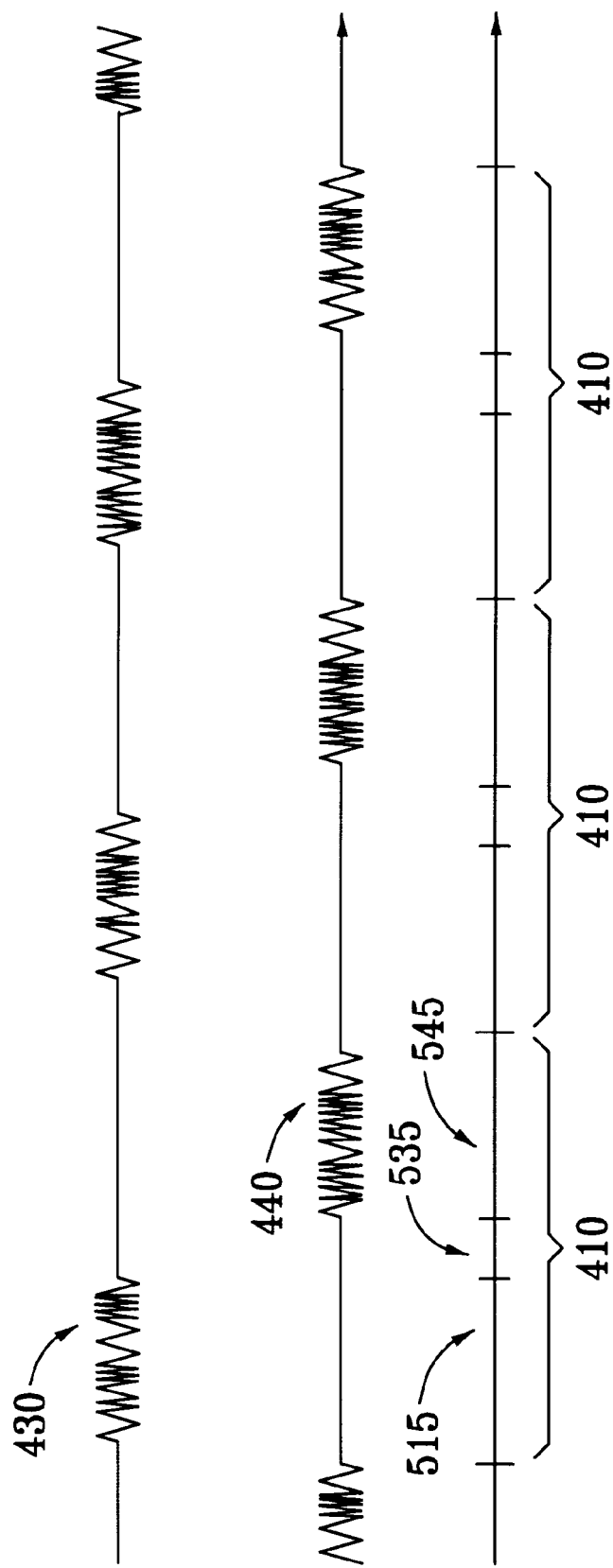
FIG. 5 is a diagram illustrating a protocol for communication.

Preferred features of a time slot 410 are depicted in FIG. 5. As shown in FIG. 5, a time slot 410 of polling loop 401 comprises a user station transmit frame 515, a guard time interval 535, and a base station transmit frame 545. A base station 104 transmits a base station transmission 440 during the base station transmit frame 545 to a user station 102 with which the base station 104 is communicating. The user station 102 transmits to the base station 104 a user station transmission 430 during the user station transmit frame 515.

Time division duplex permits common antennas to be used for transmit and receive functions at both the base station 104 and the user stations 102, generally without the need for antenna diplexers. Common antennas can be used to transmit and receive because these functions are separated in time at each of the user stations 102 and base stations 104. The use of common antennas generally results in simplicity of the design of the base station 104 and user station 102.

Figure 6:
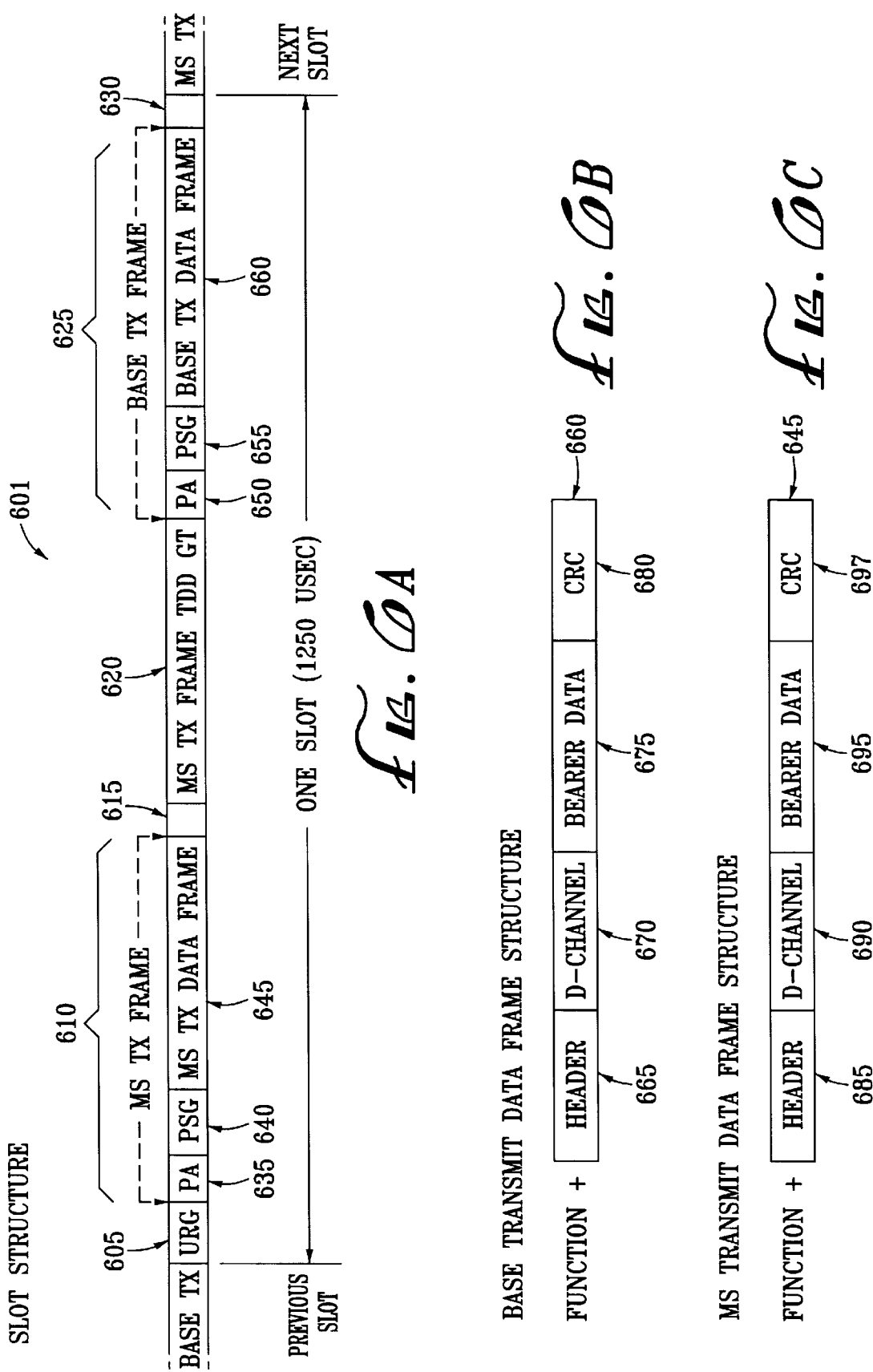
FIG. 6A is a timing diagram of an exemplary time slot structure.
FIGS. 6B and 6C are timing diagrams of a base transmit data frame structure and a mobile station transmit data frame structure, respectively.

FIGS. 6A through 6C illustrate preferred time slot components, and the relative location of the preamble code (or preamble codes) with respect to the other time slot components.

FIG. 6A shows the structure of a preferred structure of a time slot 601 comprising a variable radio delay gap 605, a user station transmit field 610, a base processor gap 615, a guard time 620, a base transmit field 625, and a radar gap 630. Each user station transmit field 610 comprises a user preamble code field 635, a user preamble sounding gap 640, and a user station data field 645. Similarly, each base transmit frame 625 comprises a base preamble code field 650, a base preamble sounding gap 655, and a base transmit data field 660. The user preamble code field 635 and base preamble code field 650 are illustrated in more detail in a variety of different embodiments described later herein.

FIG. 6B shows a preferred structure for the base transmit data field 660. The base transmit data field 660 comprises a base header field 665, a base D-channel field 670, a base data field 675, and a base cyclical redundancy check (CRC) field 680. In a preferred embodiment, the base header field 665 is 23 bits, the base D-channel field 670 is 8 bits, the base data field 625 is 192 bits, and the base CRC field 680 is 16 bits.

FIG. 6C shows a preferred structure for the user station transmit data field 645. The user station data field 645 comprises a user header field 685, a user D-channel field 690, a user data field 695, and a user CRC field 697. In a preferred embodiment, the user header field 685 is 17 bits, the user D-channel field 690 is 8 bits, the user data field 695 is 192 bits, and the user CRC field 697 is 16 bits.

Figure 7:
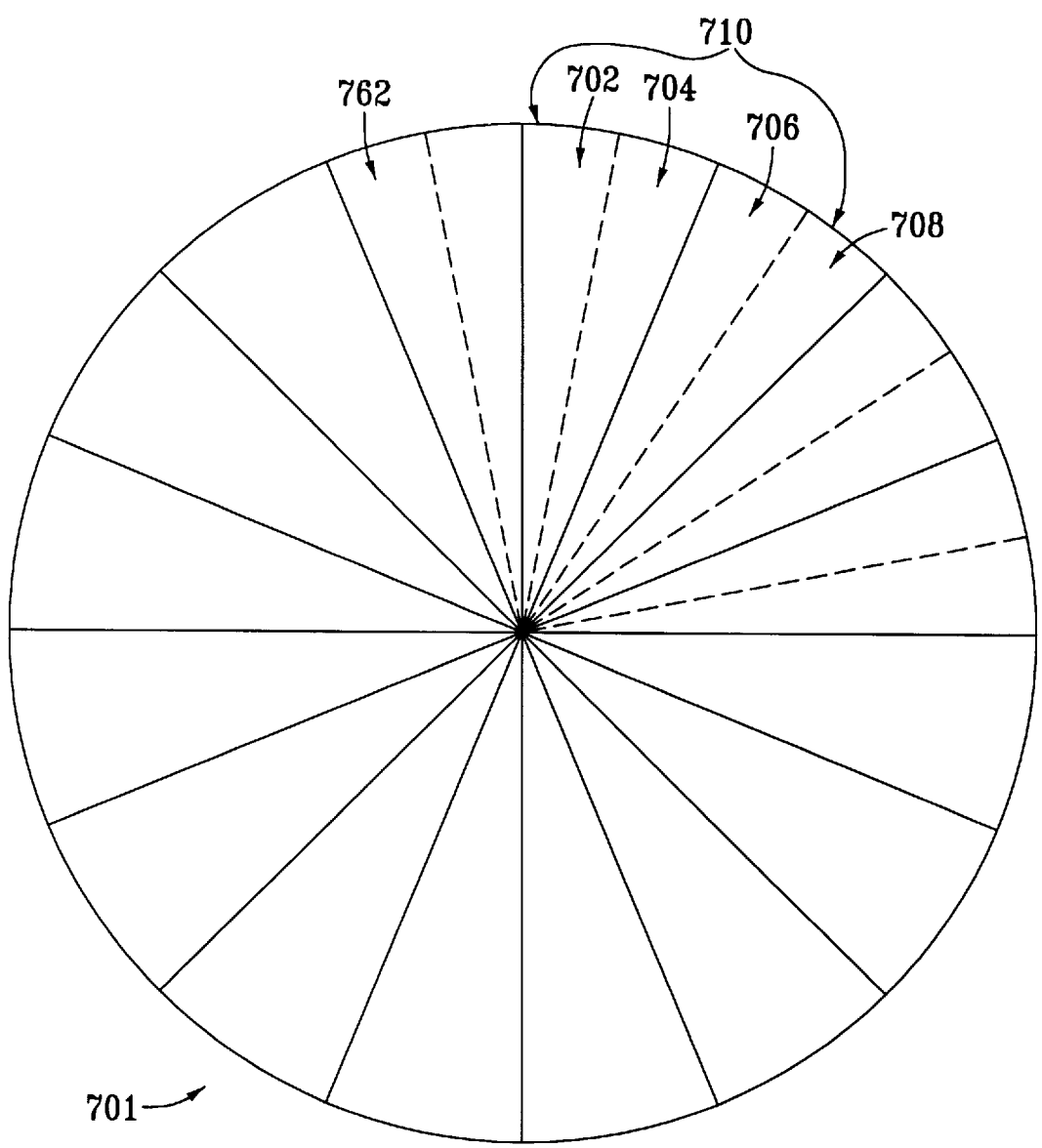
FIG. 7 is a timing diagram of a polling loop illustrating an alternative over-the-air protocol.

FIG. 7 shows an alternative polling loop structure that may be used in accordance with one or more embodiments of the present invention, and is more fully described in copending U.S. Pat. No. 6,005,856, and incorporated herein by reference as if fully set forth herein. Further details regarding the FIG. 4 polling loop structure may also be found in that application. Details regarding a presently preferred method for establishing communication between a base station 104 and a user station 102 may be found in U.S. Pat. No. 5,455,822, incorporated herein by reference as if set forth fully herein, or in the copending application referenced immediately above.

Several embodiments of the invention make use of one or more matched filter(s) and/or one or more mismatched filter(s). Matched filters for spread-spectrum communication (including M-ary spread spectrum communication) are known in the art as exemplified by, e.g., U.S. Pat. Nos. 5,022,047 and 5,016,255, both of which are assigned to the assignee of the present invention and incorporated by reference as if fully set forth herein. An exemplary matched filter 1721 (i.e., correlator) which may be used to detect binary phase shift keyed (BPSK) modulated spread spectrum signals is shown in FIG. 67. Its operation is described in detail in U.S. Pat. No. 5,022,047. A preferred correlator for detecting a continuous phase modulated (CPM) spread spectrum signal is described in U.S. Pat. No. 5,659,574, previously incorporated herein by reference.

A variety of other types of correlators and/or matched filters are known in the art and would be suitable in various embodiments of the invention set forth herein. Selection of a suitable correlator depends on a variety of factors, including the type of modulation used to transmit the signal to be detected.

Figure 66:
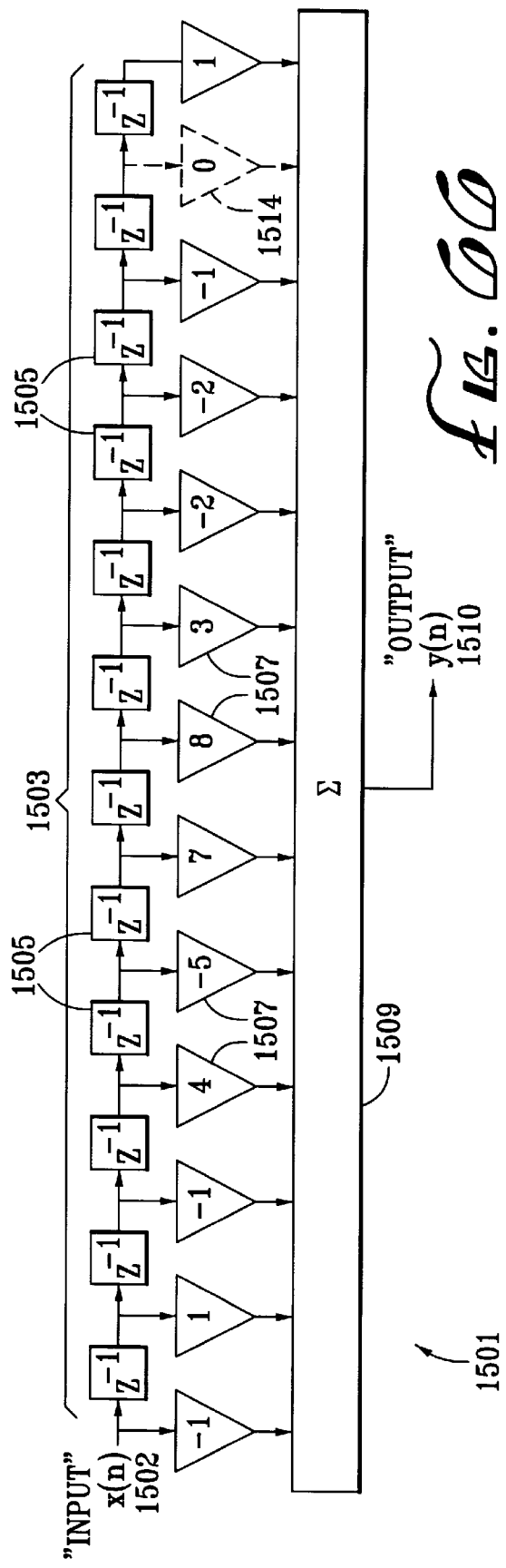
FIG. 66 is a block diagram of a mismatched filter with quantized coefficients.

FIG. 66 is a diagram of a representative mismatched filter 1501 configured to detect a particular length-4 code sequence of [1 1 −1 1]. The mismatched filter 1501 is essentially a variety of finite impulse response (FIR) filter, and has a plurality of delay stages 1505 connected in series, along which an input signal 1502 propagates. Each delay stage 1505 is preferably one chip interval in length (although non-integral chip spacings may also be used). Outputs from a plurality of delay stages 1505 are connected to a plurality of multipliers 1507 which multiply the delay stage output by the value of the coefficient associated therewith. Outputs from each of the multipliers 1507 are connected to a summer 1509, which sums its inputs to arrive at a correlation output signal 1510.

The construction of mismatched filters, including derivation of appropriate filter coefficients, is well known in the art of signal detection. Mismatched filters can be constructed for most code types, and are not limited to Barker codes. Appropriate coefficients for a mismatched filter to detect an aperiodic code may be determined by using, for example, a simplex method or gradient method. Optimizing computer programs are also available to assist in derivation of suitable filter coefficients. The mismatched filter may be constructed to operate in either an analog fashion (e.g., using a SAW device) or a digital fashion. Generally, the mismatched filter coefficients may have as values any real or complex number.

The coefficients for mismatched filters are, in some embodiments described herein, quantized to values from a limited set of coefficients. For N-bit quantization, $2^N$ possible quantized values are achievable. For example, using 2-bit quantization, the magnitude of each coefficient takes on one of $2^2$ (i.e., four) values. Using 3-bit quantization, the magnitude of each coefficient takes on one of $2^3$ (i.e., eight) values. The largest coefficient magnitude is given the largest quantization value; the rest of coefficient magnitudes are reduced in the same proportion as the largest (i.e., normalized) and rounded to the nearest quantized value. The sign of the coefficient is retained separately.

The FIG. 66 mismatched filter uses 13 stages to detect a length-4 code, and therefore is longer than a matched filter configured for the same code length. The coefficients of the FIG. 66 mismatched filter have been quantized using 3-bit quantization, so that each coefficient takes on one of the values between one and eight. A coefficient rounded to zero does not require a multiplier, as shown by the dotted lines 1514 indicating the absence of a multiplier in FIG. 66. Also, leading and trailing zero coefficients may be eliminated from the filter. Generally, the more non-zero coefficients in the mismatched filter 1501, the more complex the calculations necessary to arrive at a correlation result. Similarly, the longer the length of the mismatched filter, the more calculations are generally necessary to arrive at a correlation result; hence the more complex the overall filter design and operation. More complex calculations usually require longer processing times before a correlation result is achieved. The length selected for the mismatched filter and the number of non-zero coefficients will in part be a function of how much processing time is available to arrive at a correlation result.

Preferred preamble code structures will now be described. In one aspect of the present invention, the preamble code (such as may be tranmitted in user preamble code field 635 or base preamble code field 650 in FIG. 6A) preceding the message (or embedded within the message) is a concatenated preamble code formed by combining several other subcodes in a specified manner. In a first embodiment, a concatenated preamble code is formed by a kronecker product between two subcodes of widely varying lengths, such as a Barker-4 (B4) or Barker-5 (B5) code and a minimum peak sidelobe-28 (MPS28) code.

As used herein, the number following each code designation as a suffix corresponds to the number of elements in each code. A Barker-4 (or B4) code has four code elements; a Barker-5 (or B5) code has five code elements; and an MPS28 code has 28 code elements.

A minimum peak sidelobe (MPS) code is, within a family of codes of length N, the code having the smallest autocorrelation sidelobe peak(s), assuming biphase encoding and detection by a matched filter. MPS codes for each length-N family are generally found through exhaustive and repetitive computerized search processes which compare correlation responses for the codes in a length-N family. MPS codes are explained in more detail in, e.g., Marvin N. Cohen et al., "Minimum Peak Sidelobe Pulse Compression Codes," *IEEE 1990 International Radar Conference* (May 1990), pages 633–638, incorporated by reference as if set forth fully herein.

A Barker code is a binary code having the property that the peak side lobes of their autocorrelation functions are equal to 1/N in magnitude (where N is the code length), and the peak output signal voltage (i.e., the voltage of the maximum output) is normalized to 1. The sidelobe structure of a Barker code contains the minimum peak values theoretically possible. The only known B4 code sequences are "1101" and "1110" (plus their inverses, time-reciprocals, and inverse time-reciprocals). The only known B5 code sequence is "11101" (plus its inverse, time-reciprocal, and inverse time-reciprocal). No Barker codes greater than length-13 are known to exist, and no odd-length Barker codes greater than length-13 are believed to exist. The relatively scarcity of Barker codes and their limitation in length severely restricts the uses for which they are available.

In order to obtain longer length codes having similar properties to Barker codes, a code comprising a kronecker product of two shorter Barker codes may be used. For example, in the field of pulsed Doppler radar systems combined Barker codes have been used for pulse compression. According to this technique, a long code is generated from two Barker subcodes by phase encoding the first Barker subcode according to the elements of the second Barker subcode. The longer code consists of the first Barker subcode, each element of which is an inverted or non-inverted version of the second Barker subcode. For example, if a 4-bit Barker subcode is "1101" and a 5-bit Barker subcode is "11101", then a 5⊗4 combined code comprises the sequence "1101 1101 1101 0010 1101" (spaces have been added between the subcodes for clarity). A pair of matched filters detects the combined code at the receiver. The use of such a combined code in a pulsed radar system results in a transmitted pulse of a long duration and hence a high average power, thereby increasing the range resolution of the radar system over a system using only a single Barker code. Further details regarding high pulse compression ratio techniques are described in Marvin N. Cohen, "Pulse Compression in Pulsed Doppler Radar Systems," reprinted as Ch. 8 in Guy V. Morris, *Airborne Pulse Doppler Radar* (Artech House 1988), pages 123–145, hereby incorporated by reference as if set forth fully herein.

Figure 9:
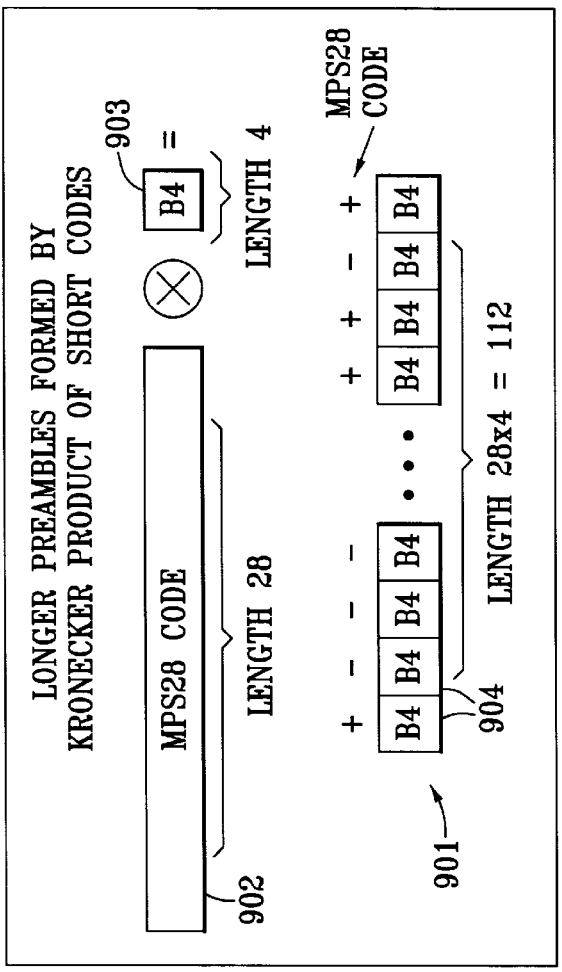
FIG. 9 is a diagram showing the construction of concatenated preamble codes.

FIG. 9 is a diagram showing a preferred method for construction of concatenated preamble codes. In FIG. 9, a length-112 concatenated preamble code 901 is formed by taking a kronecker product of a B4 code 903 (sequence "1000") and an MPS28 code 902. The concatenated preamble code 901 comprises a plurality of B4 code 904, each B4 code 904 being either an inverted version or non-inverted version of the B4 code 903 depending on the value of the MPS28 code element used to generate the B4 code 904. The resultant concatenated preamble code 901 is in one aspect an MPS28 code wherein each "chip" is a B4 code 904. A particular MPS28 code used in examples herein is given as follows:

MPS28=1000111100010001000100101101

This MPS28 code has peak autocorrelation sidelobes of −22.9 dB.

Figure 10:
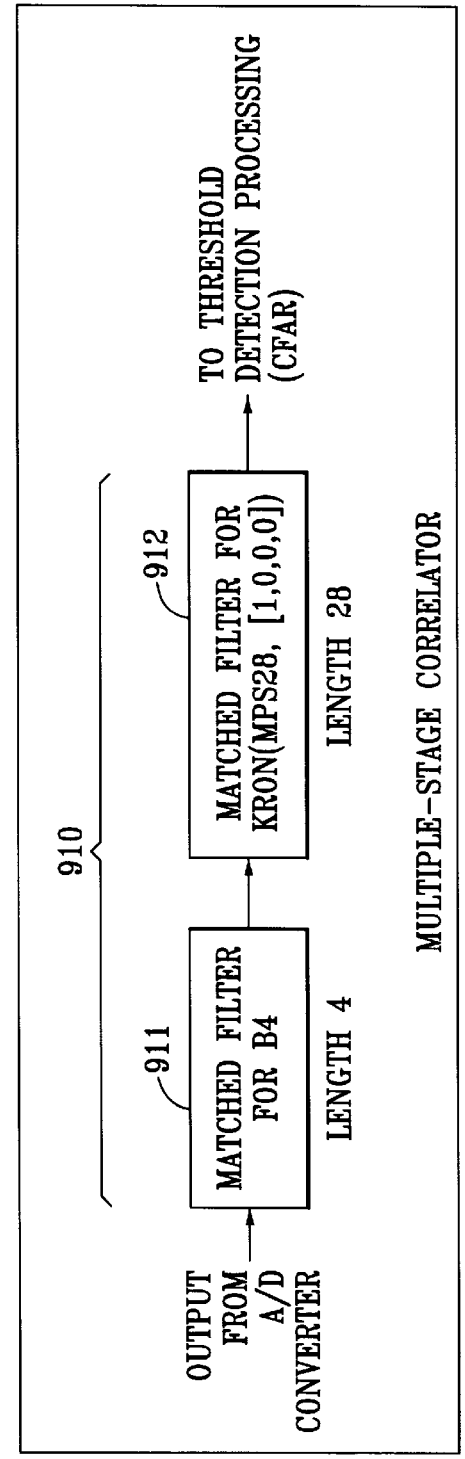
FIG. 10 is a block diagram of a two-stage correlator using two matched filters for detecting a concatenated preamble code.

At the receiver a two-stage correlator is preferably used to detect the concatenated preamble code 901 through correlation processing. A block diagram of a two-stage correlator is shown in FIG. 10. In FIG. 10, a two-stage correlator 910 preferably comprises a series of two correlation filters, such as a four tap B4 matched filter 911 followed by a 28 non-zero tap MPS28⊗[1,0,0,0] matched filter 912. In terms of processing complexity, the FIG. 10 two-stage correlator is roughly the equivalent of a 32-tap matched filter, except with a higher memory requirement.

Each matched filter 911, 912 generally operates according to the principles of the matched filter 1721 shown in FIG. 67 (or, alternatively, CPM correlator 802 shown in FIG. 8). Other embodiments are later described making use of mismatched filters in place of one or both matched filters. As used herein, the "inner" code is referred to as the first stage code (i.e., associated with the first stage of the two-stage correlator), and the "outer" code is referred to as the second stage code (i.e., associated with the second stage of the two-stage correlator).

Figure 11A:
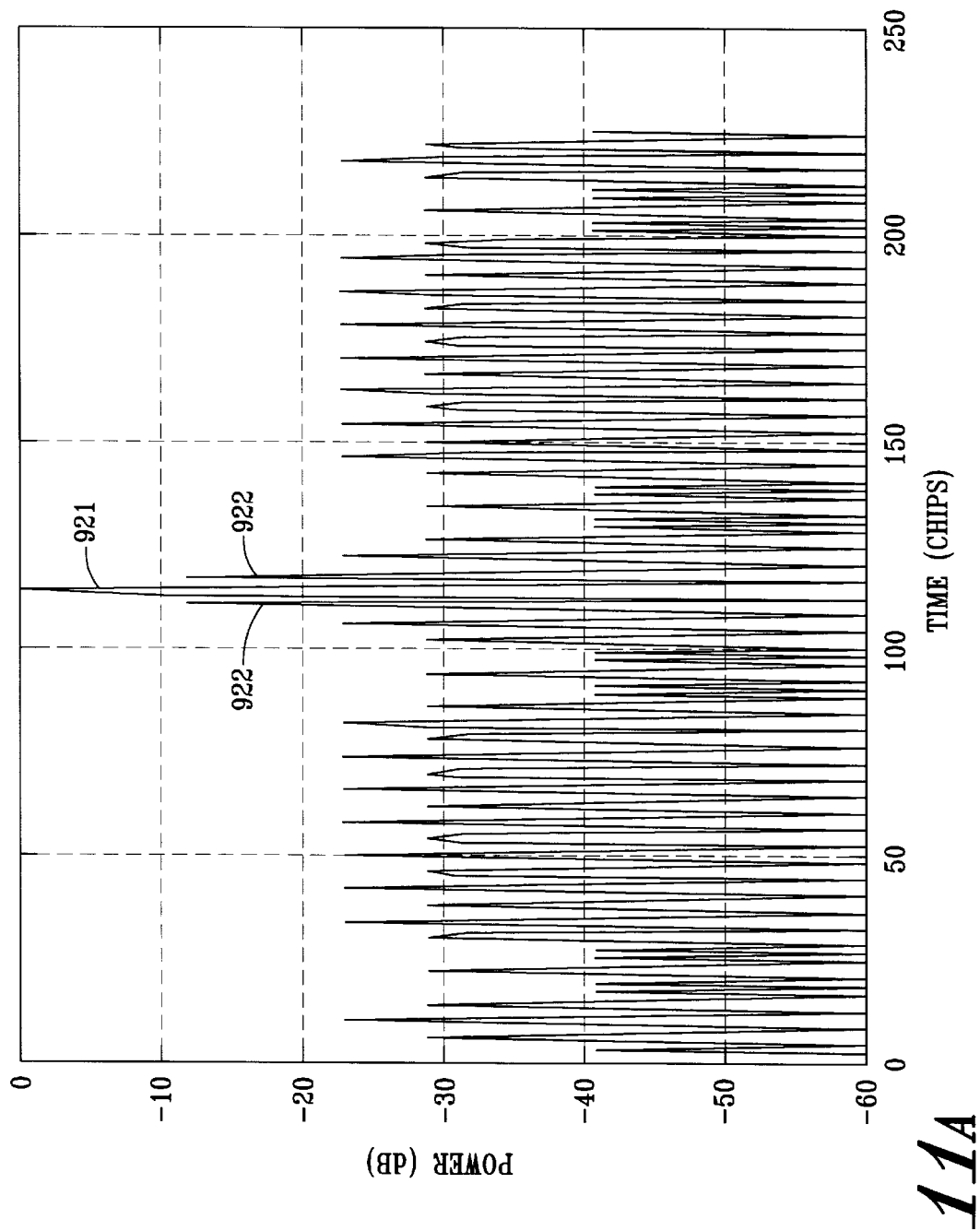
FIGS. 11A and 11B are graphs of responses of a two-stage matched filter correlator to a concatenated preamble code derived from a Barker code and a minimum peak sidelobe code.
Figure 11B:
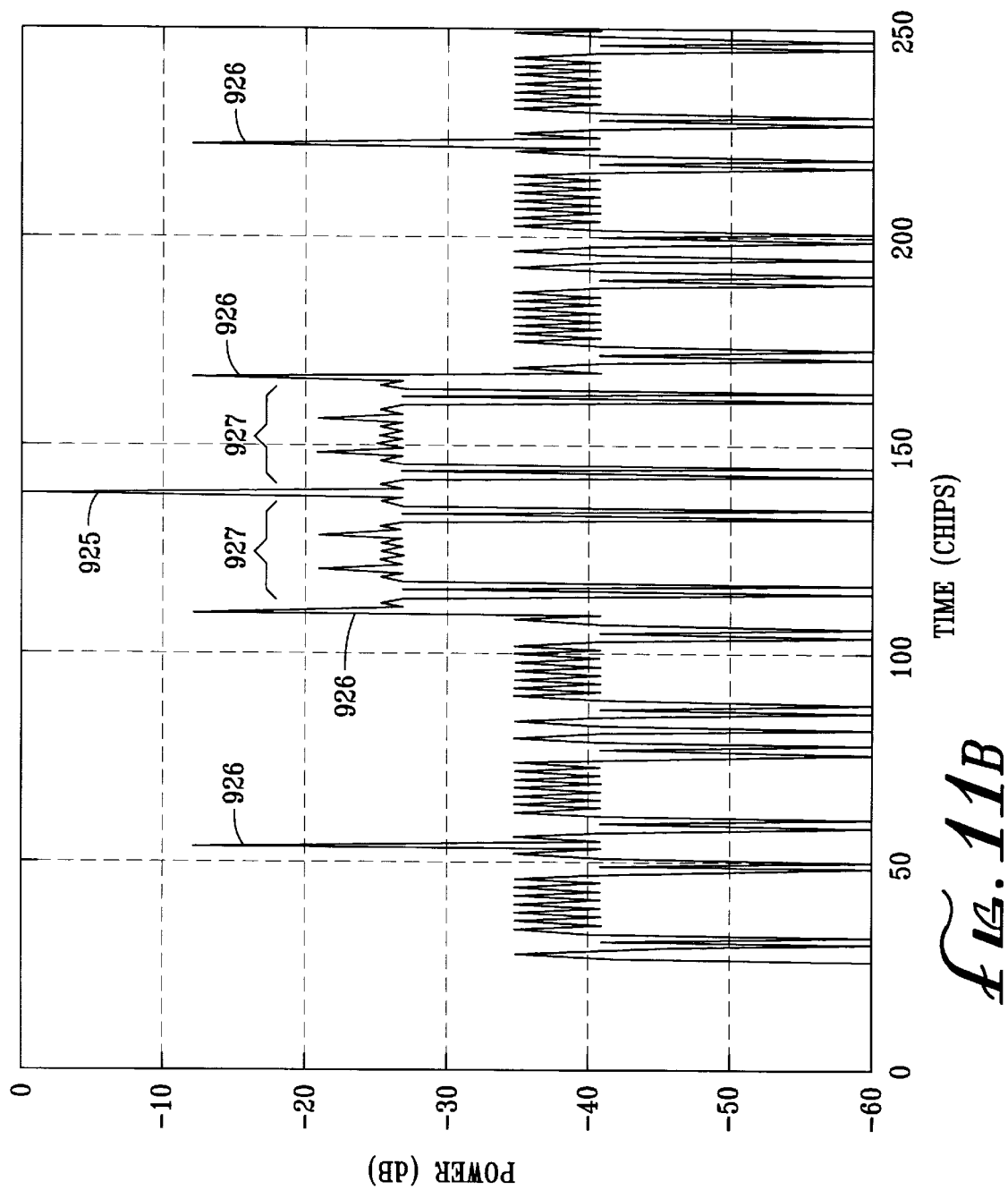

FIG. 11A is a graph showing a composite filter response of matched filters 911, 912 to an MPS28⊗B4 length-112 preamble, such as the concatenated preamble code 901 of FIG. 9. The FIG. 11A graph shows a correlation peak 921 after 112 chips, and two −12 dB spikes 922 resulting from the B4 code 903. FIG. 11B is a graph showing a composite filter response where the concatenation is reversed—i.e., the response to a B4⊗MPS28 length-112 preamble. The FIG. 11B graph shows a correlation peak 921 after 112 chips, surrounded by two sidelobes 927 characteristic of an MPS28 code 902. The FIG. 11B graph also shows four −12 dB spikes 926 resulting from the B4 code 903.

Sidelobes 927 in FIGS. 11A and 11B are a composite of the sidelobes associated with the constituent B4 and MPS28 subcodes, and spikes 922 and 926 are the result of the autocorrelation characteristics of the B4 code, which tend to cause auto-correlation spikes of 20·log(¼)=−12 dB. To reduce the level of spikes in the correlation output, the two constituent subcodes are preferably of approximately equal length; for example, the same code may be concatenated with itself.

Figure 12:
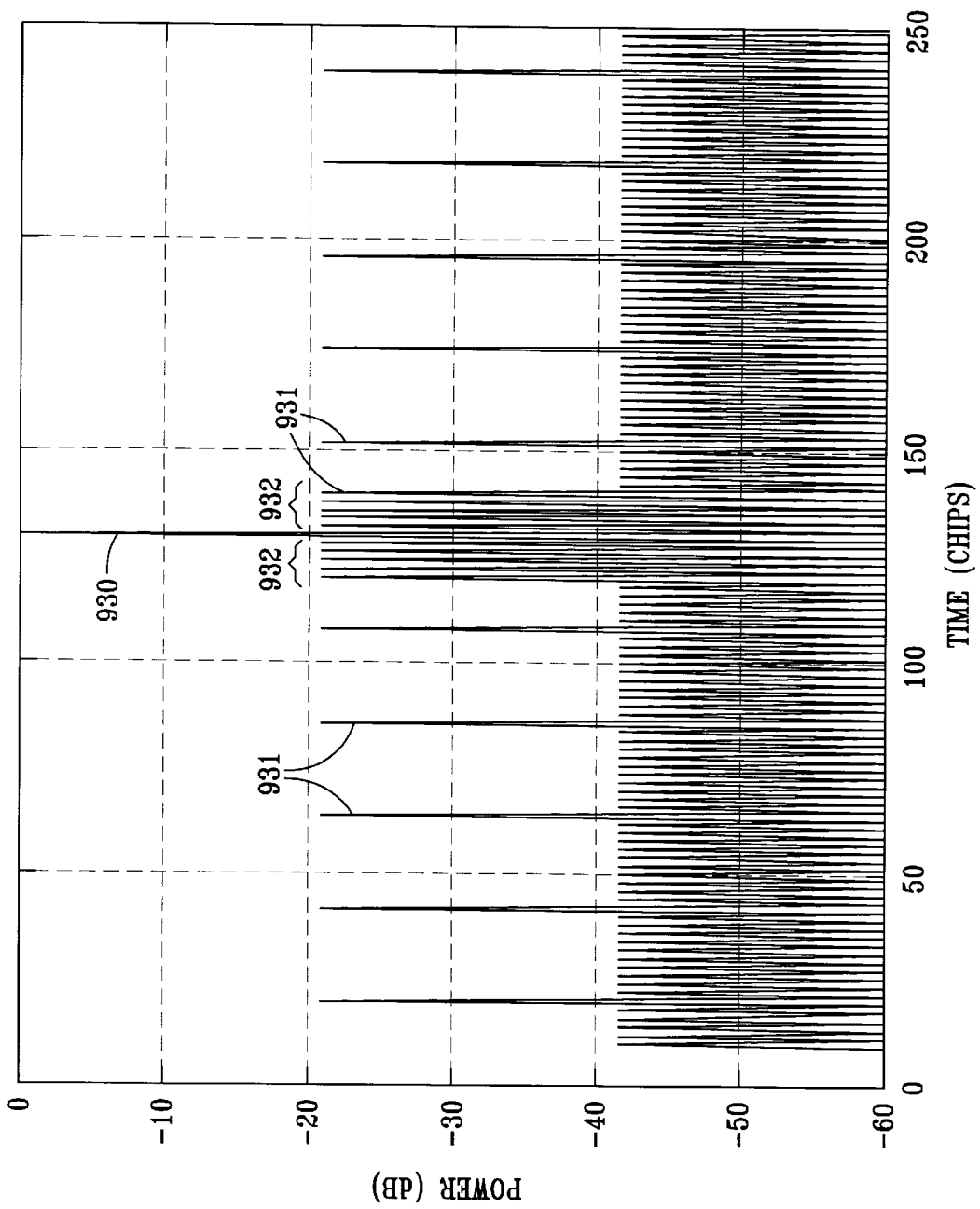
FIG. 12 is a graph depicting a two-stage matched filter correlator output for a Barker-11 code concatenated with itself.

As an example, FIG. 12 is a graph depicting the composite matched filter output of a Barker-11 code concatenated with itself. The Barker-11 code comprises the sequence [01001000111]. The FIG. 12 graph shows a correlation peak 930 surrounded by sidelobes 932, and further shows autocorrelation spikes 931 of 20·log(1/11)=−21 dB in size, substantially smaller than the spikes 922 and 926 of FIGS. 11A and 11B.

To generate a family of concatenated preamble codes, a plurality of short codes with favorable aperiodic autocorrelation responses and low aperiodic cross-correlation may be used.

As a further example using MPS32 codes, two length-128 concatenated preamble codes may be generated from a concatenation of a B4 code separately with each of two MPS32 codes exhibiting favorable aperiodic cross-correlation properties. Each concatenated preamble code comprises four of the same MPS32 codes concatenated together according to the formula MPS32⊗B4, for a total length of 128 elements in each preamble code. FIGS. 13A–13D are graphs illustrating the autocorrelation and cross-correlation properties of two concatenated preamble codes constructed from MPS32 codes. FIG. 13A shows an autocorrelation response of a correlator configured for the first preamble code (Code1) in response to Code1; FIG. 13C shows the cross-correlation response of the same correlator to Code2; FIG. 13B shows a cross-correlation response of the correlator configured for the second preamble code (Code2) to Code1; and FIG. 13D shows the autocorrelation response of the same correlator to Code2.

As shown in FIGS. 13B and 13C, peak cross-correlation responses between Code1 and Code2 are around −8.5 dB, determined almost solely by the cross-correlation of the length 32 codes (i.e., the MPS32 codes), as the Barker-4 constituent codes are the same in both preamble codes Code1 and Code2. In FIGS. 13A and 13D are shown the autocorrelation responses of Code1 and Code2, respectively. In the graph of FIG. 13A appears a correlation peak 940 surrounded by two autocorrelation peaks 941 of about −12 dB. Likewise, in the graph of FIG. 13D appears a correlation peak 945 surrounded by two autocorrelation peaks 946 of about −12 dB. The autocorrelation peaks 941 and 946 are generally caused by the Barker-4 code which is used to generate Code1 and Code2. FIGS. 14A–D show close-up views of the correlation and autocorrelation responses shown in FIGS. 13A–D, over about a ±10 chip range around the correlation peaks 940 and 945. Each closeup graph corresponds to the larger scale graph having the same subpart letter (i.e., FIG. 14A corresponds to FIG. 13A, etc.).

To reduce the size of the autocorrelation peaks 941 and 946 shown in FIGS. 13A, 13D, 14A and 14D, a concatenated preamble code may be generated using two subcodes of the same length. Such concatenated preamble codes may be referred to as "square" codes. For example, a "square" concatenated preamble code may be generated from the product of two length 11 codes. There are 60 code sequences of length 11 having a peak aperiodic autocorrelation response of less than 20·log(2/11)=−15 dB. FIGS. 15A–D show autocorrelation and cross-correlation responses for a selected pair of these code sequences. The first selected code sequence (designated "p11a") is a Barker-11 code having a bit sequence [01001000111]. The second selected code sequence (designated "p11b") is one of the 56 length-11 codes with peak autocorrelation side lobes of −15 dB, and having a bit sequence [00000110010]. FIG. 15A is a graph of an autocorrelation response for code p11a, showing a correlation peak 950 and autocorrelation peaks 951 of about −21 dB. FIG. 15B is a graph of a cross-correlation response of a matched filter configured for code p11b to code p11a. FIG. 15C is a graph of a cross-correlation response of a matched filter configured for code p11a to code p11b. FIG. 15D is a graph of an autocorrelation response for code pub, showing a correlation peak 955 and autocorrelation peaks 956 of about −15 dB.

Concatenating the codes p11a and p11b, two length 121 concatenated preamble codes $C_{A1}$ and $C_{B1}$ can be created from the following relations:

$$C_{AI} = p11a \otimes p11a$$
$$C_{BI} = p11a \otimes p11b$$

The autocorrelation and cross-correlation results for these concatenated preamble codes are shown in FIGS. 16A–D. FIG. 16A is a graph of an autocorrelation response for concatenated preamble code $C_{A1}$, showing a correlation peak 960 and autocorrelation peaks 961 of about −21 dB in sidelobe regions 962. FIG. 16B is a graph of a cross-correlation response to concatenated preamble code $C_{A1}$ of a matched filter configured for concatenated preamble code $C_{B1}$, showing a maximum cross-correlation value of about −8.8 dB. FIG. 16C is a graph of a cross-correlation response to concatenated preamble code $C_{B1}$ of a matched filter configured for concatenated preamble code $C_{A1}$, also showing a maximum cross-correlation value of about −8.8 dB. FIG. 16D is a graph of an autocorrelation response for concatenated preamble code $C_{B1}$, showing a correlation peak 965 surrounded by sidelobe regions 967, and including autocorrelation peaks 966 of about −15 dB as well as autocorrelation peaks 968 of about −12 dB. For concatenated preamble codes $C_{A1}$ and $C_{B1}$, autocorrelation peak values are generally determined by auto-correlation characteristics of the constituent subcodes, while cross-correlation peak values are generally equal to the cross-correlation peak values between the subcodes themselves (i.e., the subcode(s) of concatenated preamble code $C_{A1}$ correlated against the subcode(s) of concatenated preamble code $C_{B1}$).

Alternatively, two other "square" concatenated preamble codes can be generated by using the following relationships:

$$C_{A2} = p11a \otimes p11b$$

$$C_{B2} = p11b \otimes p11a$$

Figure 17B:
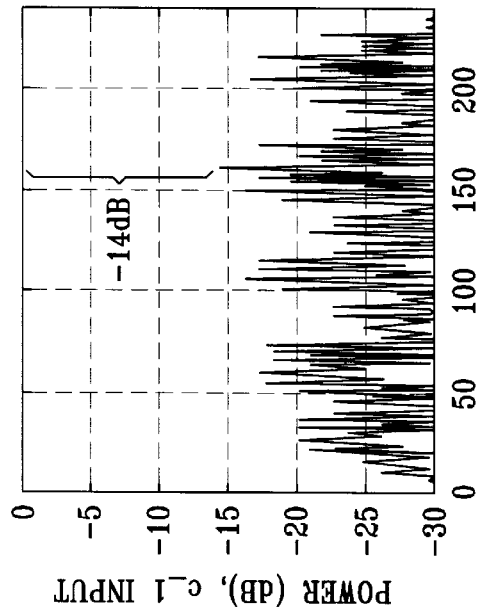
FIGS. 17A–D are graphs illustrating correlation responses to two other concatenated preamble codes derived from the length-11 Barker codes used to generate the graphs of FIG. 15A–D.
Figure 17D:
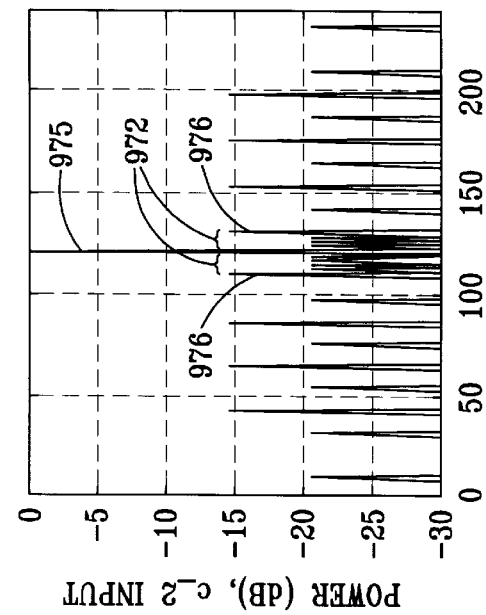
Figure 17A:
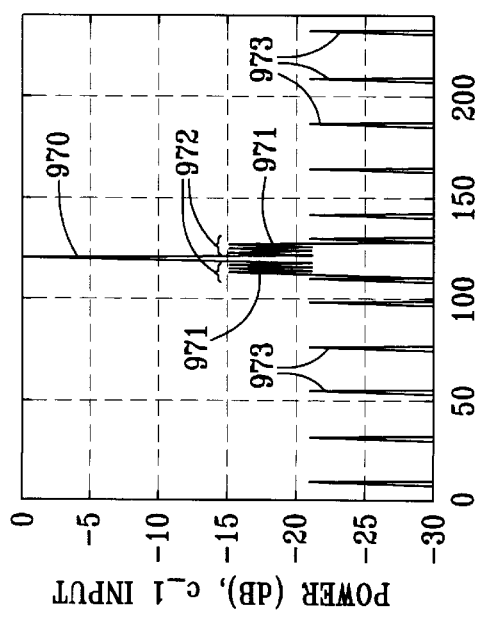
Figure 17C:
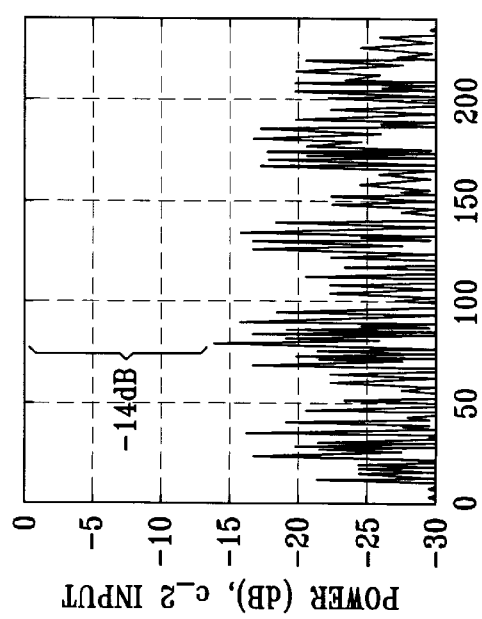

FIG. 17A is a graph of an autocorrelation response for concatenated preamble code $C_{A2}$, showing a correlation peak 970 surrounded by sidelobe regions 972, and including autocorrelation peaks 971 of about −15 dB in sidelobe regions 972 and autocorrelation peaks 973 outside of sidelobe regions 972. FIG. 16B is a graph of a cross-correlation response to concatenated preamble code $C_{A2}$ of a matched filter configured for concatenated preamble code $C_{B2}$, showing a maximum cross-correlation value of about −14 dB. FIG. 16C is a graph of a cross-correlation response to concatenated preamble code $C_{B2}$ of a matched filter configured for concatenated preamble code $C_{A2}$ also showing a maximum cross-correlation value of about −14 dB. FIG. 16D is a graph of an autocorrelation response for code $C_{B2}$, showing a correlation peak 975 surrounded by sidelobe regions 977, and including autocorrelation peaks 966 of about −15 dB as well as autocorrelation peaks 968 of about −22 dB.

As with concatenated preamble codes $C_{A1}$ and $C_{B1}$, auto-correlation peak values for concatenated preamble codes $C_{A2}$ and $C_{B2}$ are generally determined by the individual constituent subcodes p11a, p11b of concatenated preamble codes $C_{A1}$ and $C_{B1}$, while cross-correlation peak values are equal to the cross-correlation values obtained by cross-correlating the subcodes p11a, p11b of concatenated preamble code $C_{A1}$ with the subcodes p11b, p11a of concatenated preamble code $C_{B1}$. The auto-correlation and cross-correlation results for the concatenated preamble codes $C_{A2}$ and $C_{B2}$, as shown in FIGS. 17A–D, improve considerably over concatenated preamble codes $C_{A1}$ and $C_{B1}$ since both the first stage subcodes (p11a and p11b, respectively) and the second stage subcodes (p11b and p11a, respectively) are different for concatenated preamble codes $C_{A2}$ and $C_{B2}$. In contrast, only the second stage subcodes differ between concatenated preamble codes $C_{A1}$ and $C_{B1}$ (the first stage subcode, p11a, being the same for each of concatenated preamble codes $C_{A1}$ and $C_{B1}$). Because both the first stage subcodes and the second stage subcodes differ, cross-correlation responses for concatenated preamble codes $C_{A2}$ and $C_{B2}$ are, in effect, doubly isolated, while the auto-correlation responses for concatenated preamble codes $C_{A1}$ and $C_{B2}$ show the expected sidelobe structures (i.e., sidelobe regions 972 and 977, which are related to autocorrelation of the individual subcodes p11a, p11b).

A concatenated preamble code preferably comprises a "square" code—that is, a concatenated preamble code generated by taking the product of two smaller base codes (or subcodes) of equal length (e.g., length-11). The two base codes are preferably selected for minimal peak aperiodic autocorrelation response properties. Two "square" concatenated preamble codes can be constructed using the same base codes, the first square concatenated preamble code generated by the kronecker product of the first base code and the second base code, and the second square concatenated preamble code generated by the kronecker product of the second base code and the first base code.

In a preferred embodiment, at least one of the two base codes used in generating a square concatenated preamble code is a Barker code (such as, for example, a Barker-11 code). Given a known Barker code, other Barker codes can be created therefrom by generating the time reciprocals and the inverses of the known Barker code. For example, with code p11a (a Barker code) =[01001000111] referred to previously, other Barker codes generated from code p11a include [11100010010], [10110111000], and [00011101101].

A preferred length for a concatenated preamble code depends in part upon the system requirements such as receiver complexity, interference rejection requirements, and number of preamble codes and other codes being utilized in the same region and frequency band. In relation to the preferred cellular architecture according to FIG. 3, for example, a 7-cell repeating pattern of spread spectrum code groups C1, . . . ,C7 is defined. Each spread spectrum code group C1, . . . ,C7 preferably includes a unique preamble code. The preamble codes are preferably selected to be approximately 128 elements in length. In a preferred embodiment, each preamble code preferably comprises a square concatenated preamble code derived from the kronecker product of two equal length base codes or subcodes, such as two length-11 base codes.

Alternatively, concatenated preamble codes of length near 128 elements can be constructed from subcodes of different lengths. If one of the base codes is shortened, the other generally must be lengthened to maintain the same preamble code length, but doing so tends to increase auto-correlation sidelobes. Additionally, processing load (measured in terms of "non-zero" taps in the matched filter) is minimized when constituent codes are of about equal length, and thus processing load increases the greater the difference in length between the subcodes.

In order to allow more flexibility in base code selection without having an unacceptable increase in sidelobe growth, mismatched filters may be used to process the concatenated preamble codes, although with some (usually very small) loss in processing gain against noise. A mismatched filter is shown in FIG. 66 and described previously herein. In general, to obtain acceptable performance, the mismatched filter is preferably two to four times as long as a matched filter would be to detect the same length code. The longer the mismatched filter, the more sidelobe reduction is generally achievable. The increased length, however, of the mismatched filter over a matched filter increases group delay through the filter; accordingly, the mismatched filter is preferably used for the shorter of the two base codes (which is preferably selected as the first of the two base codes).

FIG. 18 is a block diagram of a multi-stage correlator 980 comprising two processing stages, a mismatched filter 981 stage followed by a matched filter 982 stage. The mismatched filter 981 forming the first processing stage is configured for a Barker-4 code and preferably has about 17 taps (but no fewer than four taps). The matched filters 982 forming the second processing stage in one exemplary embodiment have 32 taps and are configured for an MPS32 code.

In a preferred embodiment, mismatched filter 981 has the same configuration for each concatenated preamble code to be detected, while matched filter 982 differs for each concatenated preamble code to be detected. For example, with regard to the FIG. 3 cellular architecture, mismatched filter 981 preferably has the same configuration for each of the seven concatenated preamble codes used in the seven code groups C1, . . . ,C7 of the FIG. 3 cellular communication system, whereas the matched filter 982 stage differs for each of the seven concatenated preamble codes. Different concatenated preamble codes can be recognized merely by switching the characteristics of the second stage filter 982 (e.g., by programmable switches on a single matched filter, or by physically separate matched filters 982 in the same receiver). By making the first stage mismatched filter 981 fixed for all seven concatenated preamble codes, the mismatched filter 981 need not be programmable yet will still allow detection of different concatenated preamble codes. This allows highly optimized hardware constructions to be used for the mismatched filter 981.

Figure 19A:
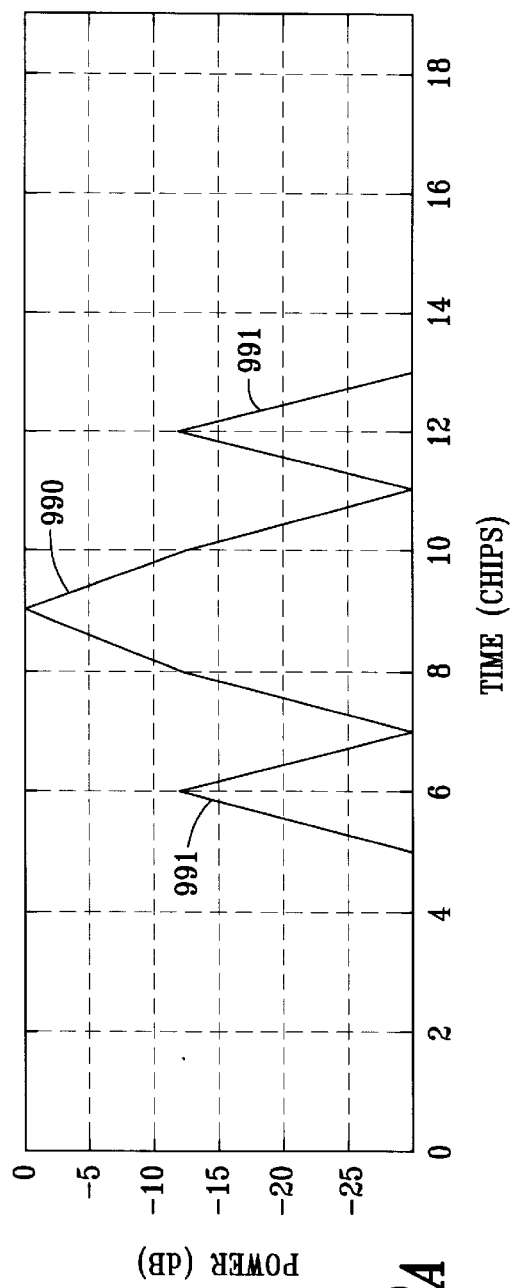
FIGS. 19A and 19B are graphs comparing matched filter and mismatched filter responses to a Barker-4 code.
Figure 19B:
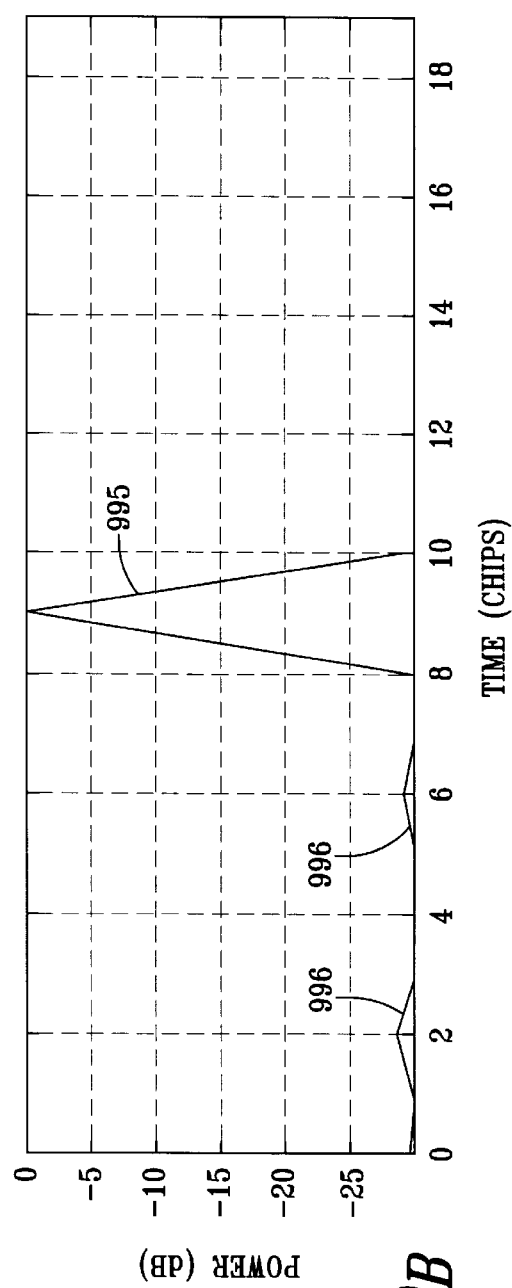

FIGS. 19A and 19B are graphs comparing single-stage matched filter and mismatched filter responses to a Barker-4 code. FIG. 19A shows a matched filter response to a Barker-4 code, and depicts a correlation peak 990 surrounded by two autocorrelation peaks 991 of about −12 dB. The FIG. 19A correlation peak 990 and autocorrelation peaks 991 have, for the purposes of FIG. 19A, been shifted to the right (by "padding" the filter with leading zeroes) for easier comparison with FIG. 19B. FIG. 19B shows a mismatched filter response to the same Barker-4 code, and depicts a correlation peak 995 as well as autocorrelation peaks 996 of about −28 dB. The mismatched filter therefore has a 16 dB improvement over the matched filter in its autocorrelation response. The mismatched filter exhibits a slight loss in processing gain against noise (i.e., 1.25 dB in the FIG. 19B example) due to the increased admittance of noise. However, the correlation peak 995 using the mismatched filter is narrower than the correlation peak 990 using the matched filter, which may result in improved channel sounding accuracy where a concatenated preamble code constructed from a base code (such as a Barker-4 code) performs a channel sounding function.

Where quantization is used for the filter coefficients in the mismatched filter (such as shown in the exemplary mismatched filter 1501 in FIG. 66, and described previously herein), a change in processing gain may result. For example, a decrease in processing gain of about 1.321 dB relative to the matched filter case may result for the FIG. 18 two-stage correlator using a mismatched filter with quantized filter coefficients, which is slightly worse than the 1.25 dB loss associated with the mismatched filter using non-quantized filter coefficients.

Figure 20A:
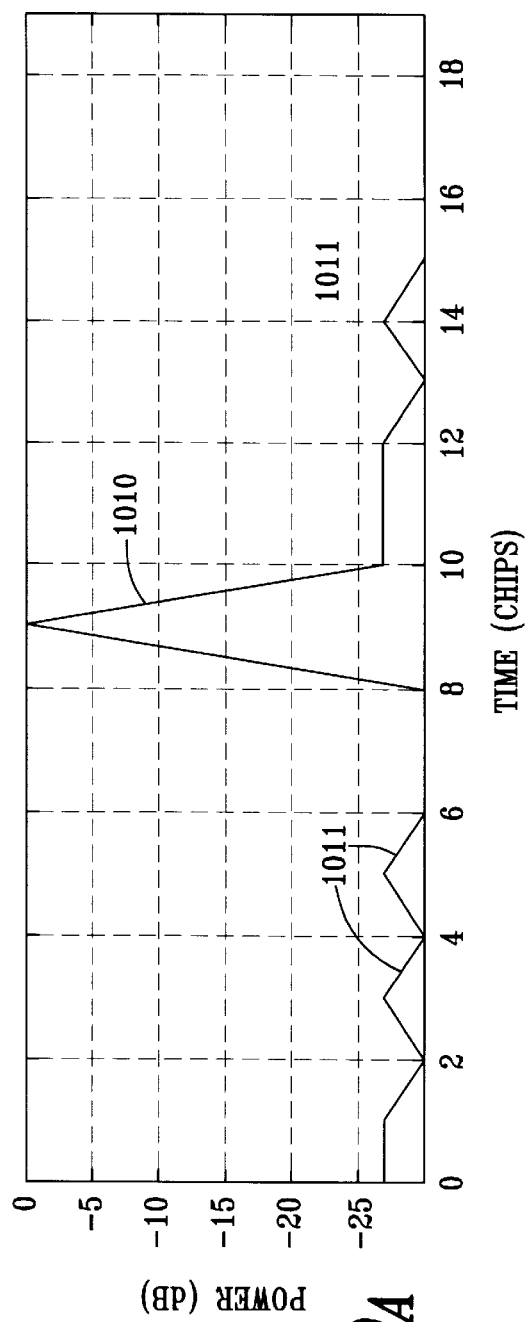
FIGS. 20A and 20B are graphs showing matched filter response where quantizing is employed, for different levels of quantizing.
Figure 20B:
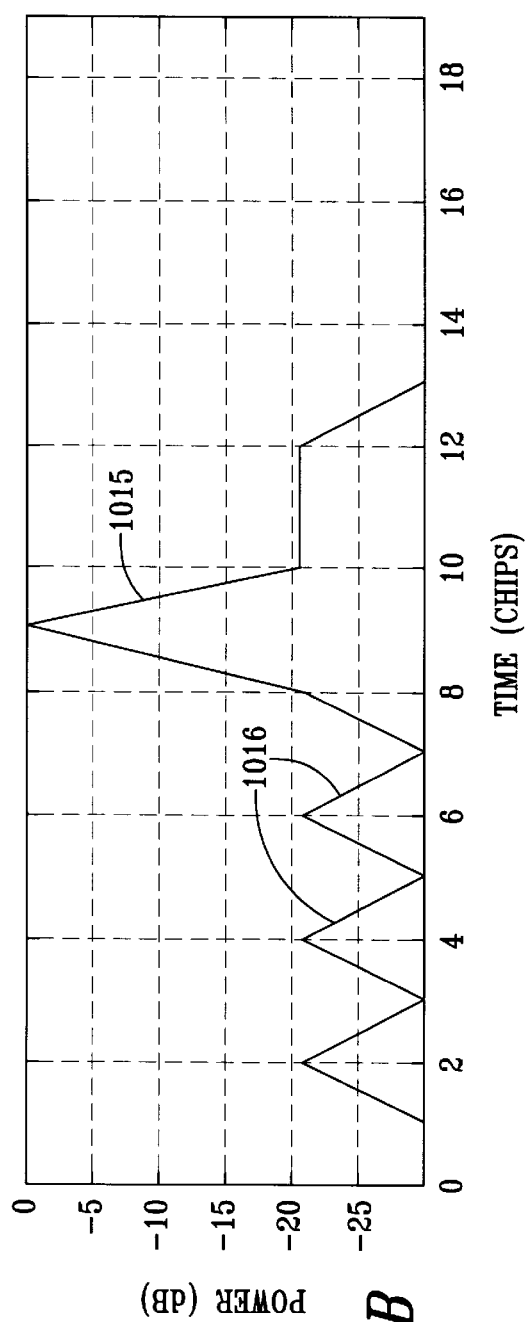
Figure 25A:
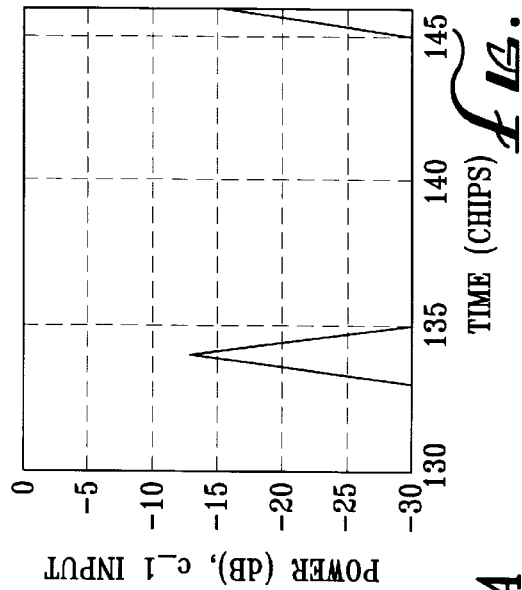
Figure 25B:
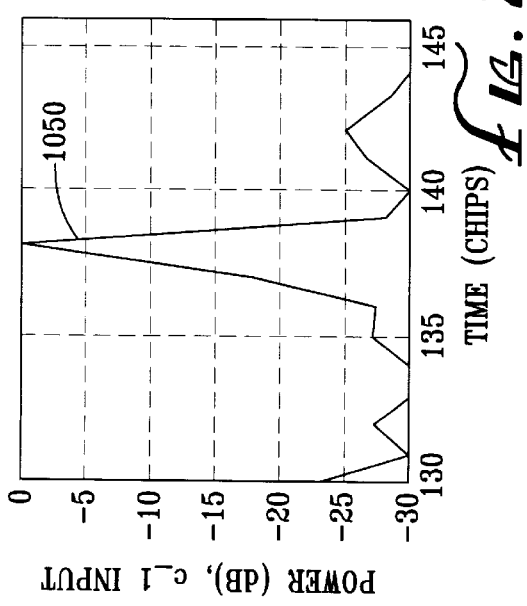
Figure 25C:
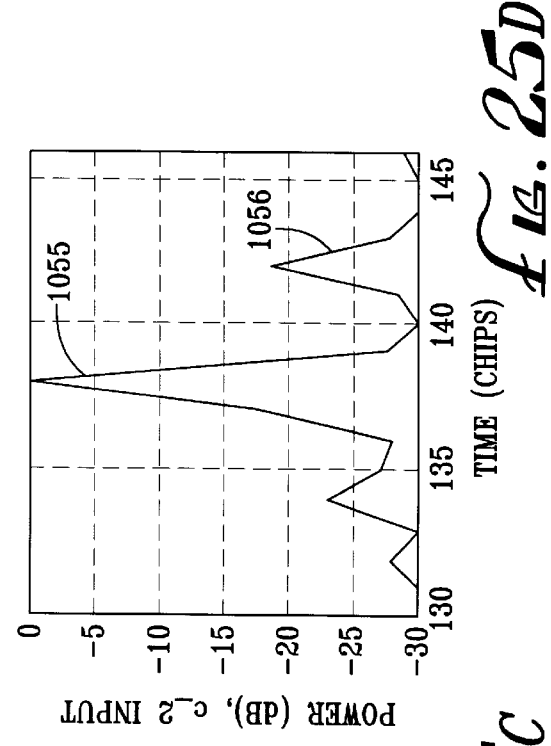
Figure 25D:
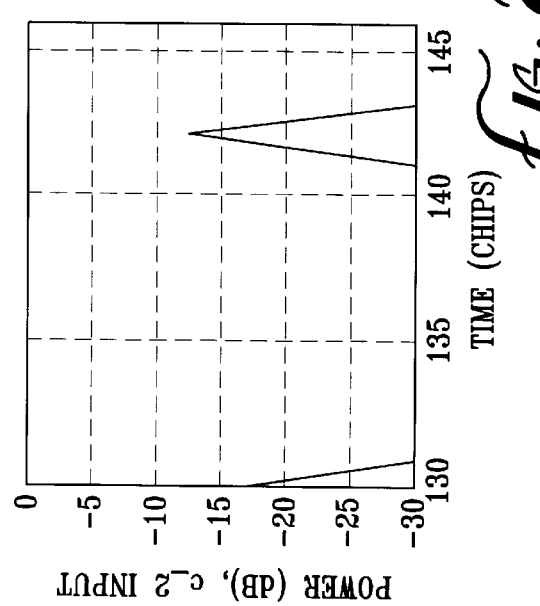

FIGS. 20A and 20B are graphs showing filter response where quantized coefficients is employed, for different levels of quantization. FIG. 20A depicts a situation where 3-bit quantization is used. For the graph of FIG. 20A, a length-17 mismatched filter is used wherein eleven of the seventeen coefficients are non-zero. The particular coefficients of the mismatched filter used to obtain the results of FIG. 20A are Fy=[−1 0 1 −3 2 3 −8 7 4 3 1 1]. The quantized coefficients are all between 0 and 8 due to the three-bit quantization. The FIG. 20A graph shows a correlation peak 1010, and further shows autocorrelation peaks 1011 of almost −27 dB, slightly increased from the −28 dB peaks of FIG. 19B. The sidelobe structure of the FIG. 20A graph is noticeably more asymmetric than the matched filter response shown in FIG. 19A.

FIG. 20B depicts a situation where 2-bit quantization is used. For the graph of FIG. 20B, a length-17 mismatched filter is used, wherein eight of the seventeen coefficients are non-zero. Specific filter coefficients for the filter used to generate the FIG. 20B graph are fy=[1 −1 1 1 −4 4 2 1]. The FIG. 20B graph shows a correlation peak 1015, and further shows autocorrelation peaks 1016 of about −21 dB. Using 2-bit rather than 3-bit quantization, only 1.3 dB of processing gain is lost (as opposed to 1.321 dB for the 3-bit case) while still holding sidelobes to no more than −21 dB. The sidelobe structure of the FIG. 20B graph is, like the FIG. 20A graph, noticeably more asymmetric than that of the matched filter response of FIG. 19A.

A mismatched filter (such as those used in generating the graphs of FIGS. 20A or 20B) can be used as the first stage filter 981 in the FIG. 18 multiple stage correlator 980. It should be noted that while a first stage filter 981 embodied as a mismatched filter has a preferred length of 17 chip stages, the mismatched filter may have more or fewer chip stages (but not less than that of the base code to be detected) depending on the system requirements and the length of the concatenated preamble code (or its consituent subcodes). The second stage filter 982 may also be embodied as a mismatched filter if desired, so long as any additional group delay caused by the increase in filter length of the second stage filter 982 is acceptable.

Performance of the FIG. 18 multiple stage correlator 980, wherein the first stage filter 981 is a mismatched filter and the second stage filter 982 is a matched filter, may be evaluated using concatenated preamble codes Code1 and Code2, discussed earlier with respect to FIG. 13A, as a preamble code set. A multi-stage correlator 980 configured to detect Code1 comprises a first stage mismatched filter 981 configured to detect the Barker-4 code used to generate Code1 and a second stage matched filter 982 configured to detect the MPS28 code used to generate Code1. A multi-stage correlator 980 configured to detect Code2 comprises a first stage mismatched filter 981 configured to detect the Barker-4 code used to generate Code2 and a second stage matched filter 982 configured to detect the MPS28 code used to generate Code2.

The cross-correlation and autocorrelation results are depicted in FIGS. 21A–D and 22A–D. FIG. 21A is a graph of an autocorrelation response for Code1 using a first stage mismatched filter 981 followed by a matched filter 982 configured for Code1. The FIG. 21A graph shows a correlation peak 1020 as well as a number of smaller autocorrelation peaks 1021 of about −21 dB. FIG. 21C is a graph of a cross-correlation response to Code2 of the same mismatched filter 981 and matched filter 982 combination, showing a maximum cross-correlation value of a little over −8 dB. FIG. 21D is a graph of an autocorrelation response to Code2 using the same first stage mismatched filter 981 followed by a matched filter 982 configured for Code2. The FIG. 21D graph shows a correlation peak 1025 as well as smaller autocorrelation peaks 1026 of about −21 dB. FIG. 21B is a graph of a cross-correlation response to Code1 of the same mismatched filter 981 and matched filter 982 combination, showing a maximum cross-correlation value of a little over −8 dB.

FIGS. 22A–D show close-up views of the correlation and autocorrelation responses shown in FIGS. 21A–D, over about a ±10 chip range around the correlation peaks 1020 and 1025. Each close-up graph corresponds to the larger scale graph having the same subpart letter (i.e., FIG. 22A corresponds to FIG. 21A, etc.). Comparing the responses shown in FIGS. 21A–D/22A–D where mismatched filters were used with the responses shown in FIGS. 13A–D/14A–D where matched filters were used, it may be observed that the −12 dB autocorrelation peaks 941, 946 in FIGS. 13A/14A and 13D/14D disappear in FIGS. 21A/22A and 21D/22D, and that the tallest autocorrelation peaks in the case of using mismatched filters are instead −21 dB, a 9 dB improvement over the case of using matched filters.

Alternative filter designs are possible having losses in processing gain of less than 1.3 dB, if such a level of loss is considered to be too large for the particular system requirements. However, if processing gain losses are reduced, then the peak sidelobes may be as suppressed. FIGS. 23A–D are graphs showing the responses to a base code sequence "1101" of various matched and mismatched filters having different filter structures. For the graph of FIG. 23A, a matched filter of length-4 having four non-zero coefficients generates the response shown. A correlation peak 1030 is produced after the matched filter receives the four chips, but has been shifted to the right in the graph merely so as to line it up with the correlation peak 1035 appearing in FIG. 23B. In the FIG. 23A graph, the correlation peak 1030 is shown surrounded by auto-correlation peaks 1031 of about −12 dB.

For the graph of FIG. 23B, a particular mismatched filter of length-21 having 21 non-zero coefficients generates the response shown, optimized to have a correlation peak in the middle of the length-21 mismatched filter. No quantization of the filter coefficients is used in this example. In the FIG. 23B graph, a correlation peak 1035 is shown surrounded by autocorrelation peaks 1036 of almost −24 dB, a substantial improvement over the −12 dB sidelobe peaks 1031 of FIG. 23A. However, some loss of processing gain occurs. Specifically, for the FIG. 23B filter there is a decrease in processing gain of about 0.8617 dB relative to the FIG. 23A filter.

A "cost" parameter may be derived to reflect the relative weight attributed to two different and, in a sense, conflicting preamble code design goals: (1) the reduction of sidelobes, and (2) the appearance of the mainlobe without loss in processing gain. Where computer optimization is used, an optimization parameter (designated "POpT") may be defined as follows:

$$P_{OPT} = RSS_{ERROR} + COST \cdot LOSS \qquad (23.1)$$

where the term $RSS_{ERROR}$ in Equation 23.1 is given by the summation over each chip of the difference between the desired response ("DR") and the actual response ("AR") (i.e., $RSS_{ERROR} = \Sigma(DR-AR)^2$, summed over the filter length), and the term LOSS is given by the ratio of the matched filter processing gain ("$MF_{PG}$") to the mismatched filter processing gain ("$MMF_{PG}$") (i.e., LOSS = $MF_{PG}/MMF_{PG}$). Generally, as sidelobes rise, $RSS_{ERROR}$ also rises, and as signal-to-noise ratio gets worse, LOSS increases. The principle objective is to minimize the optimization parameter $P_{OPT}$ by simultaneously minimizing RSSERROR and LOSS. This objective is facilitated in Equation 23.1 by use of the term COST, which is a design parameter reflecting the relative importance of sidelobe minimization with respect to processing gain loss. A preferred optimization procedure involves selecting different values for COST and observing the results until a suitable balance of low cross-correlation sidelobes and relatively high processing gain are achieved. If no value of COST provides suitable results for a given filter length, then a longer mismatched filter length may be used. Conversely, if a COST value results in a mismatched filter having better than needed performance, a shorter mismatched filter length may be tried. For the particular example of the FIGS. 23B–D filters, the parameter COST was by an iterative design process selected to be 3.162 in order to achieve the particular results shown.

For the graph of FIG. 23C, a particular mismatched filter of length-21 having eight non-zero coefficients generates the response shown to the same base code ("1101") used to generate the graphs of FIGS. 23A and 23B. Two-bit quantization of the filter coefficients is used in this example. In the FIG. 23C graph, a correlation peak 1040 is shown surrounded on one side by an autocorrelation peak 1041 of about −16 dB, and on the other side by smaller autocorrelation peaks of almost −22 dB. The loss in processing gain for the FIG. 23C mismatched filter as compared with the FIG. 23A mismatched filter is similar to that of the FIG. 23B mismatched filter.

For the graph of FIG. 23D, a particular mismatched filter of length-13 having 12 non-zero coefficients generates the response shown to base code sequence "1101". The filter coefficients of the mismatched filter used to generate the FIG. 23D graph are $f_y$=[−1 1 −1 4 −5 7 8 3 −2 −2 −1 0 1]. Three-bit quantization of the filter coefficients is used in this example. In the FIG. 23D graph, a correlation peak 1045 is shown along with an autocorrelation peak 1046 on one side of almost −22 dB, and smaller autocorrelation peaks 1047 and similar features of almost −28 dB on both sides of the correlation peak 1045. The loss in processing gain is similar to that of the mismatched filter used to generate the FIG. 23B graph—i.e., less than 1 dB.

Using the mismatched filter of FIG. 23D as the first stage mismatched filter 981 of the multi-stage correlator 980 in FIG. 18, responses to concatenated preamble codes Code1 and Code2 are shown in FIGS. 24A–D and 25A–D. FIG. 24A is a graph of an autocorrelation response for Code1 using a multiple stage correlator 980 configured for Code1, including a first stage mismatched filter 981 used to generate the response shown in FIG. 23D followed by a matched filter 982 configured for the MPS28 code of Code1. The FIG. 24A graph shows a correlation peak 1050 as well as a number of smaller auto-correlation peaks 1051 of about −20 dB. FIG. 24C is a graph of a cross-correlation response to Code2 of the same mismatched filter 981 and matched filter 982 combination, showing a maximum cross-correlation value of about −8 dB. FIG. 24D is a graph of an autocorrelation response to Code2 using the same first stage mismatched filter 981 followed by a matched filter 982 configured for the MPS28 code of Code2. The FIG. 24D graph shows a correlation peak 1055 next to an autocorrelation peak 1056 of just under −18 dB, as well as smaller autocorrelation peaks 1057 of about −21 dB. FIG. 24B is a graph of a cross-correlation response to Code1 of the same mismatched filter 981 and matched filter 982 combination, showing a maximum cross-correlation value of about −8 dB.

FIGS. 25A–D show close-up views of the correlation and autocorrelation responses shown in FIG. 24A–D, over about a ±10 chip range around the correlation peaks 1050 and 1055. Each close-up graph corresponds to the larger scale graph having the same subpart letter (i.e., FIG. 25A corresponds to FIG. 24A, etc.). Comparing the responses shown in FIGS. 24A–D with the responses shown in FIGS. 21A–D, it may be observed that the autocorrelation peaks 1051, 1056, 1057 are about 1 to 3 dB higher in FIGS. 24A and 24D than the auto-correlation peaks 1021, 1026 shown in FIGS. 21A and 21D, respectively. However, the loss in processing gain with the mismatched filter used to generate the responses of FIGS. 24A–D is only between 0.84 and 0.91 dB, as compared to a loss of 1.3 dB for the mismatched filter used to generate the responses of FIGS. 21A–D.

Figure 26:
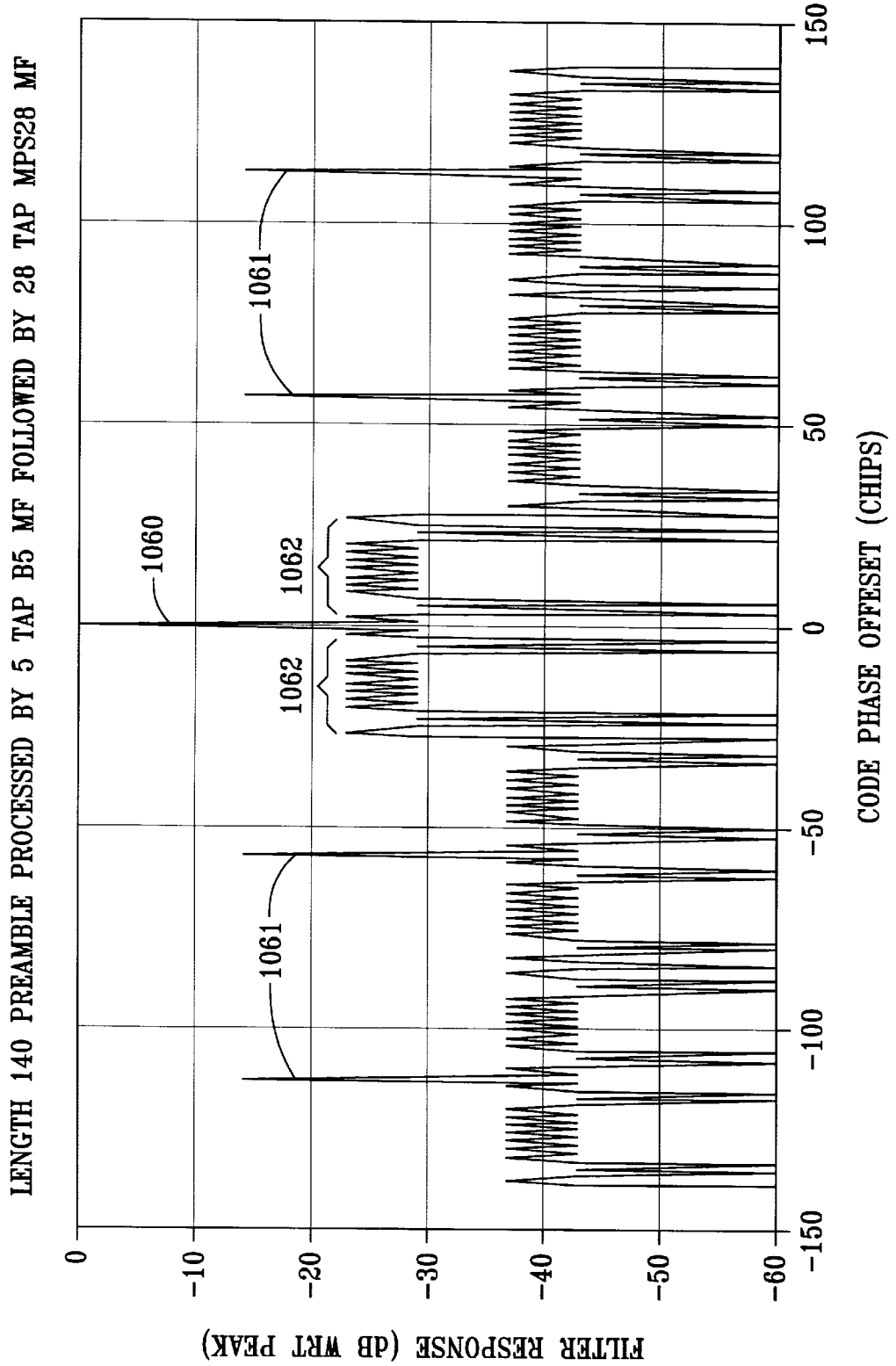
FIGS. 26 and 27 are graphs comparing the responses of matched and mismatched filters to a length-140 concatenated preamble code generated from the kronecker product of a Barker-5 (B5) code and an MPS28 code.
Figure 27:
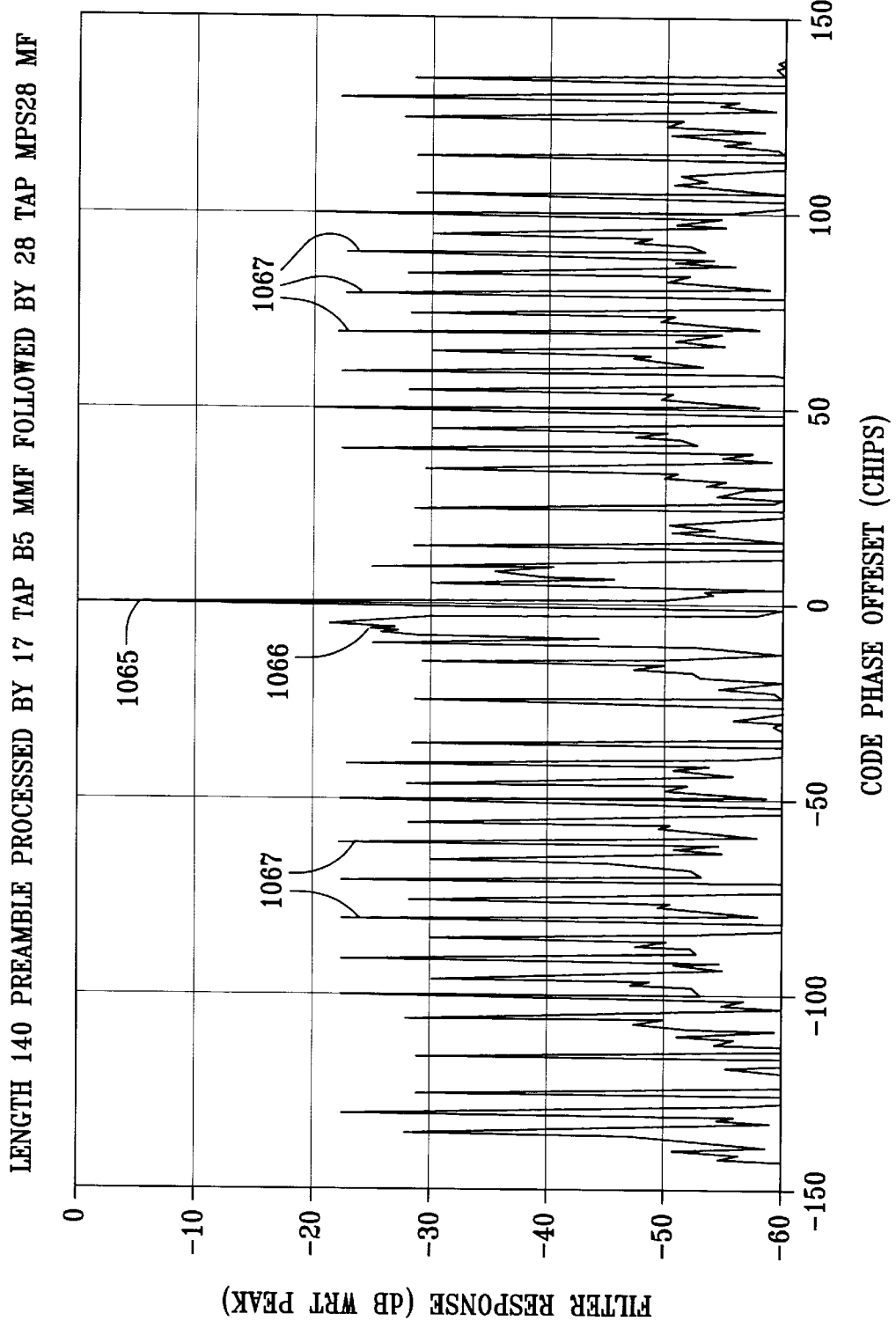
Figure 33B:
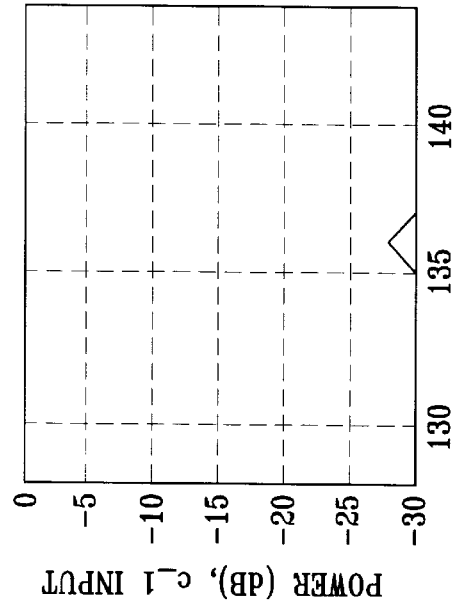
Figure 33D:
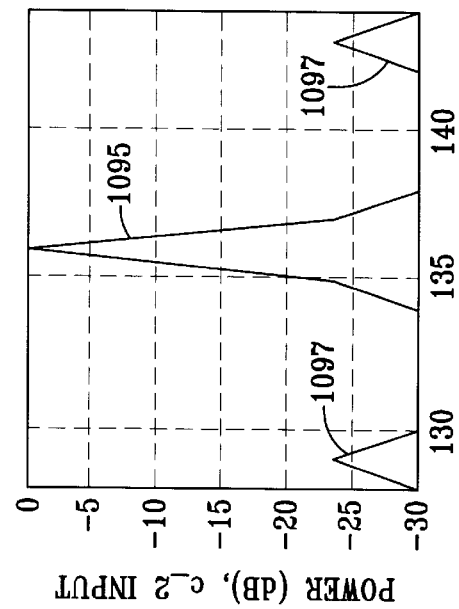
Figure 33A:
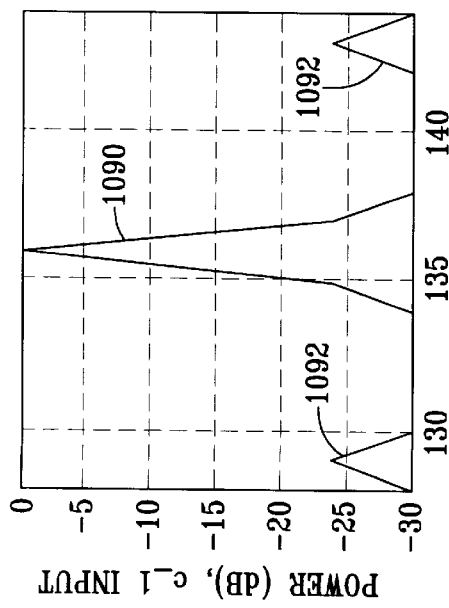
Figure 33C:
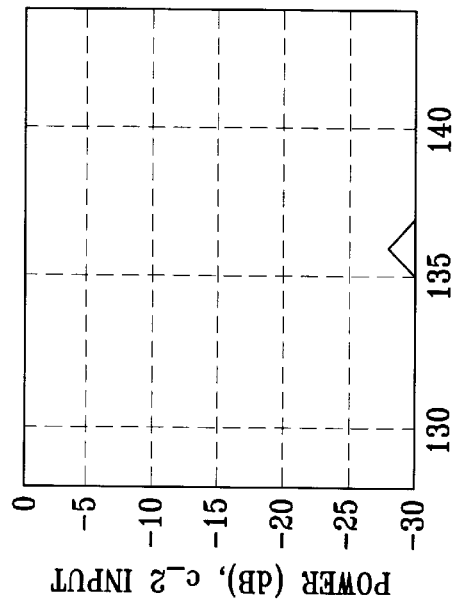

Concatenated preamble code structures may be optimized for use with mismatched filters in order to improve performance over matched filter correlators. For example, FIGS. 26 and 27 compare the responses of a matched filter corr- elator and a mismatched filter correlator to a length-140 preamble code generated from the kronecker product of a Barker-5 (B5) code and an MPS28 code. The FIG. 26 graph shows the response of a two-stage correlator (such as the two-stage correlator 910 of FIG. 10) using a matched filter in each stage. The FIG. 26 graph shows a correlation peak 1060 surrounded by two sidelobe regions 1062, as well as a number of autocorrelation peaks 1061 of about −14 dB with respect to the primary correlation peak 1060. There is no processing gain penalty for the two-stage correlator used to generate the response shown in FIG. 26.

The FIG. 27 graph shows the response of a two-stage correlator (such as the two-stage correlator 980 of FIG. 18)

using a mismatched filter stage followed by a matched filter stage. The mismatched filter is a 17-tap filter configured for the shorter of the two codes (i.e., the B5 code), while the matched filter is configured for the longer of the two codes (i.e., the MPS28 code), where the MPS28 code is the first term in the kronecker product used to generate the concatenated preamble code to be detected. In FIG. 27 is shown a correlation peak 1065 next to an autocorrelation sidepeak 1066 of about −21.54 dB relative to the primary correlation peak 1065. The FIG. 27 graph further shows a number of smaller autocorrelation peaks 1067 of about −23 dB with respect to the primary correlation peak 1065. The −21.54 dB sidepeak level of the FIG. 27 graph is substantially improved from the −14 dB sidepeak level of the FIG. 26 graph. However, unlike the matched filter combination used to generate the FIG. 26 response, the mismatched filter and matched filter combination used to generate the FIG. 27 response suffers a small loss in processing gain of about 0.62 dB.

In a particular embodiment of the present invention, concatenated preamble codes are constructed using odd length Barker codes so as to improve performance with two-bit quantizing first-stage mismatched filters, while minimizing processing gain losses. For example, length-125 concatenated preamble codes can be constructed from the kronecker product of a Barker-5 (B5) base code and a length-25 base code. In one embodiment employing length-125 concatenated preamble codes so constructed, a first-stage mismatched filter having eleven taps is used along with a second-stage matched filter in a two-stage correlator (such as two-stage correlator 980 in FIG. 18) to detect the concatenated preamble code(s).

A comparision of first-stage filter performance is illustrated in FIGS. 28 through 31, which compare the response of a matched filter with the responses of various mismatched filters to a B5 code with a code sequence "11101". FIG. 28 is a graph showing the response of a matched filter (such as the matched filter 1721 in FIG. 67) of length-5 with five non-zero filter coefficients to the B5 code sequence "11101". The FIG. 28 graph shows a correlation peak 1070 surrounded by autocorrelation peaks 1071 of about −14 dB in size relative to the primary correlation peak 1070. Because a matched filter is used, there is no processing gain penalty associated with the FIG. 28 response.

FIG. 29 is a graph showing the response to the same B5 code ("11101") of a mismatched filter (similar to mismatched filter 1501 in FIG. 66) of length-21 with 21 non-zero filter coefficients and no quantization. The FIG. 29 graph shows a correlation peak 1075 with no sidelobe peaks above −30 dB. The mismatched filter used to generate the FIG. 29 graph has a processing gain loss of 0.5228 dB, and a COST factor (with reference to Equation 23.1 discussed previously) of 2.236.

FIG. 30 is a graph showing the response of a mismatched filter of length 21 with five non-zero filter coefficients and 1-bit quantization to the same B5 code ("11101"). The filter coefficients are $f_y=[1\ -2\ 1\ 2\ 1]$. The FIG. 30 graph shows a correlation peak 1081 surrounded by two autocorrelation peaks 1081 of about −17 dB. The mismatched filter used to generate the FIG. 30 graph has a processing gain loss of 0.5017 dB, and a COST factor (with reference to Equation 23.1 discussed previously) of 2.236.

FIG. 31 is a graph showing the response to the same B5 code sequence of a mismatched filter of length 21 with nine non-zero filter coefficients and 2-bit quantization. The filter coefficients are $f_y=[1\ -1\ 0\ 2\ -4\ 3\ 4\ 2\ 0\ -1\ -1]$. The FIG. 31 graph shows a correlation peak 1085 surrounded by two autocorrelation peaks 1086 of about −24 dB. The mismatched filter used to generate the FIG. 31 graph has a processing gain loss of 0.7106 dB, and a COST factor (with reference to Equation 23.1 discussed previously) of 2.236.

So long as the processing gain loss is acceptable, mismatched filters with or without quantization may be used in a multiple stage correlator to suppress undesired correlation features, such as sidelobe autocorrelation peaks, in correlation of concatenated preamble codes.

A mismatched filter, such as any of the mismatched filters in FIGS. 29, 30 or 31, may be combined with a matched filter to detect a concatenated preamble code with improved performance. For example, a pair of concatenated preamble codes may. be constructed from the kronecker product of the Barker-5 code sequence "11101" and two length-25 subcodes, such as two codes selected from M. Cohen et al., "Minimum Peak Sidelobe Pulse Compression Codes," referenced previously herein. Two exemplary length-25 codes from this reference are the following:

$Code25_1$=0001100011111101010110110, and
$Code25_2$=0100110110101000000011100

A first concatenated preamble code $Code125_1$ is constructed from the kronecker product $[11101] \otimes Code25_1$, and a second concatenated preamble code $Code125_2$ is constructed from the kronecker product $[11101] \otimes Code25_2$. To receive either of these concatenated preamble codes, a two-stage correlator (such as the two-stage correlator 980 in FIG. 18) may be used, the first stage filter 981 being the mismatched filter used to generate the FIG. 31 graph, and the second stage filter 982 being a matched filter configured for the particular length-25 subcode used to generate the concatenated preamble code to be detected.

FIGS. 32A–D and 33A–D show the autocorrelation and cross-correlation responses of two-stage correlators so configured. FIG. 32A is a graph of an autocorrelation response for $Code125_1$ using a first stage mismatched filter 981 used to generate the response shown in FIG. 31 followed by a matched filter 982 configured for the length-25 subcode of $Code25_1$. The FIG. 32A graph shows a correlation peak 1090 surrounded by a pair of autocorrelation peaks 1092 of about −24 dB. The FIG. 32A graph also shows a number of slightly taller autocorrelation peaks 1091 of about −22 dB. FIG. 32C is a graph of a cross-correlation response to $Code125_2$ of the same mismatched filter 981 and matched filter 982 combination, showing a maximum cross-correlation value of about −11 dB. FIG. 32D is a graph of an autocorrelation response to $Code125_2$ using the same first stage mismatched filter 981 followed by a matched filter 982 configured for the length-25 subcode of $Code25_2$. The FIG. 32D graph shows a correlation peak 1095 surrounded by a pair of autocorrelation peaks 1097 of about −24 dB. The FIG. 32D graph also shows a number of slightly taller autocorrelation peak 1056 of about −22 dB. FIG. 32B is a graph of a cross-correlation response to $Code125_1$ of the same mismatched filter 981 and matched filter 982 combination, showing a maximum cross-correlation value of about −11 dB.

FIGS. 33A–D show close-up views of the correlation and autocorrelation responses shown in FIGS. 32A–D, over about a ±10 chip range around the correlation peaks 1090 and 1095. Each close-up graph corresponds to the larger scale graph having the same subpart letter (i.e., FIG. 33A corresponds to FIG. 32A, etc.). In each case the processing gain loss relative to a two-stage matched filter embodiment is about 0.7 dB. Comparing the responses shown in FIGS. 32A–D and 33A–D with the responses shown in FIGS. 21A–D and 24A–D, it may be observed that the embodiment using the odd-length (B5) Barker code (i.e., the embodiment used to generate the graphs of FIGS. 32A–D and 33A–D) for the mismatched filter obtained better performance in terms of overall processing gain loss and peak sidelobe suppression than the embodiment using the even-length (B4) Barker code (i.e., the embodiment used to generate the graphs of FIGS. 21A–D and 24A–D).

A similar comparison may be made between concatenated preamble codes constructed using different sized odd-length Barker codes as one of the base codes. For example, a comparison may be made of a concatenated preamble code constructed from a B5 code against a concatenated preamble code constructed from a shorter odd-length Barker code, such as a Barker-3 (B3) code. FIGS. 34 through 37 compare the response of a matched filter and various mismatched filters that may be used as the first stage in a two-stage correlator to detect a concatenated preamble code having as a base code the B3 code sequence "110". FIG. 34 is a graph showing the response of a length-3 matched filter (such as the matched filter 1721 in FIG. 67) with three non-zero filter coefficients to the B3 code sequence "110". The FIG. 34 graph shows a correlation peak 1105 surrounded by autocorrelation peaks 1106 of about −10 dB in size relative to the primary correlation peak 1105. Because a matched filter is used, there is no processing gain penalty associated with the FIG. 34 response.

FIG. 35 is a graph showing the response to the same B3 code ("110") of a mismatched filter (such as mismatched filter 1501 in FIG. 66) of length-13 with thirteen non-zero filter coefficients and no quantization. The FIG. 35 graph shows a correlation peak 1115 surrounded by autocorrelation peaks 1116 of about −21 dB. The mismatched filter used to generate the FIG. 35 graph has a processing gain loss of about 0.6597 dB, and a COST factor (with reference to Equation 23.1 discussed previously) of 2.236.

Figure 36:
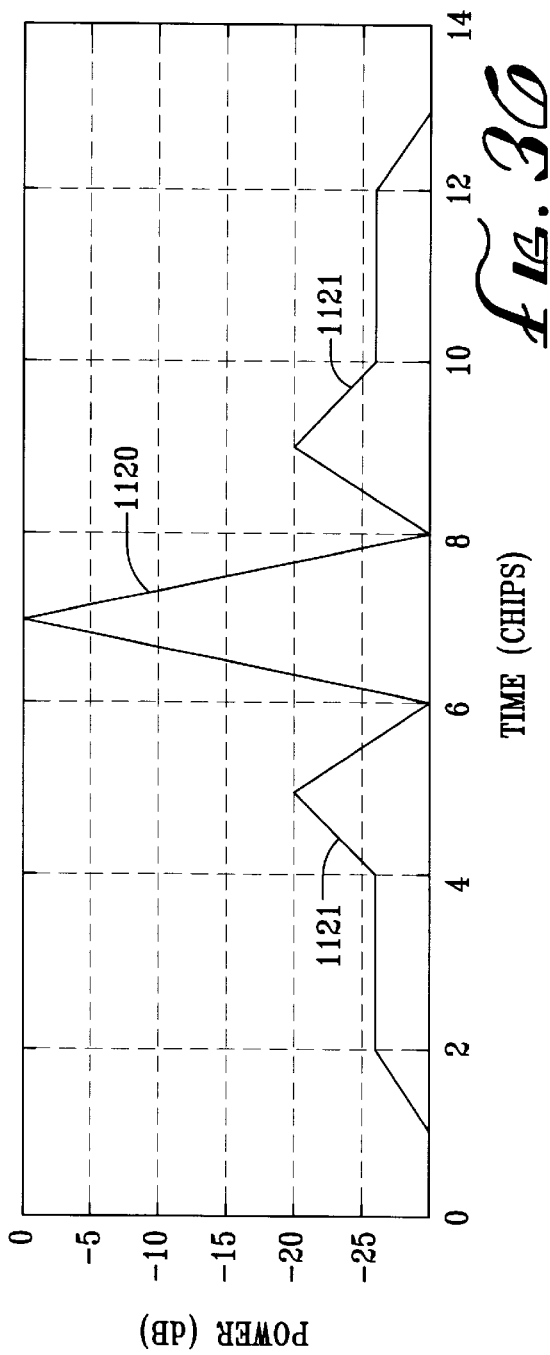

FIG. 36 is a graph showing the response to the same B3 code sequence ("110") of a mismatched filter of length-13 with nine non-zero filter coefficients and 3-bit quantization. The filter coefficients are $f_y=[1\ -2\ 2\ -6\ 8\ 6\ 2\ 2\ 1]$. The FIG. 36 graph shows a correlation peak 1120 surrounded by two autocorrelation peaks 1121 of about −20 dB. The mismatched filter used to generate the FIG. 36 graph has a processing gain loss of about 0.6258 dB, and a COST factor (with reference to Equation 23.1 discussed previously) of 2.236.

Figure 37:
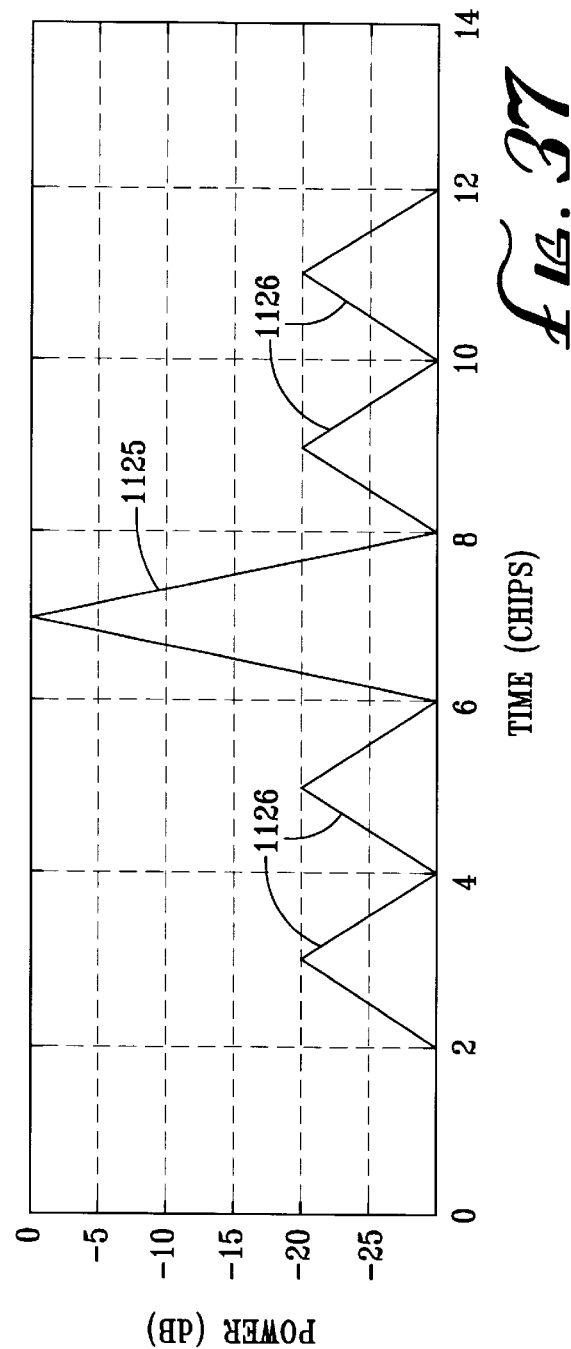
Figures 39A, 39B, 39C, 39D:
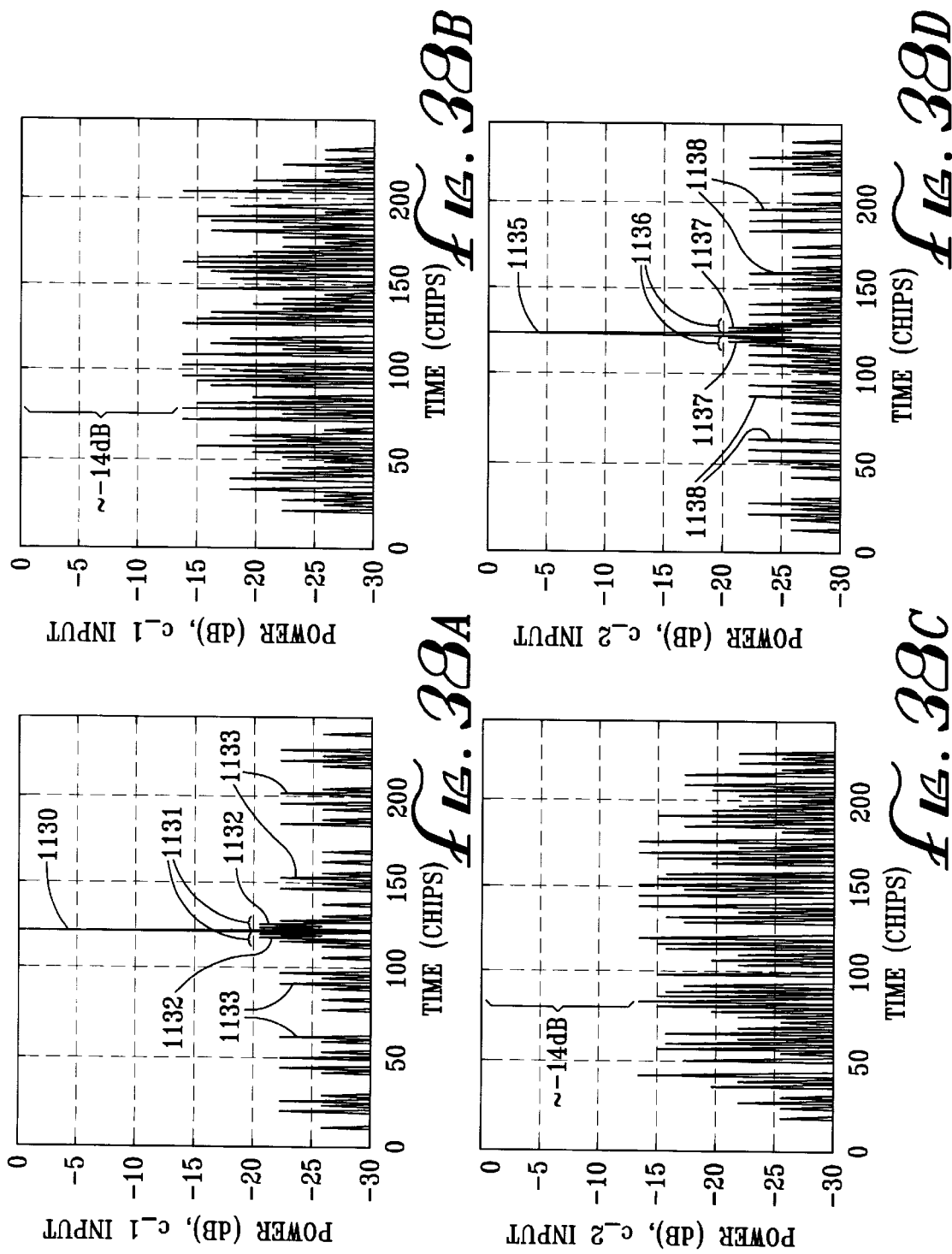

FIG. 37 is a graph showing the response to the same B3 code sequence of a mismatched filter of length 13 with seven non-zero filter coefficients and 2-bit quantization. The filter coefficients are $f_y=[-1\ 1\ 3\ 4\ 3\ 1\ 1]$. The FIG. 37 graph shows a correlation peak 1125 along with several autocorrelation peaks 1126 of about −20 dB. The mismatched filter used to generate the FIG. 37 graph has a processing gain loss of about 0.569 dB, and a COST factor (with reference to Equation 23.1 discussed previously) of 2.236.

A pair of length-117 concatenated preamble codes may be constructed from the kronecker product of the Barker-3 code sequence "110" and two length-39 subcodes, such as the following two codes selected from M. Cohen et al., "Minimum Peak Sidelobe Pulse Compression Codes," referenced previously herein:

Code39$_1$ =
000010010001101100000101110101100011100, and

Code39$_2$ =
010000100011001111011010001111100010110

A first concatenated preamble code Code117$_1$ is constructed from the kronecker product [110]⊗Code39$_1$, and a second concatenated preamble code Code117$_2$ is constructed from the kronecker product [1101]⊗Code39$_2$. To receive either of these concatenated preamble codes, a two-stage correlator (such as the two-stage correlator 980 in FIG. 18) may be used, the first stage filter 981 being the mismatched filter used to generate the FIG. 37 graph, and the second stage filter 982 being a matched filter configured for the particular length-39 subcode used to generate the length-117 concatenated preamble code to be detected.

FIGS. 38A–D and 39A–D show the autocorrelation and cross-correlation responses of two-stage correlators so configured. FIG. 38A is a graph of an autocorrelation response for Code117$_1$ using a first stage mismatched filter 981 used to generate the response shown in FIG. 37 followed by a matched filter 982 configured for the length-39 subcode of Code39$_1$. The FIG. 38A graph shows a correlation peak 1130 surrounded by a pair of sidelobe regions 1131 comprising autocorrelation peaks 1132 of about −21 dB. The FIG. 32A graph also shows a number of smaller autocorrelation peaks 1133 of about −22.5 dB. FIG. 38C is a graph of a cross-correlation response to Code117$_2$ of the same mismatched filter 981 and matched filter 982 combination, showing a maximum cross-correlation value of about −14 dB. FIG. 38D is a graph of an autocorrelation response to Code117$_2$ using the same first stage mismatched filter 981 followed by a matched filter 982 configured for the length-39 code of Code39$_2$. The FIG. 38D graph shows a correlation peak 1135 surrounded by a pair of sidelobe regions 1136 comprising autocorrelation peaks 1137 of about −21 dB. The FIG. 38D graph also shows a number of smaller autocorrelation peak 1138 of about −22.5 dB. FIG. 38B is a graph of a cross-correlation response to Code117$_1$ of the same mismatched filter 981 and matched filter 982 combination, showing a maximum cross-correlation value of about −14 dB.

FIGS. 39A–D show close-up views of the correlation and autocorrelation responses shown in FIGS. 38A–D, over about a +10 chip range around the correlation peaks 1130 and 1135. Each close-up graph corresponds to the larger scale graph having the same subpart letter (i.e., FIG. 39A corresponds to FIG. 38A, etc.). In each case the processing gain loss relative to the two-stage matched filter embodiment is about 0.59 dB. Comparing the responses shown in FIGS. 38A–D with those shown in FIGS. 32A–D, it can be seen that the graphs associated with the shorter Barker code (i.e., the B3 code) have slightly worse autocorrelation performance due to the sidelobe regions 1131 and 1136, but have a somewhat better cross-correlation performance with cross-correlation peaks of about −14 dB instead of −11 dB. On the other hand, comparing the responses shown in FIGS. 38A–D and 39A–D with the responses shown in FIGS. 21A–D and 24A–D, it may be observed that the embodiment using the B3 Barker code (i.e., the embodiment used to generate the graphs of FIGS. 38A–D and 39A–D) obtained better performance in terms of overall processing gain cost and peak sidelobe suppression.

The ultimate performance of a concatenated preamble code may therefore depend in part upon proper selection of the subcodes (i.e., the base codes multiplied together to form concatenated preamble codes). The subcodes are preferably selected so as to be relatively prime with respect to other codes (such as spreading codes or symbol codes which encode data to be transmitted) used within the same communication system as the concatenated preamble codes. For example, if the symbol codes used in the communication system are 32 chips in length, the subcodes are preferably relatively prime thereto, and the concatenated preamble codes may, for example, each be comprised of a length-5 code multiplied by a length-25 code, or a length-3 code multiplied by a length-39 code, or any other combination relatively prime to the number 32. Having the subcodes relatively prime with respect to the symbol codes should generally lead to lower "false alarm" rates at the matched filters for both the preamble code(s) and the encoded data messages. If even length subcodes are used, a computer program may be employed to search out appropriate length subcodes leading to the lowest possible false alarm rates.

It is also generally desirable to have cross-correlation isolation among the concatenated preamble codes used with in a communication system. For good operation in the FIG. 4 communication system described previously, for example, it is generally preferred to have at least 10 dB of cross-correlation isolation between concatenated preamble codes. The maximum tolerable cross-correlation of concatenated preamble codes depends upon the characteristics of the system in which the concatenated preamble codes are being used. For example, in a pure CDMA system without power control or with open loop power control, as much as 40 dB of cross-correlation isolation between concatenated preamble codes may be desirable. On the other hand, in a pure CDMA system with excellent power control, only 10 dB of cross-correlation isolation may be required. Where two longer subcodes are combined with the same shorter subcode (such as with the examples of FIGS. 38A–D and 39A–D), the cross-correlation isolation between the resultant concatenated preamble codes will arise from the two longer subcodes. In such an embodiment the longer subcodes should be selected to have the requisite cross-correlation isolation, and the resultant concatenated preamble codes should likewise have about the same cross-correlation isolation.

Concatenated preamble codes may also be formed by repeating the same subcode multiple times. Such a preamble code is referred to herein as a repeated codeword preamble ("RCP") code. The subcode used to form a repeated codeword preamble code may be a well known type of code, such as Gold code, Kasami code, or Boztas code, to name a few. The subcode may also generally comprise any type of suitable linear or non-linear code, whether binary, quadriphase, or polyphase. A number of different repeated codeword preamble codes and preamble code families are described below, along with specialized hardware for detecting such.

FIGS. 68A and 68B show a pair of tables summarizing various properties relating to Gold codes and Kasami codes, both of which are discussed further herein. The table of FIG. 68A shows, for Gold code families of length $2^5$, $2^6$, $2^7$, $2^9$, $2^{10}$, and $2^{11}$, a complex code length, real code length, number of codes in family, maximum cross-correlation peaks (both in volts and dB), and binary Welch bound. The table of FIG. 68B shows similar information for Kasami code families of length $2^2$, $2^4$, $2^6$, $2^8$, $2^{10}$, $2^{12}$, $2^{14}$ and $2^{16}$.

A first type of repeated codeword preamble code is formed by a concatenated series of Gold codes. A Gold code may be formed by modulo-2 adding a selected pair of maximal linear code sequences of the same length. The resulting code, called a Gold code, is non-maximal. Detailed information regarding the properties and generation of Gold codes may be found in R. Dixon, *Spread Spectrum Systems With Commercial Applications* (3d ed., J. Wiley & Sons 1994), at pages 85–88 and 500–503.

An exemplary repeated codeword preamble code constructed from a Gold code comprises a series of the same length-31 Gold code. There are 33 distinct Gold codes within each length-31 Gold code family. Two selected length-31 Gold codes are as follows:

Gold-$31_1$=1110110100011010101010110011000, and

Gold-$31_2$=1101101011001011100000000011111

Each of the above length-31 Gold codes is repeated, e.g., four times to generate two repeated codeword preamble codes of length-124. The repeated codeword preamble codes (designated Code$124_1$ and Code$124_2$) may each be detected using a matched filter, similar to, for example, the matched filter shown in FIG. 67. Upon receiving the proper repeated codeword preamble code, the matched filter generates a series of correlation spikes separated by the period $^T$code of the subcode. In the present example, four consecutive correlation spikes would be generated from the matched filter when the proper Gold code is received, and the correlation spikes would each be separated by 31 chips (i.e., $^T$code=31).

FIGS. 40A–D show the autocorrelation and cross-correlation responses for the matched filters configured for the two repeated codeword preamble codes (Code$124_1$ and Code $124^2$) constructed from length-31 Gold codes. FIG. 40A is a graph of an autocorrelation response to Code$124_1$ of a matched filter configured for Code$124_1$. The FIG. 40A graph shows a series of four correlation peaks 1201 (one for each subcode) with smaller autocorrelation peaks 1202 of about −10.7 dB therebetween. FIG. 40C is a graph of a cross-correlation response to Code$124_2$ of the same matched filter, showing a maximum cross-correlation value of about −10.7 dB. FIG. 40D is a graph of an autocorrelation response to Code$124_2$ of a matched filter configured for Code$124_2$. The FIG. 40D graph shows a series of four correlation peaks 1205 with smaller auto-correlation peaks 1206 of about −10.7 dB therebetween. FIG. 40B is a graph of a cross-correlation response to Code$124_1$ of the same matched filter, showing a maximum cross-correlation value of about −10.7 dB.

In comparing cross-correlation and autocorrelation performance, it may be advantageous to consider the maximum periodic (i.e., repeated) correlation properties rather than the highest correlation peak feature(s). Because a plurality of correlation spikes (e.g., four correlation spikes 1201 or 1205 in the above example) are typically generated, along with the smaller autocorrelation peaks and valleys, from the matched filter in detecting a repeated codeword preamble code, it is preferred when evaluating performance of repeated codeword preamble codes to consider the periodic cross-correlation characteristics rather than simply the maximum cross-correlation peak, and to consider the maximum periodic autocorrelation characteristics rather than simply the maximum autocorrelation peak. The maximum periodic cross-correlation value for the repeated codeword preamble code using the above Gold-31 codes is 20·log ($\%_{31}$)=−10.7 dB. The maximum periodic autocorrelation sidelobe value for these Gold codes is also −10.7 dB.

As an alternative to using a matched filter to detect a repeated codeword preamble code, a mismatched filter may be utilized to yield identically zero autocorrelation sidelobes (with some loss in processing gain) by exploiting the periodic correlation properties of periodic codes. For example, a particular filter (a "Plagge filter") is described in Rohling and Plagge, "Mismatched-Filter Design for Periodical Binary Phased Signals", *IEEE Transactions on Aerospace & Electronic Systems*, Vol. 25, No.6 (Nov. 1, 1989), pp, 890–96. The Plagge filter coefficients, if they exist, are calculated according to the following operation:

filter coefficient=real(idft(1/dft(codeword)))

where:

"dft" represents a discrete Fourier transform operation;

"idft" represents an inverse dft operation;

"/" indicates term by term division; and

"codeword" represents the received preamble code on an element by element basis

If the discrete Fourier transform of the codeword has any zeroes, then a Plagge filter cannot be constructed.

Figures 41A, 41B, 41C, 41D:
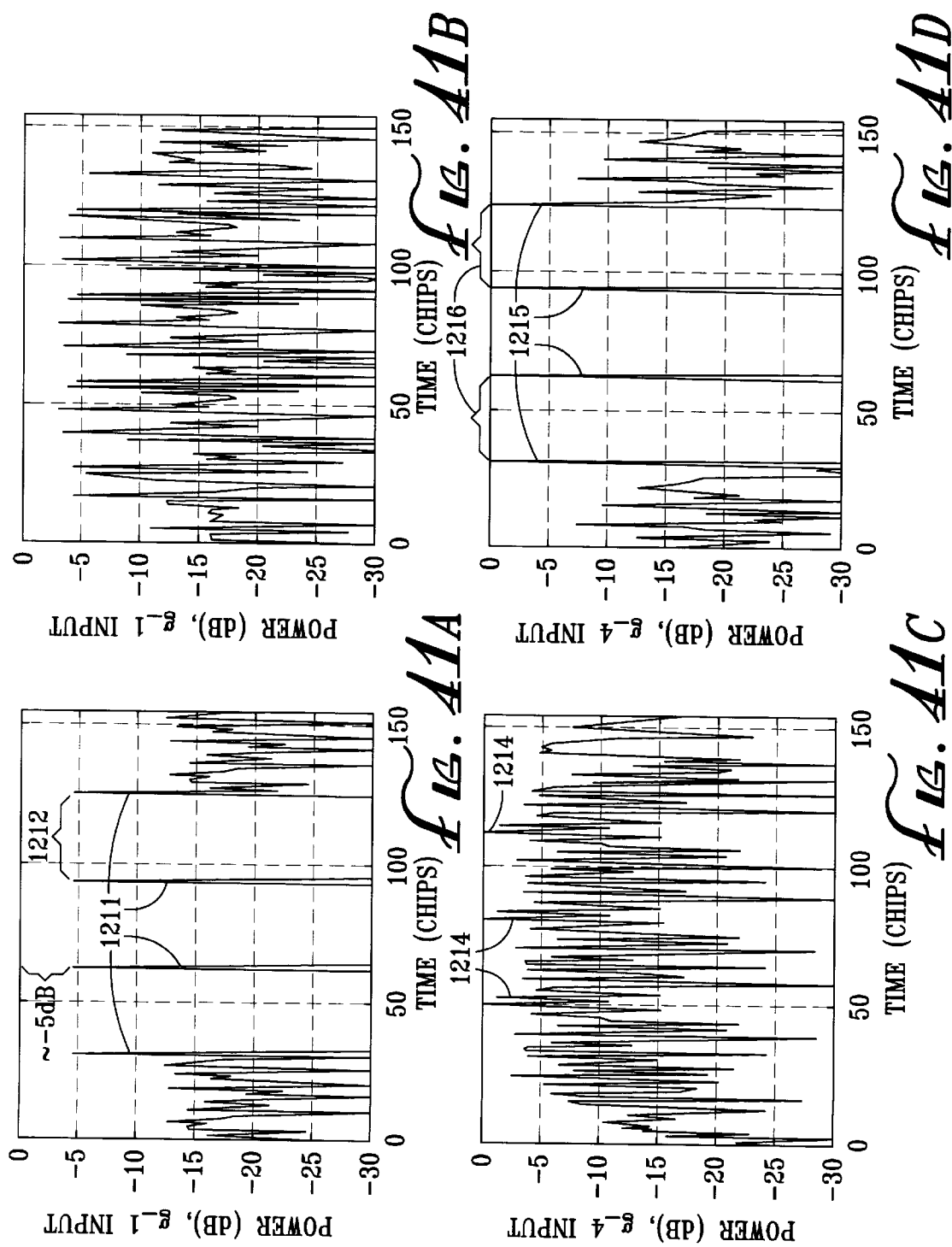
FIGS. 41A–D are graphs illustrating the response of a Plagge filter to the Gold-31 preamble codes from FIGS. 40A–D.

The response of two-stage correlators (each similar to two-stage filter 980 in FIG. 18) configured for repeated codeword preamble codes Code$124_1$ and Code$124_2$, and employing a Plagge filter as a first-stage mismatched filter followed by a second-stage matched filter (collectively referred to as a two-stage Plagge filter correlator), is shown in FIGS. 41A–D. FIG. 41A is a graph of an autocorrelation response to Code$124_1$ of a two-stage Plagge filter correlator configured for Code$124_1$. The FIG. 41A graph shows a series of four correlation peaks 1211 (one for each subcode) with the absence of significant autocorrelation peaks in the regions 1212 between the correlation peaks 1211. FIG. 41C is a graph of a cross-correlation response to Code$124_2$ of the same two-stage Plagge filter correlator, showing a maximum cross-correlation value of about 0 dB. FIG. 41D is a graph of an autocorrelation response to Code$124_2$ of a two-stage Plagge filter correlator configured for Code$124_2$. The FIG. 41D graph shows a series of four correlation peaks 1215 with the absence of significant autocorrelation peaks in the regions 1216 between the correlation peaks 1215. FIG. 41B is a graph of a cross-correlation response to Code$124_1$ of the same two-stage Plagge filter correlator, showing a maximum cross-correlation value of about −3 dB.

The cross-correlation results shown in FIGS. 41B and 41C are not acceptable for many applications. Other embodiments described herein are preferred over a Plagge filter for detecting a repeated codeword preamble code in such applications.

Another type of code that may be used in constructing repeated codeword preamble codes is a Kasami code. Kasami codes are generally known, and are described in, e.g., J. Proakis, *Digital Communications* (McGraw 2d ed. 1989), at page 836. Kasami codes generally offer better correlation properties than similar-length Gold codes—i.e., while Gold codes have cross-correlation bounded at $2^{(N+\frac{1}{2})}+1$ or $2^{(N+\frac{1}{2})}-1$, Kasami codes are bounded at $2^{(N/2)}+1$. However, Kasami codes do not exist in length-31. An alternative to using a length-31 Gold code is to use a length-63 Kasami code as a subcode for generation of a repeated codeword preamble code. There are eight length-63 Kasami codes in the Kasami code family of that length. One of these eight Kasami codes is the root maximal length sequence and is given as follows:

Kasami-$63_1$=111111000001000011000101001111010001100100101101110110011010

Another selected length-63 Kasami code is the following:

Kasami-$63_2$=010110110101111001011000000001110110100001111111001111110111001

Figure 70A:
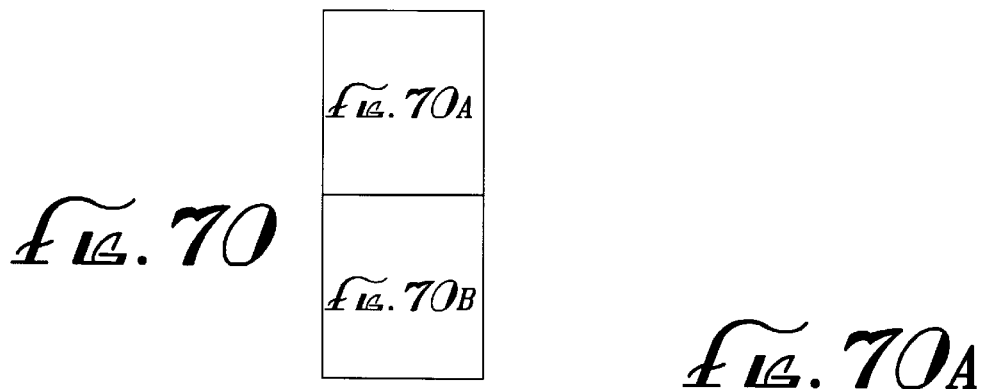
FIG. 70 is a table of eight length-63 Kasami codes.

FIG. 70 is a table showing a total of eight length-63 Kasami codes based on the maximal length sequence of Kasami-63, shown above. Two repeated codeword preamble codes of length-126 (designated Code$126_1$ and Code$126_2$) may be formed, the first from a concatenated series of two of the first Kasami-63 code, and the second from a concatenated series of two of the second Kasami-63 code.

The responses of matched filters to the two length-126 repeated codeword preamble codes Code$126_1$ and Code$126_2$ are shown in FIGS. 42A–D. FIG. 42A is a graph of an auto-correlation response to Code$126_1$ of a matched filter configured for Code$126_1$. The FIG. 42A graph shows a series of two correlation peaks 1221 (one for each Kasami code) with the absence of significant autocorrelation peaks in the regions 1222 between the correlation peaks 1221. FIG. 42C is a graph of a cross-correlation response to Code$126_2$ of the same matched filter, showing a maximum cross-correlation value of about −12 dB. FIG. 42D is a graph of an autocorrelation response to Code$126_2$ of a matched filter configured for Code$126_2$. The FIG. 42D graph shows a series of two correlation peaks 1225 with a number of smaller autocorrelation peaks 1226 therebetween. FIG. 42B is a graph of a cross-correlation response to Code$126_1$ of the same matched filter, showing a maximum cross-correlation value of about −12 dB.

The responses shown in the graphs of FIGS. 42A–D may be compared with those of FIGS. 43A–D, which show autocorrelation and cross-correlation responses for repeated codeword preamble codes constructed from two other length-63 Kasami codes, namely:

Kasami-$63_3$=100010001111100100010110100110100101001000001011110101101010000

Kasami-$63_4$=011000010010101010110001110101001100111100110001101000100100100

The two new repeated codeword preamble codes of length-126 (designated Code$126_3$ and Code$126_4$) are each generated from a series of two of the above length-63 Kasami codes, the first new repeated codeword preamble code Code $126_3$ formed from a concatenated series of two of the Kasami-$63_3$ code, and the other new repeated codeword preamble code Code $126_4$ formed from a concatenated series of two of the Kasami-$63_4$ code.

Figure 43A:
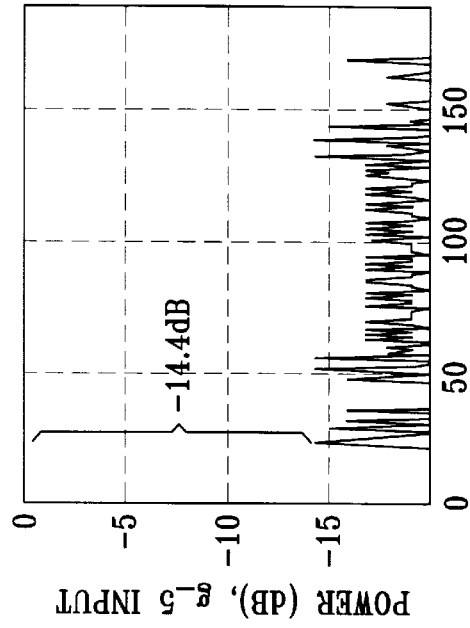
Figure 43B:
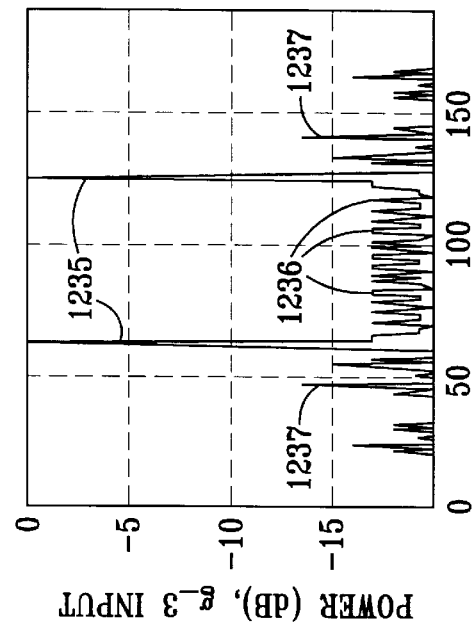
Figure 43C:
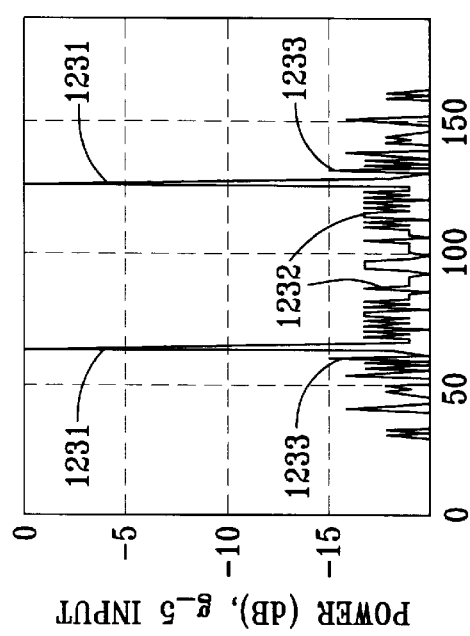
Figure 43D:
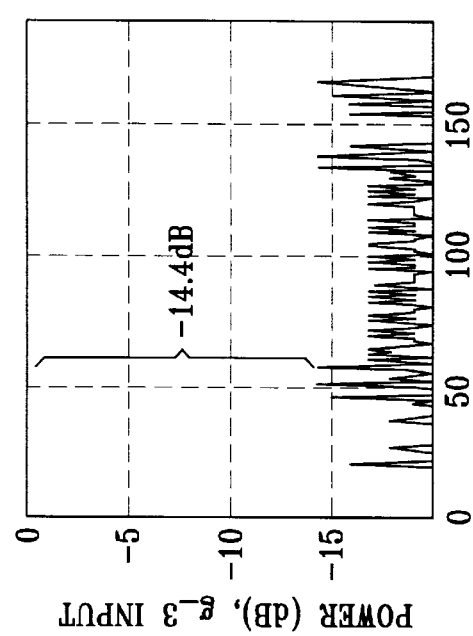

The responses of matched filters to the length-126 repeated codeword preambles codes Code $126_3$ and Code $126_4$ are shown in FIGS. 43A–D. FIG. 43A is a graph of an autocorrelation response to Code$126_3$ of a matched filter configured for Code$126_3$. The FIG. 43A graph shows a series of two correlation peaks 1231 (one for each subcode) with smaller autocorrelation peaks 1232 of about −17 dB therebetween. Larger autocorrelation peaks 1233 of about −15 dB appear just outside of correlation peaks 1231. FIG. 43C is a graph of a cross-correlation response to Code$126_4$ of the same matched filter, showing a maximum cross-correlation value of about −14.4 dB. FIG. 43D is a graph of an autocorrelation response to Code$126_4$ of a matched filter configured for Code$126_4$. The FIG. 43D graph shows a series of two correlation peaks 1235 with smaller autocorrelation peaks 1236 of about −17 dB therebetween. Larger autocorrelation peaks 1237 of about −15 dB appear just outside of correlation peaks 1235. FIG. 43B is a graph of a cross-correlation response to Code$126_3$ of the same matched filter, showing a maximum cross-correlation value of about −17 dB.

A potential disadvantage to using the Kasami-63 codes as the subcodes for repeated codeword preamble codes is that the cross-correlation and autocorrelation levels are "controlled" only when the receiving matched filter is fully loaded with the Kasami code elements. Outside of the region between the two correlation peaks 1221, 1225, 1231, or 1235, correlation properties are aperiodic with no guarantee of performance levels.

In another aspect of the invention, augmented binary codes of even length are formed by adding one or more chips to or truncating one or more chips from codes close to the desired length, and are used as the subcodes for repeated codeword preambles so as to allow more flexibility in modulation format choices. For example, a number of modulation formats utilize in-phase (I) and quadrature (Q) components for transmitting of signals. An exemplary modulation format making use of I and Q components is disclosed in, e.g., U.S. Pat. No. 5,757,847 referenced previously and incorporated by reference as if fully set forth herein. Modulation formats exploiting I and Q components are typically more spectrally efficient than other types of modulation and tend to favor the use of even length codes because it is preferred to have a one-to-one correspondence between I and Q components. A problem is that many binary codes having favorable correlation properties are odd in length, thereby making them less attractive for use in a modulation format using I and Q components.

A solution which allows odd length subcodes with favorable correlation properties to be used in conjunction with I and Q modulation formats is to create even length codes by adding one or more chips to or truncating one or more chips from an odd length code with desired correlation properties. The augmented or truncated code so generated may be used as a subcode to form a repeated codeword preamble code.

There are four ways that a given odd-length code can be augmented by one chip (i.e., by adding a "1" or "0" to either end of the code). On the other hand, there are only two ways that a given odd-length code can be truncated by one chip (i.e., by removing the first chip or the last chip of the code). For example, with the 33 codes in the length-31 Gold code family, 132 augmented codes may be formed by adding one chip, or 66 truncated codes may be formed by truncating one chip.

Figure 44A:
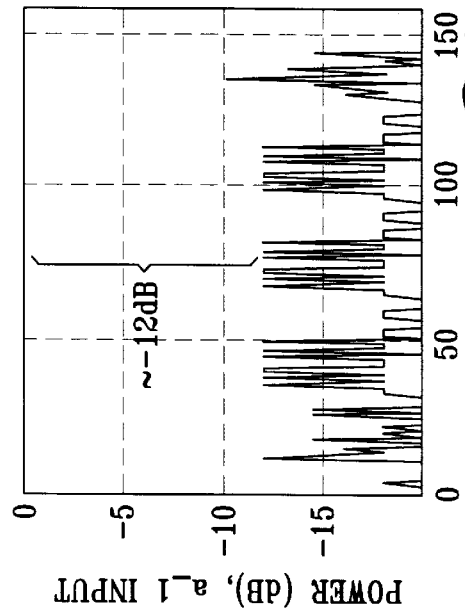
Figure 44B:
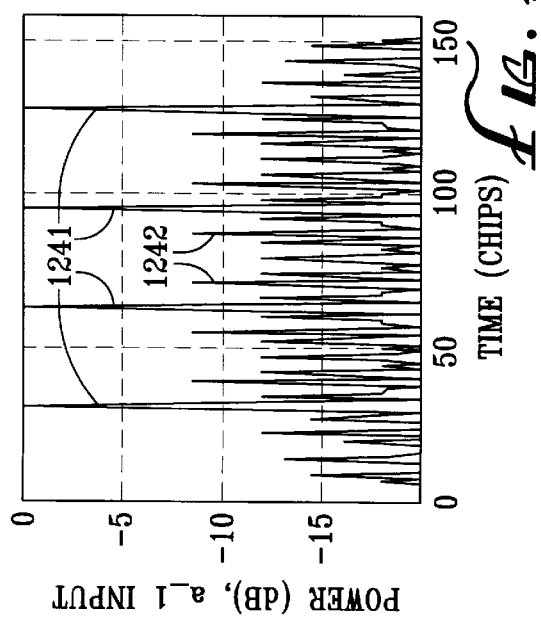
Figure 44C:
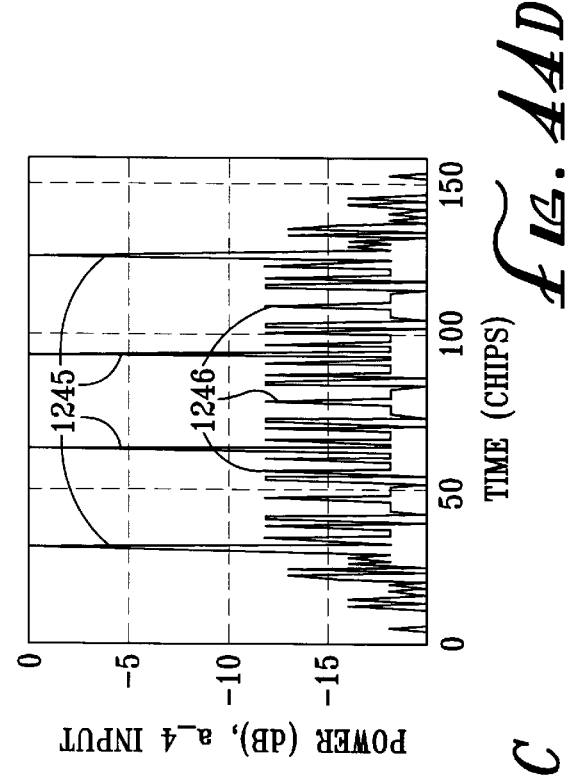
Figure 44D:
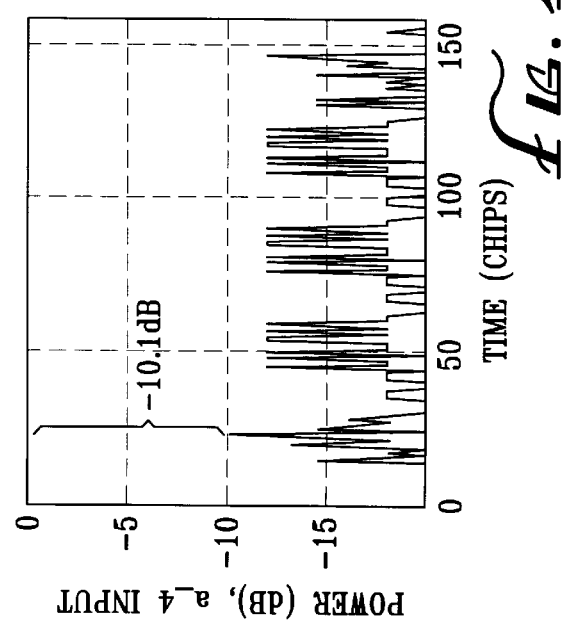

As a particular example, a 0-chip was added to the end of the Gold-$31_1$ code, which was used in the repeated codeword preamble code Code $124_1$, to form a new code designated Aug-Gold$31_1$. Likewise, a 0-chip was added to the end of the Gold-$31_2$ code, which was used in the repeated codeword preamble code Code $124_2$, to form a new code designated Aug-Gold$31_2$. The autocorrelation and cross-correlation responses for two length-128 repeated codeword preamble codes (designated Code$128_1$ and Code $128_2$) each constructed from a series of four of these augmented length-32 Gold codes (Aug-Gold$31_1$ and Aug-Gold$31_2$, respectively) are shown in FIGS. 44A–D. FIG. 44A is a graph of an autocorrelation response to Code$128_1$ of a matched filter configured for Code$128_1$. The FIG. 44A graph shows a series of four correlation peaks 1241 (one for each augmented Gold subcode Aug-Gold$31_1$) with smaller auto-correlation peaks 1242 of about −8 dB therebetween. FIG. 44C is a graph of a cross-correlation response to Code$128_2$ of the same matched filter, showing a maximum cross-correlation value of about −12 dB. FIG. 44D is a graph of an autocorrelation response to Code$128_2$ of a matched filter configured for Code$128_2$. The FIG. 44D graph shows a series of four correlation peaks 1245 with smaller autocorrelation peaks 1246 of about −12 dB therebetween. FIG. 44B is a graph of a cross-correlation response to Code$128_1$ of the same matched filter, showing a maximum cross-correlation value of about −10.1 dB.

While the worst-case autocorrelation response for Code$128_1$ degraded by about 3 dB over the autocorrelation response of non-augmented Gold code Code$124_1$ and degraded slightly in the worst-case cross-correlation response with respect to Code$128_2$, both auto-correlation and cross-correlation responses were, from an overall standpoint, better for the repeated codeword preamble codes Code $128_1$ and Code$128_2$ constructed from the augmented Gold codes than for repeated codeword preamble code Code$124_1$ and Code $124_2$ constructed from the original Gold codes.

As another particular example, a 1-chip was added to the end to another member of the Gold-31 code family to form a new augmented code designated Aug-Gold$31_3$. Likewise, a 1-chip was added to the end of the Gold-$31_2$ code refered previously to form a new code designated Aug-Gold$31_4$. The autocorrelation and cross-correlation responses for two other length-128 repeated codeword preamble codes (designated Code$128_3$ and Code$128_4$), each constructed from a concatenated series of either four augmented Gold code Aug-Gold$31_3$ or augmented Gold codes Aug-Gold$31_4$, are shown in FIGS. 45A–D. FIG. 45A is a graph of an autocorrelation response to Code$128_3$ of a matched filter configured for Code$128_3$. The FIG. 45A graph shows a series of four correlation peaks 1251 (one for each augmented Gold subcode Aug-Gold$31_3$) with smaller autocorrelation peaks 1252 of about −8 dB therebetween. FIG. 45C is a graph of a cross-correlation response to Code$128_4$ of the same matched filter, showing a maximum cross-correlation value of about −8.5 dB. FIG. 45D is a graph of an autocorrelation response to Code$128_4$ of a matched filter configured for Code$128_4$. The FIG. 45D graph shows a series of four correlation peaks 1255 lone for each augmented Gold subcode Aug-Gold$31_4$) with smaller auto-correlation peaks 1256 of about −11.5 dB therebetween. FIG. 45B is a graph of a cross-correlation response to Code$128_3$ of the same matched filter, showing a maximum cross-correlation value of about −8.5 dB.

For the repeated codeword preamble codes constructed from augmented Gold codes Code$128_3$ and Code$128_4$, performance generally deteriorates over the repeated codeword preamble codes constructed from the original length-31 Gold codes in three out of the four autocorrelation and cross-correlation measurements, as may be seen by a comparison of FIGS. 40A–D with FIGS. 45A–D.

A potential problem when selecting subcodes for use in generating repeated codeword preamble codes is that the subcode may end up the same length as another code (such as a spreading code or a data symbol code) used to transmit a data message following the repeated codeword preamble code, thereby leading to an increased probability of false synchronization when using a repeated codeword preamble code. For example, if the length of the data symbol codes is 32 chips, then it is preferable to avoid the use of length-32 subcodes in a repeated codeword preamble code. One option is to truncate chips from the desired odd-length codes to arrive at even length codes suitable for an I/Q modulation format, while at the same time having a different length than the data symbol codes. This technique may be done even if the preamble subcodes are not close in length to the data symbol code lengths.

As a particular example, a 1-chip was truncated from the beginning of the Gold-$31_1$ code which was used to generate the graph of FIG. 40A, to form a new code designated T-Gold$31_1$.

Likewise, a 1-chip was truncated from the beginning of the Gold-$31_2$ code which was used to generate the graph of FIG. 40D, to form a new code designated T-Gold$31_2$. Two length-120 preamble codes (designated Code$120_1$ and Code$120_2$) may be constructed from these truncated Gold codes, the first repeated codeword preamble code Code$120_1$ being constructed from a series of four of the T-Gold31, code, and the second repeated codeword preamble code Code$120_2$ being constructed from a series of four of the T-Gold$31_2$ code. The autocorrelation and cross-correlation responses for Code$120_1$ and Code$120_2$ are shown in FIGS. 46A–D. FIG. 46A is a graph of an autocorrelation response to Code$120_1$ of a matched filter configured for Code$120_1$.

The FIG. 46A graph shows a series of four correlation peaks 1261 (one for each truncated Gold code T-Gold31$_1$) with smaller autocorrelation peaks 1262 of about −9.5 dB therebetween. FIG. 46C is a graph of a cross-correlation response to Code120$_2$ of the same matched filter, showing a maximum cross-correlation value of about −9.5 dB. FIG. 46D is a graph of an autocorrelation response to Code120$_2$ of a matched filter configured for Code120$_2$. The FIG. 46D graph shows a series of four correlation peaks 1265 (one for each truncated Gold code T-Gold31$_2$) with smaller autocorrelation peaks 1266 of about −9.5 dB therebetween. FIG. 46B is a graph of a cross-correlation response to Code120$_1$ of the same matched filter, showing a maximum cross-correlation value of about −9.5 dB.

Compared with the responses shown in FIGS. 40A–D for repeated codeword preamble codes constructed from non-truncated Gold codes, the responses of the repeated codeword preamble codes constructed from truncated Gold codes (as shown in FIGS. 46A–D) exhibit slightly degraded performance (losing about 1.2 dB in worst case autocorrelation and cross-correlation sidelobe peak levels).

In another illustrative example, shown in FIGS. 47A–D, the performance of another set of repeated codeword preamble codes constructed from truncated Gold codes degrades to a much worse level. In the case of FIGS. 47A–D, a 1-chip was truncated from the end of the Gold-31$_1$ code which was used to generate the graph of FIG. 40A, to form a new code designated T-Gold31$_3$. Likewise, a 0-chip was truncated from the end of the Gold-31$_2$ code which was used to generate the graph of FIG. 40D, to form a new code designated T-Gold31$_4$. The autocorrelation and cross-correlation responses for two length-120 repeated codeword preamble codes (designated Code120$_3$ and Code 120$_4$), the first repeated codeword preamble code Code 120$_3$ constructed from a series of four of truncated Gold code T-Gold31$_3$ and the second repeated codeword preamble code Code 120$_4$ constructed from a series of four of truncated Gold code T-Gold31$_4$, are shown in FIGS. 47A–D. FIG. 47A is a graph of an autocorrelation response to Code120$_3$ of a matched filter configured for Code120$_3$. The FIG. 47A graph shows a series of four correlation peaks 1271 (one for each truncated Gold code T-Gold31$_3$) with smaller autocorrelation peaks 1272 of about −7 dB therebetween. FIG. 47C is a graph of a cross-correlation response to Code120$_4$ of the same matched filter, showing a maximum cross-correlation value of about −8 dB. FIG. 47D is a graph of an autocorrelation response to Code120$_4$ of a matched filter configured for Code120$_4$. The FIG. 47D graph shows a series of four correlation peaks 1275 (one for each truncated Gold code T-Gold31$_4$) with smaller autocorrelation peaks 1276 of about −8 dB therebetween. FIG. 47B is a graph of a cross-correlation response to Code120$_3$ of the same matched filter, showing a maximum cross-correlation value of about −8 dB.

Compared with the previous repeated codeword preamble code responses in FIGS. 46A–D using truncated Gold codes, the repeated codeword preamble code responses in FIGS. 47A–D exhibit significantly increased sidelobe peaks in the Code120$_3$ autocorrelation response and moderately increased cross-correlation peak values as shown in both FIGS. 47A and 47D.

Kasami codes may also be augmented or truncated for use in a repeated codeword preamble code, but are somewhat less "tolerant" of augmentation or truncation as compared to the Gold codes. As a particular example, a 1-chip was added to the end of the Kasami-63$_3$ code which was used to generate the graph of FIG. 43A, to form a new code designated Aug-Kasami63$_1$. Likewise, a 1-chip was added to the end of the Kasami-63$_4$ code which was used to generate the graph of FIG. 43D, to form a new code designated Aug-Kasami63$_2$.

Figure 48B:
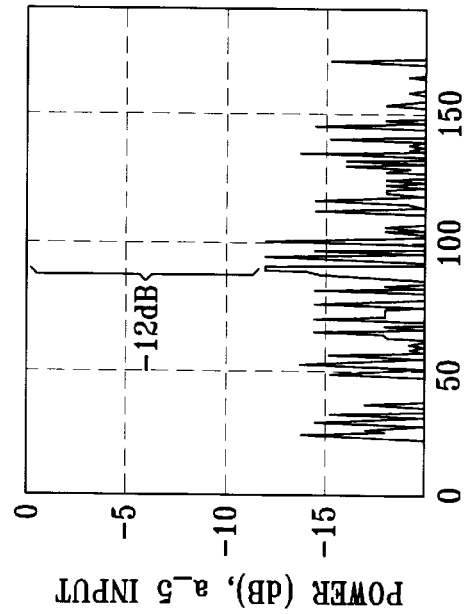
FIGS. 48A–D are graphs illustrating correlation responses of matched filters to length-128 repeated codeword preamble codes constructed from augmented Kasami codes.
Figure 48D:
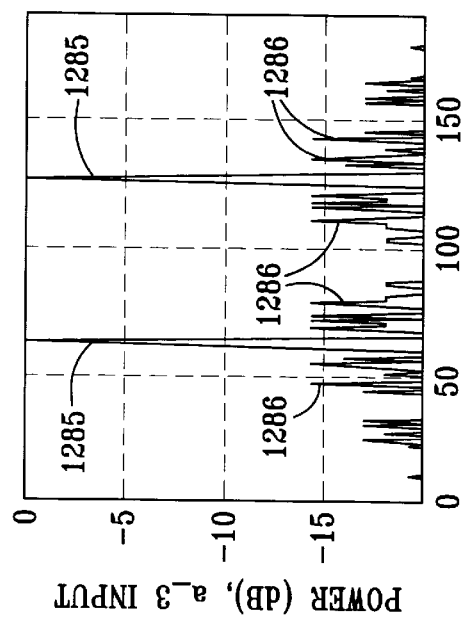
Figure 48A:
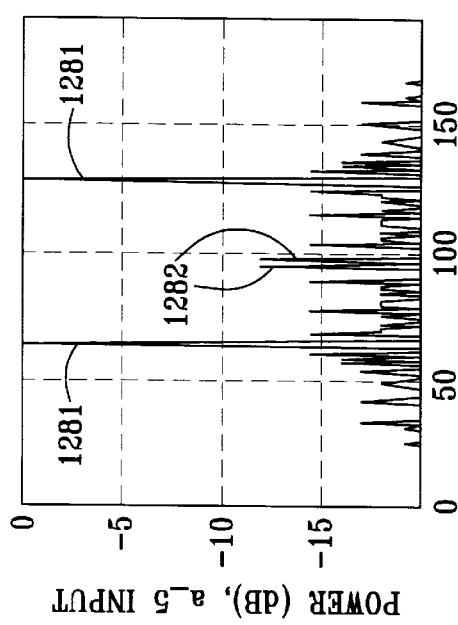
Figure 48C:
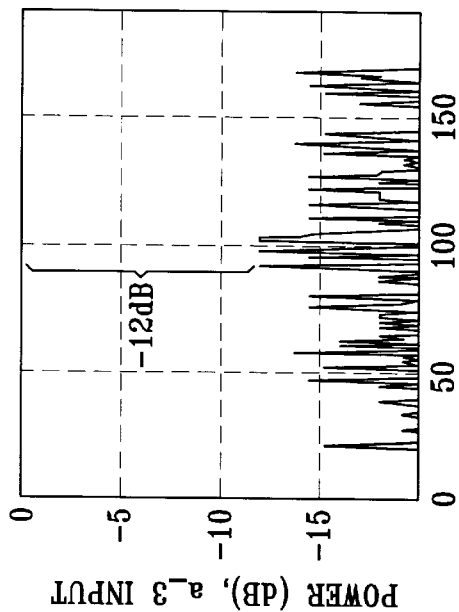

The autocorrelation and cross-correlation responses for two length-128 repeated codeword preamble codes (designated ACode128$_1$ and ACode128$_2$), the first repeated codeword preamble code ACode128$_1$ constructed from a series of two of augmented Kasami code Aug-Kasami63$_1$ and the second repeated codeword preamble code ACode128$_2$ constructed from a series of two of augmented Kasami code Aug-Kasami63$_2$, are shown in FIGS. 48A–D. FIG. 48A is a graph of an autocorrelation response to ACode128$_1$ of a matched filter configured for ACode128$_1$. The FIG. 48A graph shows a series of two correlation peaks 1281 (one for each augmented Kasami code Aug-Kasami63$_1$) with smaller autocorrelation peaks 1282 of about −12 dB therebetween. FIG. 48C is a graph of a cross-correlation response to ACode128$_2$ of the same matched filter, showing a maximum cross-correlation value of about −12 dB. FIG. 48D is a graph of an autocorrelation response to ACode128$_2$ of a matched filter configured for ACode128$_2$. The FIG. 48D graph shows a series of two correlation peaks 1285 (one for each augmented Kasami code Aug-Kasami63$_2$) with smaller autocorrelation peaks 1286 of about −12 dB therebetween. FIG. 48B is a graph of a cross-correlation response to ACode128$_1$ of the same matched filter, showing a maximum cross-correlation value of about −12 dB.

In comparison with the responses in FIGS. 43A–D for the repeated codeword preamble codes formed from non-augmented Kasami codes, the autocorrelation and cross-correlation responses for the repeated codeword preamble codes formed from augmented Kasami codes show a degradation in performance of about 1.5 to 3 dB in worst case autocorrelation peak levels and about 2.5 dB in worst case cross-correlation peak levels.

Repeated codeword preamble codes may also be constructed from truncated Kasami codes. For example, a 1-chip may be truncated from the beginning of the Kasami-63$_3$ code which was used to generate the graph of FIG. 43A, to form a new code designated T-Kasami63$_1$. Likewise, a 0-chip may be truncated from the beginning of the Kasami-63$_4$ code which was used to generate the graph of FIG. 43D, to form a new code designated T-Kasami63$_2$.

The autocorrelation and cross-correlation responses for two length-124 repeated codeword preamble codes (designated TCode124$_1$ and TCode124$_2$) each constructed from a series of two of the same truncated Kasami code (T-Kasami63$_1$ and T-Kamasi63$_2$, respectively) are shown in FIGS. 49A–D. FIG. 49A is a graph of an autocorrelation response to TCode124$_1$ of a matched filter configured for TCode124$_1$. The FIG. 49A graph shows a series of two correlation peaks 1291 (one for each truncated Kasami subcode T-Kasami63$_1$) with smaller autocorrelation peaks 1292 of about −11 dB therebetween. FIG. 49C is a graph of a cross-correlation response to TCode124$_2$ of the same matched filter, showing a maximum cross-correlation value of about −13.6 dB. FIG. 49D is a graph of an autocorrelation response to TCode124$_2$ of a matched filter configured for TCode124$_2$. The FIG. 49D graph shows a series of two correlation peaks 1295 (one for each truncated Kasami subcode T-Kasami63$_2$) with smaller auto-correlation peaks 1296 of about −13 dB therebetween. FIG. 49B is a graph of a cross-correlation response to TCode124$_1$ of the same matched filter, showing a maximum cross-correlation value of about −13.6 dB.

In comparison with the responses in FIGS. 43A–D for the repeated codeword preambles codes formed from non-truncated Kasami codes, the autocorrelation and cross-correlation responses for the repeated codeword preamble codes formed from truncated Kasami codes show a degradation in performance of about 1 to 4 dB in worst case auto-correlation peak levels and about 0.8 dB in worst case cross-correlation peak levels.

In another aspect of the invention, quadriphase codes (preferably of even binary length) may be used in a concatenated preamble code or repeated codeword preamble code. FIGS. 69A through 69D show tables comprising information relating to particular quadriphase codes, some of which are discussed in specific examples further herein. The table of FIG. 69A shows, for Boztas family A ("Boztas-A") codes of lengths between $2^2$ and $2^{10}$, a complex code length, real code length, number of codes in family, maximum cross-correlation peaks (both in volts and dB), and binary Welch bound. The table of FIG. 69B shows similar information for Boztas family $\beta$ codes of lengths between $2^2$ and $2^{10}$. The table of FIG. 69C shows similar information for Novosad codes of lengths $2^2$, $2^6$ and $2^{10}$. The table of FIG. 69D shows similar information for Matsufuji codes of lengths $2^4$, $2^8$ and $2^{12}$.

The Boztas-A codes have the advantage of being nearly optimal with respect to Welch lower bound and form a large set of basis codewords (having the same size and period of the family of binary Gold code sequences). There are sixteen codewords in each Boztas-A length-15 family. A detailed description of Boztas codes may be found in, e.g., Serdar Boztas et al., "4-Phase Sequences with Near-Optimum Correlation Properties," *IEEE Transactions on Information Theory*, Vol. 38, No. 3 (May 1992), pages 1101–1113, incorporated by reference as if set forth fully herein.

In their Galois form, Boztas; codes take on values from the set of [0,1,2,3] for each chip (using spread-spectrum terminology). They may be mapped into a complex format by the following operation:

0→+1
1→+j
2→−1
3→−j

As examples, four length-15 Boztas codes in Galois form appear in the table shown in FIG. 71, along with initial seeds used to generate them. Two selected complex Boztas-A codes of length-15 are the following (the first two codes shown in FIG. 71):

Boz1=222200010011010
Boz2=333322030031212

Two length-60 complex repeated codeword preamble codes (designated $Code60^1$ and $Code60_2$) can be constructed, each comprising a series of four of the same Boztas-A code (Boz1 and Boz2, respectively).

FIGS. 50A–D show the autocorrelation and cross-correlation responses for matched filters configured for $Code60^1$ and $Code60_2$. FIG. 50A is a graph of an autocorrelation response to $Code60_1$ of a matched filter configured for $Code60^1$. The FIG. 50A graph shows a series of four correlation peaks 1301 (one for each Boztas-A subcode) with a constant autocorrelation response of about −23 dB in the regions 1303 between the correlation peaks 1301. The FIG. 50A graph also shows autocorrelation peaks 1304 of about −12 dB outside of the outer correlation peaks 1301. FIG. 50C is a graph of a cross-correlation response to $Code60_2$ of the same matched filter, showing a maximum cross-correlation value of about −9.5 dB. FIG. 50D is a graph of an autocorrelation response to $Code60_2$ of a matched filter configured for $Code60_2$. The FIG. 50D graph shows a series of four correlation peaks 1305 (one for each Boztas-A subcode) with auto-correlation peaks 1307 of about −9.7 dB therebetween. The FIG. 50D graph further shows smaller autocorrelation peaks 1306 of about −12 dB outside of the outer correlation peaks 1305. FIG. 50B is a graph of a cross-correlation response to $Code60_1$ of the same matched filter, showing a maximum cross-correlation value of about −9.5 dB.

As another example using Boztas-A family codes, two other selected complex Boztas-A codes of length-15 are the following (the last two codes shown in the FIG. 71 table):

Boz3=032131100030231
Boz4=331120012211210

Two new length-60 complex repeated codeword preamble codes (designated $Code60_3$ and $Code60_4$) can be constructed, each comprising a series of four of the same Boztas-A code (Boz3 and Boz4, respectively).

Figure 51A:
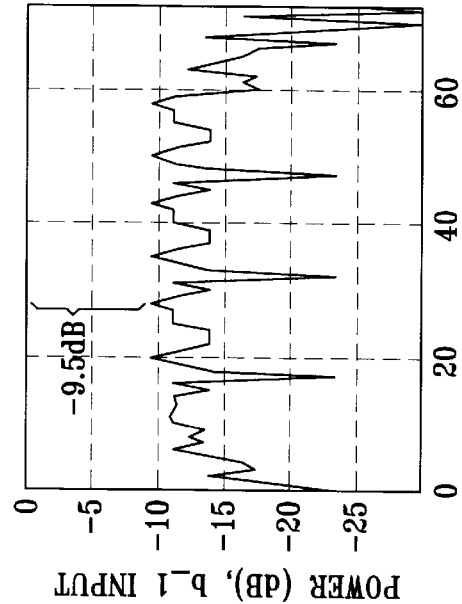
Figure 51B:
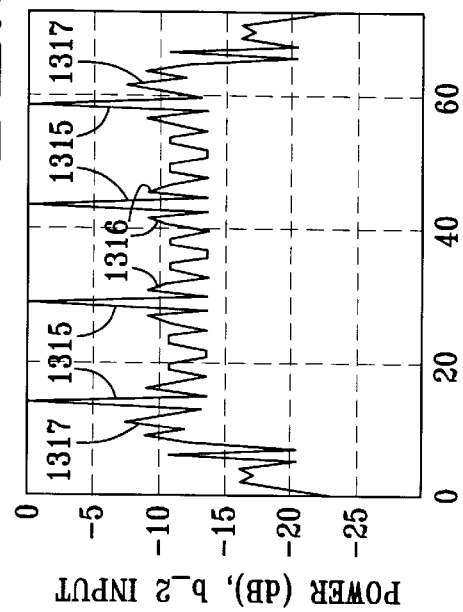
Figure 51C:
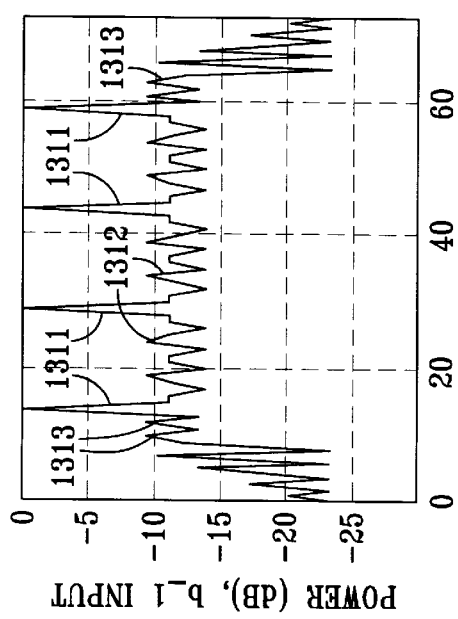
Figure 51D:
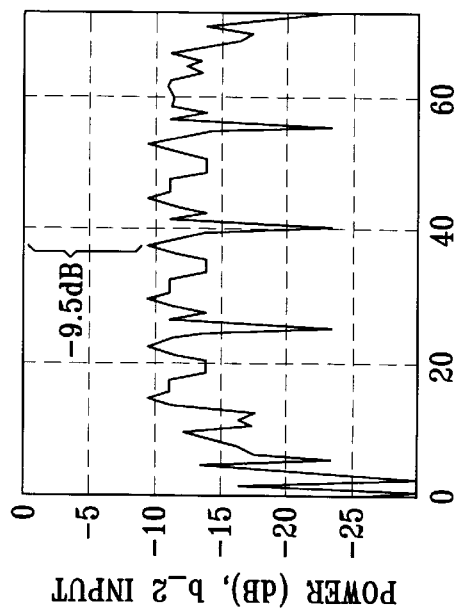

FIGS. 51A–D show the autocorrelation and cross-correlation responses for the matched filters configured for $Code60_3$ and $Code60_4$. FIG. 51A is a graph of an autocorrelation response to $Code60_3$ of a matched filter configured for $Code60_3$. The FIG. 51A graph shows a series of four correlation peaks 1311 (one for each Boztas-A subcode) with a number of smaller autocorrelation peaks 1312 of about −9.6 dB therebetween. The FIG. 51A graph also shows several autocorrelation peaks 1313 of about the same size outside of the outer correlation peaks 1311. FIG. 51C is a graph of a cross-correlation response to $Code60_4$ of the same matched filter, showing a maximum cross-correlation value of about −9.5 dB. FIG. 51D is a graph of an autocorrelation response to $Code60_4$ of a matched filter configured for $Code60_4$. The FIG. 51D graph shows a series of four correlation peaks 1315 (one for each Boztas-A subcode) with auto-correlation peaks 1316 of about −9.6 dB therebetween. The FIG. 51D graph further shows slightly taller autocorrelation peaks 1317 of about −8 dB outside of the outer correlation peaks 1316. FIG. 51B is a graph of a cross-correlation response to $Code60_3$ of the same matched filter, showing a maximum cross-correlation value of about −9.5 dB.

From a worst case autocorrelation and cross-correlation peak value standpoint, the correlation responses shown in FIGS. 50A–D and 51A–D for the Boztas-A family repeated codeword preamble codes are about on par with the responses (as shown in, e.g., FIGS. 40A–D) for the Gold family repeated codeword preamble codes.

Alternatively, each element from a Boztas code may be mapped according to the following Grey mapping operations:

0→[0 0]
1→[1 0]
2→[1 1]
3→[0 1]

Using the above Grey mapping operations, two length-30 binary codes may be obtained from the two previous Boztas-A codes (Boz1 and Boz2) used to generate the graphs of FIGS. 50A–D. These length-30 binary codes appear with their seed values in FIG. 72, and are given as follows:

$Code30_1$=111111110000001100001111001100
$Code30_2$=101010101111001000001001110111

Two length-120 repeated codeword preamble codes (designated $Code120_5$ and $Code120_6$) may be formed from a series of four of the above length-30 binary codes. The repeated codeword preamble code $Code120_5$ is formed from a series of four $Code30_1$ codes, and the repeated codeword preamble code $Code120_6$ is formed from a series of four $Code30_2$ codes.

FIGS. 52A–D show the autocorrelation and cross-correlation responses for the matched filters configured for $Code120_5$ and $Code120_6$. FIG. 52A is a graph of an autocorrelation response to $Code120_5$ of a matched filter configured for $Code120_5$. The FIG. 52A graph shows a series of four correlation peaks 1321 (one for each length-30 binary subcode) with a constant autocorrelation response of about −23 dB in the regions 1323 between the correlation peaks 1321. The FIG. 52A graph also shows auto-correlation peaks 1324 of about −12 dB outside of the outer correlation peaks 1321. FIG. 52C is a graph of a cross-correlation response to $Code120_6$ of the same matched filter, showing a maximum cross-correlation value of about −9.5 dB. FIG. 52D is a graph of an autocorrelation response to $Code120_6$ of a matched filter configured for $Code120_6$. The FIG. 52D graph shows a series of four correlation peaks 1325 (one for each length-30 binary subcode) with auto-correlation peaks 1326 of about −9.7 dB therebetween. The FIG. 52D graph further shows smaller autocorrelation peaks 1327 of about −10.3 dB outside of the outer correlation peaks 1325. FIG. 52B is a graph of a cross-correlation response to $Code120_5$ of the same matched filter, showing a maximum cross-correlation value of about −9.5 dB.

The correlation responses (as depicted in FIGS. 52A–D) to repeated codeword preamble codes comprised of a series of binary codes generated from a Grey mapping of Boztas-A codes is very similar to the correlation responses (as depicted in FIGS. 50A–D) to repeated codeword preamble codes comprised of a series of Boztas-A codes mapped into a complex format.

Longer Boztas-A codes may also be used to generate complex-mapped quadriphase codes with relatively good performance. For example, several length-31 Boztas-A codes appear in the table of FIG. 73. Two length-31 complex Boztas-A codes selected from the FIG. 73 table are the following:

Boz5=1122113312223301310101222030212
Boz6=2222200022022202020000200202200

Two length-62 complex repeated codeword preamble codes (designated $Code62_1$ and $Code62_2$) can be constructed, each comprising a series of two of the same complex Boztas-A code (Boz5 and Boz6, respectively).

Figure 53A:
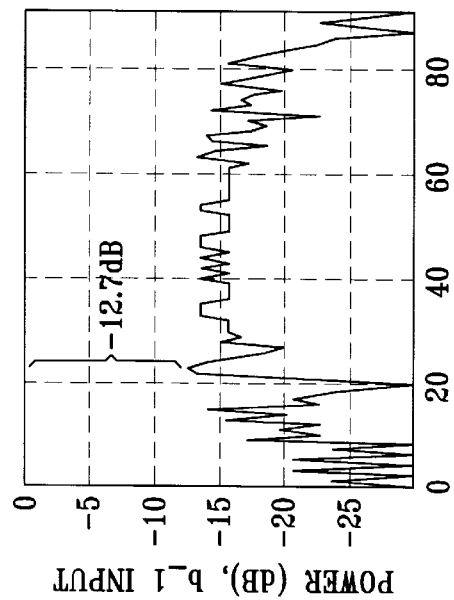
Figure 53B:
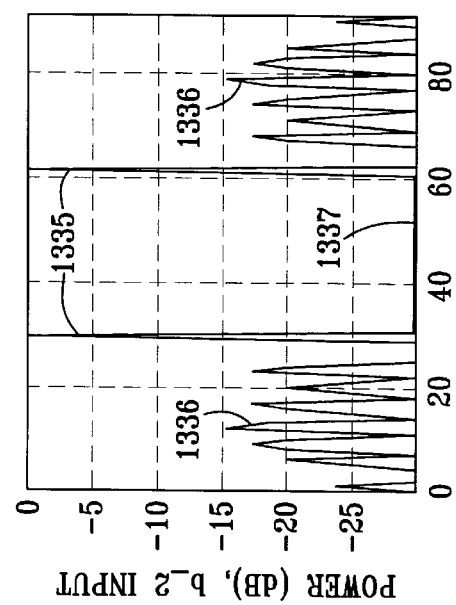
Figure 53C:
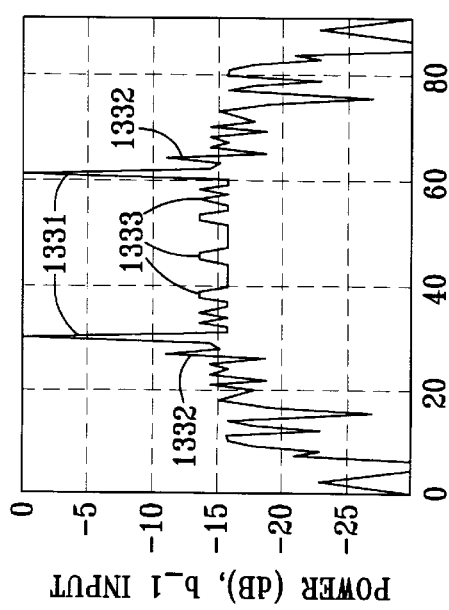
Figure 53D:
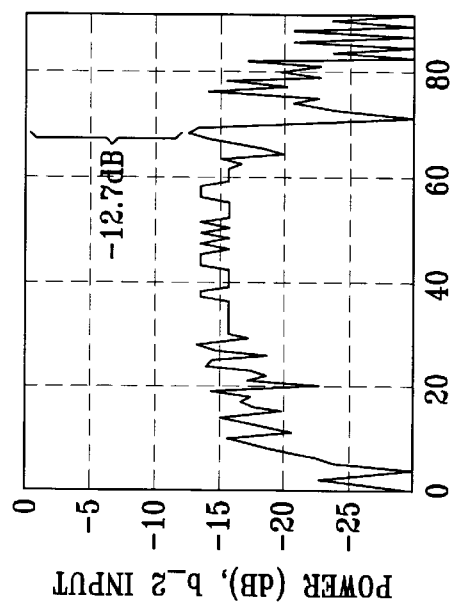

FIGS. 53A–D show the autocorrelation and cross-correlation responses for the matched filters configured for $Code62_1$ and $Code62_2$. FIG. 53A is a graph of an autocorrelation response to $Code62_1$ of a matched filter configured for $Code62_1$. The FIG. 53A graph shows a series of two correlation peaks 1331 (one for each length-31 Boztas-A subcode) with a number of smaller auto-correlation peaks 1333 therebetween. The FIG. 53A graph also shows several autocorrelation peaks 1332 of about −11 dB outside of correlation peaks 1331. FIG. 53C is a graph of a cross-correlation response to $Code62_2$ of the same matched filter, showing a maximum cross-correlation value of about −12.7 dB. FIG. 53D is a graph of an autocorrelation response to $Code62_2$ of a matched filter configured for $Code62_2$. The FIG. 53D graph shows a series of two correlation peaks 1335 (one for each length-31 Boztas-A subcode) with a constant autocorrelation level of about −30 dB in the region 1337 there-between. The FIG. 53D graph further shows taller autocorrelation peaks 1337 of about −16 dB outside of the correlation peaks 1336. FIG. 53B is a graph of a cross-correlation response to $Code62_1$ of the same matched filter, showing a maximum cross-correlation value of about −12.7 dB.

Another example of correlation responses using length-62 repeated Boztas-A codewords for preamble construction appears in FIGS. 54A–D. To generate the graphs of FIGS. 54A–D, the following length-31 Boztas-A code (also taken from the FIG. 73 table) was used in place of the code Boz6 used to generate FIGS. 54C and 54D:

Boz7=0032130033331002112111210120201

Another length-62 complex repeated codeword preamble code (designated $Code62_3$) may be constructed, this time using a series of two of the above Boztas-A codes Boz7, and its correlation tested against the length-62 complex repeated codeword preamble code $Code62_1$ generated from Boztas-A code Bos5.

Figure 54A:
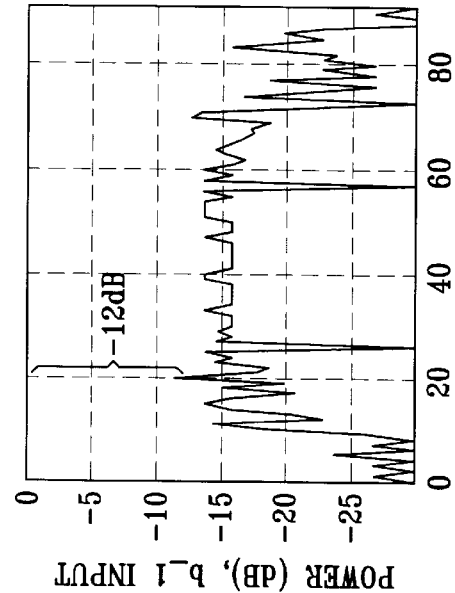
Figure 54B:
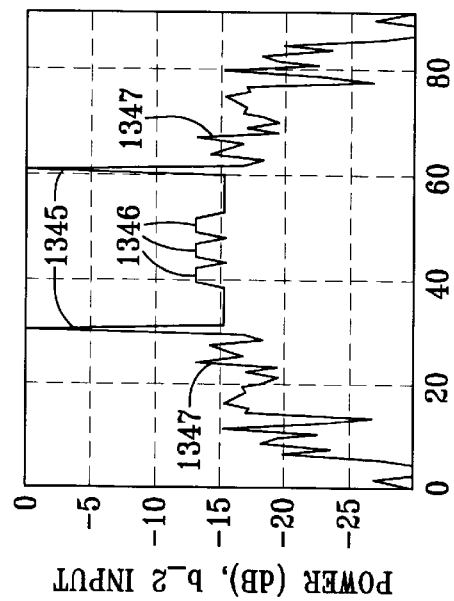
Figure 54C:
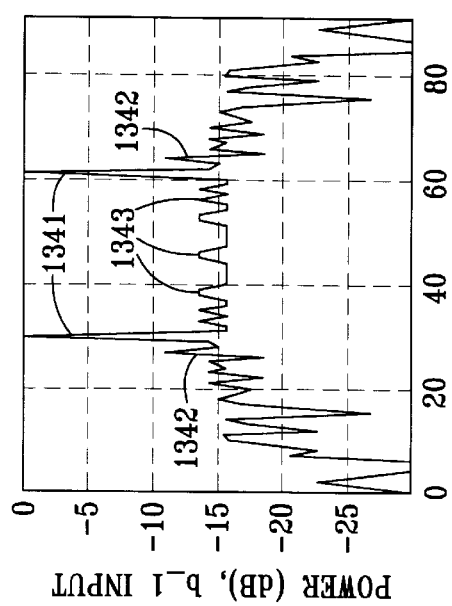
Figure 54D:
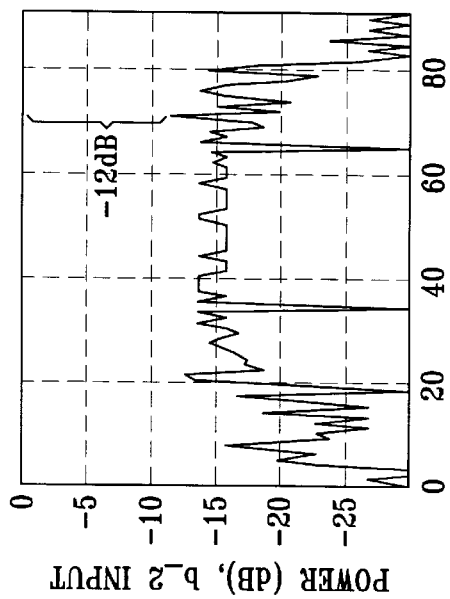

FIGS. 54A–D show the autocorrelation and cross-correlation responses for the matched filters configured for $Code62_1$ and $Code62_3$. FIG. 54A is a graph of an autocorrelation response to $Code62_1$ showing a series of two correlation peaks 1341 and auto-correlation peaks 1333 and 1334, identical to the graph of FIG. 53A. FIG. 54C is a graph of a cross-correlation response to $Code62_3$ of the same matched filter, showing a maximum cross-correlation value of about −12 dB. FIG. 54D is a graph of an autocorrelation response to $Code62_3$ of a matched filter configured for $Code62_3$. The FIG. 54D graph shows a series of two correlation peaks 1345 (one for each Boztas-A subcode) with autocorrelation peaks 1346 of about −13.5 dB therebetween. The FIG. 54D graph further shows auto-correlation peaks 1347 of about the same size outside of the correlation peaks 1346. FIG. 54B is a graph of a cross-correlation response to $Code62_1$ of the same matched filter, showing a maximum cross-correlation value of about −12 dB.

In another aspect of the invention, an alert/confirm detector is used to enhance detection of a repeated codeword preamble code. A repeated codeword preamble code generally tends to be more difficult to detect than non-repeating preamble code of the same length, particularly in a noisy environment. Because failure to detect a preamble code can lead directly to a frame error, it is important to be able to detect a preamble code as accurately as possible. According to a preferred benchmark for reliable communications, a preamble code should be correctly detected with a greater than 99% reliability. At the same time, the receiver should be capable of rejecting noise or interfering signals as non-preamble signal information—in other words, it should avoid generating "false alarms" in response to noise or interference.

Figure 55A:
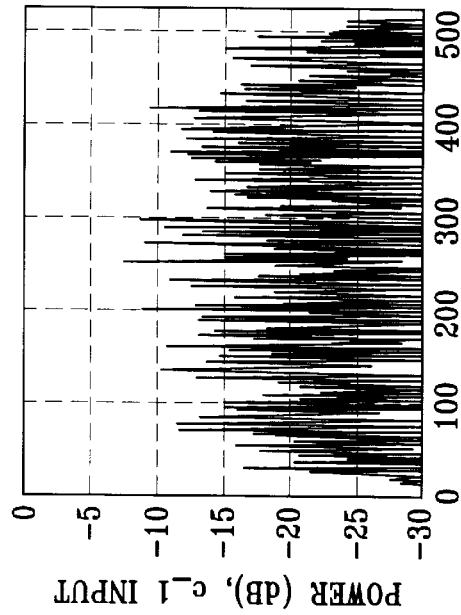
Figure 55B:
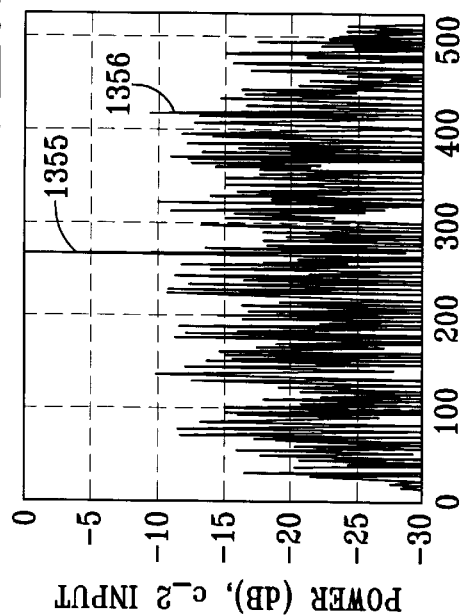
Figure 55C:
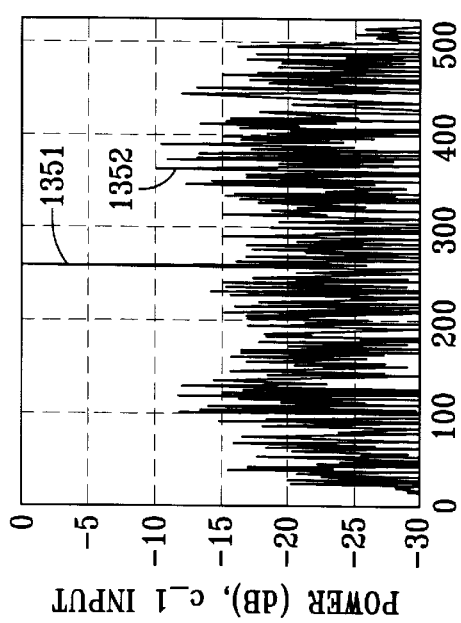
Figure 55D:
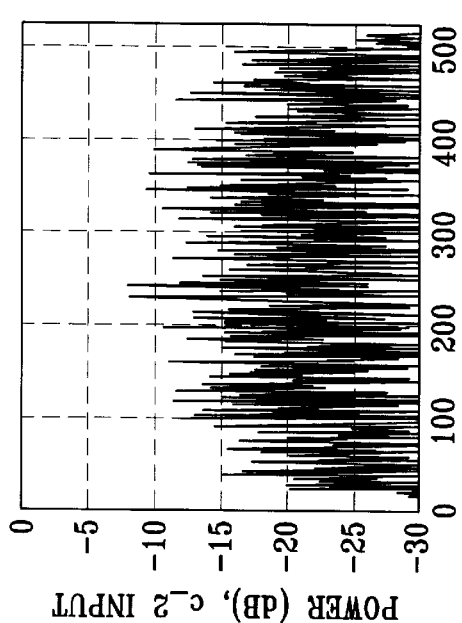

FIGS. 55A–D and 56A–D are graphs comparing correlation responses for a length-128 non-repeating preamble code with a length-120 repeated codeword preamble code, each in the presence of simulated noise and interference. Nominal chip signal-to-noise ratio is assumed to be 2 dB, characteristic of operation near threshold. FIGS. 55A–D show the response of a two-stage mismatched filter correlator (such as the two-stage correlator 980 of FIG. 18) to the preamble codes Code1 and Code2 used in the generation of the graphs of FIGS. 21A–D and 22A–D, but where the received preamble code has been corrupted by Gaussian noise and hard-limited prior to being input to the two-stage correlator. FIG. 55A is a graph of the response to Code1 of a two-stage mismatched filter correlator configured for Code1, showing a correlation peak 1351 with a worst-case autocorrelation peak 1352 of about −10 dB. Likewise, FIG. 55B is a graph of the response to Code2 of a two-stage mismatched filter correlator configured for Code2, showing a correlation peak 1355 with a worst-case autocorrelation peak 1356 of about −9.7 dB. FIGS. 55B and 55C show cross-correlation results, with a worst case cross-correlation level of about −8.4 dB.

FIGS. 56A–D, in contrast, show the response of matched filters configured for the repeated codeword preamble codes Code120$_5$ and Code120$_6$ used in the generation of the graphs of FIGS. 52A–D, also where the received repeated codeword preamble has been corrupted by Gaussian noise and hard-limited prior to being input to the matched filter. Nominal chip signal-to-noise ratio is, as for FIGS. 55A–D, assumed to be 2 dB. FIG. 56A is a graph of the response to Code120$_5$ of a matched filter configured for Code120$_5$, showing a series of four correlation peaks 1361, several of which show degradation from the noise and hardlimiting effects. The discrimination margin is substantially reduced over the case without noise and hardlimiting. Likewise, FIG. 56D is a graph of the response to Code120$_6$ of a matched filter configured for Code120$_6$, showing a series of four correlation peaks 1365, several of which have also been degraded by the noise and hardlimiting effects. FIGS. 56B and 56C show cross-correlation results, with a worst case cross-correlation level of about −4.2 dB, significantly worse than for the single long (non-repeating) preamble code of FIGS. 55A–D.

A detection method for repeated codeword preamble codes preferably enhances resistance to noise and interference. One preferred method of detecting a repeated codeword preamble is to "partition" the repeated codeword preamble code into its constituent subcodes (i.e. codewords) and detect a correlation peak with respect to each constituent subcode. In a particular embodiment of a repeated codeword preamble code detector 1380 shown in FIG. 57, a single matched filter 1382 is utilized to detect the repeated codeword preamble code by partitioning, thereby taking advantage of the preamble code's repetitive nature. In FIG. 57, an input signal 1381 is provided to a subcode matched filter 1382. The input signal 1381 comprises a repeated codeword preamble code 1390 formed from a series of subcodes 1391. The subcode matched filter 1382 is configured to produce a correlation peak in its correlation output signal 1395 when a subcode 1391 with the correct phase is present. As an example, for a length-112 repeated codeword preamble code 1390 comprising four subcodes 1391 of 28 chips each, the subcode matched filter 1382 is configured to match a single subcode 1391 and is therefore 28 chips in length. The subcode matched filter 1382 is connected to an envelope detector 1388, which receives a correlation output signal 1395 and detects the signal envelope thereof. The envelope detector 1388 is connected to a shift register 1396 (or other delay element). The shift register 1396 may be analog or digital in nature. In a preferred embodiment, the shift register 1396 is digital, and analog-to-digital conversion of the input signal occurs prior to correlation by the subcode matched filter 1382. The correlation output signal 1395 in such an embodiment is therefore also a digital signal. A digital shift register implementation may comprise, e.g., an array of flip-flops or, alternatively, a random-access-memory (RAM) array with a memory sub-system including indexing pointers to keep track of relative location in the RAM array.

The shift register 1396 comprises a plurality of delay stages and is, for convenience, measured in units of chips (or chip intervals). If analog-to-digital conversion is carried out prior to match filtering, then shift register 1396 preferably comprises a number of storage locations depending upon the subcode length and the sampling rate. For example, if twice oversampling is used, then the shift register 1396 would comprise two storage locations for each chip in the subcode 1391. The envelope detected signal from envelope detector 1388 propagates along the delay stages of shift register 1396. For a 4-way partitioned preamble code 1390 (i.e., a repeated codeword preamble code comprising four subcodes 1391), an output is taken from four test signal locations 1387a–d along shift register 1396. The test signal locations 1387a–d (each of which holds the signal for a one chip interval) are separated by an amount of chip intervals equal to the subcode length minus one chip interval; this separation amount is implemented by use of delay blocks 1385a–c.

When a repeated codeword preamble code 1390 is received, a plurality of consecutive correlation peaks (i.e., four consecutive correlation peaks in this example) are generated by the subcode matched filter 1382 in response to receiving four consecutive subcodes 1391, and, after propagation along the shift register 1396, the four correlation peaks eventually are located at the test signal locations 1387a–d simultaneously.

To simultaneously detect the four correlation peaks in the test signal locations 1387a–d, further circuitry is provided. Each test signal location 1387a–d is connected to its own threshold comparator 1384a–d, each of which is also connected to a threshold signal 1397 output from a threshold setting circuit 1383. When the signal value at a test signal location 1387 exceeds the threshold signal level, the respective comparator 1384 changes state. An output from each comparator 1384 is connected to a decision block 1389, which outputs a detection signal 1386 according to a detection criterion. For M-of-N detection, M of N comparators 1384 must change state for a preamble code detection to be declared. For example, in a 3-of-4 detection scheme (also referred to as 3-of-4 partitioning), at least three of the four comparators 1384a–d must change state in order for a preamble code detection to be declared (i.e., to make detection signal 1386 change state). In 4-of-4 partitioning, all of the four comparators 1384a–d must change state in order for a preamble code detection to be declared.

As a specific example, where a length-112 repeated codeword preamble code 1390 comprises four subcodes 1391 of 28 chips apiece, four correlation peaks will be output by the subcode matched filter 1382 upon receipt of the preamble code 1390, each correlation peak separated from the next by 28 chip intervals. The delay blocks 1385a–c comprise a delay of 27 chip intervals apiece, so that the correlation peaks will line up in the test signal locations 1387a–d (which are 28 chip intervals apart) simultaneously at some point in time. In this manner, a single relatively short matched filter 1382 is used to detect a much longer preamble code, and, where less than 4-of-4 detection is used, detection may be accomplished in certain cases even when one of the correlation peaks may be degraded due to noise or interference.

In the event that M-of-N detection is used with M<N (e.g., 2-of-4 or 3-of-4 detection), there is some possibility of false synchronization with a timing error generally equal in duration to an integral multiple of the subcode interval. As an example, if 3-of-4 detection criteria is used, there will be a tendency to declare synchronization after only three of the four subcodes have been received into the subcode matched filter 1382, particularly at high signal-to-noise ratio (SNR) levels. An improved preamble detector addressed to this potential problem is shown in FIG. 59 and described in more detail hereinafter.

Figure 59:
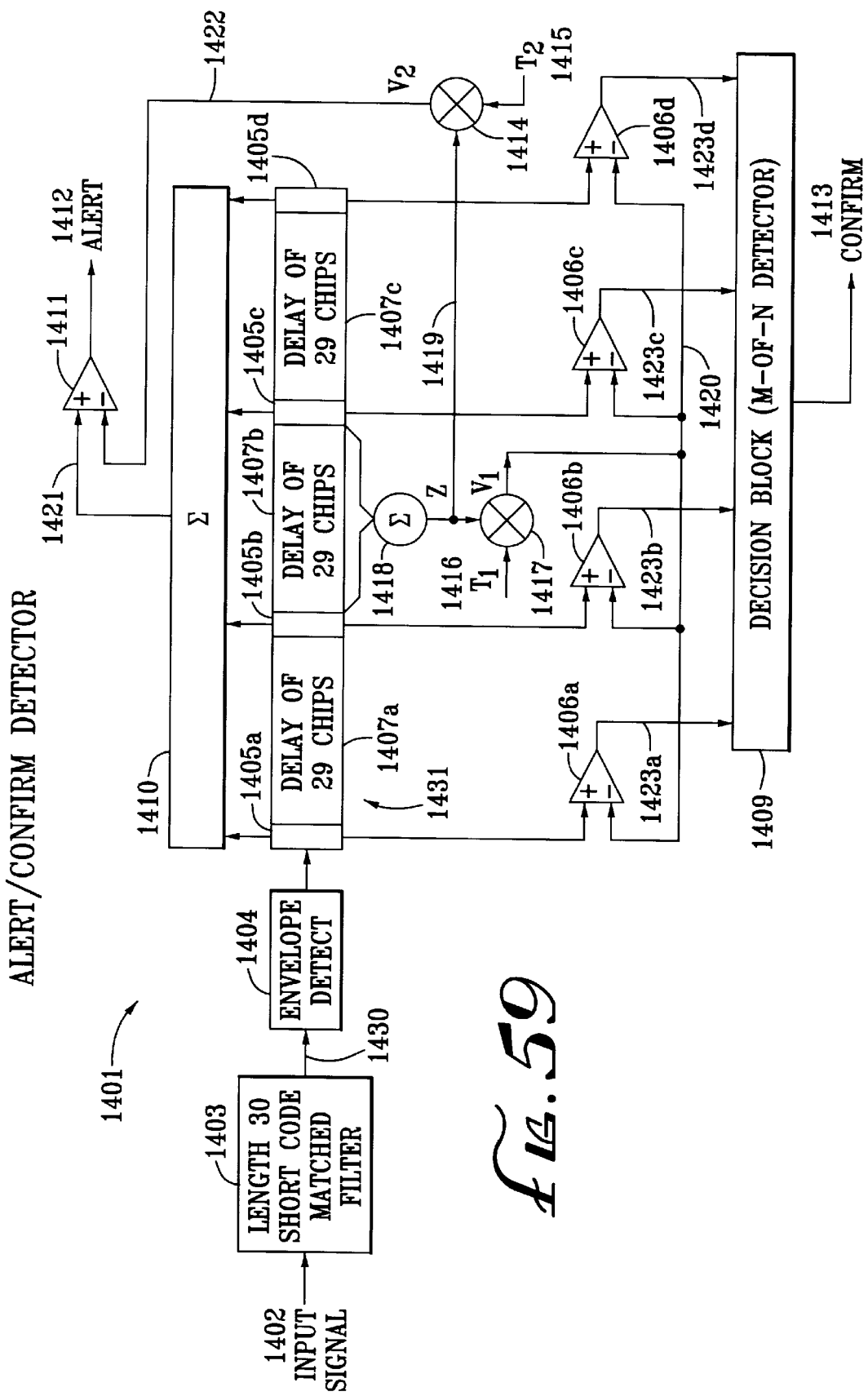
FIG. 59 is a block diagram of a preferred alert/confirm preamble code detector.

As an alternative to using the FIG. 59 preamble detector to address possible false synchronization, a processing scheme may be implemented in the receiver whereby a determination of proper synchronization is made based on a verification check of transmitted data. For example, a cyclic redundancy check (CRC) field (see, e.g., FIGS. 6B and 6C) maybe provided in the message portion of the transmission, and upon obtaining an indication of synchronization from the preamble code detector, a processing thread is initiated on the assumption that the synchronization indication is correct. A checksum is carried out using the CRC field to determine whether or not the sychronization indication was in fact correct. Multiple processing threads may be implemented in parallel, with the correct synchronization being determined by the correct checksum result appearing for the CRC field associated the proper processing thread. The checksum thereby provides a function similar to the confirm function discussed later with respect to FIG. 59. Rather than using a CRC field, the same technique may be applied to block error detection encoding schemes, such as Reed-Solomon encoding schemes.

An alternative to the repeated codeword preamble code detector of FIG. 57 is to use a single matched filter configured to detect the entire repeated codeword preamble code. Such a matched filter will generally be much longer than the subcode matched filter 1382 used in the preamble detector of FIG. 57 which employs a code partitioning technique. For example, to detect a length-112 repeated codeword preamble code with a single matched filter would generally require that the single matched filter be 112 chips in length.

Figure 58A:
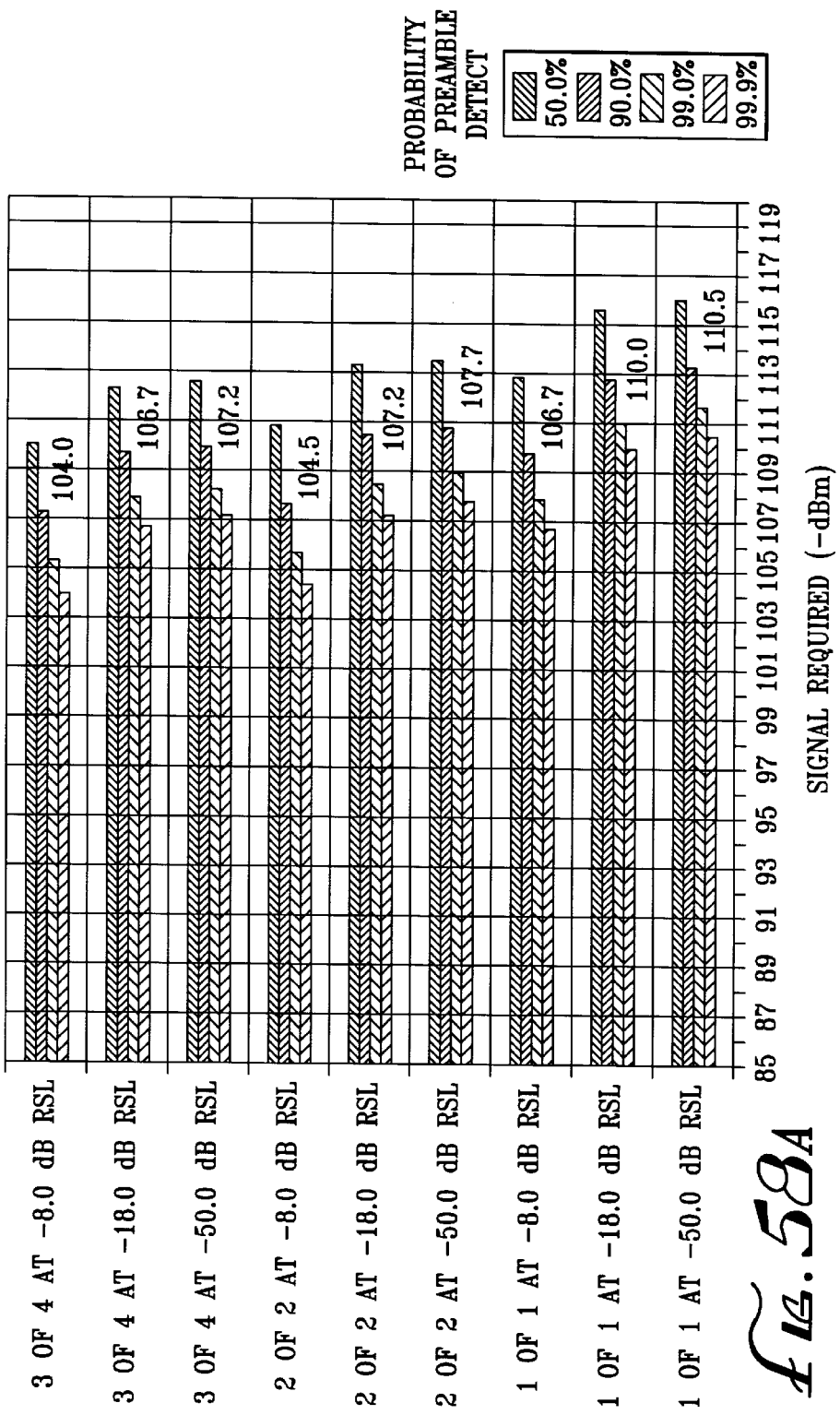
FIGS. 58A and 58B are charts comparing performance of preamble code detection with and without partitioning, for various levels of detection probability and with different false alarm probabilities.
Figure 58B:
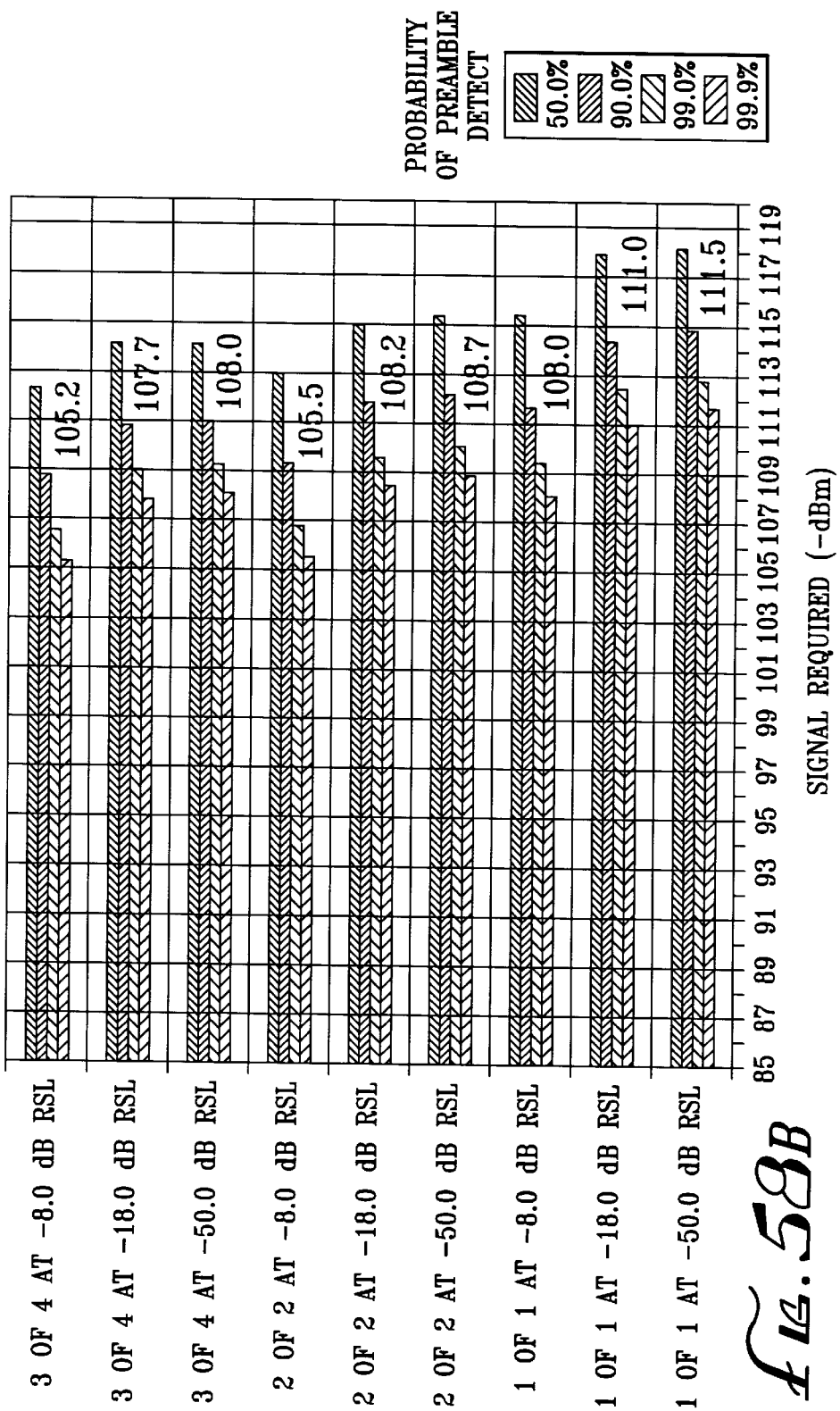

FIGS. 58A and 58B are charts comparing performance of preamble code detection with and without partitioning, for various levels of detection probability, and with different false alarm probabilities. The charts of FIGS. 58A and 58B assume use of a 128-chip preamble code in a preferred 32-ary spread spectrum TDMA communication system such as generally described previously with respect to FIGS. 1–5. The charts of FIGS. 58A and 58B further assume an unfaded environment, a 3 dB noise figure, a 2 dB implementation loss, and a 2.5 MHz chipping rate, resulting in a preamble code detection sensitivity of about −105.7 dBm. A constant false alarm rate (CFAR) loss (i.e., a loss in detectability due to imperfections in the threshold setting mechanism) of 2 dB is assumed. Also, it is assumed for FIGS. 58A and 58B that the receiver is not using antenna diversity.

The FIGS. 58A–B charts show the required signal level (in −dBm) for various preamble code partitioning schemes and for relative sidelobe levels (RSL's). The M-of-N partitioning schemes considered are 3-of-4, 2-of-2, and 1-of-1 (the last of which is simply a non-partitioned, single matched filter case). RSL generally represents the relative strength of the correlation peak to the peak sidelobe and/or interference levels. An RSL of −50 dB typically represents a situation where the correlation peak is compared only against ambient noise. An RSL of −18 dB is typical of an autocorrelation response of a long preamble code in the absence of interference. An RSL of −8 dB might be encountered at 0 dB instantaneous signal-to-interference (C/I) ratio commonly seen in the tail regions of the C/I probability density function. As RSL rises, a high signal level is generally needed to elevate signals out of the thermal noise range so as to permit discrimination between the desired signal and its temporal sidelobes, and cross-correlation peaks from interfering signals.

Different probabilities of false alarm are considered in FIGS. 58A and 58B. The FIG. 58A chart shows the case where the probability of false alarm (PFA) is $10^{-3}$—that is, out Of $10^3$ random noise/interference samples, an erroneous preamble code detection result will occur once from the correlator due to a variety of factors, such as similarities in the random noise pattern with the desired signal and/or imperfections in the threshold setting mechanism. Appropriate threshold levels to achieve a PFA of $10^{-3}$ may be calculated by performing a binomial search of the generalized Marcum's Q function. In FIG. 58A, a minimum required signal strength is shown to achieve a $10^{-3}$ PFA for the various preamble code partition schemes (3-of-4, 2-of-2, and 1-of-1) at various RSL levels (−8 dB RSL, −18 dB RSL, and −50 dB RSL) and for various probabilities of preamble code detection (50%, 90%, 99%, and 99.9%). According to the chart of FIG. 58A, the required signal strength drops for lower RSL's, and also tends to be lower in the absence of partitioning (given equivalent RSL levels). The lowest required signal strength for the combinations considered in FIG. 58A is for a 1-of-1 partitioning scheme (i.e., no partitioning) at −50 dB RSL for a 50% probability of preamble code detection; the highest required signal strength in FIG. 58A is for a 3-of-4 partitioning scheme at −8 dB RSL for a 99.9% probability of preamble code detection.

Assuming a 99% probability of preamble code detection is desired, a required signal strength for a 1-of-1 partitioning scheme at −8 dB RSL, −18 dB RSL and −50 dB RSL, is −106.7 dBm, −110.0 dBm, and −110.5 dBm, respectively, whereas the required signal strength for a 3-of-4 partitioning scheme for the same RSL's is −104.0 dBm, −106.7 dBm, and −107.2 dBm, respectively. Use of a 1-of-1 partitioning scheme (i.e., no partitioning) appears to provide about 3+dB of performance gain over a 3-of-4 partitioned detection scheme.

The FIG. 58B chart shows the case where the allowable PFA is $10^{-2}$, such as may be the case after synchronization has been established so that the expected time window of arrival of the preamble code is known (e.g., according to a time frame structure such as shown in FIGS. 5 and 6A). The FIG. 58B chart shows information similar to the FIG. 58A chart, but indicates an improvement in preamble code detection performance of about 1 to 1.2 dB over the FIG. 58A chart.

According to the charts of FIGS. 58A and 58B, a system using 3-of-4 partitioning with total length 128 could potentially be "preamble limited" in the sense that the preamble code detection has a worse sensitivity than the data detection (assuming a case, for example, where a 7 dB bit-energy-to-noise ($E_b$/No) ratio yields a frame error rate (FER) of $10^{-2}$). For example, for a preamble code detection probability of 99% using 3-of-4 partitioning of the preamble code with a PFA ratio of $10^3$, the preamble code detection process would require signal levels of −104 dBm (at −8 dB RSL) or higher while the data demodulation process may operate adequately at, e.g., −105.7 dBm, resulting in 1 or 2 dB difference in sensitivity. However, using a PFA ratio of $10^2$ instead of $10^3$, the 3-of-4 partitioning preamble code detection scheme offers sensitivity commensurate with the data sensitivity and the system would therefore not be preamble limited. A receiver may be outfitted with thresholds for both $10^{-3}$ and $10^{-2}$ PFA ratios, using the $10^{-3}$ PFA ratio prior to establishing synchronization and the $10^{-2}$ PFA ratio thereafter.

Detection of a repeated codeword preamble code can be improved by use of an alert/confirm preamble code detector, as further described below. A preferred alert/confirm preamble code detector 1401 is shown in FIG. 59 and comprises a subcode matched filter 1403 for receiving an input signal 1402. As with the repeated codeword preamble code detector 1380 of FIG. 57, a single matched filter 1403 is generally utilized to detect the repeated codeword preamble code by partitioning. The particular device shown in the FIG. 58 example, however, is configured to detect a repeated codeword preamble of length-120 rather than length-112; therefore, the subcode matched filter 1403 of FIG. 58 is 30 chips in length (rather than 28 chips), and the length-120 repeated codeword preamble code is comprised of four subcodes of 30 chips each (instead of 28 chips each).

The subcode matched filter 1403 produces a correlation peak when a length-30 subcode is present with correct phase. The subcode matched filter 1403 is, similar to the FIG. 57 preamble code detector, connected to an envelope detector 1404, which receives a correlation output signal 1430 and detects the envelope thereof. The envelope detector 1404 is connected to a multi-stage shift register 1431 (or other delay element). Shift register 1431 is similar to that of the FIG. 57 device, and comprises a plurality of delay stages measured in terms of chips or chip intervals. The envelope detected signal from envelope detector 1404 propagates along shift register 1431. An output is taken from four test signal locations 1405*a–d* (for a 4-way partition) along the shift register 1431. The test signal locations 1405*a–d* (each of which holds the signal for a one-chip interval) are separated by an amount of chip intervals equal to the subcode length minus one chip; this separation amount is implemented using delay blocks 1407*a–c*. When a repeated codeword preamble code is received, four consecutive correlation peaks are generated by the subcode matched filter 1403 from receiving the four consecutive subcodes of the repeated codeword preamble code, resulting in four correlation peaks being simultaneously located in the test signal locations 1405*a–d*.

To simultaneously detect the four correlation peaks in test signal locations 1405*a–d*, additional circuitry is provided, similar to FIG. 57, but with the addition of an "alert" function responsive to total measured correlation energy at the four test signal locations 1405*a–d*, and of a variable threshold setting mechanism responsive to a measured background noise and interference level. Similar to FIG. 57, each test signal location 1405*a–d* is connected to an individual threshold comparator 1406*a–d*, each of which is also connected to a threshold signal 1420. The threshold signal 1420 is dynamically varied, as explained further below, in response to a measured background noise level. When the signal level at a test signal location 1405 exceeds the threshold signal level, the respective comparator 1406 changes state. An output from each comparator 1406*a–d* is connected to a decision block, which outputs a confirm signal 1413 according to a decision criterion. In 3-of-4 detection, at least three of the four comparators 1406*a–d* must change state in order for the confirm signal 1413 to indicate a detected preamble code. In 4-of-4 detection, all four of the comparators 1406*a–d* must change state in order for the confirm signal 1413 to indicate a detected preamble code.

Figure 59A:
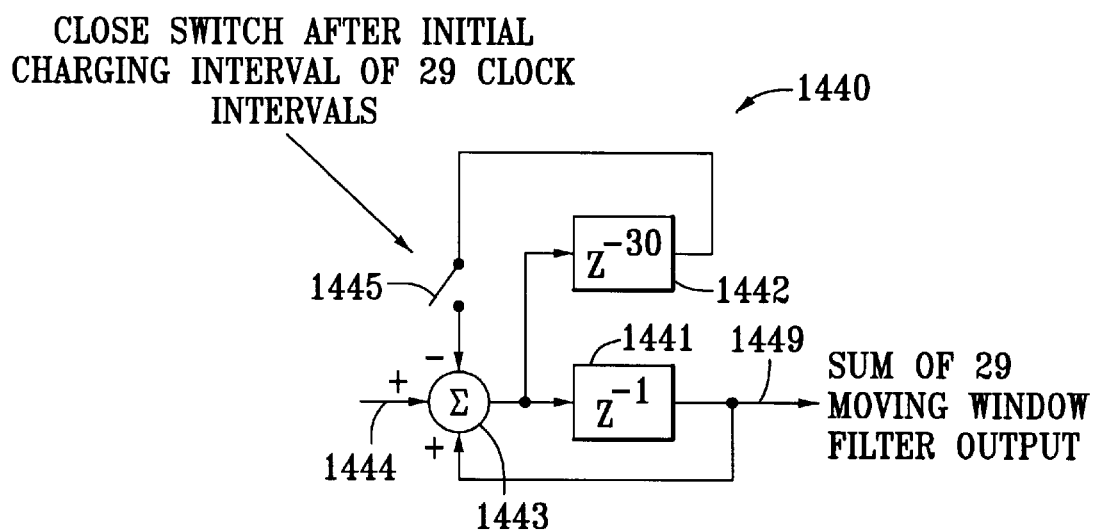
FIG. 59A is a block diagram of a preferred moving average filter for use in the FIG. 59 preamble code detector.

The threshold signal 1420 connected to comparators 1406*a–d* is derived dynamically according to a representative sample of the correlation output signal envelope. A plurality of correlation envelope values from chip interval locations along shift register 1431 are connected to a summer 1418. For example, taps from 29 chip interval locations along the second delay block 1407*b* may be connected to summer 1418; however, any suitable number of taps from the delay block(s) 1407*a–c* may be used. Summer 1418 (preferably comprising a moving average filter such as shown in FIG. 59A) outputs a summation signal 1419 generally comprising an average sidelobe energy level (and is therefore sometimes referred to herein as an average sidelobe energy signal). Summer 1418 is connected to a multiplier 1417, which has another input connected to a predefined threshold constant signal 1416 having a threshold constant of $T_1$. Multiplier 1417 multiplies its inputs to arrive at threshold signal 1420. The threshold signal 1420 thereby varies dynamically as a function of average sidelobe energy (including noise and interfering signal energy), and tends to drop in relative signal level precisely at the preamble code detection point because the correlation peaks move into the test signal locations 1405*b* and 1405*c* at that instant, removing their relatively high energy levels from the averaging filter (i.e., summer 1418).

It is preferred that summer 1418 draws its inputs from one or more complete delay stages 1407*a–c* (and not including the test signal locations 1405*a–d*), so that the sudden drop in the threshold signal 1420 level is effectuated precisely when the correlation peaks are being tested in the test signal locations 1405*a–d*, and at no other time. It is also preferred that the summer 1418 draw its inputs from the center delay stage 1407*b*, so as to provide optimal performance where interference conditions change.

In another aspect of the FIG. 59 preamble code detector, an alert signal 1412 is generated according to measured correlation output energy in the test signal locations 1405*a–d*. The test signal locations 1405*a–d* are connected to another summer 1410, which adds its inputs and generates a summed energy signal 1421 which indicates the total correlation output energy in the test signal locations 1405*a–d*. When the correlation peaks line up in the test signal locations 1405*a–d*, the summed energy signal 1421 level is at a maximum. The summed energy signal 1421 is compared against a threshold signal 1422. The threshold signal 1422 is derived from the average sidelobe energy signal 1419 output from summer 1418, and from a predefined threshold constant signal 1415 having a threshold constant of $T_2$. The average sidelobe energy signal 1419 and threshold constant signal 1415 are multiplied together by multiplier 1414 to arrive at threshold signal 1422. Threshold signal 1422 thereby varies, similar to threshold signal 1420, according to average background noise and interference level, and drops suddenly when the correlation peaks are in the test signal locations 1405*a–d*. Because threshold constants $T_1$ and $T_2$ can be (and preferably are) set to different values, threshold signals 1420 and 1422 can be different from one another.

The function of the alert signal 1412 is to "alert" the preamble code detector 1401 to the possibility, based on total measured energy in the test signal locations 1405*a–d*, that a repeated codeword preamble code may be present, while the function of the confirm signal 1413 is to "confirm" that enough correlation peaks (e.g., 3 of 4, or 4 of 4) of sufficient size are present in the test signal locations 1405*a–d*, thereby confirming the correlation pattern as corresponding to a repeated codeword preamble code. The alert signal 1412 rejects "false alarms" by ensuring that the total correlation peak energy is sufficiently greater than the average background noise and interference level. When both the alert signal 1412 output and confirm signal 1413 output are true, the preamble code detector 1401 declares that a repeated codeword preamble code has been detected.

As an example, given a length-120 repeated codeword preamble code comprising four subcodes of 30 chips apiece, four correlation peaks will be output by the subcode matched filter 1403 upon receipt of the repeated codeword preamble code, each correlation peak separated from the next by an interval of 30 chips. The delay blocks 1407*a–c* separating the test signal locations 1405*a–d* are 29 chip intervals each in length, so that the correlation peaks will line up in the test signal locations 1405*a–d* simultaneously at some point in time. When the correlation peaks are so lined up, the summed energy signal 1421 level will exceed threshold signal 1422, and the alert signal 1412 output will be true. Likewise, each of the comparators 1406*a–d* (assuming 4-of-4 partitioning) will indicate that threshold signal 1420 has been exceeded by the signal levels in the respective test signal locations 1405a–d, and the decision block 1409 (e.g., an M-of-N detector) will cause the confirm signal 1413 to be true. When both the alert signal 1412 output and confirm signal 1413 output are true, as noted, a valid repeated codeword preamble code is detected.

Because both the alert and confirm functions must be true to declare a valid received preamble code, the threshold signal 1420 used for the confirm function can be set (by using threshold constant $T_1$) relatively low to allow better detection at low signal levels. With a low threshold signal 1420 value, however, more "false alarms" are likely to be detected by the decision block 1409. The alert function helps ensure that such false alarms are not erroneously identified as valid preamble codes, by requiring that the total correlation energy in the test signal locations 1405a–d (which hold the four correlation peaks if a repeated codeword preamble code has actually been received) be greater than the average background noise/interference and sidelobe energy level.

The effect of the alert/confirm preamble code detector 1401 of FIG. 59 is to non-coherently add individual correlation spikes to detect a repeated codeword preamble code. The preamble code detection is accomplished using a single subcode matched filter 1403 rather than a single long matched filter configured for the total preamble code length.

Exemplary signal outputs in accordance with the FIG. 59 alert/confirm preamble code detector 1401 are shown in FIGS. 60A–D, 61A–D and 62A–D. FIGS. 60A–D depict the summed energy signal 1421 output level from summer 1410 for two different repeated codeword preamble codes (along with noise), using two different preamble detector configurations. The chip-energy-to-noise ($E_c$/No) ratio for the graphs of FIGS. 60A–D is 2 dB, assuming hardlimiting of the input signal to the matched filter. The two repeated codeword preamble codes are Code120$_5$ and Code120$_6$ (used to generate the graphs of FIGS. 52A–D), each formed, as noted previously, from a series of four of the length-30 binary subcodes Code30$_1$ or Code30$_2$. FIGS. 60A and 60B depict the summed energy signal 1421 for an alert/confirm preamble code detector 1401 wherein subcode matched filter 1403 is configured to detect Code30$_1$. The summed energy signal 1421 in response to the receipt of Code120$_5$ (which is comprised solely of four Code30$_1$ subcodes) is shown in FIG. 60A, which depicts a series of energy spikes 1451 associated with the instants in time when some or all of the correlation peaks are in the test chip locations 1405a–d. The energy spikes 1451 gradually increase as more correlation peaks are generated, until all four correlation peaks are located in the test signal locations 1405a–d (at which point the maximum summed energy is generated), and thereafter decrease as the correlation peaks propagate through the shift register 1431 while no new correlation peaks are generated. Given proper preamble code selection, the summed energy signal 1421 output level tends to "quiet" between energy spikes 1451.

The confirm function determines which (if any) of the multiple energy spikes 1451 corresponds to an actual received repeated codeword preamble code. The confirm function performs this selection process, as noted, by testing each of the test signal locations 1405a–d to make sure most or all of them exceed a dynamically generated threshold.

Figure 61A:
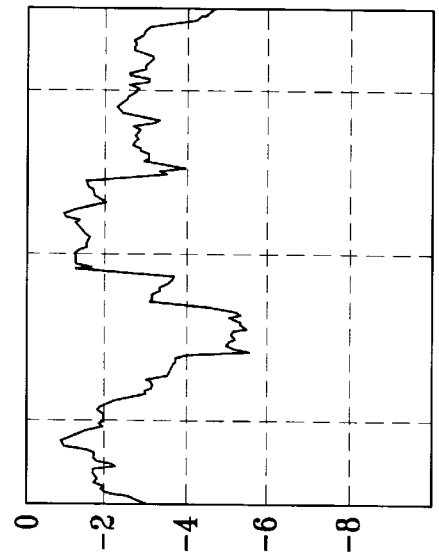
Figure 61B:
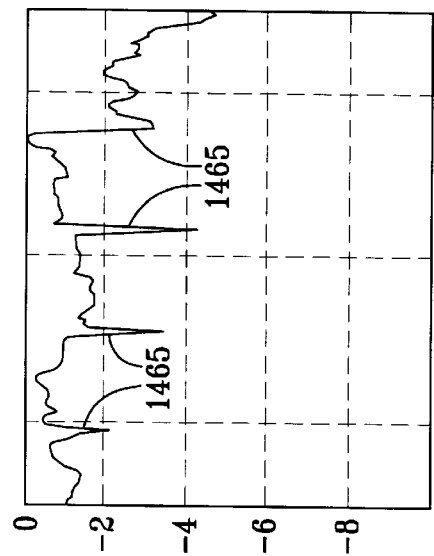

FIGS. 61A–D depict the average sidelobe energy signal 1419 level output from summer 1418. The average sidelobe energy signal 1419, as noted, determines the threshold signal levels based on the preselected threshold constants. FIGS. 61A and 61B depict the average sidelobe energy signal 1419 level for an alert/confirm preamble code detector 1401 wherein subcode matched filter 1403 is configured to detect Code30$_1$. The average sidelobe energy signal 1421 in response to the receipt of Code30$_1$ is shown in FIG. 61A, which depicts a series of inverse spikes 1461 associated with the instants in time when some or all of the correlation peaks are in the test signal locations 1405a–d. The inverse spikes 1461 cause a sudden drop in threshold signals 1420 and 1422, assisting in detection of the received preamble code by lowering the thresholds required for the alert and confirm functions. The average sidelobe energy signal 1419 as depicted in FIG. 61A drops for about one chip interval when a correlation peak leaves the delay block 1407b and thereby removes its relatively high energy from the summed energy, and increases after the one more chip interval as the next correlation peak enters the delay block 1407b, thereby contributing its relatively high energy level to the summed energy.

Figure 61C:
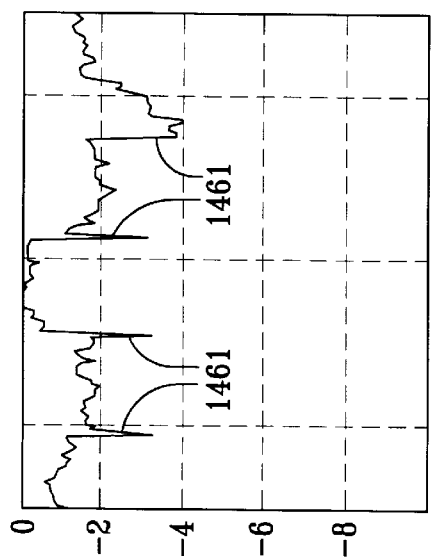

FIGS. 60C and 61C compare the responses of the summed energy signal 1421 output level from summer 1410 and the average sidelobe energy signal 1419 level, respectively, of the same alert/confirm preamble code detector 1401 upon receipt of a different repeated codeword preamble code, Code120$_6$. FIG. 60C does not show energy spikes similar to those of FIG. 60A (which shows the situation when the correct repeated codeword preamble code is received), nor does FIG. 61C show the inverse spikes associated with threshold level reductions such as would occur when the correct preamble code is received, as is instead shown in FIG. 61A.

Figure 61D:
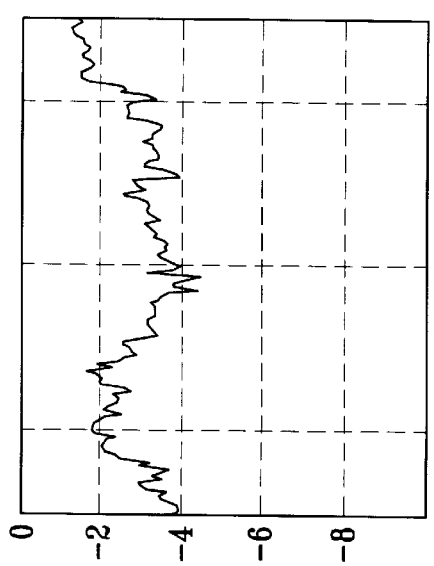

In an analogous fashion, FIGS. 60B and 60D depict the summed energy signal 1421 for alert/confirm preamble code detector 1401 wherein subcode matched filter 1403 is configured to detect Code30$_2$. The summed energy signal 1421 in response to the receipt of Code 1206 (comprised solely of four Code30$_2$ subcodes) is shown in FIG. 60D, which depicts a series of energy spikes 1455, similar to FIG. 60A, associated with the instants in time when some or all of the correlation peaks are in the test signal locations 1405a–d. FIG. 60B contrasts the response to a different repeated codeword preamble code, Code120$_5$ (comprised solely of four Code30$_1$ subcodes instead of four Code30$_2$ subcodes), and shows no similar energy spikes. FIGS. 61B and 61D depict the average sidelobe energy signal 1419 level for the same preamble code detector configuration. The average sidelobe energy signal 1421 in response to the receipt of Code120$_6$ is shown in FIG. 61D, which, like FIG. 61A, depicts a series of inverse spikes 1465 associated with the instants in time when some or all of the correlation peaks are in the test signal locations 1405a–d. FIG. 61B shows the response of the average sidelobe energy signal 1419 level to the same repeated codeword preamble code, Code120$_6$, and does not have the same type of inverse spikes associated with threshold level reductions such as would occur when the correct repeated codeword preamble code is received, as is instead shown in FIG. 61D.

Based on the graphs of FIGS. 60A–D and 61A–D, the alert/confirm preamble code detector 1401 of FIG. 59 strongly rejects incorrect preamble codes (as well as other codes, noise and other types of interference), while at the same time boosting recognition capability of the correct repeated codeword preamble code.

Figure 62A:
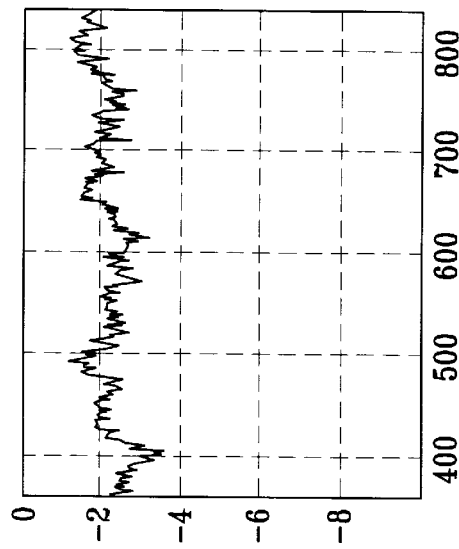
Figure 62B:
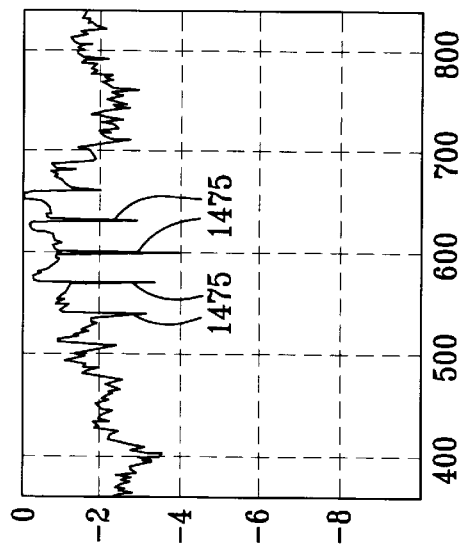
Figure 62C:
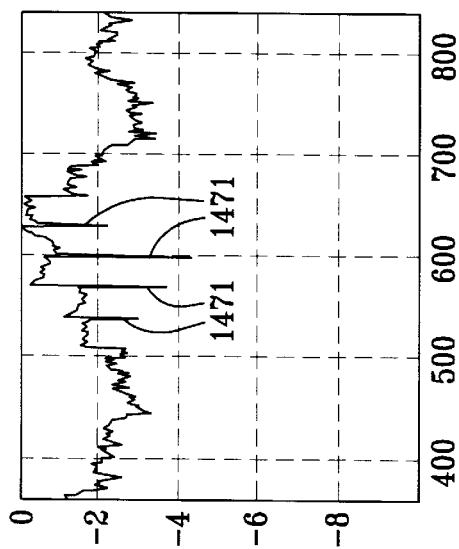
Figure 62D:
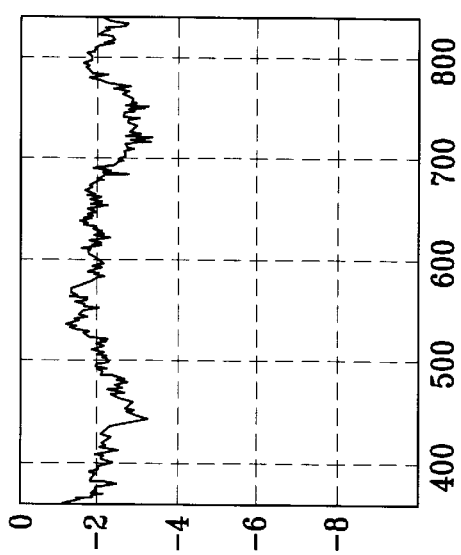

The graphs of FIGS. 62A–D correspond to the graphs of FIGS. 61A–D having the same sub-part (i.e., FIG. 62A corresponds to FIG. 61A), and show the situation where summer 1418 is connected to all three delay blocks 1407a–c so as to sample the correlation energy over a wider interval. In such a case, the threshold constants should be reduced by about a factor of three (as the correlation energy sample is three times larger). The graphs of FIGS. 62A and 62D show even more pronounced inverse spikes 1471 and 1475 than those shown in FIGS. 61A and 61D, and hence lead to improved discrimination between preamble codes.

In a preferred embodiment, the summer 1418 (i.e., averaging filter) in FIG. 59 is implemented in a manner so as to require only two arithmetic operations—a single addition operation and a single subtraction operation. During each clock cycle a single "new" chip value (leaving from test chip location 1405*b*) is added to an accumulated total, and a single "old" chip value (entering test chip location 1405*c*) is subtracted from the accumulated total, so that a running accumulated total is maintained without having to re-add all 29 chips each clock cycle. To implement this procedure, the shift register 1431 portion preceding the delay block 1407*b* is preferably pre-set with appropriate signal values, and a suitable initial "accumulated" value is pre-selected so as to ensure that the output of summer 1418 (and therefore the threshold signals 1420 and 1422) are large enough to prevent false detections at initial operation.

A preferred moving average filter for use in the FIG. 59 embodiment is depicted in FIG. 59A. In FIG. 59A, a moving average filter 1440 comprises a summer 1443 and two digital delay blocks 1441, 1442. The first digital delay block 1441 has a one-chip delay interval, and the second digital delay block 1442 has a 30-chip delay interval. The first digital delay block 1441 and second digital delay block 1442 both receive their respective inputs from the output of summer 1443. Both digital delay blocks 1441, 1442 feed back to inputs of the summer 1443, with a switch 1445 located along the feedback path of the second digital delay block 1442. The summer 1443 also receives an input signal 1444 from shift register 1431 (preferably from the output of the first delay block 1407*a* in the shift register 1431).

In operation, the moving average filter 1440 receives the envelope detected output of matched filter 1403 (delayed by delay block 1407*a*) from input signal 1444. The envelope detected signal is accumulated first by the operation of the summer 1443 and the first digital delay block 1441 while switch 1445 is open, during an initial charging interval of 29 chip intervals (as measured by, e.g., a local clock) so as to provide a suitable threshold for initial operation of the preamble code detector. After 29 chip intervals, switch 1445 closes and the moving average filter 1440 thereafter operates to keep a running average of the energy in the portion of the envelope detected correlation output signal corresponding to delay block 1407*b*. The moving average filter 1440 accomplishes this by adding the energy for the current chip interval from input signal 1444 to the total energy for the previous 29 chips from output signal 1449, while at the same time subtracting the energy for the 30th previous chip interval. The energy for the 30th previous chip interval is output from the second digital delay block 1442, which, as noted, stores energy from the envelope detected correlation signal output for 30 chip intervals.

The moving average filter 1440 of FIG. 59A performs only a single addition and single subtraction operation each chip cycle. The moving average filter 1440 outputs a signal 1449 which comprises the sum of the energy of the envelope detected correlation signal output for the 29 chip window corresponding to the second delay block 1407*a* in FIG. 59.

Sensitivity comparisons for a concatenated preamble code detected with a two-stage mismatched filter correlator (such as that of FIG. 18) versus a repeated codeword preamble code detected with an alert/confirm detector (such as that of FIG. 59) may be evaluated using the Generalized Marcum's Q function. The Generalized Marcum's Q function describes detection probabilities for linear sum of square-law envelope (although linear sum of linear-law or log-law envelopes are preferred as offering slightly better detection performance in a cluttered environment). A description of probability detection using the Generalized Marcum Q-function may be found in, e.g., D. Shnidman, "The Calculation of the Probability of Detection and the Generalized Marcum Q-Function," *IEEE Transactions on Information Theory*, Vol. 35, No. 2 (March 1989), pages 389–399, and in J. Bird, "Calculating the Performance of Linear and Square-Law Detectors," *IEEE Transactions on Aerospace and Electronic Systems*, Vol. 31, No. 1 (January 1995), pages 39–50, each of which is incorporated herein by reference as if set forth fully herein. No admission regarding the possible prior art effect of the latter article (or any other publication referred to herein) is made by citation thereto.

Figure 63A:
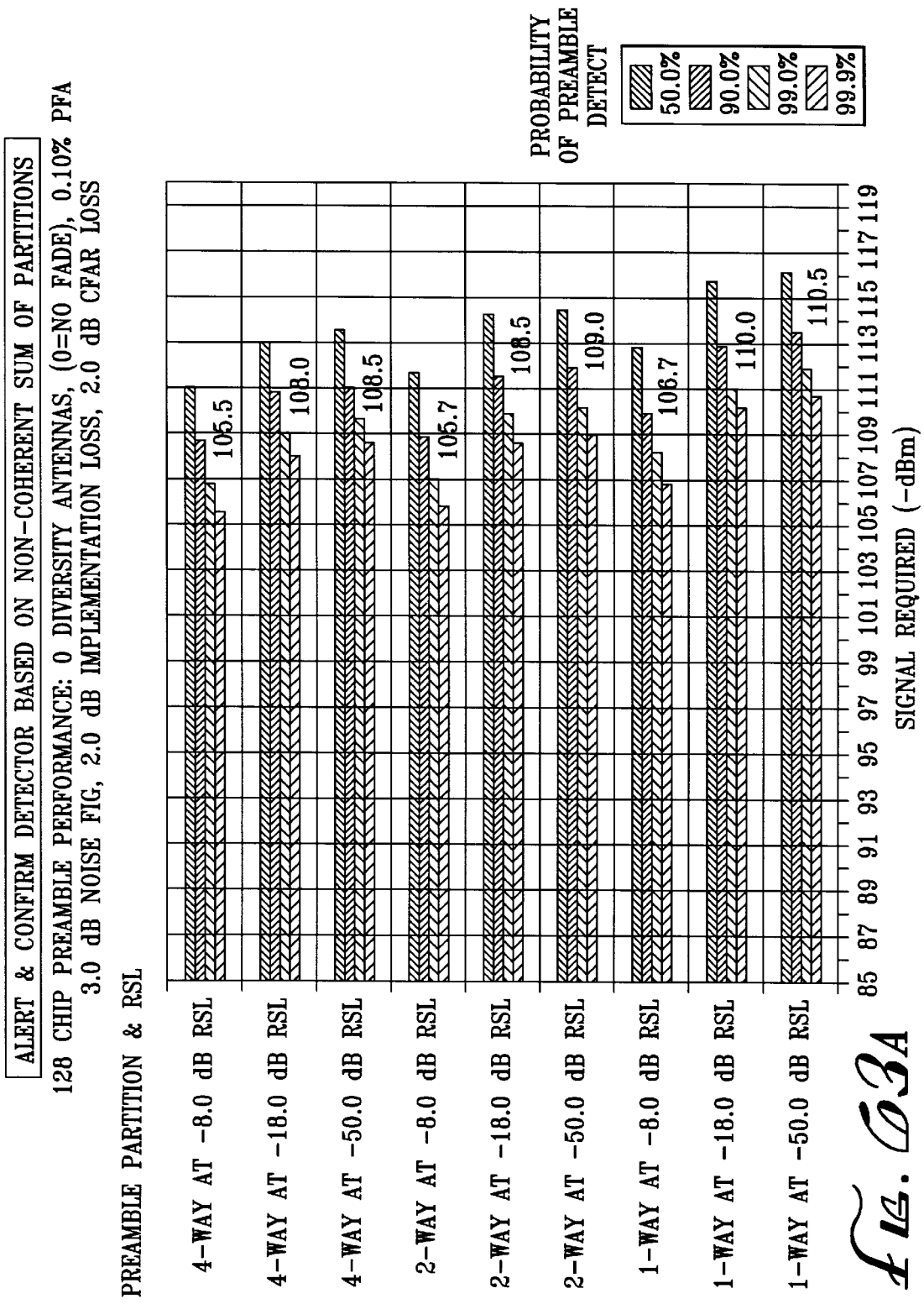
FIGS. 63A and 63B are charts comparing expected preamble code detection sensitivities with and without partitioning, for various levels of detection probability and with different false alarm probabilities, based on evaluation of a Generalized Marcum's Q function.
Figure 63B:
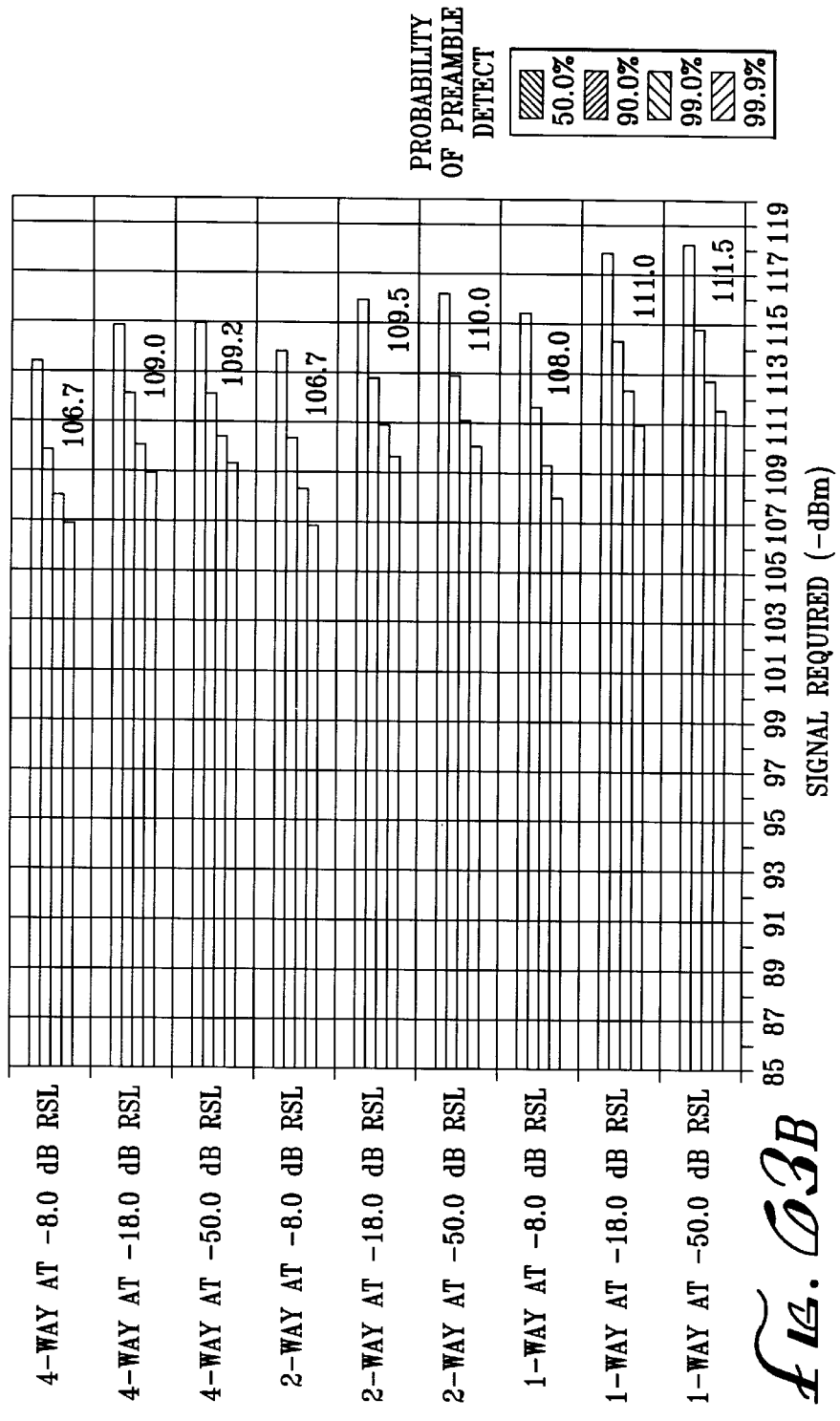

FIGS. 63A and 63B are charts similar to those of FIGS. 58A–B showing expected sensitivities based on evaluation of a Generalized Marcum's Q function for the two-stage mismatched filter correlator of FIG. 18 and the alert/confirm preamble code detector of FIG. 59. Both FIGS. 63A and 63B assume use of a 128-chip preamble code in a preferred 32-ary spread spectrum TDMA communication system such as generally described previously with respect to FIGS. 1–5, and further assume a required bit-energy-to-noise ratio (Eb/No) of about 7 dB, a noise figure of about 3 dB, and implementation loss of about 2 dB, a 2.5 MHz chipping rate, a CFAR loss of 2 dB, and no antenna diversity. The FIG. 63A–B charts show the required signal level (in –dBm) for various preamble partitioning schemes and RSL's. The M-of-N partitioning schemes considered are 4-of-4 ("4-way") and 2-of-2 ("2-way") for the alert/confirm preamble code detector, while 1-of-1 ("1-way") "partitioning" indicates detection with the two-stage mismatched filter correlator of FIG. 18. RSL levels considered are –8 dB, –18 dB, and –50 dB. The bar graphs in FIGS. 63A and 63B show required signal level (in –dBm) for preamble code detection probabilities of 50%, 90%, 99% and 99.9%; numbers (in –dBm) are provided next to the bar graphs for the 99% preamble code detection probability case.

The FIG. 63A chart is constructed according to a PFA ratio of 0.1% (i.e., $10^{-3}$), while the FIG. 63B chart is constructed according to a PFA ratio of 1% (i.e., $10^{-2}$). The FIG. 63A graph shows only about a 1.2 to 2 dB difference between the 4-way or 2-way partitioning detection method as compared with the 1-way partitioning method. The FIG. 63B graph shows similar results. Given that the 1-way partitioning with a two-stage mismatched filter correlator has about a 1 dB processing gain loss due to the mismatched filter, performance is about comparable for the two-stage mismatched filter correlator and the alert/confirm preamble code detector. In either case, preamble sensitivities are well-matched to expected data waveform sensitivity of about –105.7 dBm in an unfaded environment. Accounting for the possibility that the alert/confirm preamble code detector using 4-way partitioning may have lower CFAR losses, it may in some cases outperform the two-stage mismatched filter correlator. As a further consideration, the alert/confirm preamble code detector is generally easier to implement than the two-stage mismatched filter correlator because the subcode matched filter of the former is significantly smaller than the two filter stages (mismatched and matched) in the two-stage mismatched filter correlator.

In a situation where fading occurs in the communication channel, the question of how well the preamble code is matched to the data portion of the waveform from a sensitivity standpoint is largely dependent on how the data portion of the waveform is demodulated, including the availability of antenna diversity. The effect of fading and antenna diversity is discussed below with respect to FIGS. 64 and 65, after the following description of a preferred antenna selection scheme within the context of the preferred communication system of FIGS. 1–5.

In a preferred embodiment the base station 104 includes a plurality of antennas, each of which simultaneously receives the user station transmission 430. Circuitry in the base station 104 is provided for selecting the "best" antenna or antennas for communicating with each user station 102 in communication with the base station 104. In one embodiment, each antenna is connected to an individual receiver which analyzes the quality of the received user station transmission 430 and provides quality metrics to a processor in the base station 104. The base station 104 compares the quality metrics produced by each receiver and selects the antenna receiver receiving the highest quality data detected. In addition to being used to select the antenna receiving the highest quality signal, the metrics from the selected receiver output signal also provide a metric for characterization of the quality of the communication link between the base station 104 and the user station 102.

Similarly, when the base station 104 transmits a base station transmission 440 to a particular user station 102 during a particular time slot, circuitry is preferably provided for selecting the best base station antenna for transmission. An antenna (or antennas) and a transmission power level are preferably selected to match the characteristics of the transmission channel from the base station 104 to the user station 102.

In one aspect of the presently preferred communication protocol shown in FIG. 5, the same frequency is used for the base station transmissions 440 and the corresponding user station transmissions 430. Over the duration of a given period of time (e.g., a time slot 410), the characteristics of the communication channel for a base station transmission 440 to a particular user station 102 are similar for a user station transmission 430 from that particular user station 102 to the base station 104. However, the channel characteristics vary with time, especially where a user station 102 is mobile. In systems employing TDD technologies deployed in areas with multi-path signal propagation problems and/or mobile communication systems during the time period of the polling loop, the quality metrics derived from a user station transmission 430 in a particular time slot may not be accurate in estimating the characteristics of a subsequent base station transmission channel, particularly where the base station transmission 440 occurs in the same time slot location but in a subsequent polling loop. In other words, the latency of the quality metrics derived from a user station transmission 430 is only accurate for a certain time period depending upon, for example, the geographical area in which the system is deployed and, more importantly, the user station's velocity (where mobile).

As an example, where the base station 104 transmits information prior to the user station 102 in a particular time slot and the polling loop has a duration of 20 milliseconds, if the base station transmission in response to a user station in that same time slot on an antenna based upon the user station's quality metrics is delayed for the full period of the loop, performance may suffer in certain environments because the channel characteristics from the time the base station 104 receives the user station transmission 430 and the time the base station 104 sends the base station transmission 440 twenty milliseconds later will change. The preferred communication protocol of FIG. 5 allows for the shortening of the latency of the base station 104 transmission after receiving the user station transmission 430.

In loop 401, during each time slot 410 a user station 102 first transmits a user station transmission 430 which is received by a base station 104. The user station transmission 430 includes sufficient information to sound the communication channel. The base station 104 receives the user station transmission 430 on a plurality of antennas, each of which produces channel characterization information. The channel characterization information is used to select an antenna (or antennas, or separate transmit and receive antenna(s)) and to determine the transmission power level to be used for a base station transmission 440 following the user station transmission 430.

In a preferred embodiment, the elapsed time between reception of the user station transmission 430 and the beginning of the base station transmission 440 is no greater than about 1.25 msec so that the channel characteristics remain relatively constant. This technique may be referred to as a "mobile-first" or "handset-first" communication protocol, which provides a means for the base station to have valid information for selecting the best base station antenna (or antennas) and a transmission power level given the characteristics of the transmission channel between the base station 104 and the user station 102.

If pure selection diversity is used, wherein the antenna and rake channel with the strongest signal is selected for communication, then a function of the transmitted preamble code is preferably to identify the strongest signal path (i.e., antenna and propagation path) which will then be the signal path used by the demodulator.

Figure 64:
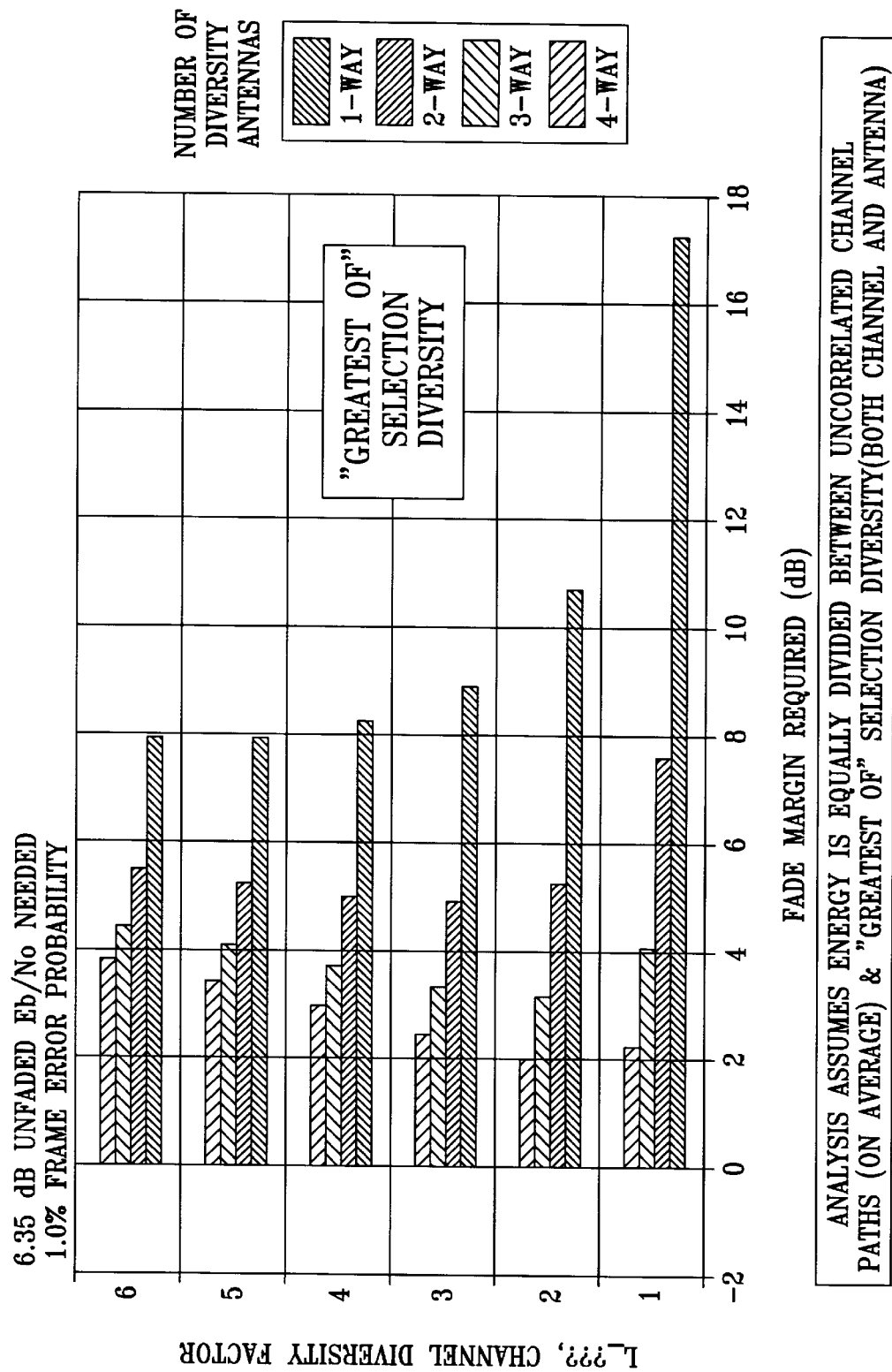
FIG. 64 is a graph comparing an additional mean signal strength necessary to maintain a performance level based on various numbers of antenna channel paths and rake channel paths.

FIG. 64 is a graph comparing the additional mean signal strength necessary to maintain FER performance in a variety of selection diversity scenarios, assuming the signal energy is equally divided between uncorrelated antenna channel paths and the selection diversity antenna channel path. The vertical axis in FIG. 64 shows the number of rake channels (one to six) and the horizontal axis shows the additional mean signal strength (in dB) needed. The additional mean signal strength is shown at each rake channel value for different numbers of antennas, from one to four (i.e., "1-way" antenna "diversity" to "4-way" antenna diversity). The gain from increasing the number of antennas from which one antenna may be selected using selection diversity is greatest when the number of channel diversity paths is low (i.e., when the number of rake channels is low). When the number of rake channels is high, adding antennas does not provide as large a marginal improvement in required signal strength.

The results shown in the FIG. 64 graph generally apply to all the cases of partitioning thus far discussed, so long as the fading level remains substantially stationary over the duration of the preamble code.

Instead of selection diversity, combining diversity may be used, wherein the receiver selects one or more antenna paths for use by the demodulator. Where combining diversity is used, a function of the transmitted preamble code is preferably to identify all paths with significant energy for input into the demodulator. As the number of potential diversity channels increases, selecting these paths becomes more difficult. Because no single channel has to be very strong for demodulation to be successful where combining diversity is used, the antenna path selection process generally needs to identify relatively small signal levels as compared with the pure selection diversity case. However, as the signal strength decreases on a given antenna path, its contribution to the demodulation process also diminishes, and detection probabilities of less than 99% may become acceptable for individual antenna/path signal components. Also, the stronger and easier-to-identify antenna paths remain the most important antenna paths to identify.

Because of the variables involved with identifying and combining signals for use in the demodulation process, preamble code detection performance for a combining diversity system is more difficult to predict than for a system using selection diversity. Performance of a system using combining diversity may be evaluated by computer simulation. Such a simulation may be advantageously run with or without interference effects; the effect of interference may in some cases be estimable from an interference-free simulation.

FIG. 65 is a chart showing preamble code detection performance in a Rayleigh fading environment for various chipping rates and preamble code lengths, assuming no partitioning. The chipping rates considered are 5.00 MHz, 2.80 MHz, 1.60 MHz, and 1.40 MHz, and the preamble code lengths are 11, 13, 25, 28, 56, 84, 112 in various (but not all possible) combinations with the chipping rates and preamble code detection threshold levels (90% or 99.9%). Assumptions for the FIG. 65 chart include a probability of false alarm of 1%, three antenna channels, a single (i.e., non-dispersive) rake channel, a noise figure of 4 dB, an implementation loss of 3 dB, and a CFAR loss of 2 dB. The FIG. 65 chart shows, for a 99.9% probability of preamble code detection, the preamble code detection threshold setting (in dBm) in a first column where there are no significant sidelobes (i.e., only background noise) and in a second column where there is a −7 dB peak sidelobe to be rejected by the demodulator. The FIG. 65 chart also shows that, for a 90% probability of preamble code detection factor, the preamble code detection threshold setting (in dBm) in a first column where there are no significant sidelobes (i.e., only background noise) and in a second column where there is a −7 dB peak sidelobe to be rejected by the demodulator. As shown in FIG. 65, the chipping rate, preamble code length, probability of detection desired, and expected peak sidelobe all contribute to the required detection threshold setting.

Selection of a set of concatenated preamble codes for use in a communication system may advantageously be accomplished by automated or computer processing. A preferred methodology for selecting a preamble code set comprises four main steps. In a first step, the length L of a desired concatenated preamble code is selected. Typically, in a communication system it is desired that all of the preamble codes in use have the same length. The desired length L of the preamble codes is selected based upon factors such as the amount of noise or interference rejection needed, and the acceptable time of processing the preamble code at the receiver.

In a second step, after the desired length L of a concatenated preamble code is selected, two groups G1, G2 of subcodes are selected, which will ultimately be used for generating a universe of concatenated preamble codes of the desired length L. In a first sub-step, subcode lengths are determined. The subcode lengths S1, S2 are generally chosen to be factors of L such that, when multiplied together, they equal the desired length L. Thus, for example, if the desired length L is 128, suitable subcode lengths S1, S2 would be 4 and 32, for example. In some cases, the subcode lengths may be chosen to be the same.

In a second sub-step after selection of the subcode lengths S1 and S2, subcodes are selected for each of the subcode lengths S1, S2 to arrive at two groups G1 and G2 of subcodes. All codes of lengths S1 may be chosen for the subcodes of group G1, and all of the codes of length S2 may be chosen for the subcodes of group G2. Alternatively, a limited number of codes of each length may be chosen for each group G1, G2. As a particular example, assuming subcode length S1 is 4, then two codes may be selected for group G1, and these codes may be the two length-4 Barker codes (i.e., "1110" and "1101"). Further assuming, by way of example, that subcode length S2 is 32, then the set of approximately 844 length-32 minimum peak sidelobe codes are potentially available for use as subcode S2 and, when concatenated with the two length-4 Barker codes of group G1, yield a total of 1688 candidate concatenated preamble codes of length-128.

As a general matter, subcodes of a particular group are preferably selected to have low auto-correlation peak sidelobes, and to have low cross-correlation with the other subcodes within the group. Barker codes and minimum peak sidelobe codes are preferable; other codes may also be used. Details regarding various different codes and code families are further explained at various places herein.

In a third step, a universe U of concatenated preamble codes is generated by taking the kronecker product of each subcode from group G1 with each subcode from the group G2. Preferably, in carrying out the third step, the smaller of the two subcodes is the first factor in the kronecker product, and the larger of the two subcodes is the second factor in the kronecker product, thereby leading to a lesser repetition of the same subcode.

In a fourth step, a family F of concatenated preamble codes is selected from among the concatenated preamble codes in the code universe U for use in a communication system. The family F comprises a number N of concatenated preamble codes, with the number N depending upon the system requirements, such as the number of potential simultaneous users.

Selecting a family F of preamble codes from the code universe U involves an optimization process for selecting the preamble codes with the best auto-correlation and cross-correlation properties. The optimization process includes three main sub-steps. First, a trial family F' of N concatenated preamble codes is arbitrarily selected from the code universe U. Second, the concatenated preamble codes in the trial family F' are evaluated for autocorrelation and cross-correlation performance. Third, each concatenated preamble code in the code universe U, other than those in the trial family F', is tested against the concatenated preamble codes in the trial family F' for autocorrelation and cross-correlation performance. If the tested preamble code is superior to the weakest preamble code of the trial family F', then the tested preamble code replaces the weakest preamble code in the trial family F'. After all of the concatenated preamble codes in the code universe U have been cycled through, the trial family F' becomes the family F of optimum preamble codes to be used.

In testing the concatenated preamble codes against the trial family F' of preamble codes, it may be advantageous to weight the cross-correlation scores and auto-correlation scores differently, and, in particular, to weight the auto-correlation score slightly higher than the cross-correlation score.

A computer programming for carrying out the general functions of the optimization process is appended hereto, and appears just prior to the claims.

An example of the code selection process is as follows. Building upon the previous example, with subcode lengths S1 and S2 selected as 4 and 28, respectively, a first group G1 of subcodes can be chosen to include the two length-4 Barker codes ("1110" and "1101"), and a second group G2 of subcodes can be chosen to include a number of length-32 codes having optimal auto-correlation and cross-correlation properties. A universe U of length-128 concatenated preamble codes can be generated by taking the kronecker product of the first Barker code ("1110") with each of the subcodes in the second group G2 of subcodes, and the kronecker product of the second Barker code ("1101") with each of the subcodes in the second group G2 of subcodes. From this universe U, the optimization process of the fourth step described above may be applied, with N=7, to yield the following set of preferred length-128 concatenated preamble codes:

$P1$ = 11101110111000011110111011100001000111110
 1110111000011110000111101110000111101110
 00011110111011100001000100010000100011110
 11101110

$P2$ = 11101110000100010001111000010000100011110
 1110110111011100001111011101110111000011110
 11100000100011110000111101111000111100001
 00010001

$P3$ = 11101110111000010001000010001000111101110
 111000001000111000001000111100001000010001
 1110111000001111000011110111101111000011110
 11101110

$P4$ = 11101110000111110000111110000111111000010001
 1110000100011110111011101111011101111011100001
 00011110111000010001000111110111000010001
 00010001

$P5$ = 11100001111000010001111101111000011111000001
 00010001111101111000010001000111110000010001
 0001000100010001000100011110111011011101110
 00011110

$P6$ = 1110111000011110111011101111011101111011101110
 000100011110111011110000100010001111100001
 1110111000001111011110000100010001111100001
 11101110

$P7$ = 111011101111011101110111011111100001000010001
 00011110111000011110000100011110000011110
 0001111000001111000001000111110111000010001
 11101110

While the above process has generally been described with respect for selection of a set of concatenated preamble codes, it is also applicable to selection of other codes, such as repeated codeword preamble codes or spreading codes.

The preamble codes and preamble code detection techniques described herein may be used in conjunction with either the FIG. 4 or FIG. 7 time frame structure, or in a variety of other digital communication systems whether or not TDMA in nature. These techniques may also be used with or without antenna diversity. Further, while preamble codes have been discussed in terms of "chips" so as generally to relate the preamble codes to a preferred spread spectrum communication system, any binary elements may be used instead of chips to construct preamble codes in accordance with the techniques disclosed herein. Moreover, while certain types of quadriphase codes have been discussed with respect to preamble code construction, the invention is not to be limited to those particular quadriphase codes, but is intended to encompass other quadriphase codes as well as binary codes derived therefrom, or polyphase codes having suitable characteristics for preamble code construct ion in accordance with the described techniques.

Although preamble code concatenation has generally been shown using the kronecker product of two subcodes, and detection has generally been shown in some embodiments using a two-stage correlator (one stage for each subcode), the same principles may be extended to the general case of concatenation using N subcodes and an N-stage correlator for concatenated preamble code detection.

While preferred embodiments are disclosed herein, many variations are possible which remain within the concept and scope of the invention. Such variations would become clear to one of ordinary skill in the art after inspection of the specification and drawings herein. The invention therefore is not to be restricted except within the spirit and scope of any appended claims.

What is claimed is:

1. A correlator comprising:
   a mismatched filter;
   a first correlation signal output from said mismatched filter and having a correlation peak when a concatenated code is received, said concatenated code comprising a kronecker product of a first subcode and a second subcode, said first subcode having a length of one-half or less the length of said mismatched filter;
   a matched filter connected to said first correlation signal, said matched filter configured to detect said second subcode; and
   a second correlation signal output from said matched filter in response to said first correlation signal.

2. A correlator comprising:
   a mismatched filter;
   a first correlation signal output from said mismatched filter and having a correlation peak when a concatenated code is received, said concatenated code comprising a kronecker product of a first subcode and a second subcode,
   a matched filter connected to said first correlation signal, said matched filter configured to detect said second subcode; and
   a second correlation signal output from said matched filter in response to said first correlation signal,
   wherein said first correlation signal has a second correlation peak when a second concatenated code is received, said second concatenated code comprising a second kronecker product of said first subcode and a third subcode,
   a second matched filter connected to said first correlation signal, said second matched filter configured to detect said third subcode; and
   a third correlation signal output from said second matched filter in response to said first correlation signal.

3. The correlator of claim 2 wherein at least one of said first subcode, said second subcode. and said third subcode comprises a Barker code.

4. The correlator of claim 2 wherein at least two of said first subcode, said second subcode. and said third subcode comprises a non-Barker code.

5. The correlator of claim 2 wherein said mismatched filter has quantized coefficients.

6. A method of correlating to a code comprising the steps of;
   receiving a signal comprising the the code, said code comprising a kronecker product formed from a first subcode and a second subcode;
   correlating said signal with a first filter configured for said first subcode, said first filter comprising a mismatched filter having a length of at least twice the length of said first subcode;
   generating a first output correlation pulse when said first subcode is received;
   correlating an output of said first filter with a second filter configured for said second subcode; and
   generating a second output correlation pulse when said second subcode is received.

7. The method of claim 6 wherein said second filter comprises a matched filter.

8. The method of claim 6 wherein at least one of said first subcode and said second subcode comprises a Barker code.

9. The method of claim 6 wherein at least one of said first subcode and said second subcode comprises a non-Barker code.

10. The method of claim 6 wherein said first subcode and said second subcode each have low autocorrelation peak sidelobes.

11. A correlator comprising:
    a first filter configured to produce a first correlation pulse upon receipt of a first subcode, said first filter comprising a mismatched filter having a length of at least twice the length of said first subcode;
    a first correlation signal output from said first filter;
    a second filter connected to said first correlation signal and configured to produce a second correlation pulse upon receipt of a second subcode; and
    a second correlation signal output from said second filter in response to said first correlation signal.

12. The correlator of claim 11 wherein said second filter comprises a matched filter.

13. The correlator of claim 11 wherein said first filter produces a plurality of correlation pulses in response to receiving a kronecker product of said first subcode and said second subcode, one correlation pulse for each appearance of said first subcode in said kronecker product, and wherein said second filter produces said second correlation pulse in response to receiving said plurality of correlation pulses.

14. The correlator of claim 11 wherein at least one of said first subcode and said second subcode comprises a Barker code.

15. The correlator of claim 11 wherein at least one of said first subcode and said second subcode comprises a non-Barker code.

16. The correlator of claim 11 wherein said mismatched filter has quantized coefficients.

17. The correlator of claim 11 wherein each of said first subcode and said second subcode have low autocorrelation peak sidelobes.

* * * * *